(12) United States Patent  
Renema, II

(10) Patent No.: US 9,348,488 B1  
(45) Date of Patent: May 24, 2016

(54) METHODS FOR BLATANT AUXILIARY ACTIVATION INPUTS, INITIAL AND SECOND INDIVIDUAL REAL-TIME DIRECTIONS, AND PERSONALLY MOVING, INTERACTIVE EXPERIENCES AND PRESENTATIONS

(71) Applicant: Andrew Renema, II, Encinitas, CA (US)

(72) Inventor: Andrew Renema, II, Encinitas, CA (US)

(*) Notice: Subject to any disclaimer, the term of this patent is extended or adjusted under 35 U.S.C. 154(b) by 153 days.

(21) Appl. No.: 14/078,477

(22) Filed: Nov. 12, 2013

Related U.S. Application Data

(60) Provisional application No. 61/731,446, filed on Nov. 29, 2012.

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
None
See application file for complete search history.

(56) References Cited

U.S. PATENT DOCUMENTS

| 6,154,723 | A  | * | 11/2000 | Cox et al. ........................ 704/270 |
| 7,932,909 | B2 |   | 4/2011  | Niles |
| 2008/0245212 | A1 | * | 10/2008 | Lemons ................ G09B 15/02 84/483.2 |

OTHER PUBLICATIONS

McGugan, Will "Beginning Game Development with Python and Pygame," Berkeley, CA: Apress, 2007.

* cited by examiner

*Primary Examiner* — William Trapanese

(57) ABSTRACT

Methods for specifying and using objects, paths, initial and second individual real-time directions, and audio and video recordings entice users to create, share, and explore personally moving presentations and exhibits, without infringing copyrights. Similarly produced shows may comprise rich, interactive, graphical user interfaces, (GUIs), for additional services, applications, and content. Shows may be re-purposed to influence lighting devices and mechanical movements.

Figure 15:
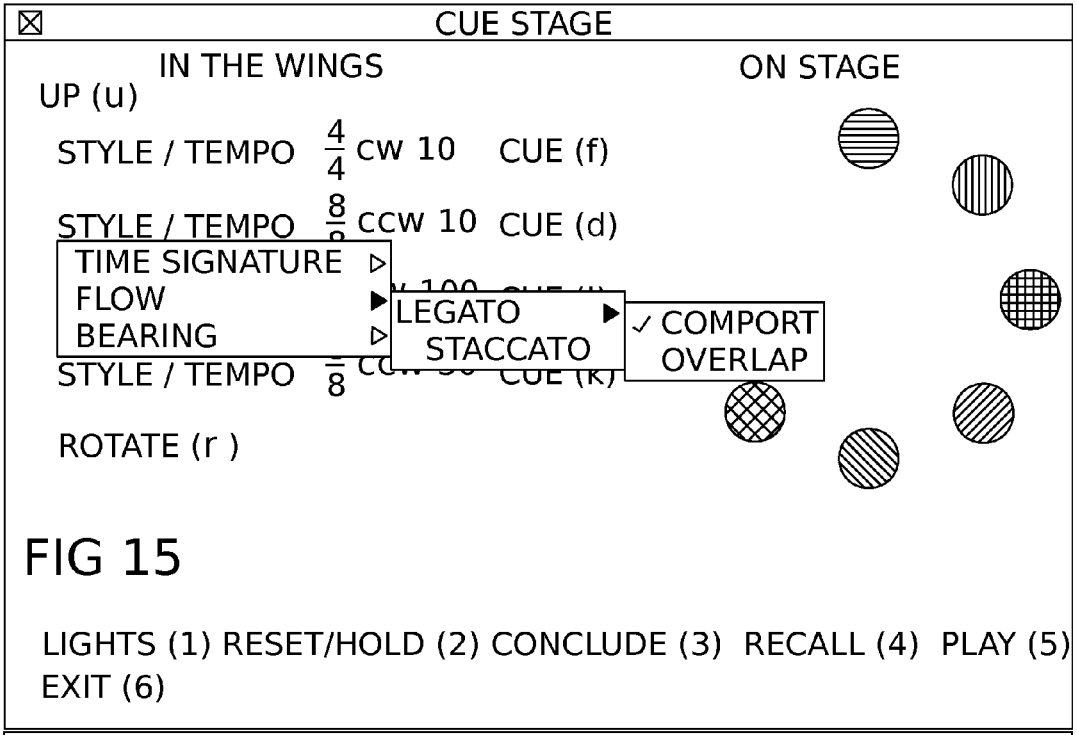

Methods for implementing auxiliary activation inputs that are blatantly displayed provide productivity boosts without memorization, efficient display utilization one fullscreen at a time, and efficacious use of available device inputs.

1 Claim, 69 Drawing Sheets

BUILD SHOW

3-D IMAGE OBJECT MEDLEY (m)

3-D IMAGE OBJECT SELECTION (s)

HELP FILES (h)

TO BEGIN, ACTIVATE A BUTTON:

CLICK "3-D IMAGE OBJECT MEDLEY"      OR TYPE "m",
CLICK "3-D IMAGE OBJECT SELECTION"   OR TYPE "s",
CLICK "HELP FILES"                    OR TYPE "h".

EXIT (6)

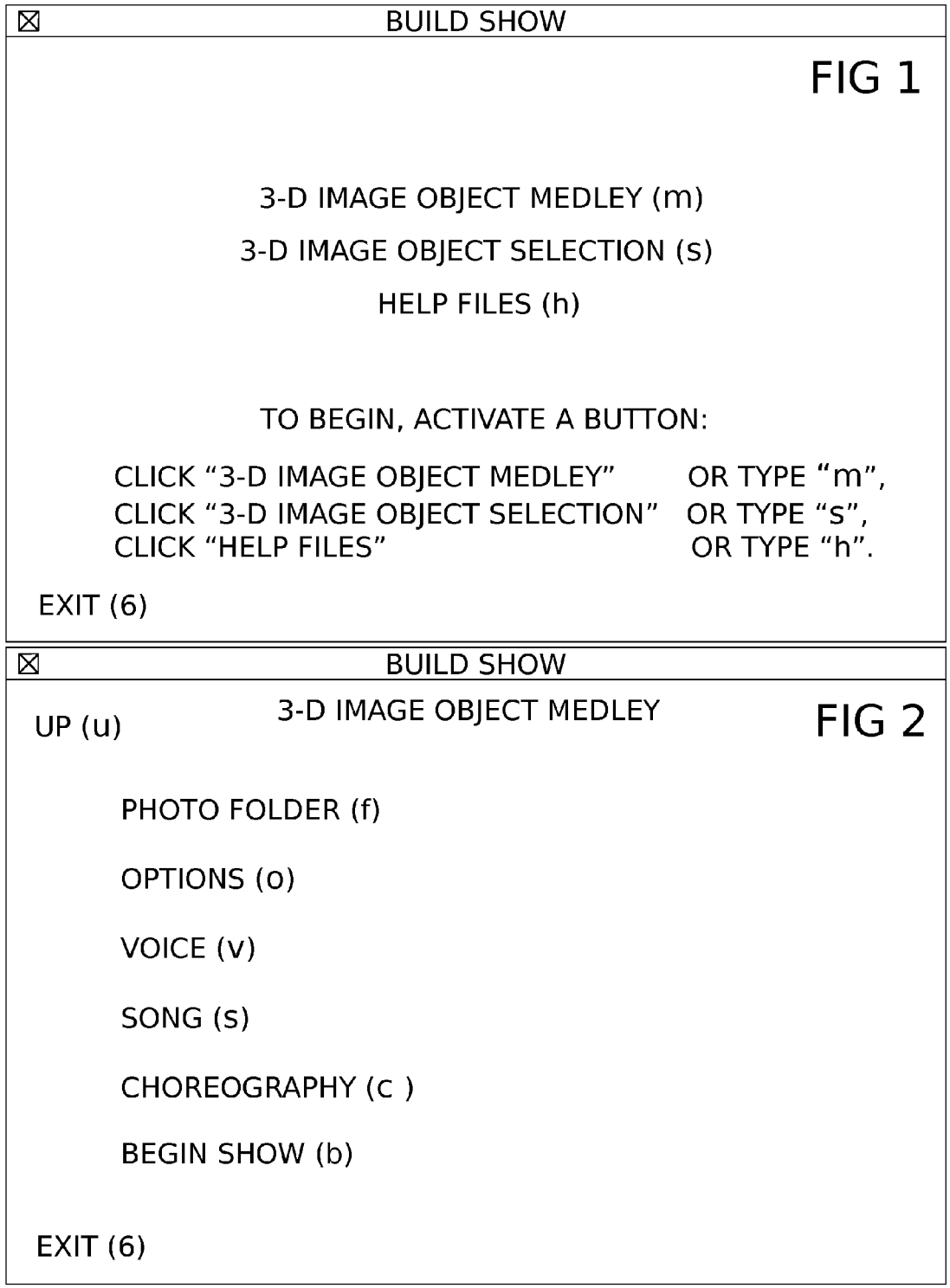

```
┌─────────────────────────────────────────────────────────┐
│ ☒           BUILD SHOW                                  │
│         SHOW FORMAT:    OPTIONS                         │
│ UP (u)  ☑ NORMAL SHOW (n)                      FIG 5    │
│         ☐ SLIDE SHOW (s)                                │
│     VIEW TIME (v): 400.0 s                              │
│     BACKGROUND SCENERY:                                 │
│         ☑ ON AT START (o)                               │
│         ☐ NON-PANORAMIC OPTION (p)                      │
│         ☐ ALTERNATE ORIENTATION (a)                     │
│         ☑ CUSTOM (FIRST ON LINEUP) (c)                  │
│     RESOLUTION:                                         │
│         ☑ LOW (l)                                       │
│         ☐ MEDIUM (m)                                    │
│         ☐ HIGH (h)                                      │
│     ADVANCED:                                           │
│         BOTTOM CORRECTION (b): 0.975                    │
│         ☐ RESIZE PHOTOS (NEAREST POWER-OF-2) (r)        │
│ EXIT (6)    CUSTOMIZE (z)                               │
└─────────────────────────────────────────────────────────┘
┌─────────────────────────────────────────────────────────┐
│ ☒           BUILD SHOW                                  │
│         SHOW FORMAT:    OPTIONS                         │
│ UP (u)  ☑ NORMAL SHOW (n)                      FIG 6    │
│         ☐ SLIDE SHOW (s)                                │
│     VIEW TIME (v): 400.0 s                              │
│     BACKGROUND SCENERY:                                 │
│         ☑ ON AT START (o)                               │
│         ☐ NON-PANORAMIC OPTION (p)                      │
│         ☐ ALTERNATE ORIENTATION (a)                     │
│         ☑ CUSTOM (FIRST ON LINEUP) (c)                  │
│     RESOLUTION:                                         │
│         ☑ LOW (l)                                       │
│         ☐ MEDIUM (m)                                    │
│         ☐ HIGH (h)                                      │
│     ADVANCED:                                           │
│         BOTTOM CORRECTION (b): 0.975                    │
│         ☐ RESIZE PHOTOS (NEA  SO98-QZN8-U1T2-PMGU-RI0V  │
│ EXIT (6)    CUSTOMIZE (z)         B09-332               │
└─────────────────────────────────────────────────────────┘
```

```
┌─────────────────────────────────────────────────┐
│ ☒              BUILD SHOW                       │
├─────────────────────────────────────────────────┤
│ UP (u)                                   FIG 7  │
│                    VOICE                        │
│                                                 │
│     ☐ SILENCE (s)                               │
│                                                 │
│     ☒ RECORDING (r)    NEW VOCAL RECORDING NAME (n) │
│                                                 │
│                                                 │
│                                                 │
│           CURRENT VOCAL RECORDING NAME:         │
│         /Users/kjacobi/projects/vocalRecordings/ │
│                   Band One Ad.mp3               │
│ EXIT (6)                                        │
└─────────────────────────────────────────────────┘
┌─────────────────────────────────────────────────┐
│ ☒              BUILD SHOW                       │
├─────────────────────────────────────────────────┤
│ UP (u)                                   FIG 8  │
│                    SONG                         │
│                                                 │
│     ☐ SILENCE (s)                               │
│                                                 │
│     ☒ MUSIC (m)        NEW SONG NAME (n)        │
│                                                 │
│                                                 │
│                                                 │
│                CURRENT SONG NAME:               │
│         /Users/kjacobi/Music/Band One/Album One/ │
│                   02 Song Two.mp3               │
│ EXIT (6)                                        │
└─────────────────────────────────────────────────┘
```

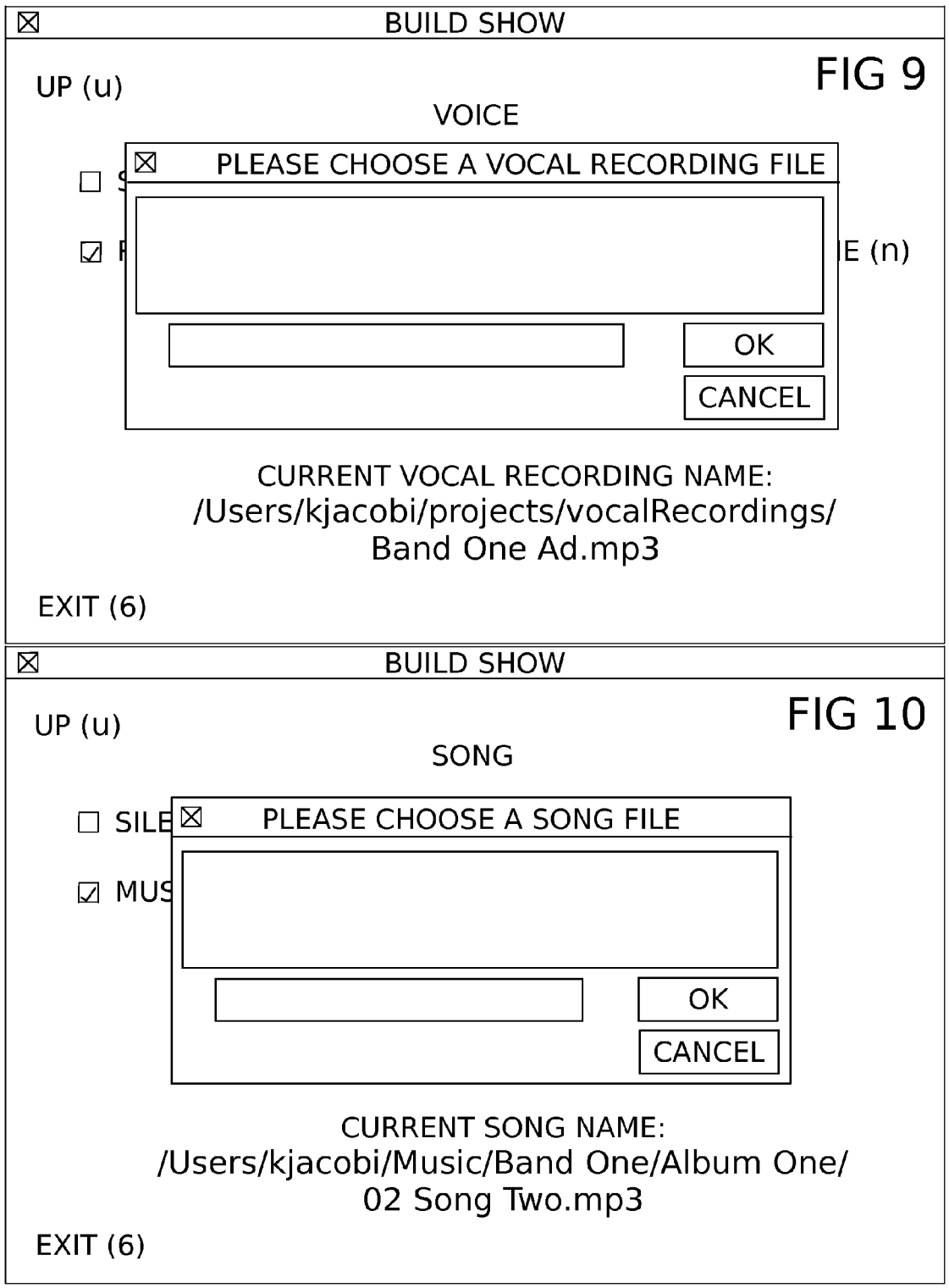

☒  BUILD SHOW

UP (u)

FIG 11

CHOREOGRAPHY

☐ STANDARD (s)   (EDITS, EDGE TRACK)

☑ DIRECTED (d) NEW DANCE (n) (CUE SEQUENCE AND EDITS, CUSTOM OR EDGE TRACK)

CURRENT DIRECTED DANCE:
Artist Three/Album Five/
01 Song One/012111/test4

EXIT (6)

---

☒  BUILD SHOW

UP (u)

FIG 12

CHOREOGRAPHY

☐ STANDARD (s)   (EDITS, EDGE TRACK)

☑ DIRECTED (d) NEW DANCE (n) (CUE SEQUENCE AND EDITS, CUSTOM OR EDGE TRACK)

STARTING CUE STAGE APPLICATION

CURRENT DIRECTED DANCE:
Artist Three/Album Five/
01 Song One/012111/test4

EXIT (6)

FIG 13

CUE STAGE

IN THE WINGS    ON STAGE

UP (u)

STYLE / TEMPO  $\frac{4}{4}$ cw 10  CUE (f)

STYLE / TEMPO  $\frac{8}{8}$ ccw 10  CUE (d)

STYLE / TEMPO  $\frac{8}{8}$ cw 100  CUE (j)

STYLE / TEMPO  $\frac{8}{8}$ ccw 50  CUE (k)

ROTATE (r)

LIGHTS (1) RESET/HOLD (2) CONCLUDE (3) RECALL (4) PLAY (5) EXIT (6)

FIG 14

CUE STAGE

IN THE WINGS    ON STAGE

UP (u)

STYLE / TEMPO  $\frac{4}{4}$ cw 10  CUE (f)

STYLE / TEMPO  $\frac{8}{8}$ ccw 10  CUE (d)

| TIME SIGNATURE ▶ | SIMPLE ▷ |
| FLOW ▷ | COMPOUND ▷ |
| BEARING ▷ | COMPLEX ▶ |

STYLE / TEMPO  $\frac{8}{8}$ $\frac{5}{4}$
$\frac{7}{4}$
$\frac{5}{8}$
$\frac{7}{8}$
$\frac{11}{4}$
$\frac{3}{2}$
✓ $\frac{8}{8}$ ROTATE (r)

LIGHTS (1) RESET/HOLD (2) CONCLU(3) RECALL (4) PLAY (5) EXIT (6)

FIG 17

CUE STAGE

IN THE WINGS      ON STAGE

UP (u)

STYLE / TEMPO   $\frac{4}{4}$ CW 10   CUE (f)

STYLE / TEMPO   $\frac{8}{8}$ CCW 10   CUE (d)

STYLE / [    ] UE (j)

STYLE / [    ] UE (k)

ROTATE

Dropdown:
- GRAVE
- LARGO
- LARGHETTO
- LENTO
- ADAGIO
- ANDANTE
- MODERATO
- ALLEGRETTO
- ALLEGRO
- PRESTO
- PRESTISSIMO
- ✓ MIO METRE ...

LIGHTS (    ) ONCLUDE (3) RECALL (4) PLAY (5)
EXIT (6)

FIG 18

CUE STAGE

IN THE WINGS      ON STAGE

UP (u)

STYLE / TEMPO   $\frac{4}{4}$ CW 10   CUE (f)

QUARTER NOTE BEATS PER MINUTE:   [10 /] (1 TO 600).
PRESS "ENTER" TO FINISH.

STYLE / TEMPO   $\frac{8}{8}$ CW 100   CUE (j)

STYLE / TEMPO   $\frac{8}{8}$ CCW 50   CUE (k)

ROTATE (r)

LIGHTS (1) RESET/HOLD (2) CONCLUDE (3) RECALL (4) PLAY (5)
EXIT (6)

CUE STAGE

IN THE WINGS      ON STAGE

UP (u)

STYLE / TEMPO   $\frac{4}{4}$ cw 10

STYLE / TEMPO   $\frac{8}{8}$ ccw 10

STYLE / TEMPO   $\frac{8}{8}$ cw 100

STYLE / TEMPO   $\frac{8}{8}$ ccw 50

ROTATE (r)    CUE (f)

CUE (j)      CUE (k)

FIG 19

CUE (d)

LIGHTS (1) RESET/HOLD (2) CONCLUDE (3) RECALL (4) PLAY (5) EXIT (6)

---

CUE STAGE

IN THE WINGS      ON STAGE

UP (u)

STYLE / TEMPO   $\frac{4}{4}$ cw 10   CUE (f)

STYLE / TEMPO   $\frac{8}{8}$ ccw 10   CUE (d)

STYLE / TEMPO   $\frac{8}{8}$ cw 100   CUE (j)

STYLE / TEMPO   $\frac{8}{8}$ ccw 50   CUE (k)

ROTATE (r)

FIG 20

LIGHTS (1) RESET/HOLD (2) CONCLUDE (3) RECALL (4) PLAY (5) EXIT (6)

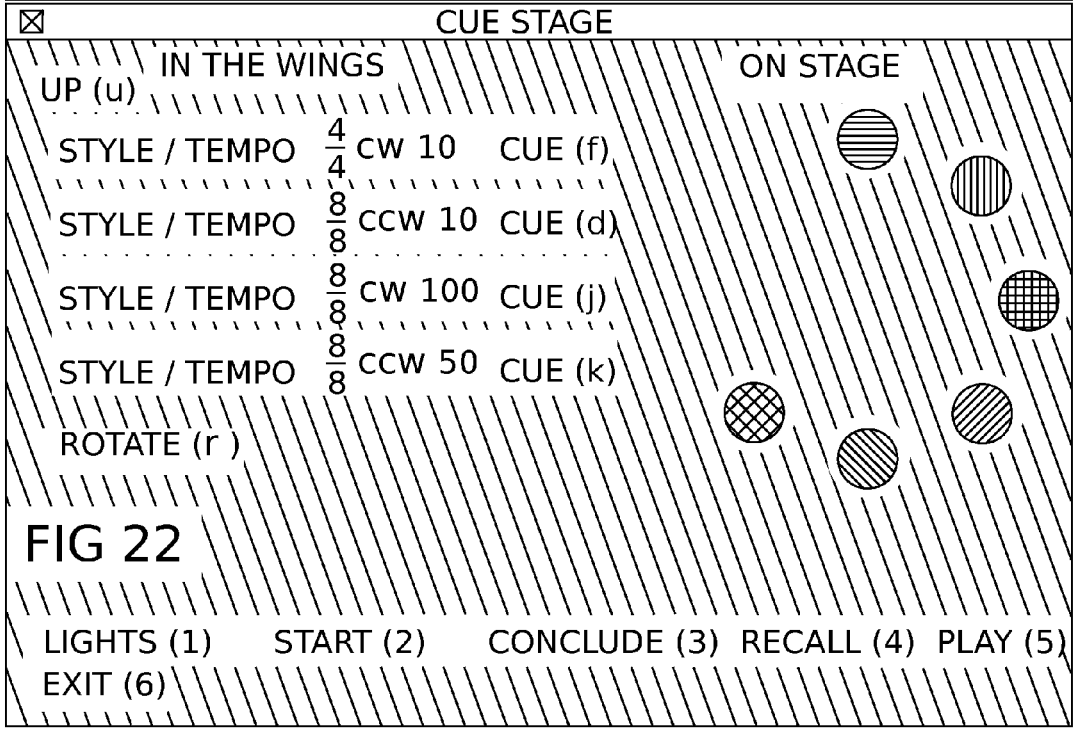

☒ CUE STAGE

FIG 29

USE MOUSE TO DRAW, ESC KEY TO FINISH

☒ CUE STAGE

FIG 30

UP (u)            IMPORT

IMPORT (i)

CREATES SUBFOLDERS IT DOES.  COPIES FILES IT DOES NOT!
SAVE TIME – DON'T RETYPE!

EXIT (6)

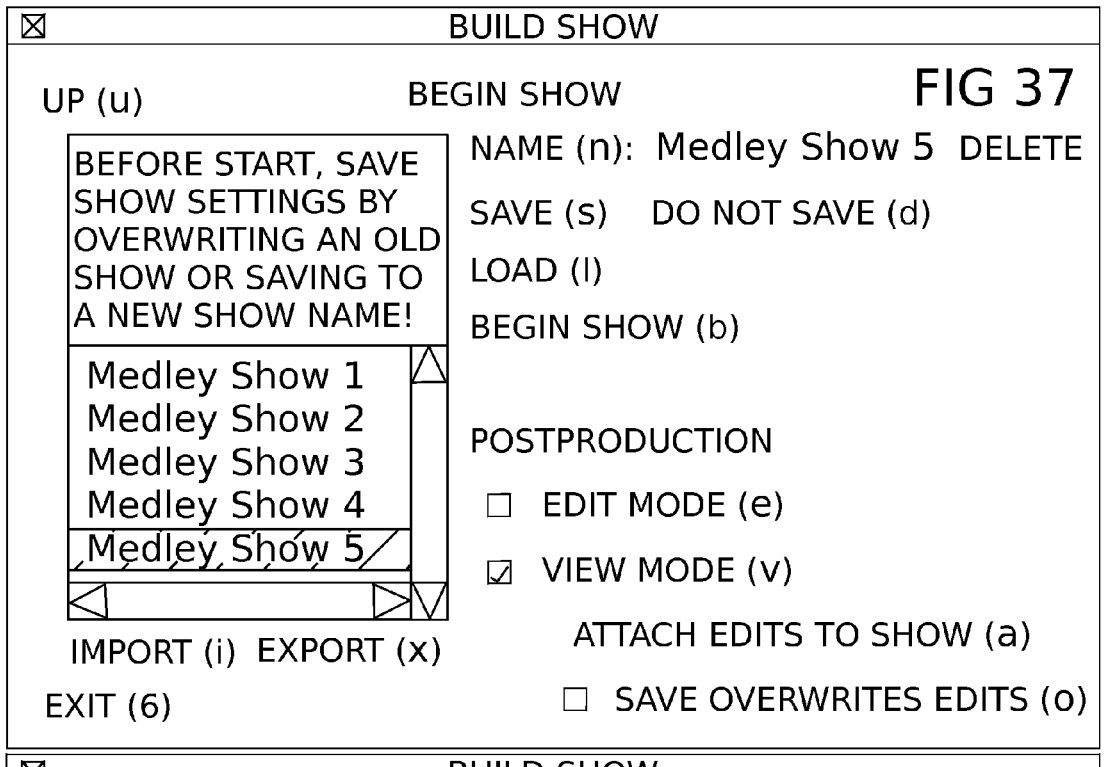
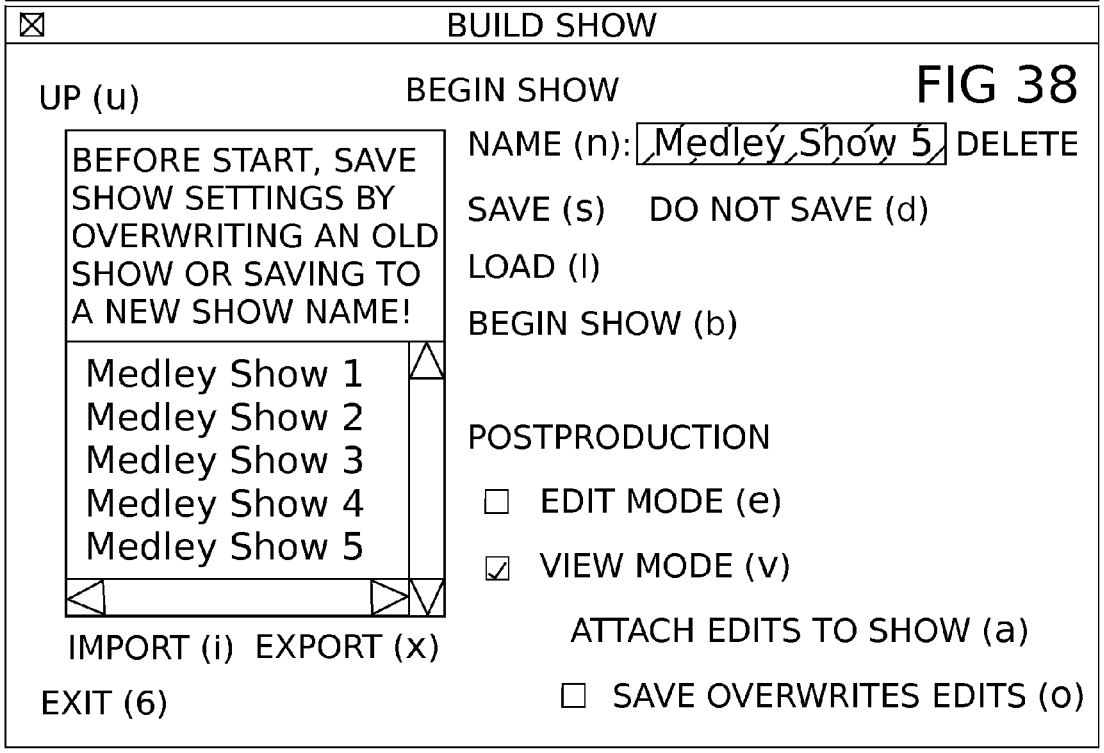

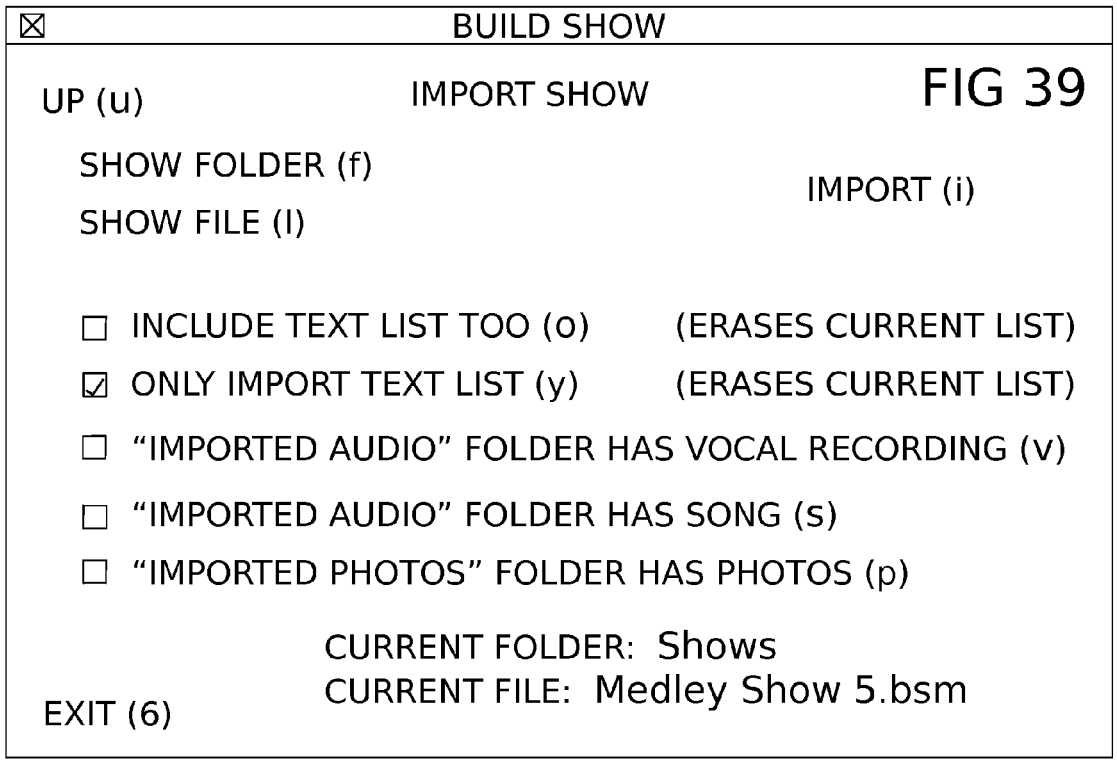
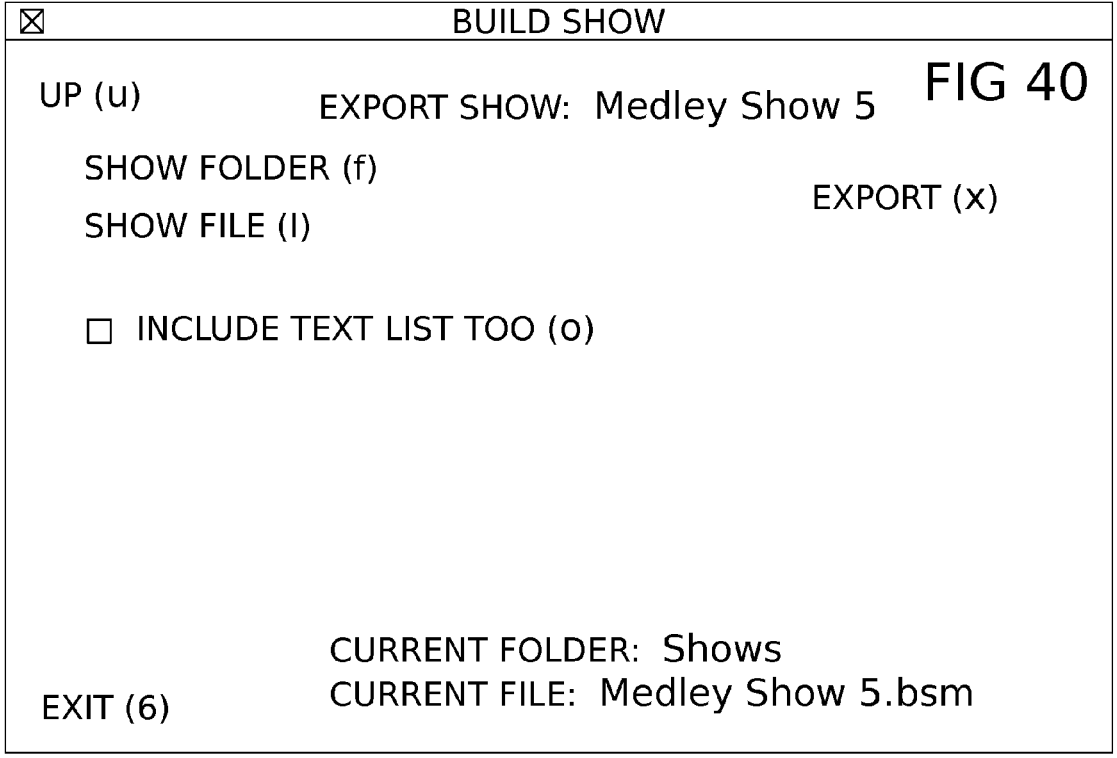

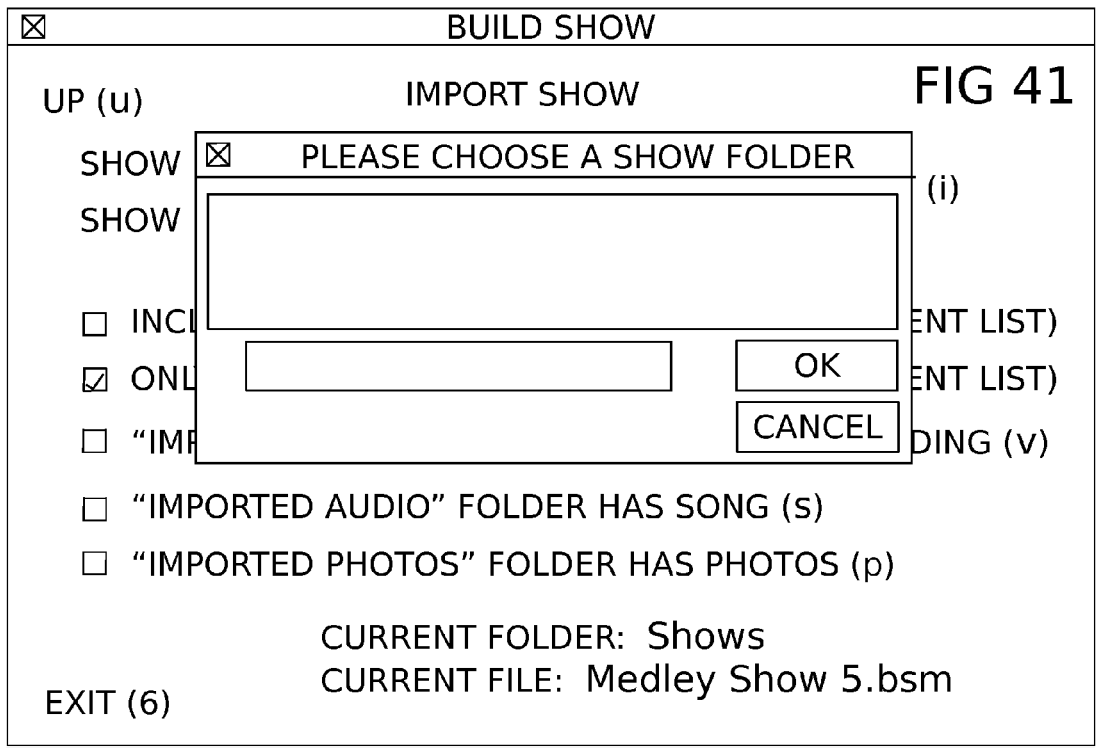
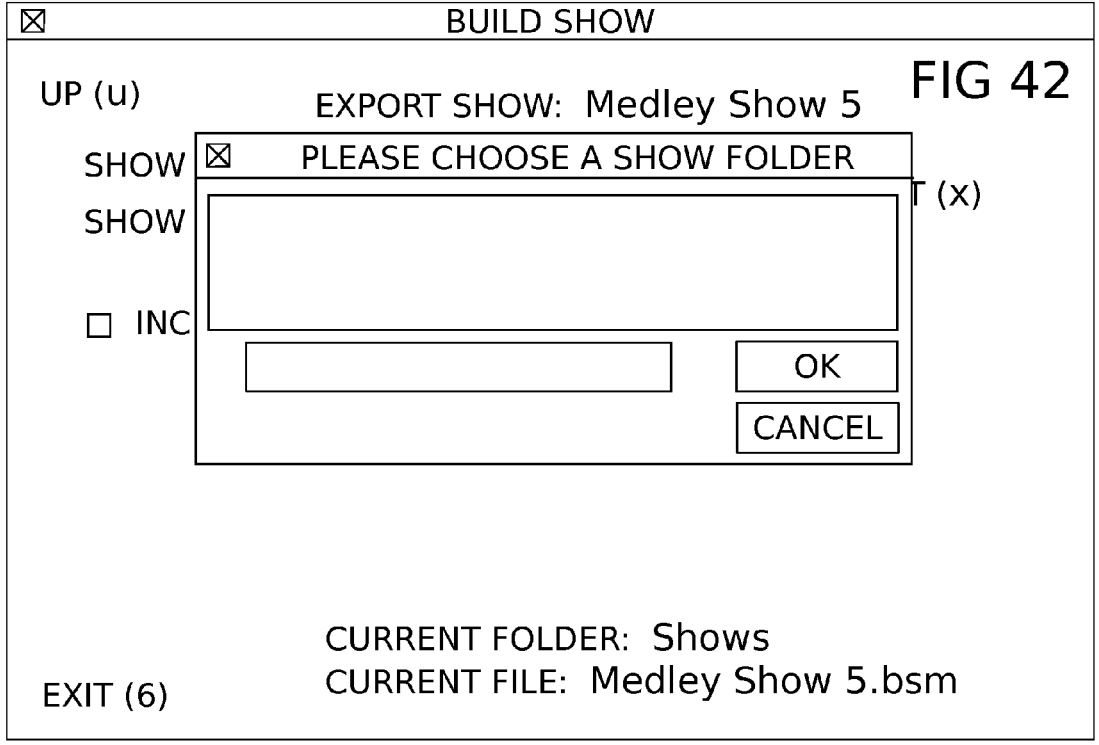

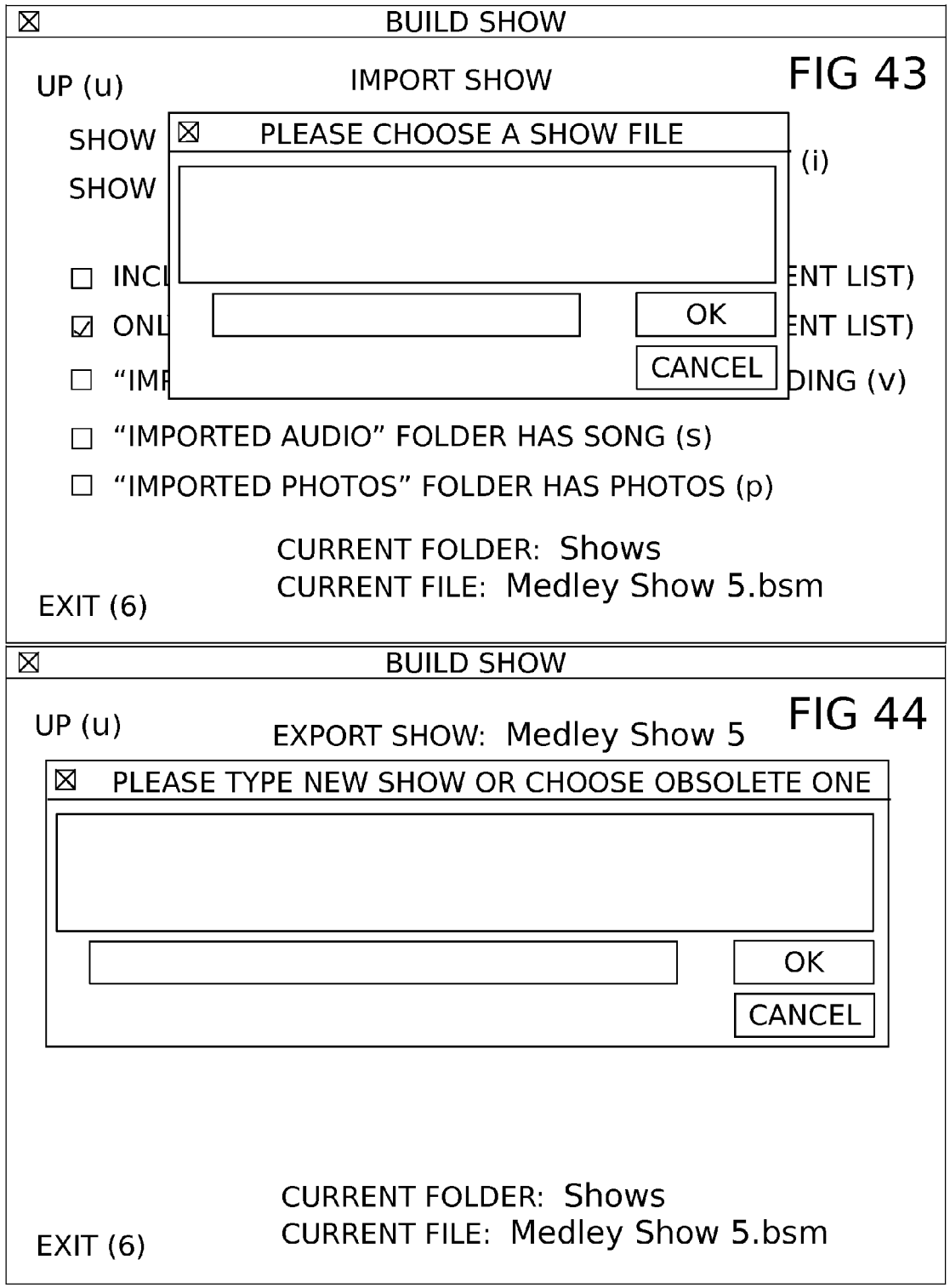

```
┌─────────────────────────────────────────────────┐
│ ☒            BUILD SHOW                         │
├─────────────────────────────────────────────────┤
│ UP (u)                                  FIG 45  │
│            3-D IMAGE OBJECT SELECTION           │
│                                                 │
│        3-D IMAGE OBJECTS (i)                    │
│                                                 │
│        OPTIONS (o)                              │
│                                                 │
│        VOICE (v)                                │
│                                                 │
│        SONG (s)                                 │
│                                                 │
│        CHOREOGRAPHY (c )                        │
│                                                 │
│        BEGIN SHOW (b)                           │
│                                                 │
│ EXIT (6)                                        │
├─────────────────────────────────────────────────┤
│ ☒            BUILD SHOW                         │
├─────────────────────────────────────────────────┤
│ UP (u)                                  FIG 46  │
│               3-D IMAGE OBJECTS                 │
│                                                 │
│        CREATIONS AND CHANGES (c )               │
│                                                 │
│        SHOW LINEUP (l)                          │
│                                                 │
│                                                 │
│                                                 │
│                                                 │
│                                                 │
│                                                 │
│ EXIT (6)                                        │
└─────────────────────────────────────────────────┘
```

FIG 45

FIG 46

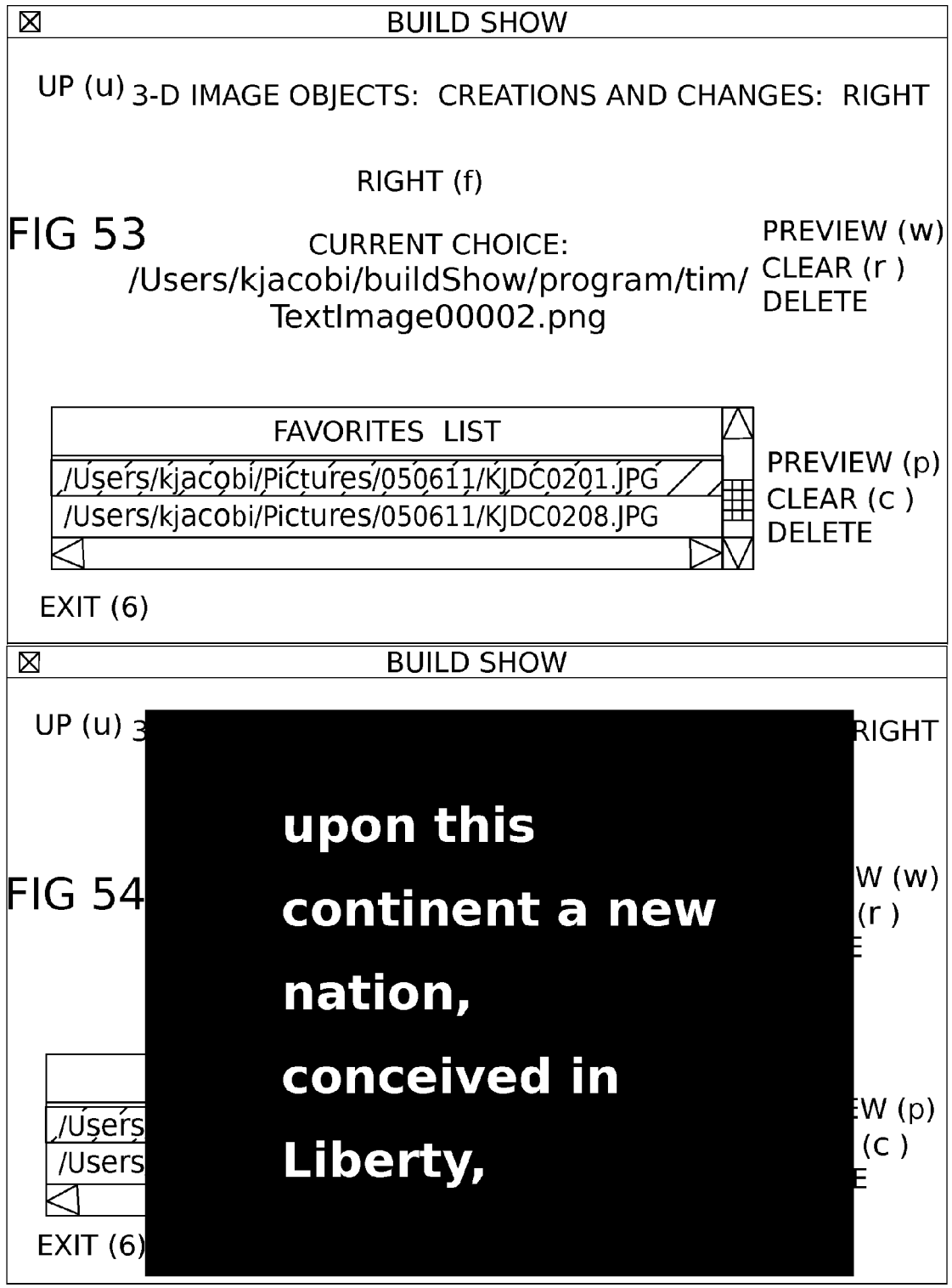

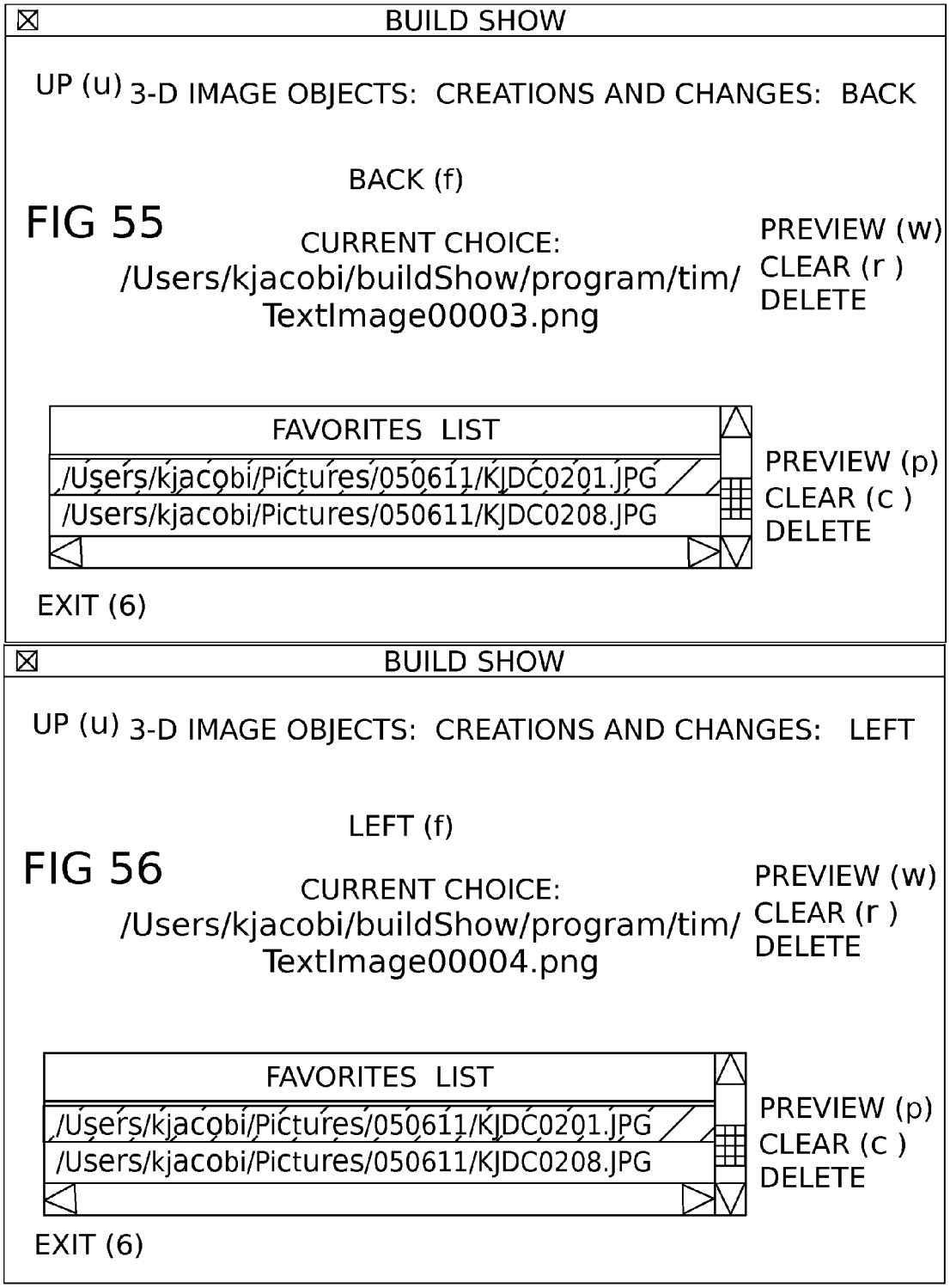

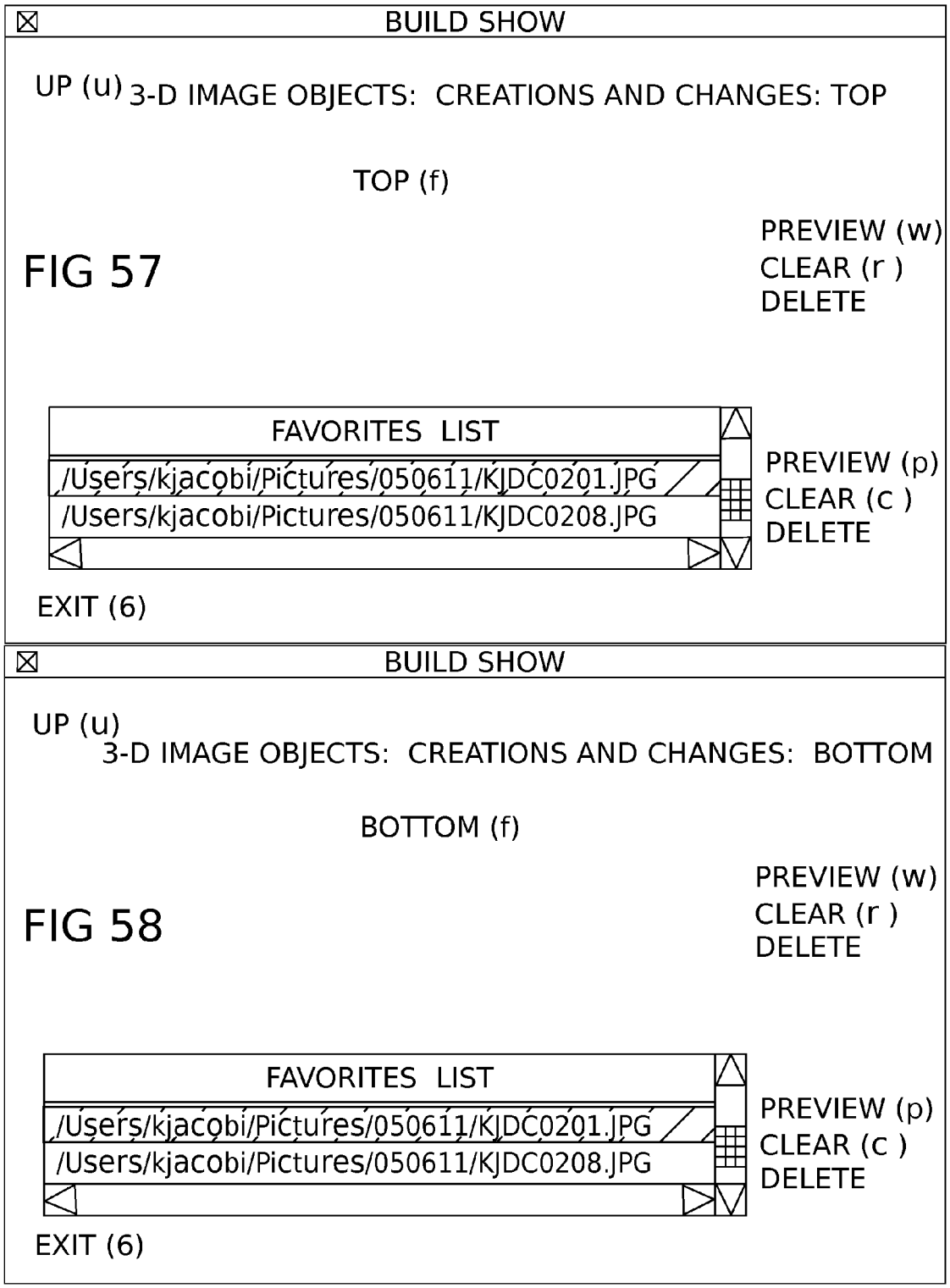

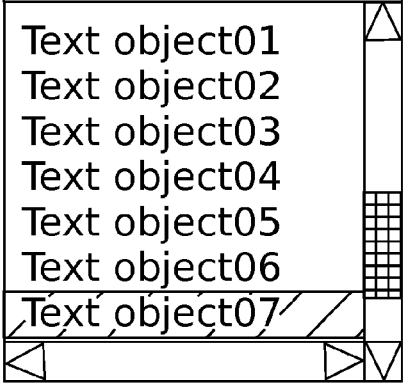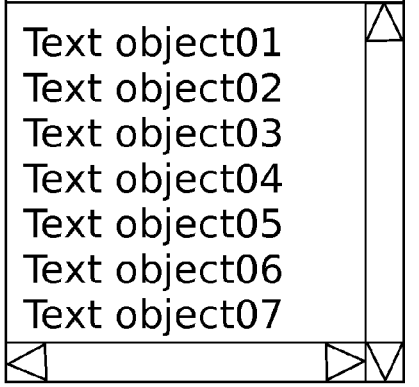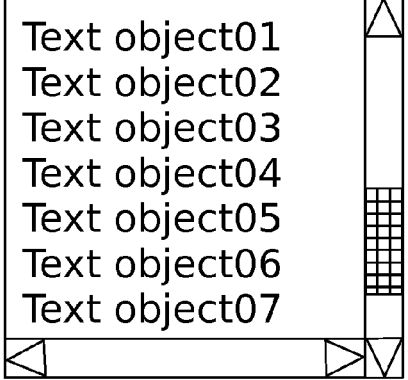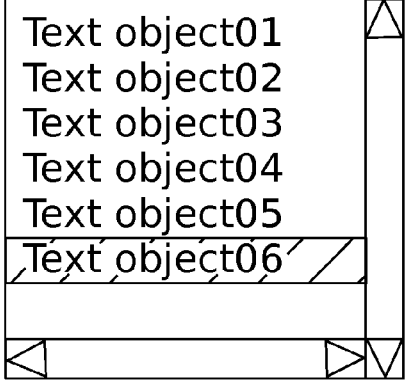

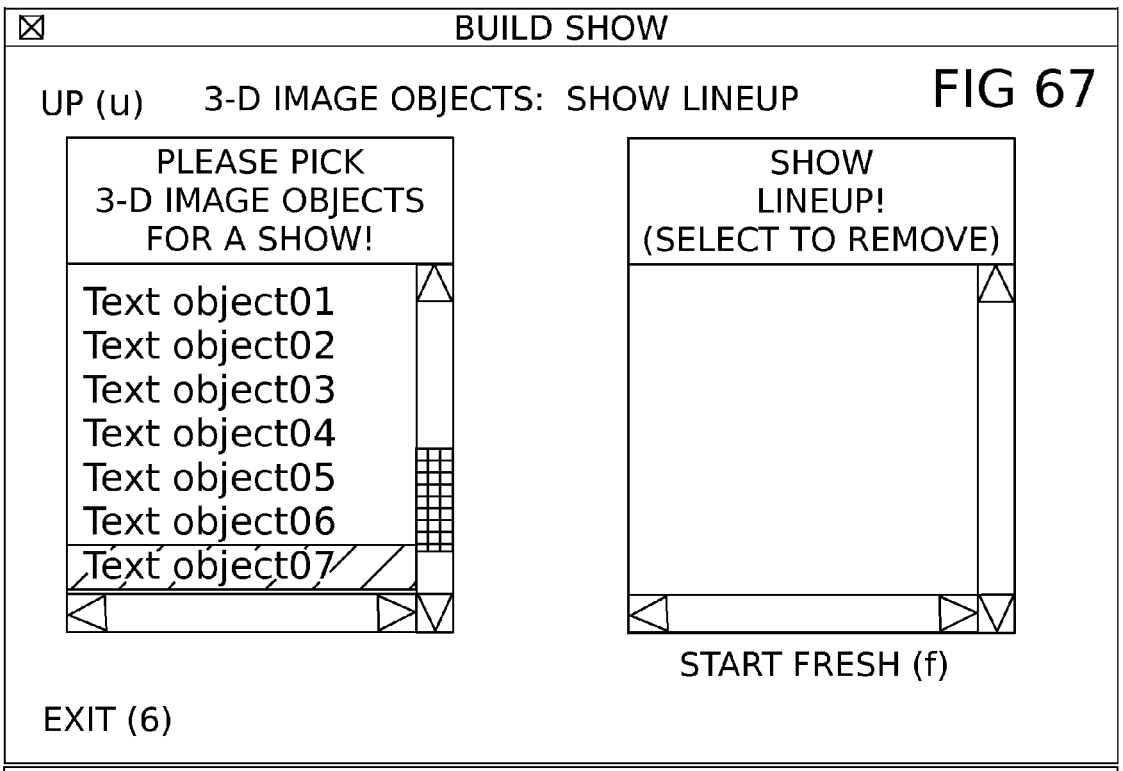
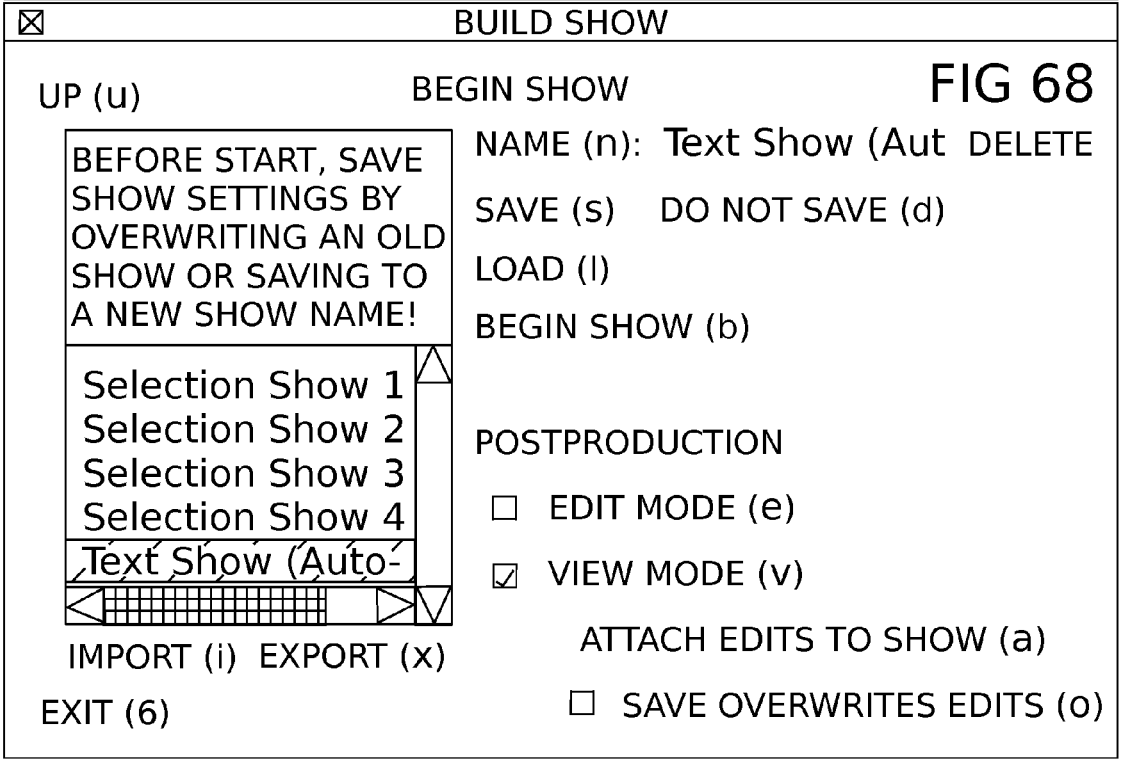

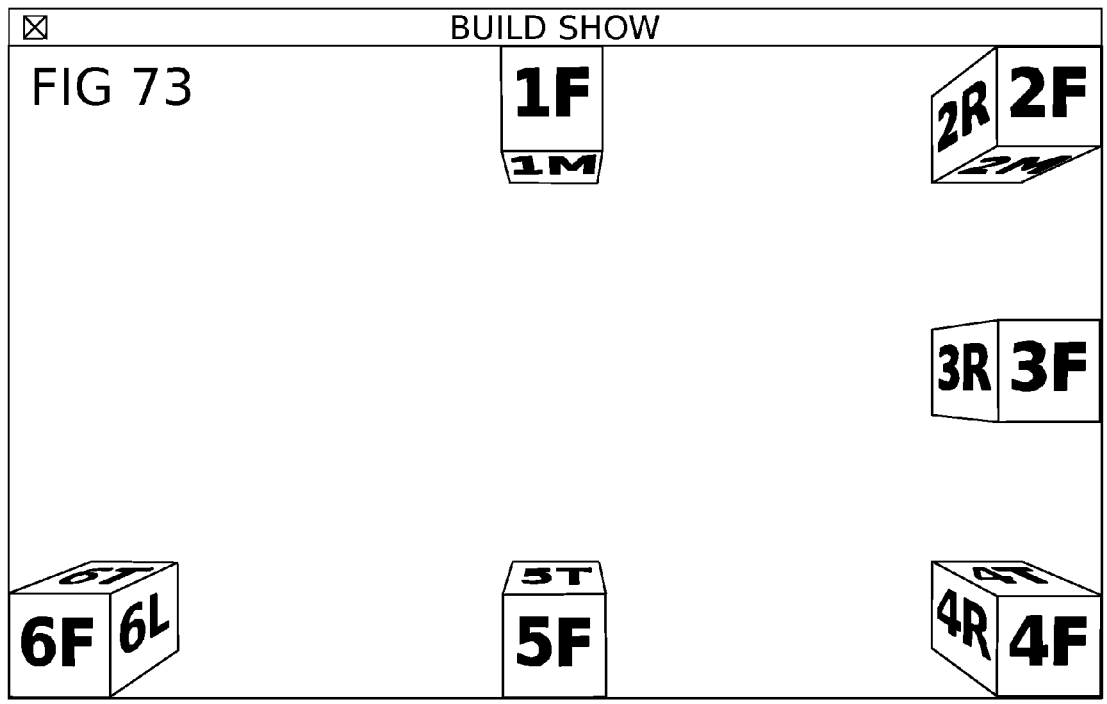
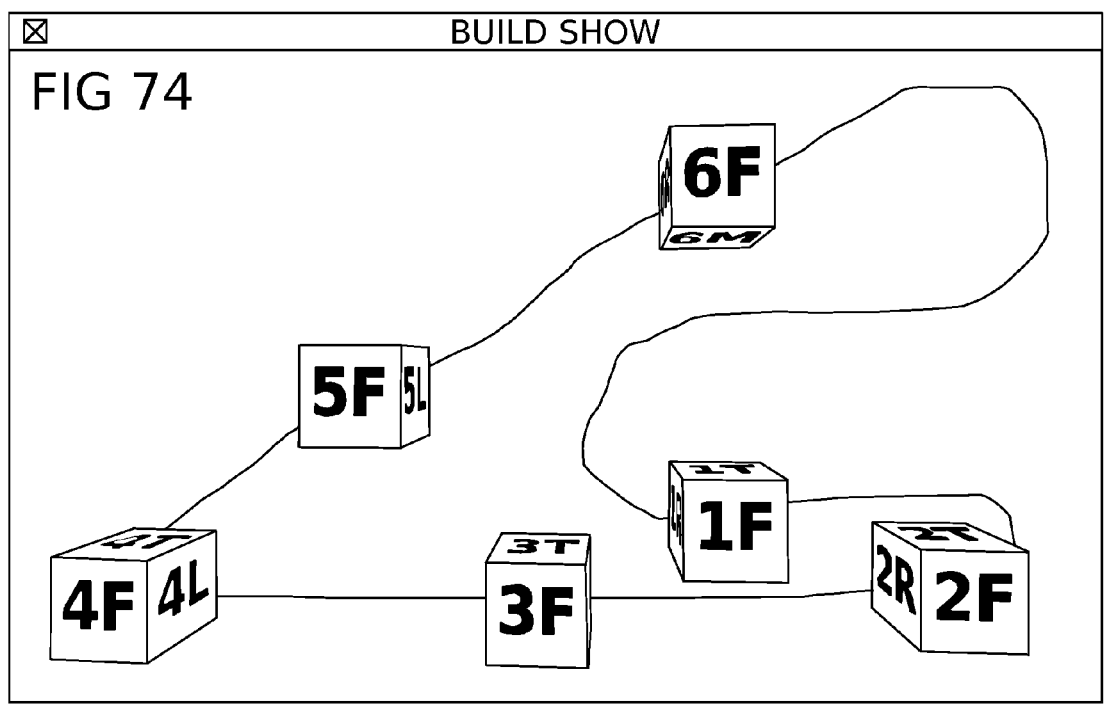

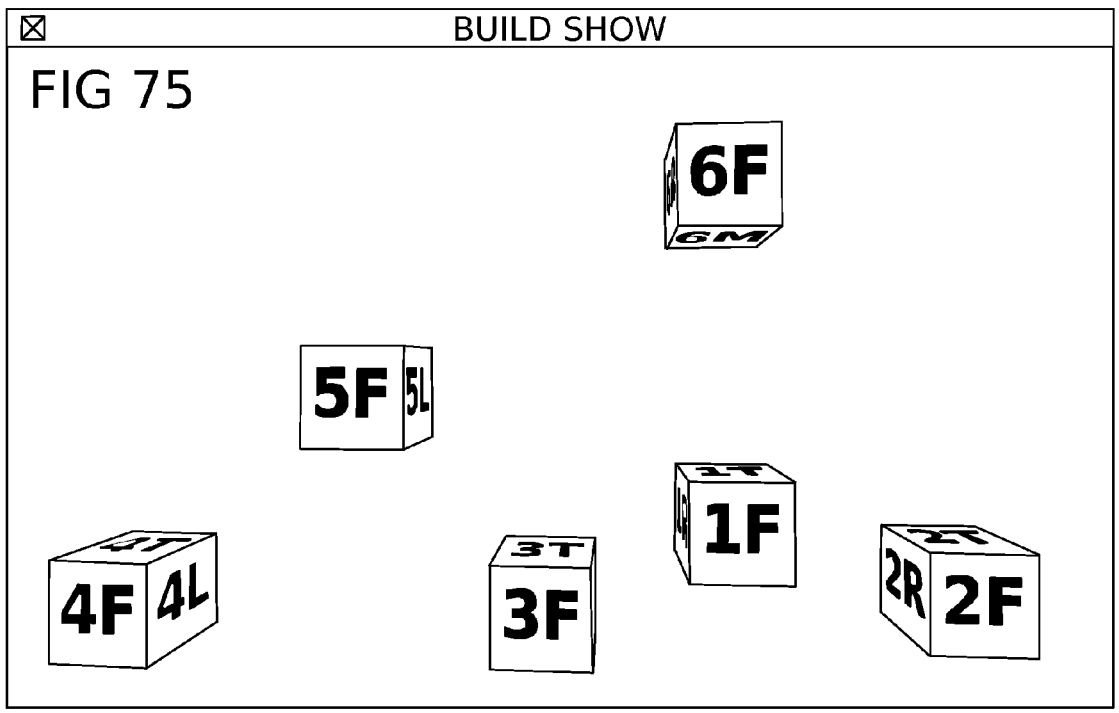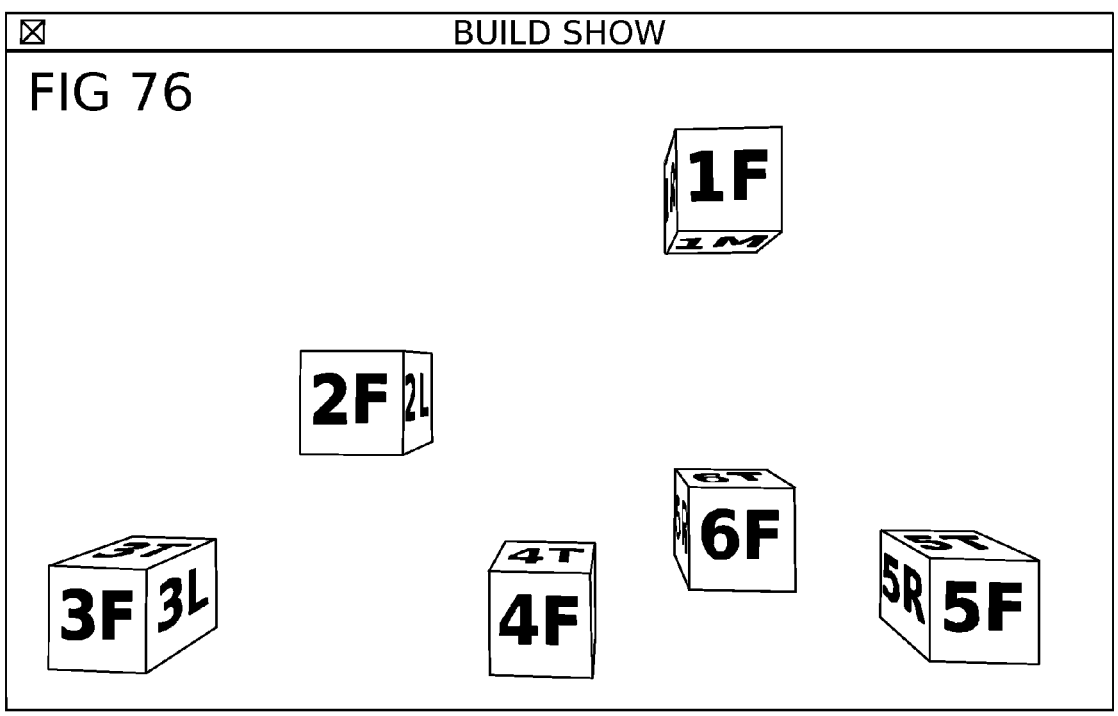

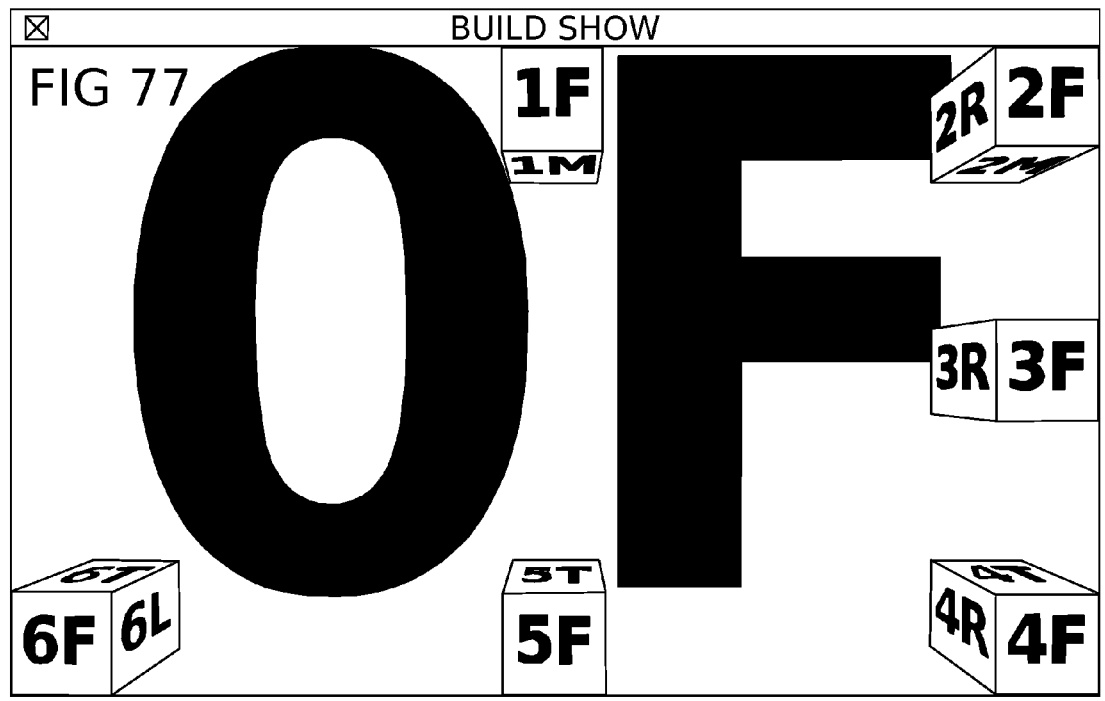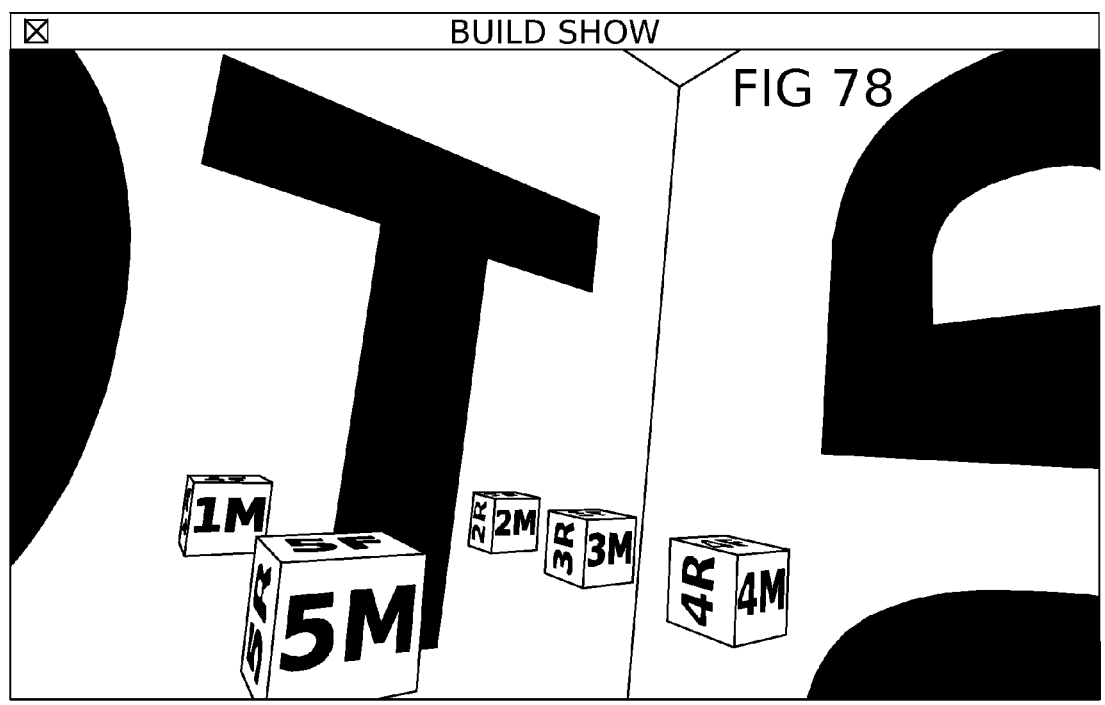

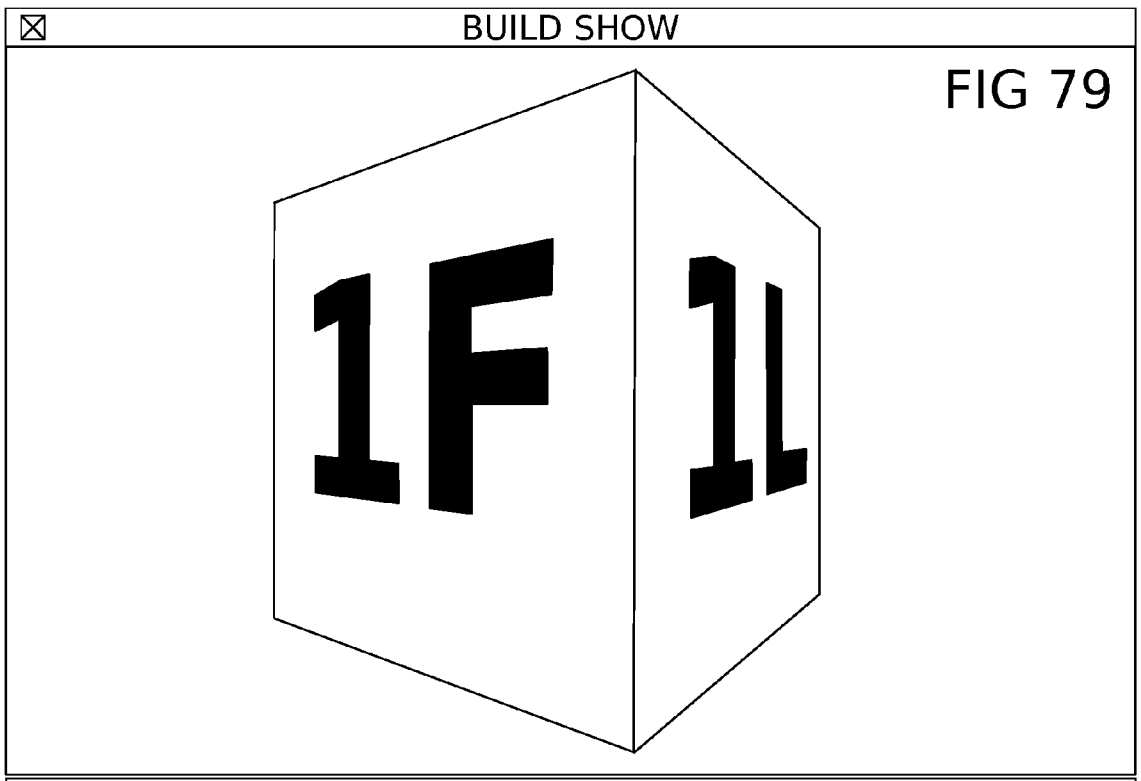
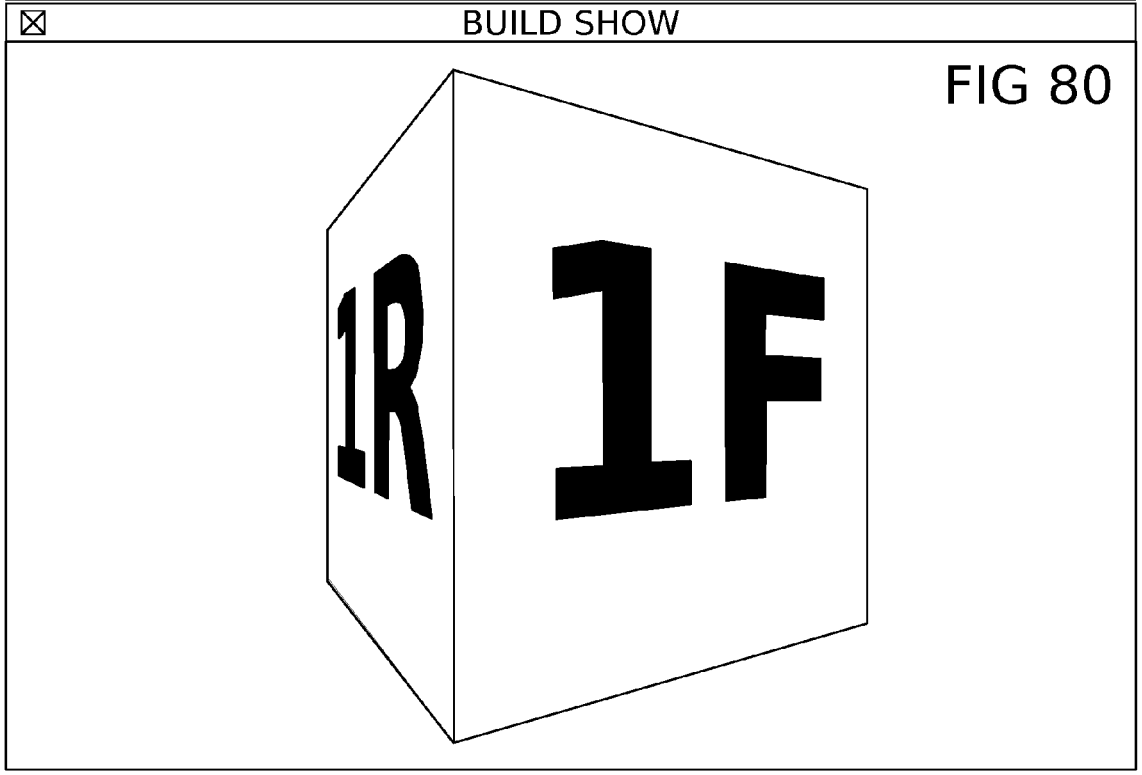

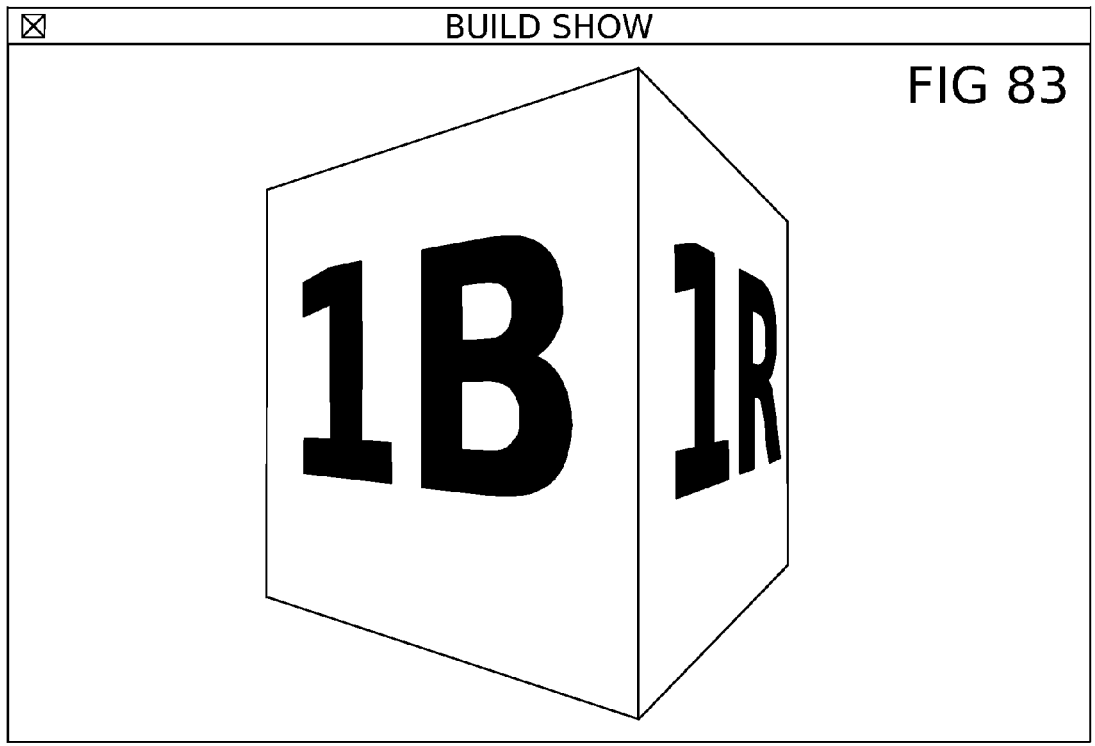
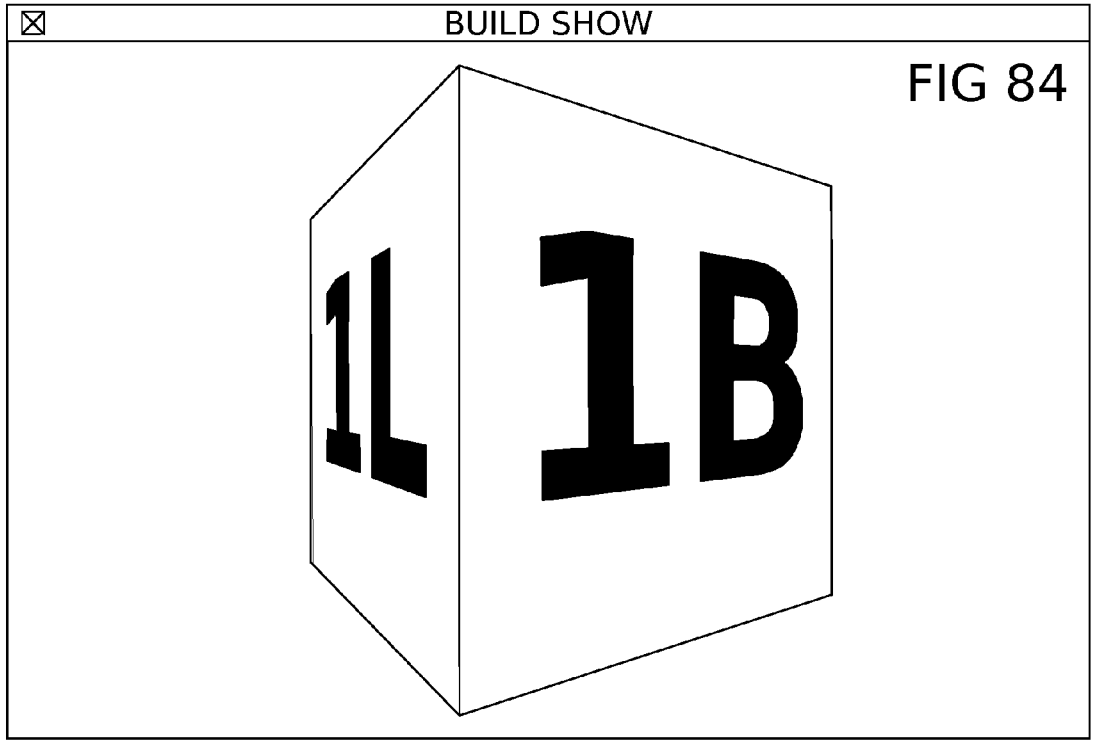

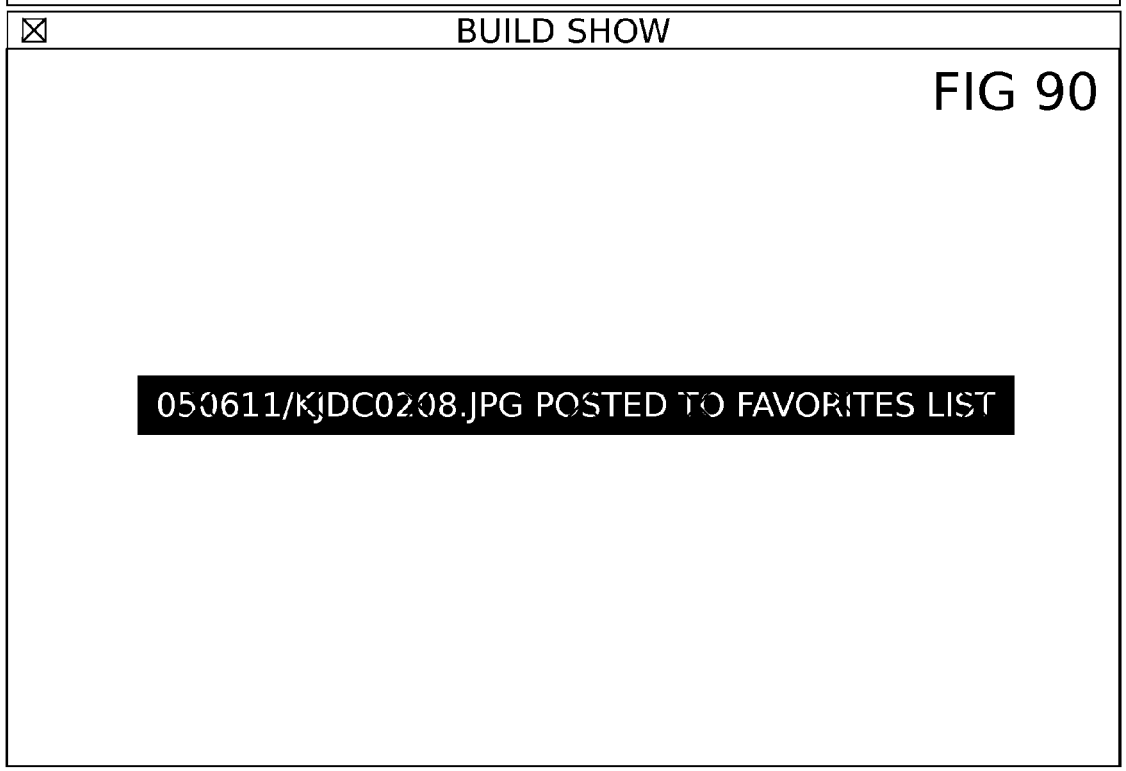

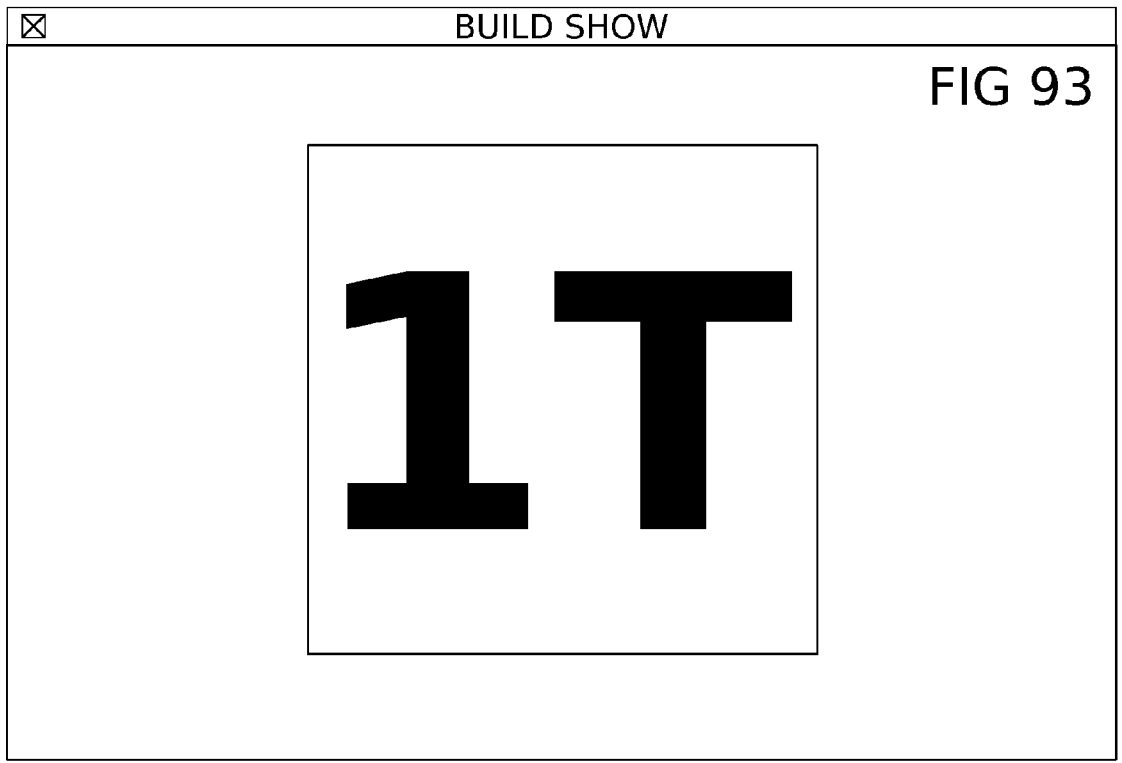
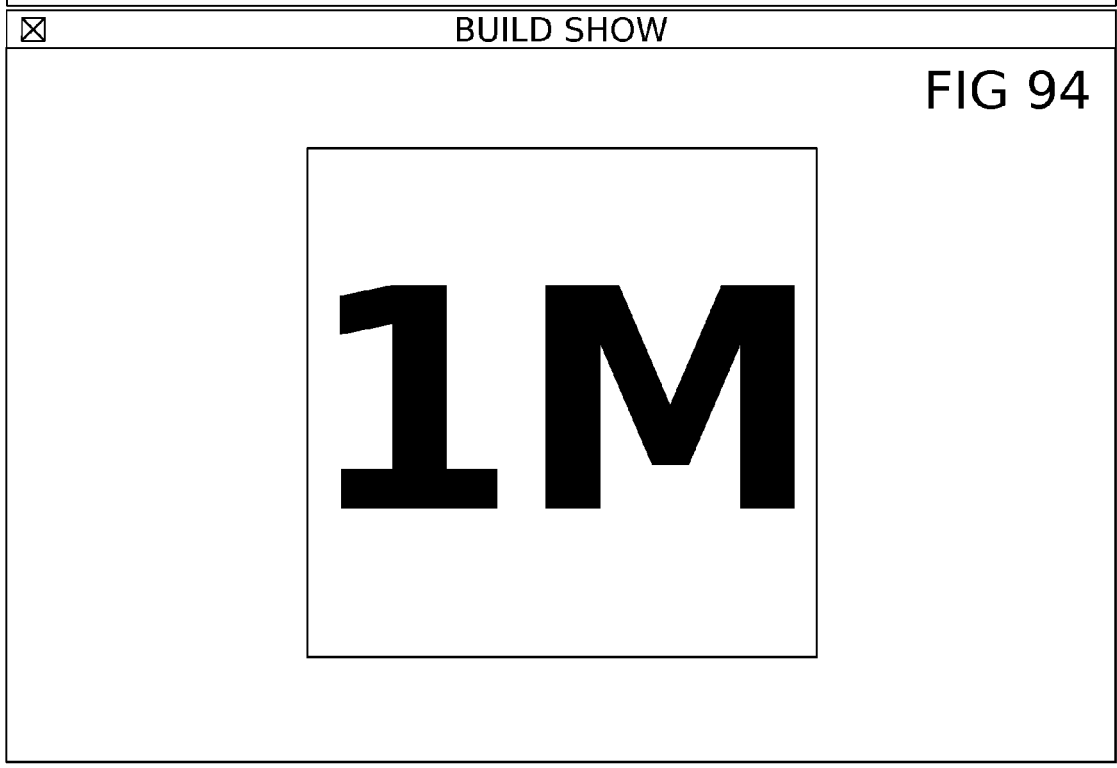

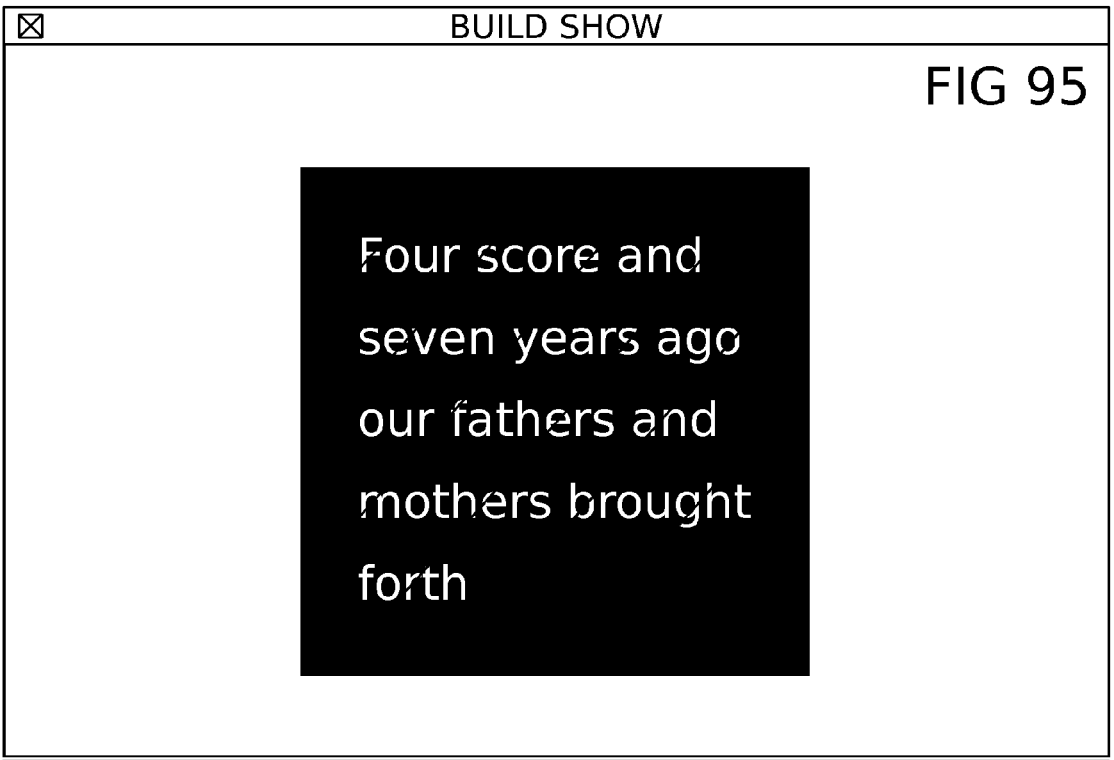
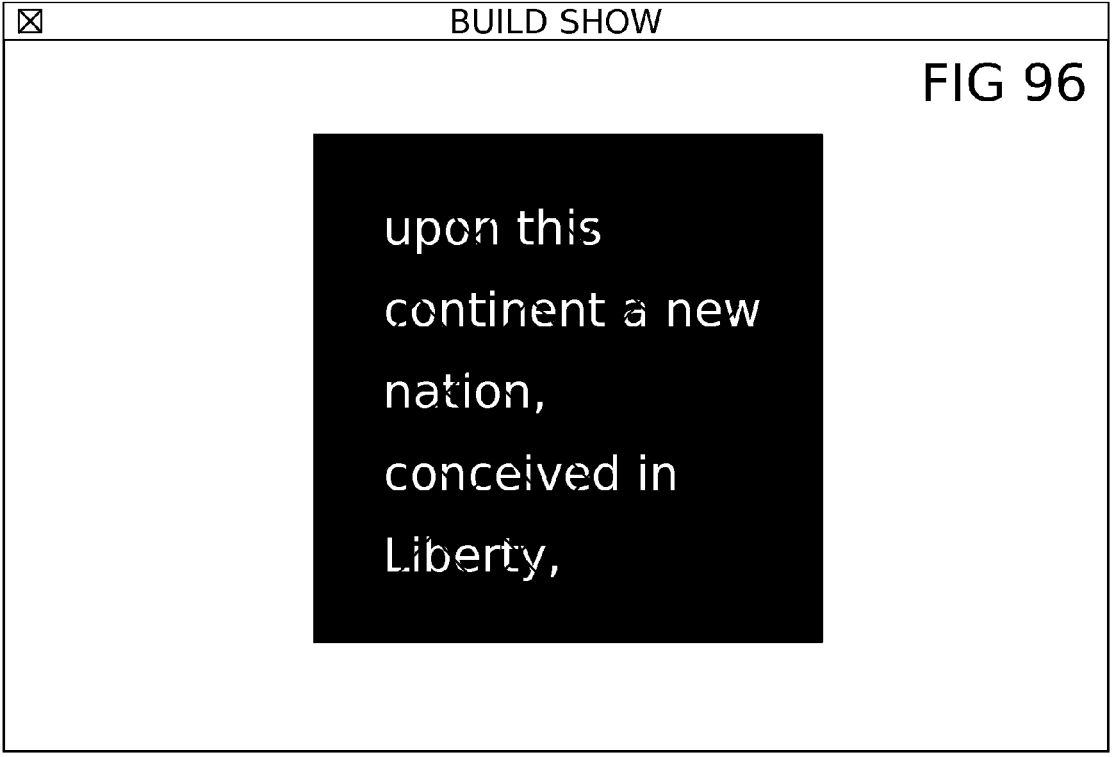

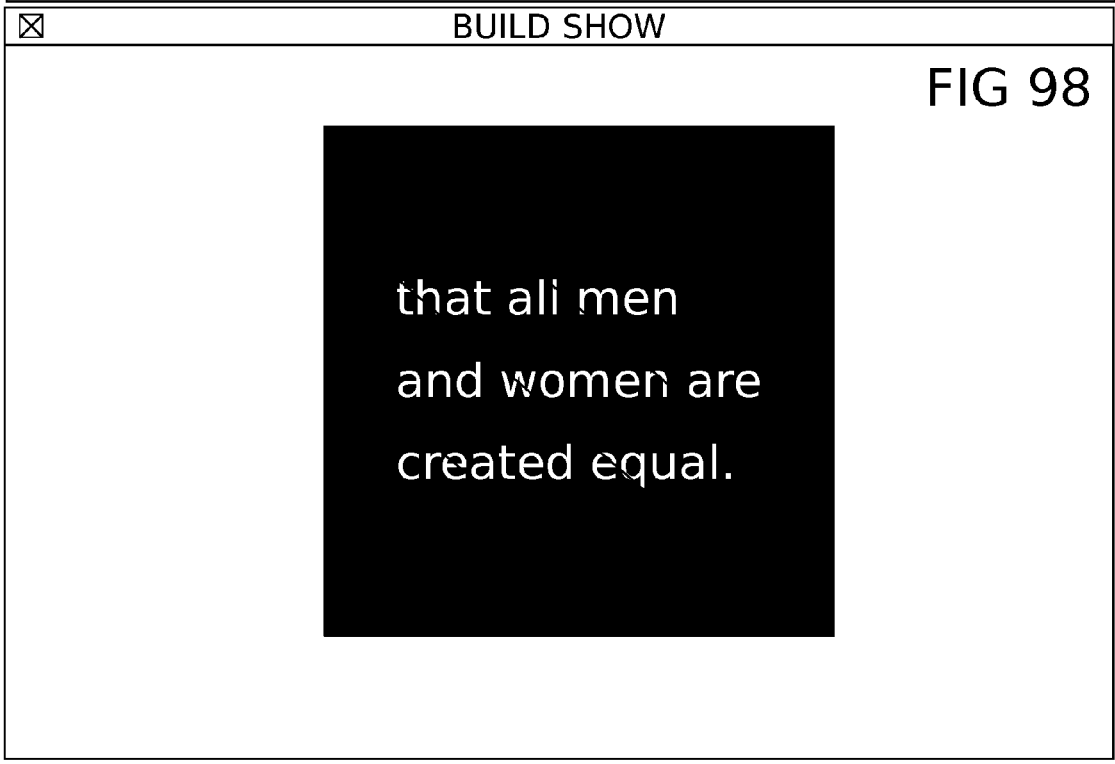

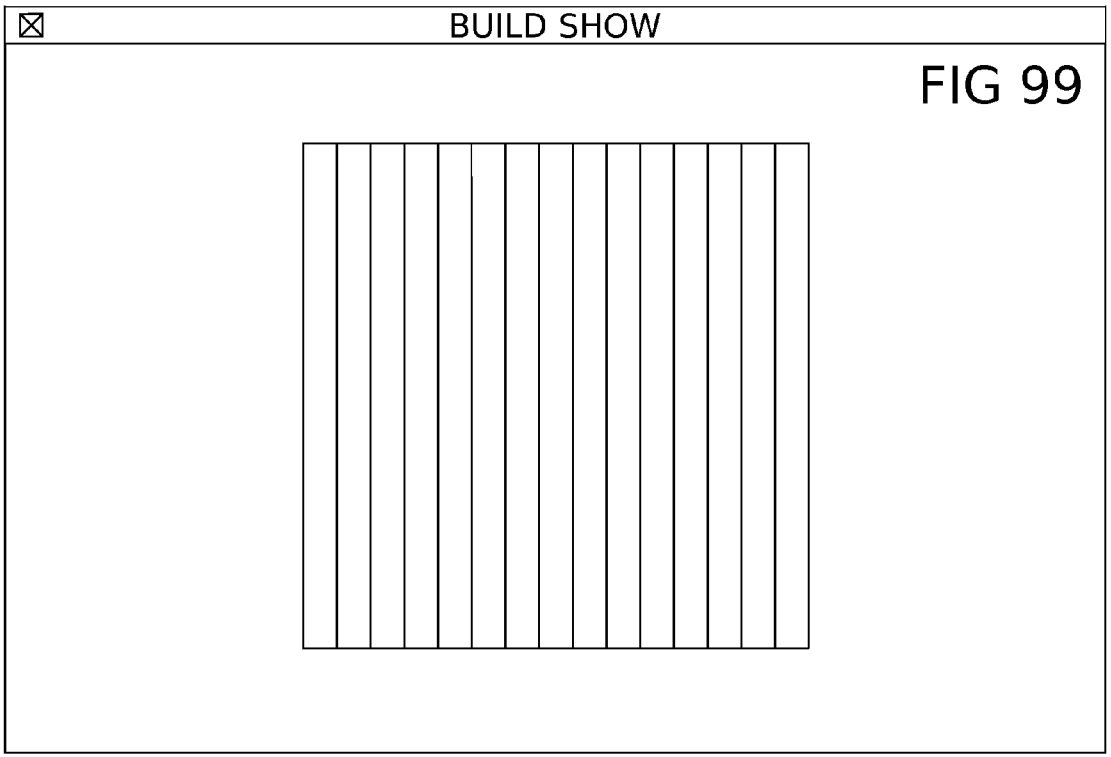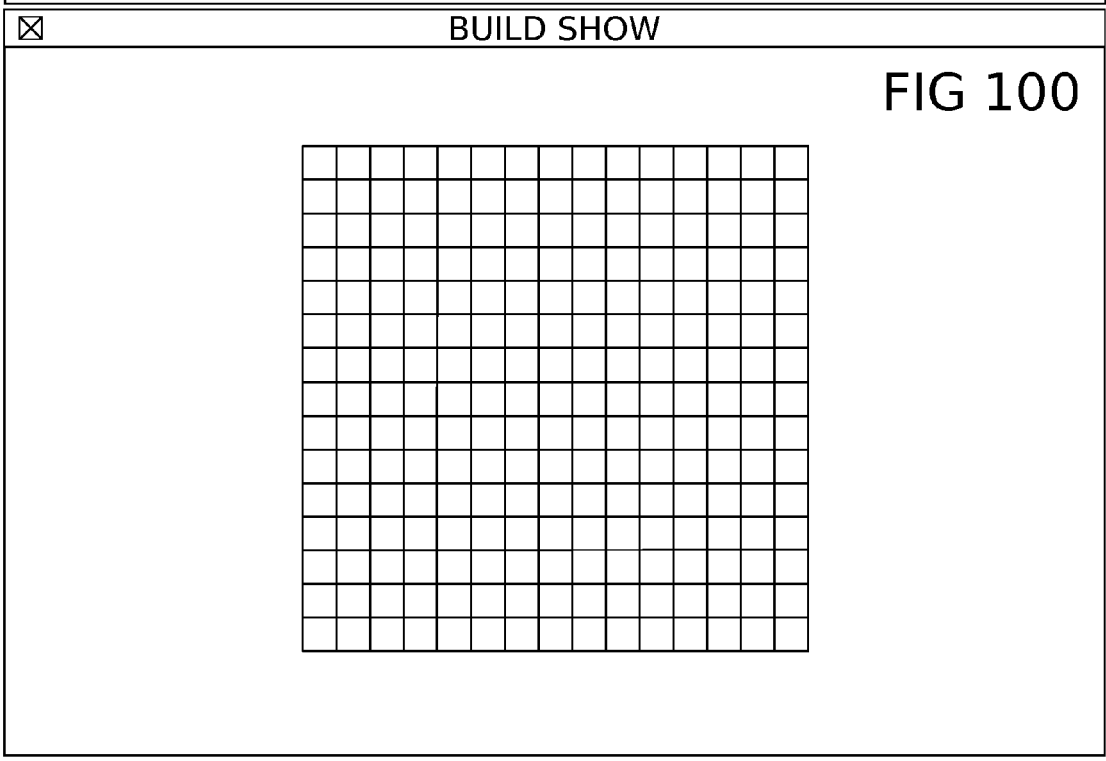

```
┌─────────────────────────────────────────────────────┐
│ ☒                    BUILD SHOW                     │
│                                          FIG 101    │
│  UP (u)      3-D IMAGE OBJECT SELECTION             │
│                                                     │
│       3-D IMAGE OBJECTS (i)                         │
│                                                     │
│       OPTIONS (o)                                   │
│                                                     │
│       VOICE (v)                                     │
│                                                     │
│       SONG (s)                                      │
│                                                     │
│       CHOREOGRAPHY (c )        Bye-bye for now.     │
│                                                     │
│       BEGIN SHOW (b)                                │
│                                                     │
│  EXIT (6)                                           │
└─────────────────────────────────────────────────────┘

┌─────────────────────────────────────────────────────┐
│ ☒                    BUILD SHOW                     │
│                                          FIG 102    │
│  UP (u)      3-D IMAGE OBJECT SELECTION             │
│                                                     │
│       3-D IMAGE OBJECTS (i)                         │
│                                                     │
│       OPTIONS (o)                                   │
│                                                     │
│       VOICE (v)                                     │
│                                                     │
│       SONG (s)                                      │
│                                                     │
│       CHOREOGRAPHY (c )        Bye-bye for now.     │
│                                                     │
│       BEGIN SHOW (b)           See you ...          │
│                                                     │
│  EXIT (6)                                           │
└─────────────────────────────────────────────────────┘
```

| ⊠ | BUILD SHOW | |
|---|---|---|
| UP (u) | 3-D IMAGE OBJECT SELECTION | FIG 103 |

```
       3-D IMAGE OBJECTS (i)

OPTIONS (o)

VOICE (v)

SONG (s)
                                    Bye-bye for now.
       CHOREOGRAPHY (c )
                                    See you ... next time!
       BEGIN SHOW (b)

EXIT (6)
```

FIG 109

GIVEN, FOR ONE EMBODIMENT:

iposArcTotal = 256   (total interpositions along path)  — 7

$xi = \dfrac{TF}{TS} = 1$   (ratio of phase durations, fast and slow) — 8

$kappa = \dfrac{omegaF}{omegaS} = 4$   (ratio of phase interposition speeds, fast and slow) — 9

$\dfrac{X}{Y}$   (time signature, chosen by user) — 10

DEFINED, FOR ONE EMBODIMENT:

$iposArcPerBeat = \dfrac{iposArcTotal}{Y}$   (interpositions per beat) — 11 iposArcPerBeat = iposArcPerPhsFast + iposArcPerPhsSlow — 12 iposArcPerPhsFast = TF * omegaF (duration * interposition speed) — 13 iposArcPerPhsSlow = TS * omegaS (duration * interposition speed) — 14

THEREFORE:

$\dfrac{iposArcPerPhsFast}{iposArcPerPhsSlow} = \dfrac{TF * omegaF}{TS * omegaS} = xi * kappa = xk$ — 15

USE ALGEBRA TO REARRANGE 12 AND 15:

$iposArcPerPhsFast = \dfrac{iposArcPerBeat}{1 + \dfrac{1}{xk}}$ — 16

$iposArcPerPhsSlow = \dfrac{iposArcPerBeat}{1 + xk}$ — 17

FIG 114A

Figure 113A:
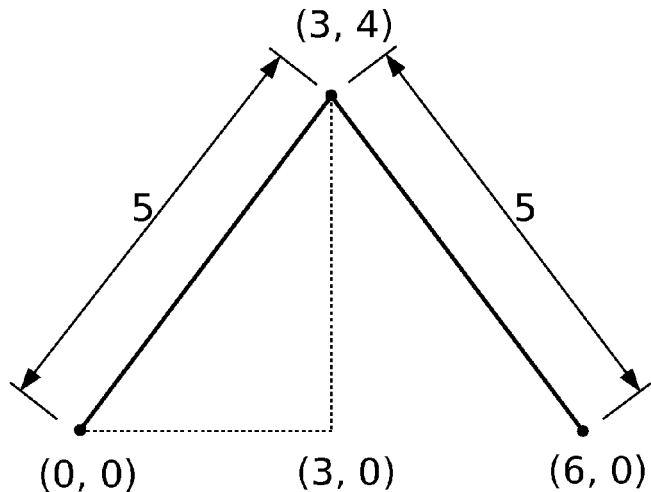

GIVEN, FOR ILLUSTRATION PURPOSES: Fig 113A interpositions = 6 ⟶ 18          indices = 6 ⟶ 19

FIND INDEX COORDINATES FOR FIG 113A.

USE FLOWCHART IN FIG 112.

Figure 113B:
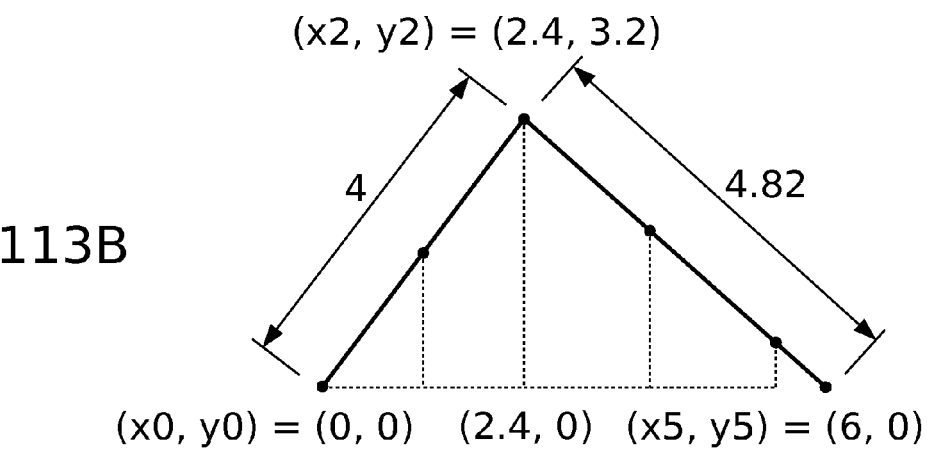

ROUND 1, FIND (x1, y1) TO (x4, y4) IN FIG 113B:

trkLength = 2 * sqrt(3*3 + 4*4) = 10 ⟶ 20 trkIpsLength = trkLength / (interpositions - 1) = 10 / 5 = 2.00 ⟶ 21

Start: (0, 0), slope = 4/3 = 1.33

Index 0 is (x0, y0) = (0, 0)

Index 1 is trkIpsLength = 2.00 along the original track:

x1 = x0 + trkIpsLength * cos(atan(slope))

= 0  + 2.00 * cos(atan(1.33)) = 1.20 y1 = y0 + trkIpsLength * sin(atan(slope))

= 0  + 2.00 * sin(atan(1.33)) = 1.60

(x1, y1) = (1.20, 1.60)

Index 2 is trkIpsLength = 2.00 along the original track:

x2 = x1 + trkIpsLength * cos(atan(slope))

= 1.20 + 2.00 * cos(atan(1.33)) = 2.40 y2 = y1 + trkIpsLength * sin(atan(slope))

= 1.60 + 2.00 * sin(atan(1.33)) = 3.20

(x2, y2) = (2.40, 3.20)

FIG 114B

Only (5.0 – 2 * trkIpsLength) = 1.0 unit remains on segment.

Change leading point from (3, 4) to the next along the track, (6, 0), to provide room to extend another trkIpsLength beyond Index 2. That is, loop back to step 4 in Fig 112 flowchart.

Distance from (x2, y2) to (6, 0) =

= sqrt((6.0 – x2)2 + (0 – y2)2) =

= sqrt((6.0 – 2.4)2 + (0 - 3.2)2) = 4.82.

Slope from (x2, y2) to (6, 0) = (0 – y2) / (6.0 – x2) =

= -3.2 / (6.0 – 2.4) = -0.89 x3 = x2 + trkIpsLength * cos(atan(slope))

= 2.4 + 2.00 * cos(atan(-0.89)) = 3.89 y3 = y2 + trkIpsLength * sin(atan(slope))

= 3.2 + 2.00 * sin(atan(-0.89)) = 1.87

(x3, y3) = (3.89, 1.87)

Index 4 is trkIpsLength = 2.00 along same trajectory:

x4 = x3 + trkIpsLength * cos(atan(slope))

= 3.89 + 2.00 * cos(atan(-0.89)) = 5.39 y4 = y3 + trkIpsLength * sin(atan(slope))

= 1.87 + 2.00 * sin(atan(-0.89)) = 0.54

(x4, y4) = (5.39, 0.54)

There is only (4.82 - 2.0 * trkIpsLength) = 0.82 unit left along the track, 0.82 < trkIpsLength = 2.00, and point (6, 0)

marks the end:  (x5, y5) = (6, 0).

FIG 114C

Figure 113C:
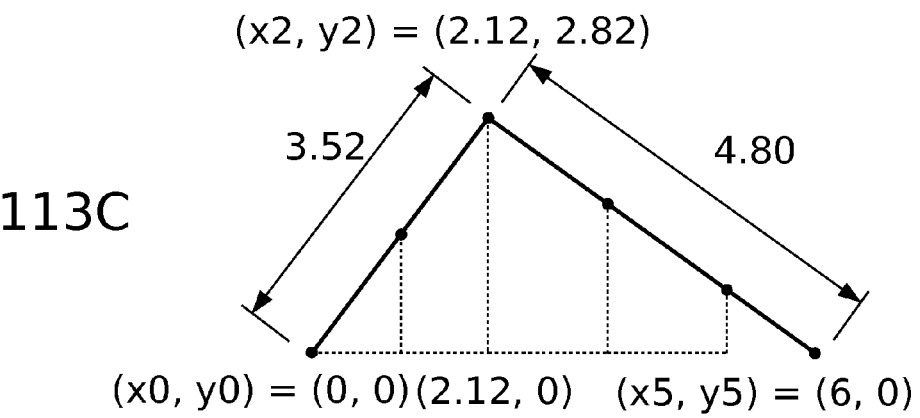

ROUND 2, FIND (x1, y1) TO (x4, y4) IN FIG 113C:

trkLength = 4.0 * trkIpsLength + 0.82      22

= 4.0 * 2.00 + 0.82 = 8.82 trkIpsLength = trkLength / (interpositions − 1)      23

= 8.82 / (6 − 1) = 1.76

Start: (0, 0), slope = 4/3 = 1.33

Index 0 is (x0, y0) = (0, 0)

Index 1 is trkIpsLength = 1.76 along the original track:

x1 = x0 + trkIpsLength * cos(atan(slope))

= 0 + 1.76 * cos(atan(1.33)) = 1.06 y1 = y0 + trkIpsLength * sin(atan(slope))

= 0 + 1.76 * sin(atan(1.33)) = 1.41

(x1, y1) = (1.06, 1.41)

Index 2 is trkIpsLength = 1.76 along the original track:

x2 = x1 + trkIpsLength * cos(atan(slope))

= 1.06 + 1.76 * cos(atan(1.33)) = 2.12 y2 = y1 + trkIpsLength * sin(atan(slope))

= 1.41 + 1.76 * sin(atan(1.33)) = 2.82

(x2, y2) = (2.12, 2.82)

FIG 114D

Only (5.0 – 2 * trkIpsLength) = 1.47 units remain.

Change leading point from (3, 4) to the next along the track, (6, 0), to provide room to extend another trkIpsLength beyond Index 2. That is, loop back to step 4 in Fig 112 flowchart.

Distance from (x2, y2) to (6, 0) =

= sqrt((6.0 – x2)2 + (0 – y2)2) =

= sqrt((6.0 – 2.12)2 + (0 - 2.82)2) = 4.80.

Slope from (x2, y2) to (6, 0) = (0 – y2) / (6.0 – x2) =

= -2.82 / (6.0 – 2.12) = -0.73 x3 = x2 + trkIpsLength * cos(atan(slope))

= 2.12 + 1.76 * cos(atan(-0.73)) = 3.54 y3 = y2 + trkIpsLength * sin(atan(slope))

= 2.82 + 1.76 * sin(atan(-0.73)) = 1.79

(x3, y3) = (3.54, 1.79)

Index 4 is trkIpsLength = 1.76 along same trajectory:

x4 = x3 + trkIpsLength * cos(atan(slope))

= 3.54 + 1.76 * cos(atan(-0.73)) = 4.97 y4 = y3 + trkIpsLength * sin(atan(slope))

= 1.79 + 1.76 * sin(atan(-0.73)) = 0.75

(x4, y4) = (4.97, 0.75)

Only (4.80 - 2.0 * trkIpsLength) = 1.28 units remain, 1.28 < trkIpsLength = 1.76, and point (6, 0) marks the end:

(x5, y5) = (6, 0).

FIG 115A
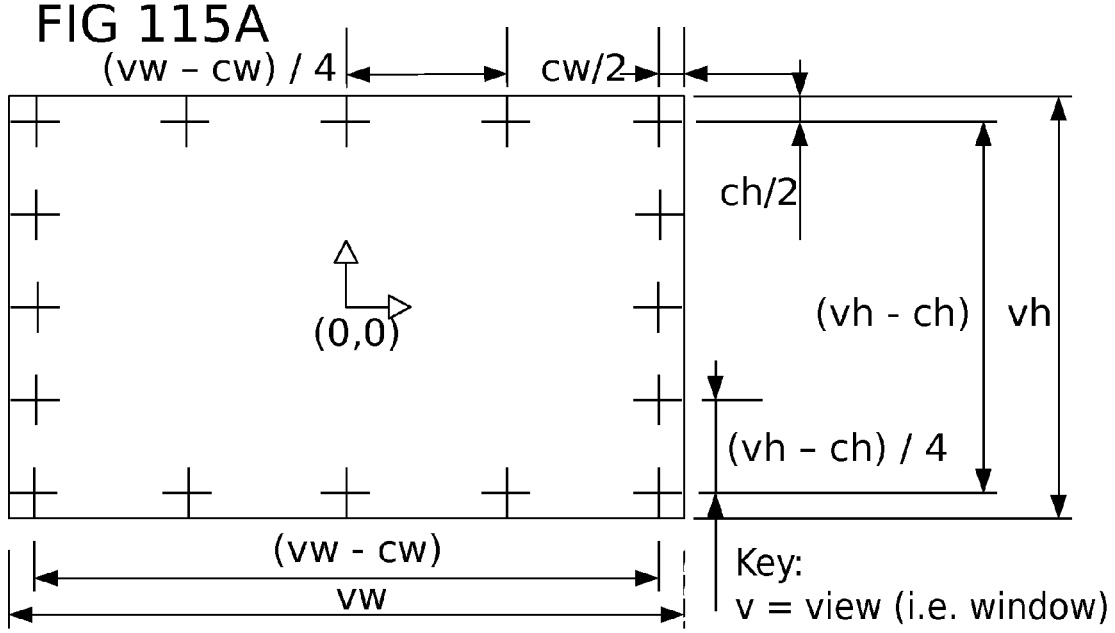
Key:
v = view (i.e. window)
c = cube
w = width
h = height
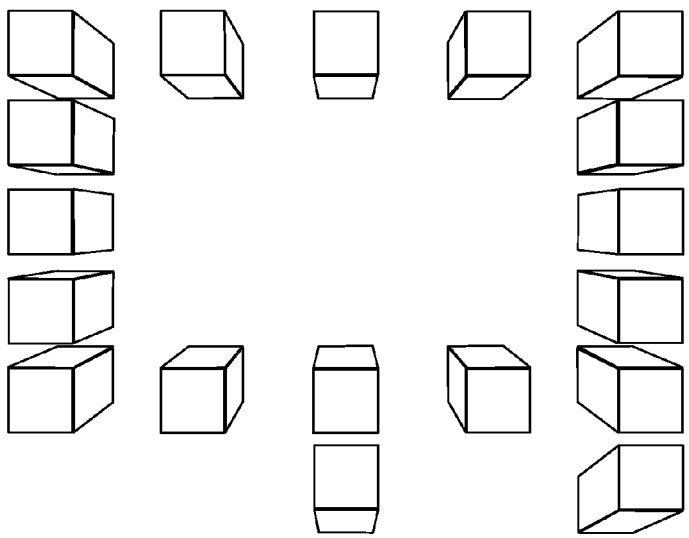
FIG 115B
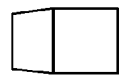
FIG 115C

FIG 116A

| | | |
|---|---|---|
| OPTIONS (o) | OPTIONS {o} | OPTIONS [o] |
| OPTIONS \|o\| | OPTIONS 'o' | OPTIONS :o: |
| OPTIONS `o' | OPTIONS /o/ | OPTIONS ^o^ |
| OPTIONS !o! | OPTIONS >o< | OPTIONS \o/ |
| OPTIONS − o | OPTIONS + o | OPTIONS...o |
| OPTIONS −>o | OPTIONS =>o | OPTIONS.o |
| OPTIONS .. o | OPTIONS <o> | OPTIONS `o` |
| OPTIONS * o | OPTIONS %o% | |
| OPTIONS /o | OPTIONS =>o<= | etc. |

FIG 116B

| | | |
|---|---|---|
| options (o) | options (o) | options (o) |
| Options (o) | Options (o) | Options (o) |
| OPTIONS (O) | OPTIONS (O) | OPTIONS (O) |
| options (O) | options (O) | options (O) |
| Options (O) | Options (O) | Options (O) |
| *options (o)* | *<u>options</u> (o)* | *Options (o)* |
| *OPTIONS (O)* | *<u>OPTIONS</u> (O)* | *options (O)* |
| *Options (O)* | *<u>Options</u> (O)* | *<u>options</u> (O)* |
| *<u>Options</u> (o)* | *Options (O)* | *options (O)* |
| OPTIONS (*O*) | Options (*o*) | options (*o*) |
| etc. | | |

FIG 117A

OPTIONS (⇕) (circle up)
OPTIONS (⇕) (circle down)
OPTIONS (⇔) (circle right)
OPTIONS (⇔) (circle left)

OPTIONS (↻) (circle cw)
OPTIONS (↺) (circle ccw)
OPTIONS (⤴) (tilt forward)
OPTIONS (⤴) (tilt back)

OPTIONS (⤵) (twist forward)
OPTIONS (⤴) (twist back)
OPTIONS (⤵) (twist cw)
OPTIONS (⤴) (twist ccw)

OPTIONS (↑) (shake up)
OPTIONS (↓) (shake down)
OPTIONS (→) (shake right)
OPTIONS (←) (shake left)

OPTIONS (↗) (shake forward)
OPTIONS (↘) (shake back)
OPTIONS (↗) (shake diagonally up-right)
OPTIONS (↖) (shake diagonally up-left)

OPTIONS (↘) (shake diagonally down-right)
OPTIONS (↙) (shake diagonally down-left)

FIG 117B

| OPTIONS (↑1) | OPTIONS (⇕1) |
| VOICE (↑2) | VOICE (⇕2) |
| SONG (↑3) | SONG (⇕3) |

| OPTIONS (↗1) | OPTIONS (⤵1) |
| VOICE (↗2) | VOICE (⤵2) |
| SONG (↗3) | SONG (⤵3) |

FIG 117C

| OPTIONS ( 1 ) | OPTIONS ( I ) | OPTIONS |
|---|---|---|
| VOICE ( 2 ) | VOICE ( II ) | VOICE |
| SONG ( 3 ) | SONG ( III ) | SONG |

FIG 118

OPTIONS (𝓜)    OPTIONS (α)
(M gesture)      (alpha gesture)

OPTIONS (╱)    OPTIONS (ν)
(diagonal up gesture) (nu gesture)

OPTIONS (☺)    OPTIONS (☹)
(smile)          (frown)

OPTIONS ( : ) )    OPTIONS ( : ( )
(smile)          (frown)

OPTIONS (☺)    OPTIONS ( ā )
(smile)          (phoneme ā )

OPTIONS ( ȯ )    OPTIONS ( ē )
(phoneme ȯ )   (phoneme ē )

METHODS FOR BLATANT AUXILIARY ACTIVATION INPUTS, INITIAL AND SECOND INDIVIDUAL REAL-TIME DIRECTIONS, AND PERSONALLY MOVING, INTERACTIVE EXPERIENCES AND PRESENTATIONS

CROSS-REFERENCE TO RELATED APPLICATIONS

This application claims the benefit of PPA Ser. No. 61/731, 446, filed 2012 Nov. 29 by the present inventor, which is incorporated by reference.

FEDERALLY SPONSORED RESEARCH

Not Applicable

Joint Research Agreement

Not Applicable

Computer Program Listing Appendix

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The entire contents of eleven text file attachments are hereby incorporated by reference as if fully set forth herein. The eleven attached text files are listed as follows:

| Name | Creation Date | Modification Date | Bytes |
| --- | --- | --- | --- |
| cueStage.txt | Jul. 16, 1999 | Nov. 1, 2012 | 237,316 |
| tdiObjShow.txt | Nov. 20, 2009 | Nov. 1, 2012 | 183,177 |
| buildShow.txt | Jan. 13, 2010 | Nov. 19, 2012 | 411,318 |
| mkTxoImgs.txt | Dec. 30, 2009 | Nov. 1, 2012 | 6,023 |
| chkTxoImg.txt | Apr. 23, 2011 | Jun. 12, 2012 | 1,944 |
| hlpFiles.txt | Feb. 17, 2010 | Oct. 27, 2012 | 634,617 |
| bldShwSkel.txt | Oct. 31, 2012 | Jan. 9, 2013 | 840,578 |
| uuDec.txt | May 21, 2012 | May 27, 2012 | 1,254 |
| tgzExt.txt | May 18, 2012 | May 27, 2012 | 1,263 |
| txtDebut.txt | Oct. 27, 2012 | Oct. 27, 2012 | 1,501 |
| pchFiles.txt | Oct. 10, 2011 | Nov. 16, 2012 | 40,756 |

BACKGROUND

Prior Art

A method for animating an object with varying motion is proposed in U.S. Pat. No. 7,932,909 to Niles et al. (2011), "by either applying another behavior (such as randomize or ramp) or keyframing the Velocity parameter of the Wind behavior." However, these processes are not conducive to choreography nor practicable for inexpert users.

Animated objects are programmed to perform specific movements and behaviors and/or to respond to virtual stimuli, including wind, gravity, sound, and other virtual objects. A sense of satisfaction for a computer animator is limited to how well an animation accomplishes a motion or behavior, or how well an algorithm adapts to given stimuli. A complicated graphical user interface, while versatile, increases a stress level for the animator.

Videos are commonly distributed using internet video or cloud sharing services. However, still photos and sound recordings often provide equal or higher image resolution and audio fidelity for significantly less bandwidth.

Video and audio podcasts or netcasts are commonly recorded and distributed on the internet. Audio netcasts consume much less bandwidth than video netcasts, but are often limited to single "cover art" images. Videos are unrealistic without a sufficient service provider data contract.

Due to recent dramatic cost reductions, many users have large troves of digital photographs and are challenged to efficiently organize, annotate, and present them.

Plain text menus hark back to early computing and monochrome monitors. A user would read a menu, type a number corresponding to a menu selection, confirm the number visually, and press a "return" key. Plain text menus were around before mice, high-resolution CRTs, (cathode ray tubes), and graphics hardware. They are considered unattractive, uninspiring, inefficient, and inconvenient.

Icon toolbars or ribbons are popular, but are confusing, intimidating, and tiny for a new user. A mouse or other pointing device activates them. They do not convey a hierarchical workflow.

Tabbed notebook widgets allow a user to change contents of a displayed page by clicking on tabs or activating auxiliary key combinations and sequences that have been memorized, (at least partially, such as knowing to include an "alt" key, for example). New users may not realize a tab is present or its purpose. Lengths of tab titles are restricted to one or two words. Tabbed notebook widgets do not convey a hierarchical workflow.

Menubars containing drop-down menus are promoted as versatile, convenient, and sophisticated. However, menubars containing drop-down menus and submenus use small font sizes. Usually after a first mouse click opens a menu, dexterous navigation through submenus and another mouse click confirm a choice. A pop-up dialog box may appear, requesting more user input. People with low visual acuity or computer familiarity may start down a wrong drop-down menu path, and not achieve a sought result within an allotted period of time. Menubars containing drop-down menus do not convey a hierarchical workflow.

Some operating systems provide a dedicated menubar that switches drop-down menus depending on which program is active. A user may not realize the menubar is a replacement, because of similar or identical drop-down menu titles. Confusion surfaces if an errant mouse click backgrounds an active program, switching menubars unbeknownst to the user.

Links to a large number of pages and dialog boxes often are conglomerated into one menubar containing drop-down menus. A novice user may become discouraged by a vast multitude of selections, reckoning that a program is for someone more expert. That is, someone who has taken a course, or who has had time to study a manual.

Large menubars containing drop-down menus mandate programmers establish esoteric hot key or shortcut key or auxiliary key combinations to differentiate among a wide range of choices. For example, a "shift" key, "control" key, and "n" key may be indicated to activate a menu selection via keyboard. All three keys may need to be pressed, and in a correct order. Often practicality dictates just a few selections be assigned auxiliary key combinations. As auxiliary key definitions are commonly hidden until a drop-down menu opens, auxiliary key combinations are often memorized before providing a productivity boost.

Selecting a touch screen icon comprises hand-eye coordination, possibly diverting visual attention in a multitasking situation.

Advantages

Several advantages of one or more aspects are that users, within a broad range of experience levels, are likely to be successful at, and enjoy making, watching, and/or interacting with, personally moving experiences and presentations.

SUMMARY

In accordance with one embodiment, digital displays, audio speakers, and memory devices are manipulated to elicit and record unique real-time directions from individuals via buttons, keyboards, mice, pointing devices, touch sensors, optical sensors, acoustic sensors, motion sensors, and/or other input devices. In accordance with one embodiment, initial and/or second individual real-time direction recordings are used to create personally moving experiences and presentations. In accordance with one embodiment, images and text are organized into "three-dimensional image objects" which move according to initial and/or second individual real-time direction recordings. Video and/or audio recordings may play simultaneously. In accordance with one embodiment, second individual real-time directions may further adjust viewing parameters and play additional video and/or audio recordings. In accordance with one embodiment, shows are exported and imported to and from single, small (i.e. about 100 kilobytes) "export text files." They include initial and/or second individual real-time direction recordings, video recording names, audio recording names, photograph names, databases detailing three-dimensional image object constructions and/or a text file that may automatically convert into three-dimensional image objects. Export text files facilitate sharing, database management, and back-up.

In accordance with one embodiment, a customization process involves 1) identifying a registration number and unique identification code, 2) submitting the registration number and unique identification code while requesting a particular customization to modify certain default parameters, 3) receiving a customization file which is specific to a unique identification code, 4) receiving a reversion file which is specific to a unique identification code, 5) placing a copy of the customization file (or reversion file) in a designated customization folder, and 6) selecting a "customize" button widget menu item.

In accordance with one embodiment, blatant auxiliary activation inputs advantageously speed menu navigation and program operation.

DRAWINGS

Figures

Closely related drawings share a common number, but have different letter suffixes.

FIG. 1 An opening page is depicted, for one embodiment.

FIG. 2 First page after activating "medley" button is depicted, for one embodiment.

FIG. 3 First page after activating "photo folder" button of FIG. 2 is depicted, for one embodiment.

FIG. 4 A dialog box appears after activating "photo folder" button of FIG. 3, for one embodiment.

FIG. 5 First page after activating "options" button is depicted, for one embodiment.

FIG. 6 Codes appear when cursor touches "customize" button, for one embodiment.

FIG. 7 First page after activating "voice" button is depicted, for one embodiment.

FIG. 8 First page after activating "song" button is depicted, for one embodiment.

FIG. 9 A dialog box appears after activating "new vocal" button, for one embodiment.

FIG. 10 A dialog box appears after activating "new song" button, for one embodiment.

FIG. 11 First page after activating "choreography" button is depicted, for one embodiment.

FIG. 12 A label appears after activating "new dance" button, for one embodiment.

FIG. 13 First page after activating "new dance" button is depicted, for one embodiment.

FIG. 14 A time signature is chosen using "style" button pop-up menus, for one embodiment.

FIG. 15 Comporting legato flow is chosen using "style" button pop-up menus, for one embodiment.

Figure 16:
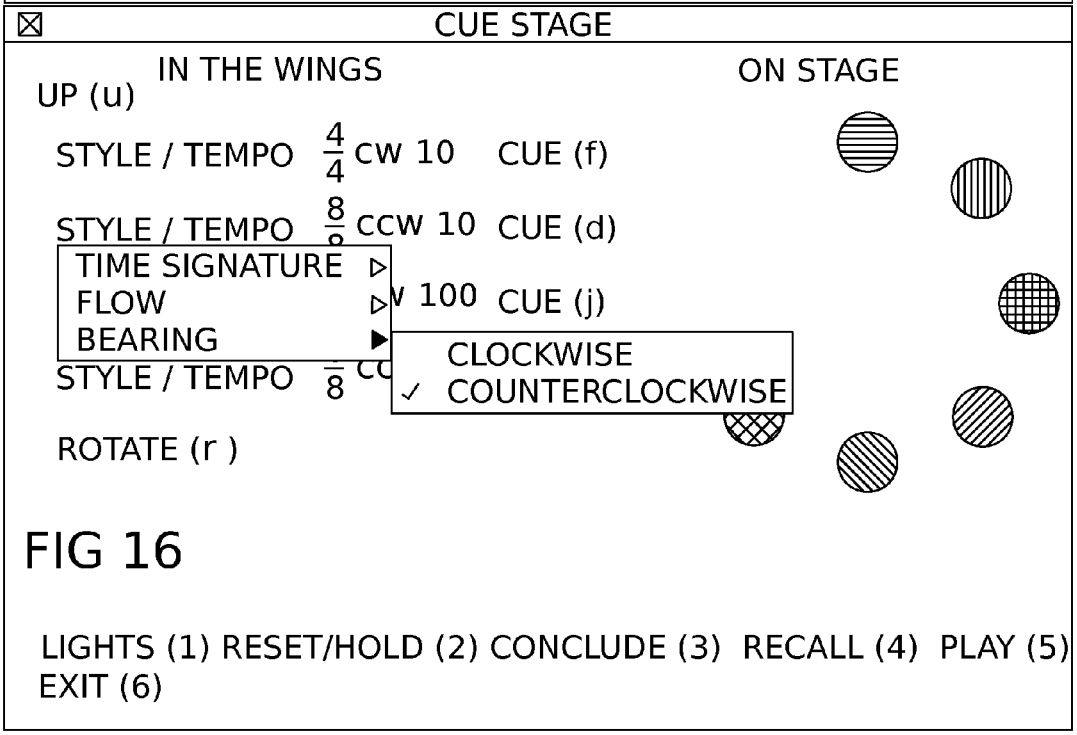

FIG. 16 Counterclockwise bearing is chosen using "style" button pop-up menus, for one embodiment.

FIG. 17 Custom tempo option, "mio meter . . . ", is selected using "tempo" button pop-up menus, for one embodiment.

FIG. 18 Custom tempo dialog box appears after selecting "mio meter . . . ", for one embodiment.

FIG. 19 "Cue" text widget touch items may be relocated, for one embodiment.

FIG. 20 Objects have rotated clockwise by three-eighths of one revolution, for one embodiment.

FIG. 21 Objects disappear when "lights" button is activated, for one embodiment.

FIG. 22 Objects halt in reset position when "reset/hold" button is activated, for one embodiment.

Figure 23:
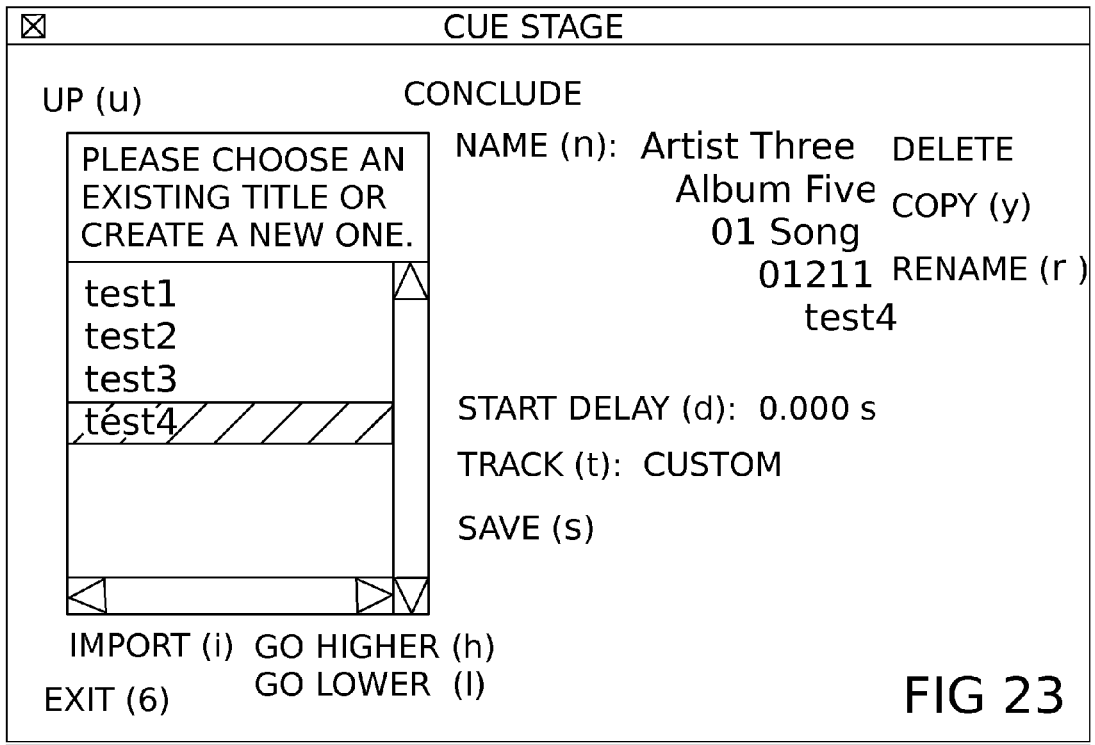

FIG. 23 First page after activating "conclude" button is depicted, for one embodiment.

Figure 24:
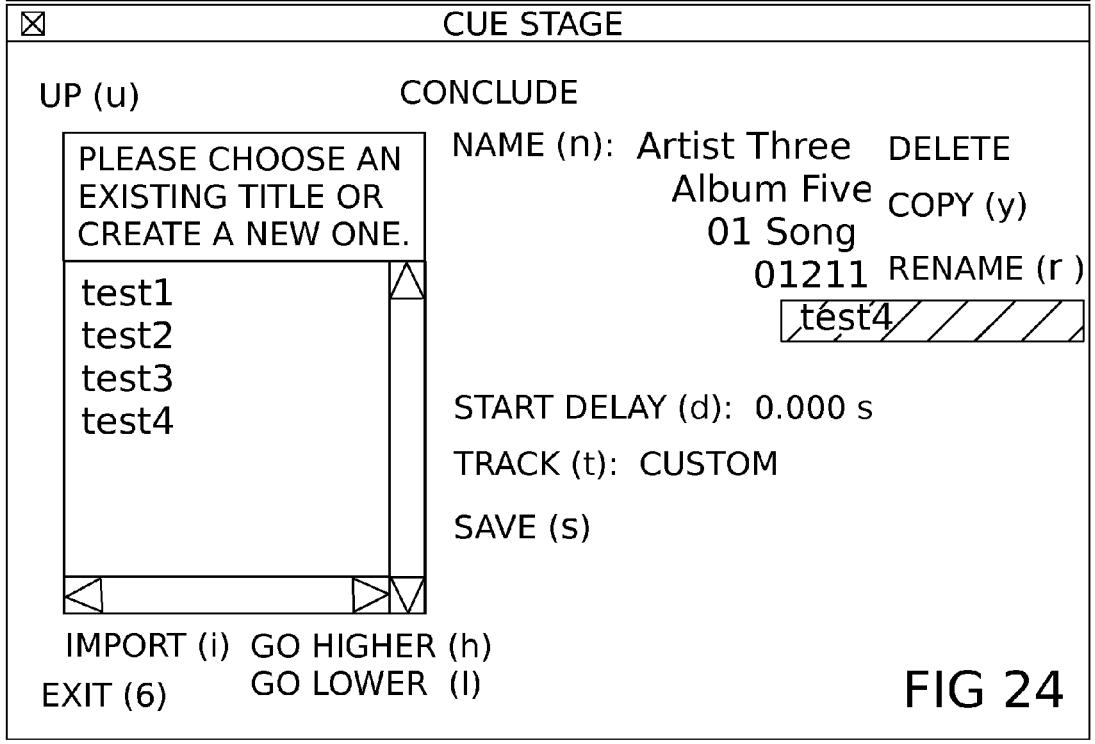

FIG. 24 A current name is highlighted in a text entry widget box when "name" button is activated, for one embodiment.

Figure 25:
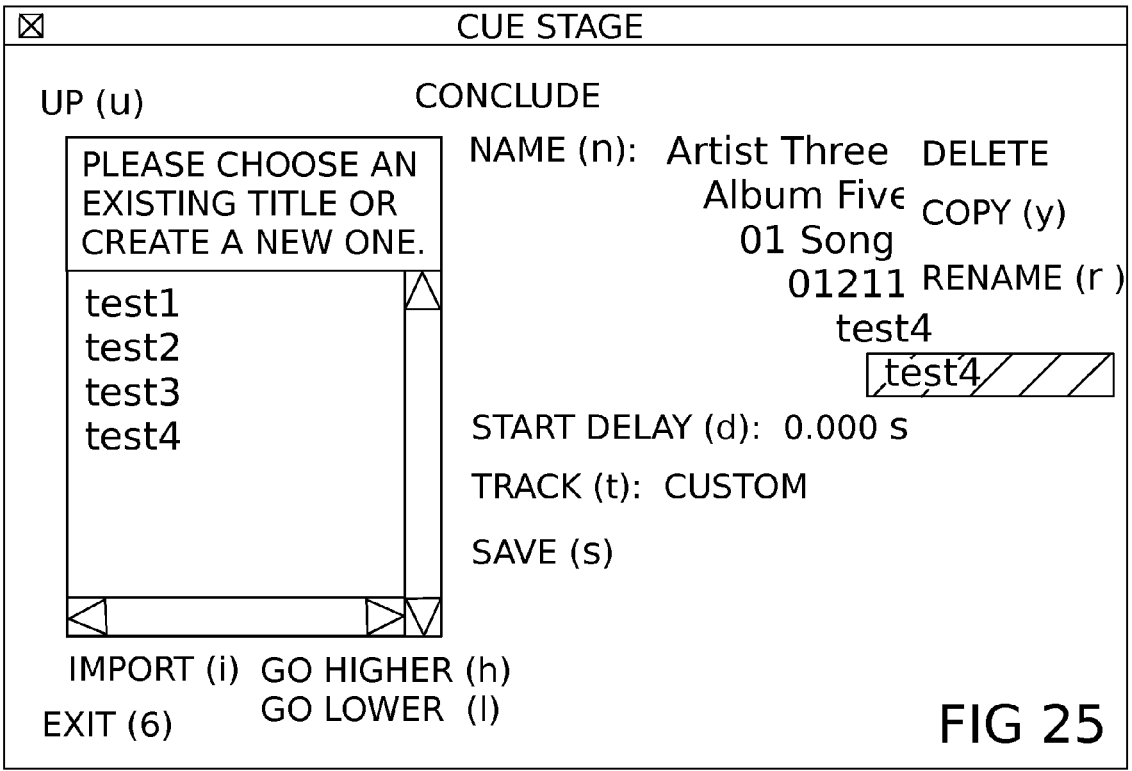

FIG. 25 A lower level text entry widget box with a highlighted duplicate name appears when "go lower" button is activated, for one embodiment.

Figure 26:
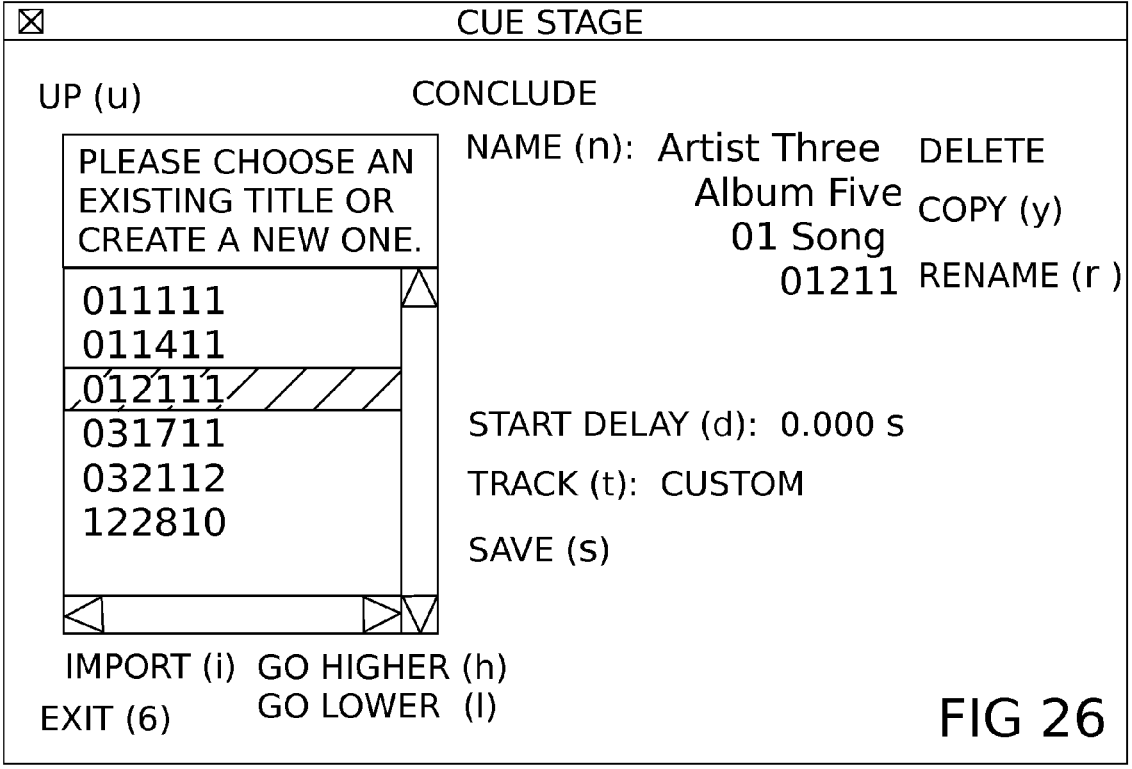

FIG. 26 A previous name's parent level is highlighted when "go higher" button is activated, for one embodiment.

Figure 27:
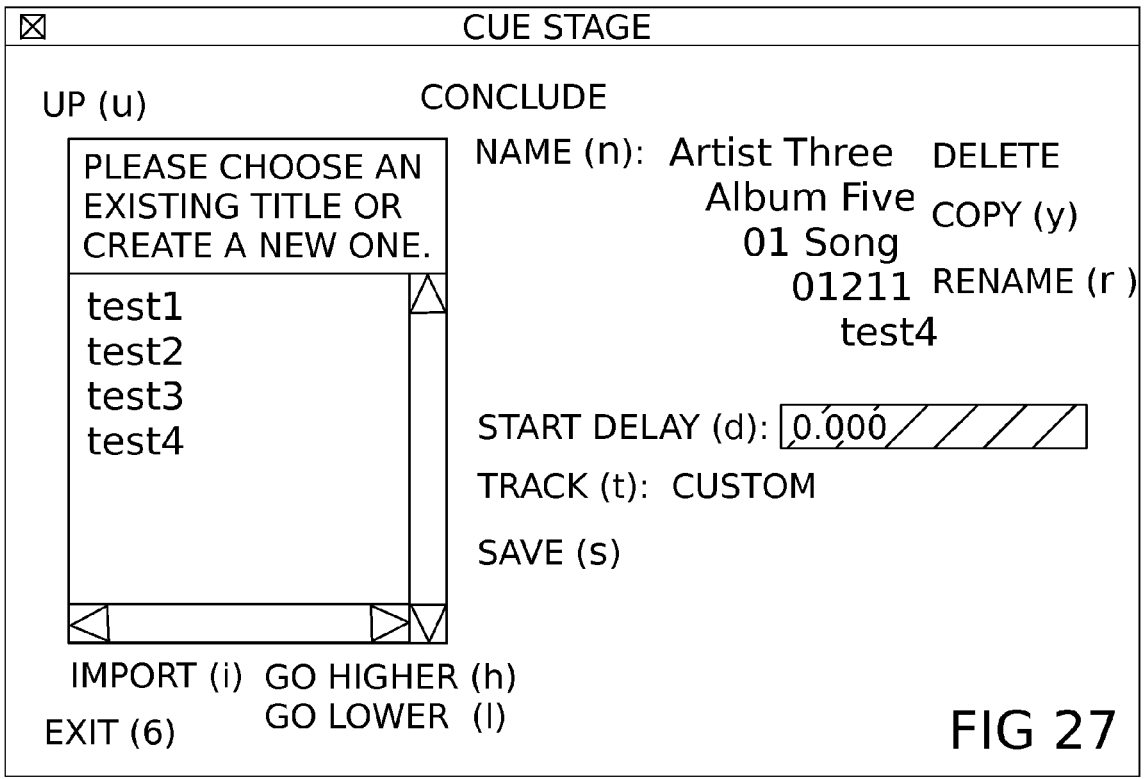

FIG. 27 A current start delay is highlighted in a text entry widget box when "start delay" button is activated, for one embodiment.

Figure 28:
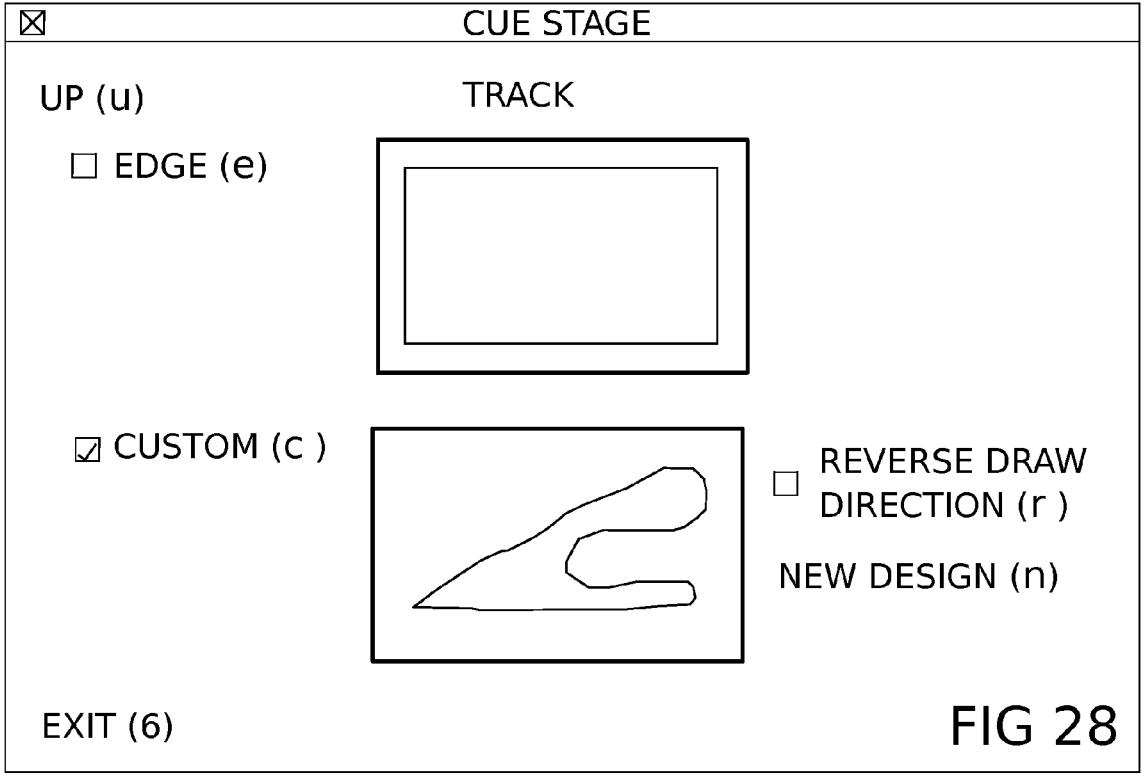

FIG. 28 First page after activating "track" button is depicted, for one embodiment.

FIG. 29 Full screen view after activating "new design" button is depicted, for one embodiment.

FIG. 30 First page after activating "import" button of FIG. 23 is depicted, for one embodiment.

Figure 31:
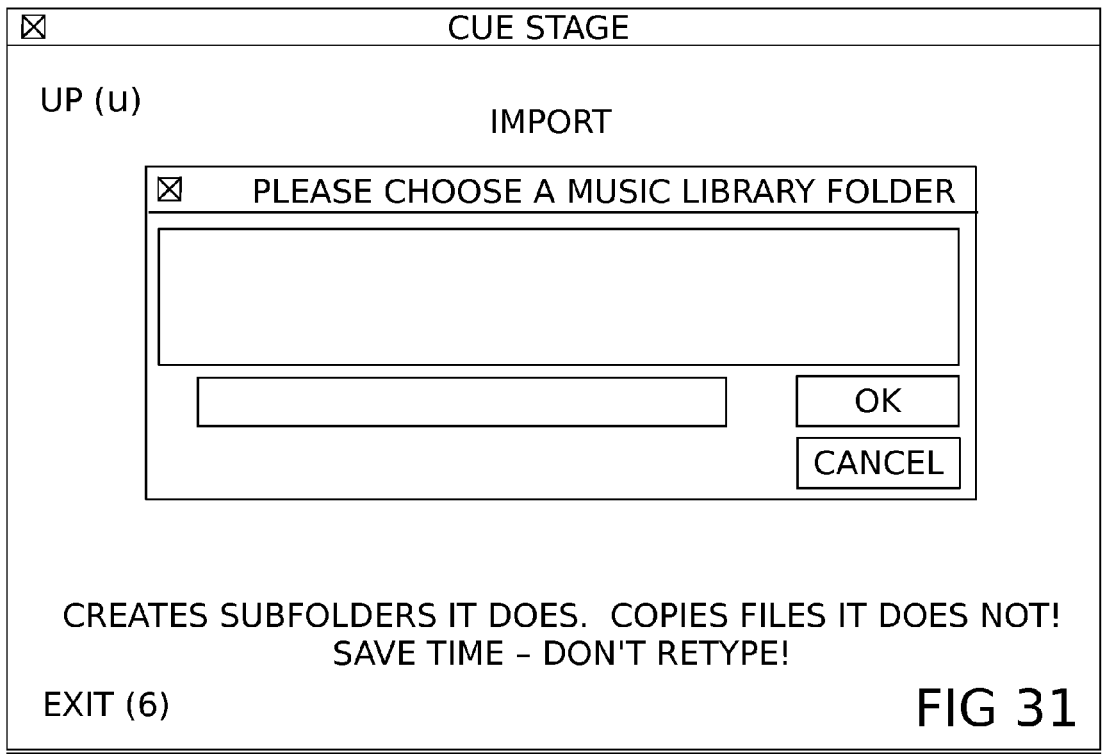

FIG. 31 A dialog box appears after activating "import" button of FIG. 30, for one embodiment.

Figure 32:
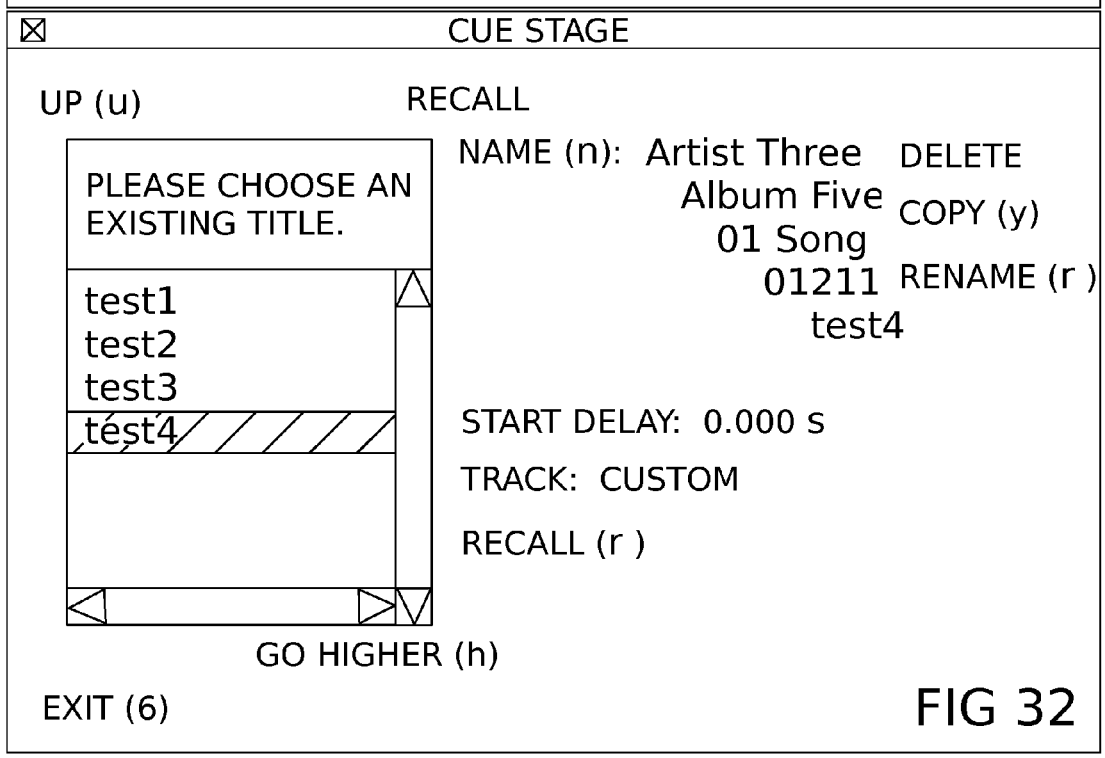

FIG. 32 First page after activating "recall" button of FIG. 13 is depicted, for one embodiment.

Figure 33:
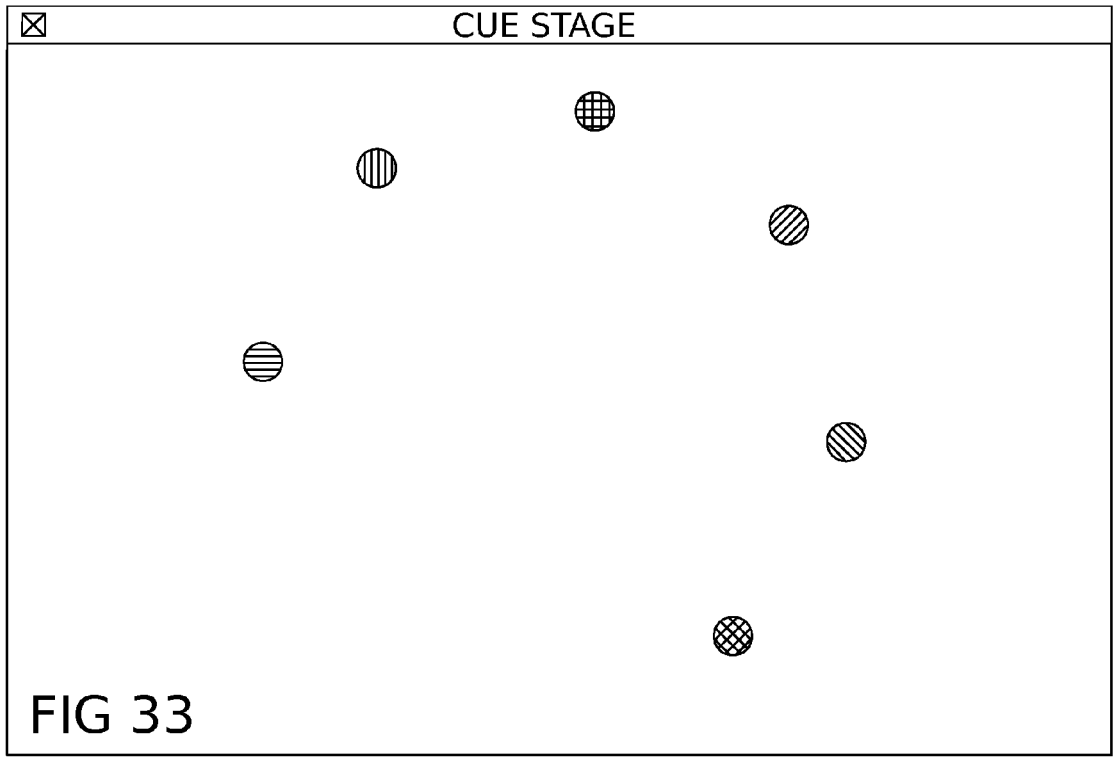

FIG. 33 A snapshot of a full screen performance after activating "play" button of FIG. 13 is depicted, for one embodiment.

Figure 34:
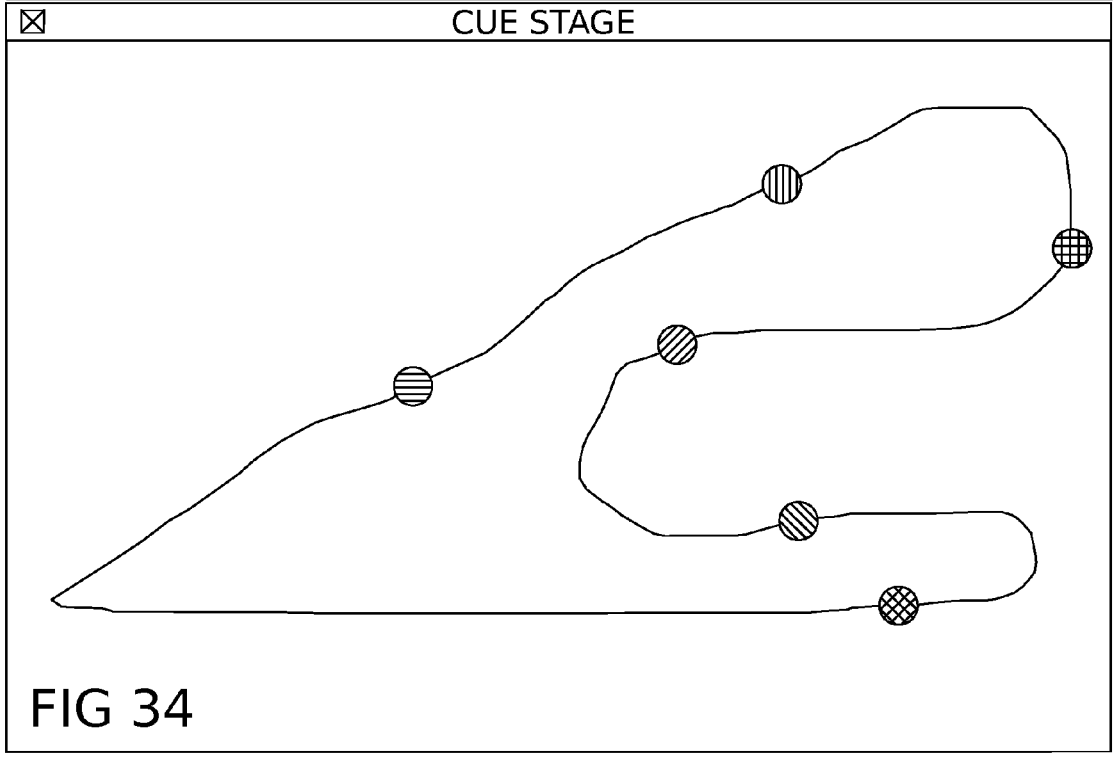

FIG. 34 A snapshot of a full screen performance after activating "play" button of FIG. 13 is depicted, for one embodiment.

Figure 35:
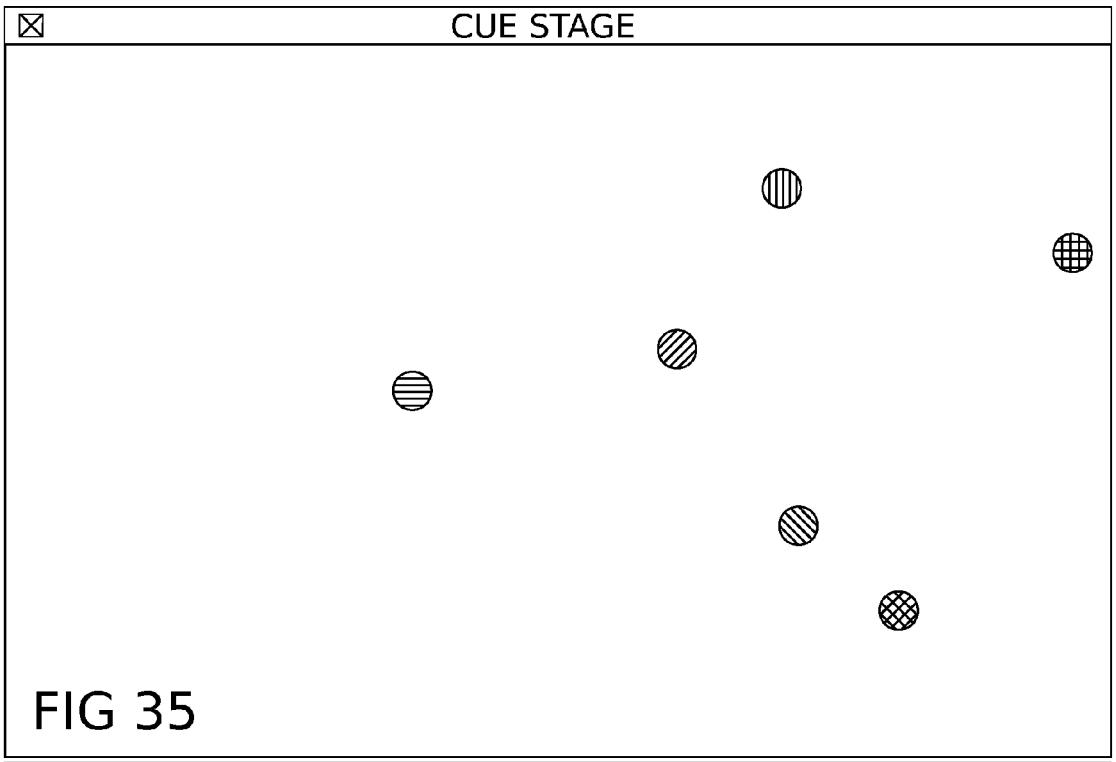

FIG. 35 Previous snapshot with invisible track is depicted, for one embodiment.

Figure 36:
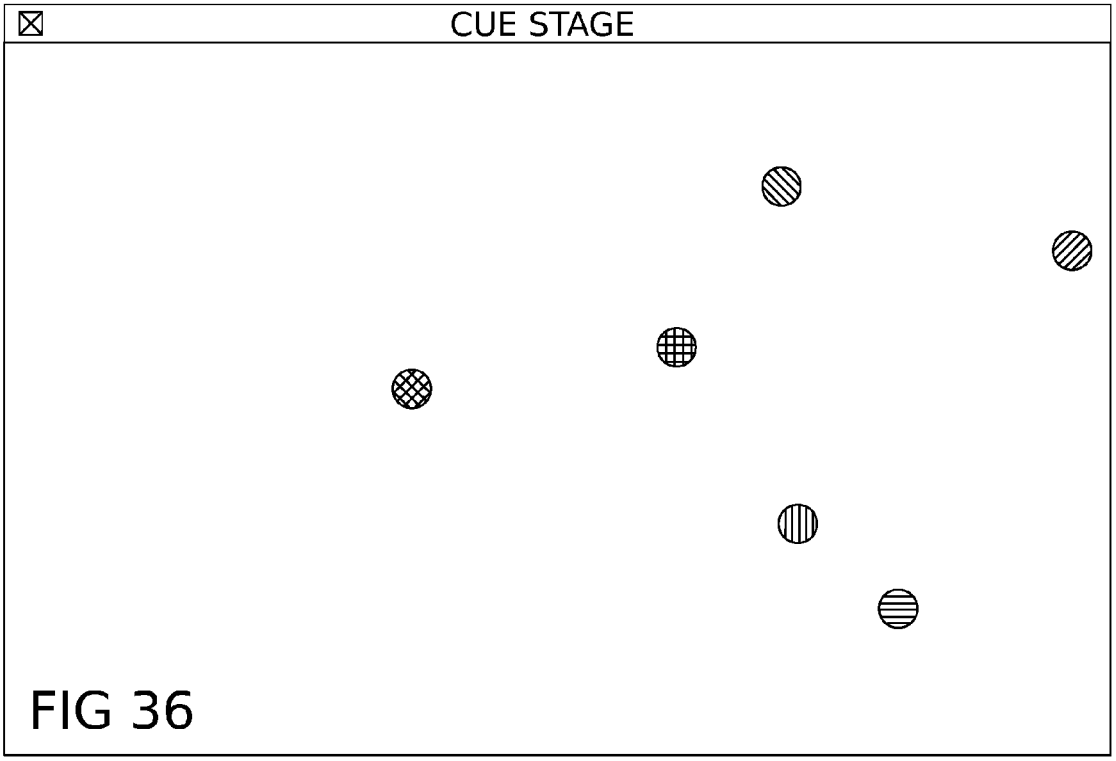

FIG. 36 Objects appear in reverse order and move in other direction when "reverse draw direction" checkbutton of FIG. 28 is selected, for one embodiment.

FIG. 37 First page after activating "begin show" button of FIG. 2 is depicted, for one embodiment.

FIG. 38 A current name is highlighted in a text entry widget box when "name" button is activated, for one embodiment.

FIG. 39 First page after activating "import" button of FIG. 37 is depicted, for one embodiment.

FIG. 40 First page after activating "export" button of FIG. 37 is depicted, for one embodiment.

FIG. 41 A dialog box appears after activating "show folder" button of FIG. 39, for one embodiment.

FIG. 42 A dialog box appears after activating "show folder" button of FIG. 40, for one embodiment.

FIG. 43 A dialog box appears after activating "show file" button of FIG. 39, for one embodiment.

FIG. 44 A dialog box appears after activating "show file" button of FIG. 40, for one embodiment.

FIG. 45 First page after activating "selection" button of FIG. 1 is depicted, for one embodiment.

FIG. 46 First page after activating "objects" button is depicted, for one embodiment.

Figure 47:
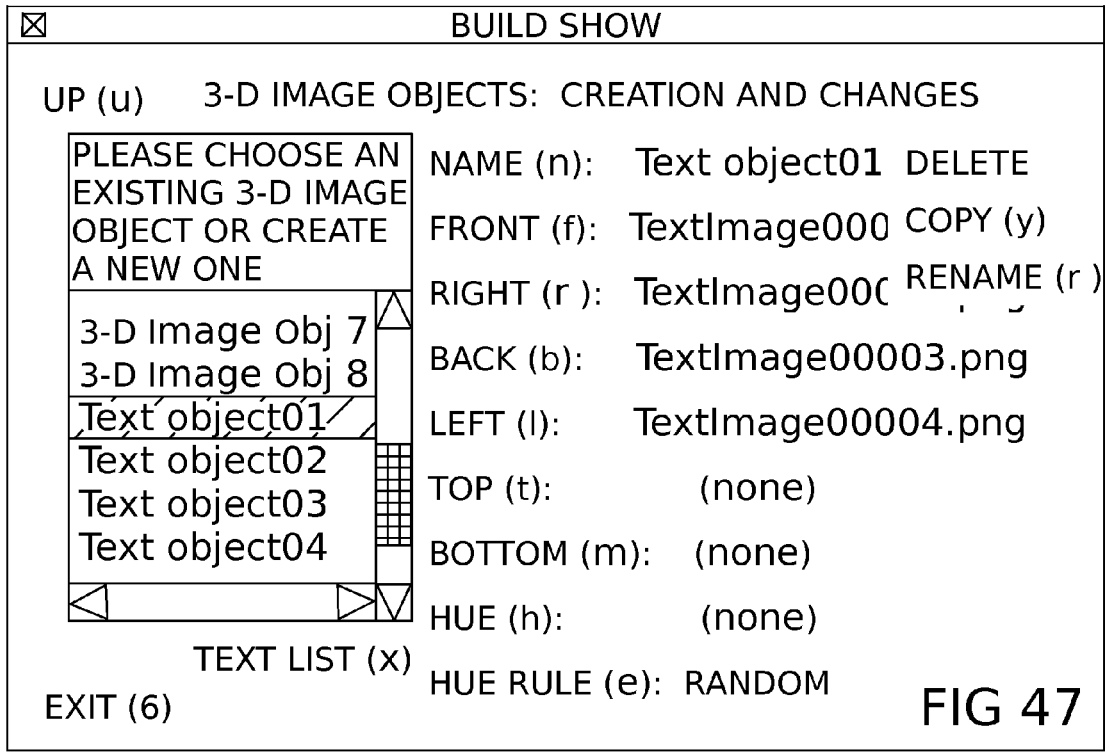

FIG. 47 First page after activating "creations and changes" button is depicted, for one embodiment.

Figure 48:
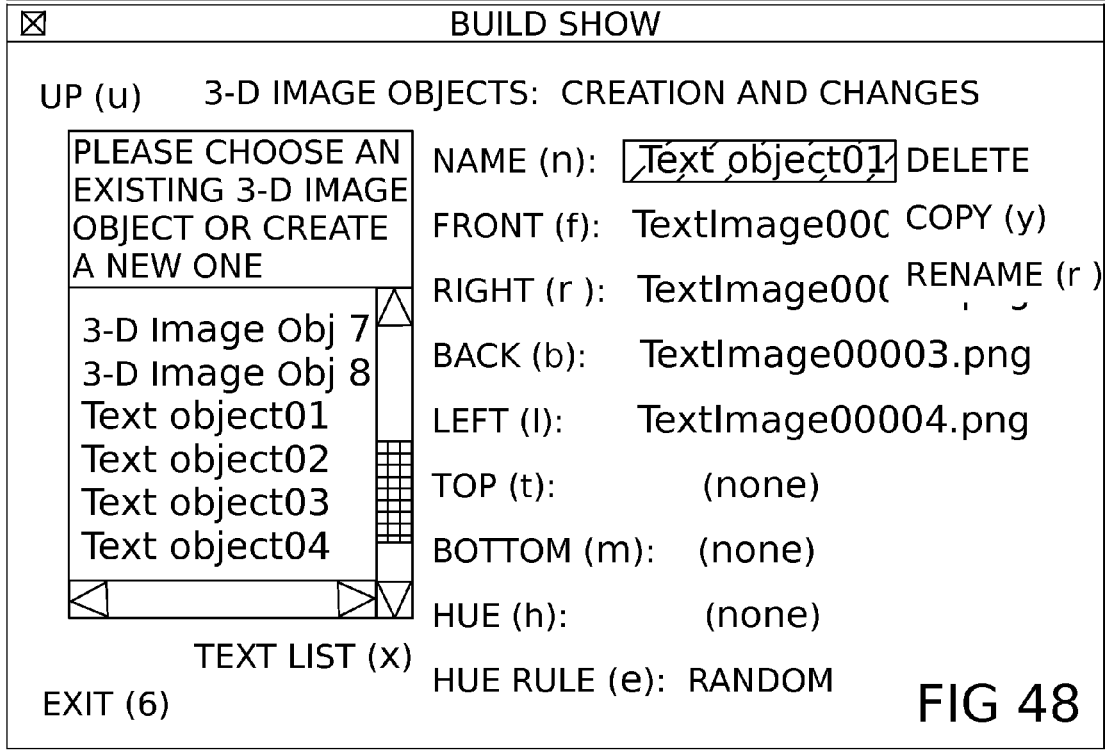

FIG. 48 A current name is highlighted in a text entry widget box when "name" button is activated, for one embodiment.

Figure 49:
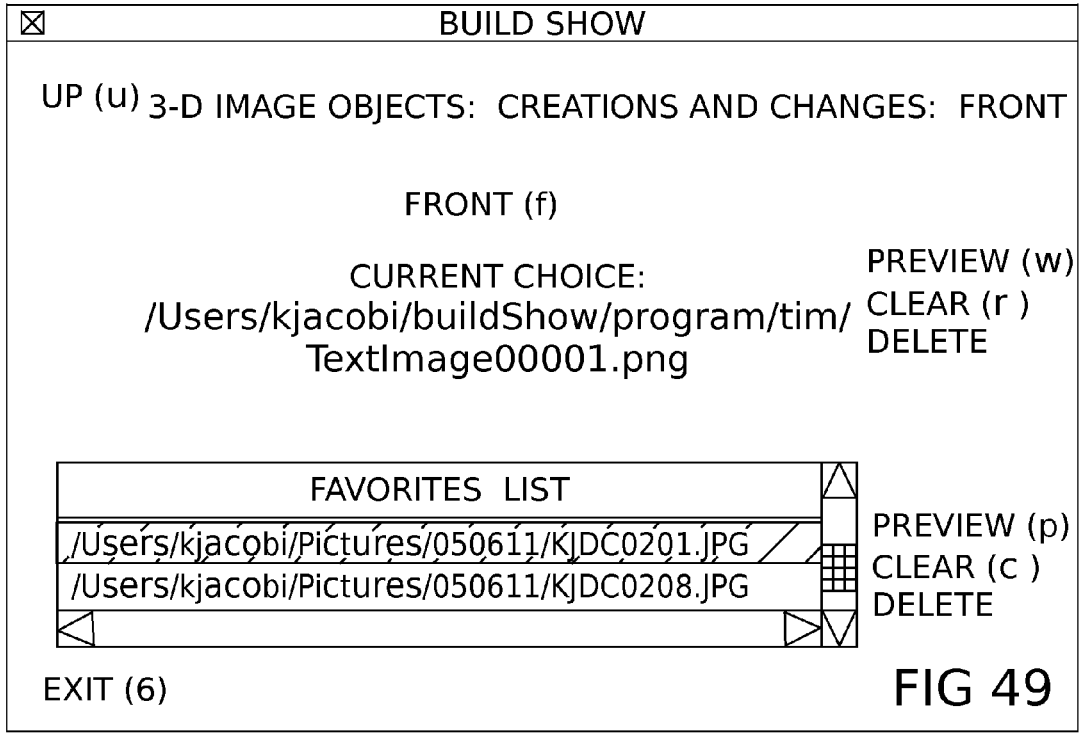

FIG. 49 First page after activating "front" button of FIG. 47 is depicted, for one embodiment.

Figure 50:
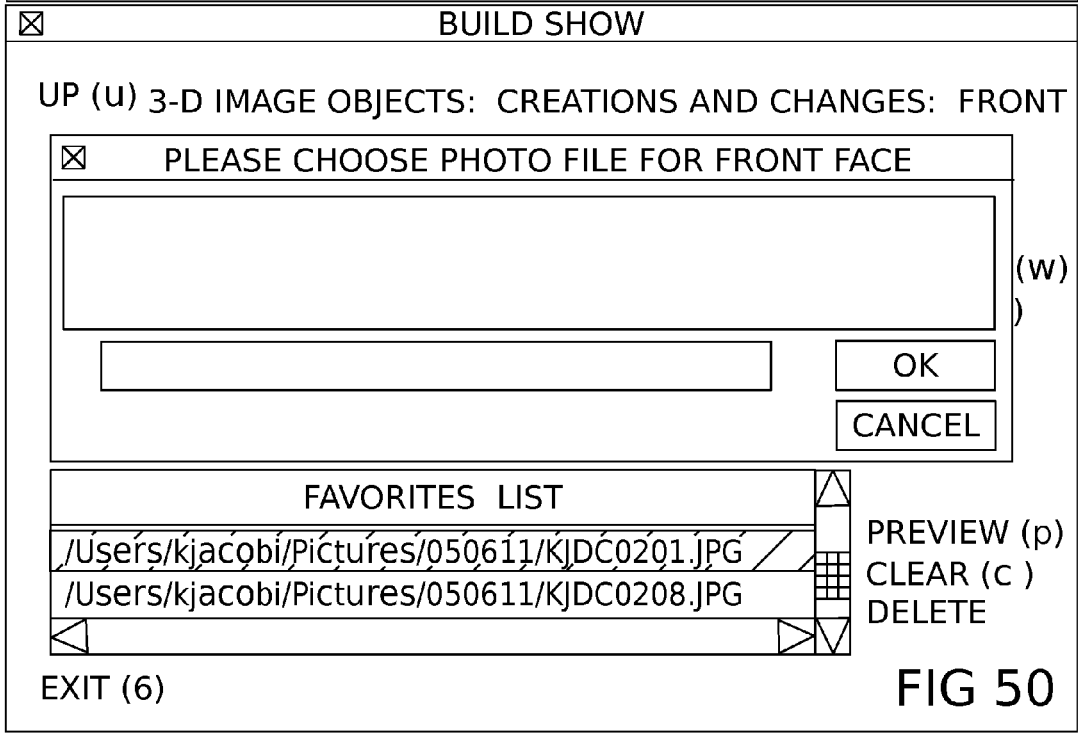

FIG. 50 A dialog box appears after activating "front" button of FIG. 49, for one embodiment.

Figure 51:

FIG. 51 Image assigned to front face of object is previewed when top "preview" button is activated, for one embodiment.

Figure 52:
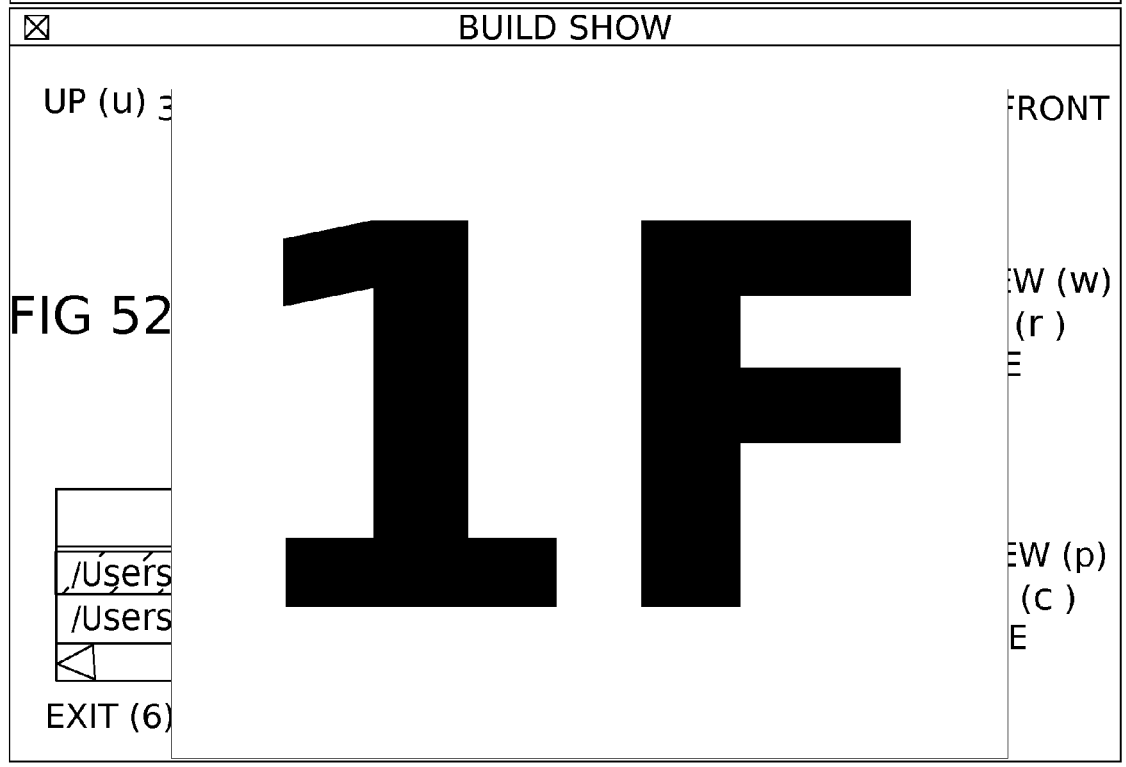

FIG. 52 Image highlighted in Favorites List listbox is previewed when bottom "preview" button is activated, for one embodiment.

FIG. 53 First page after activating "right" button of FIG. 47 is depicted, for one embodiment.

FIG. 54 Image assigned to right face of object is previewed when top "preview" button is activated, for one embodiment.

FIG. 55 First page after activating "back" button of FIG. 47 is depicted, for one embodiment.

FIG. 56 First page after activating "left" button of FIG. 47 is depicted, for one embodiment.

FIG. 57 First page after activating "top" button of FIG. 47 is depicted, for one embodiment.

FIG. 58 First page after activating "bottom" button of FIG. 47 is depicted, for one embodiment.

Figure 59:
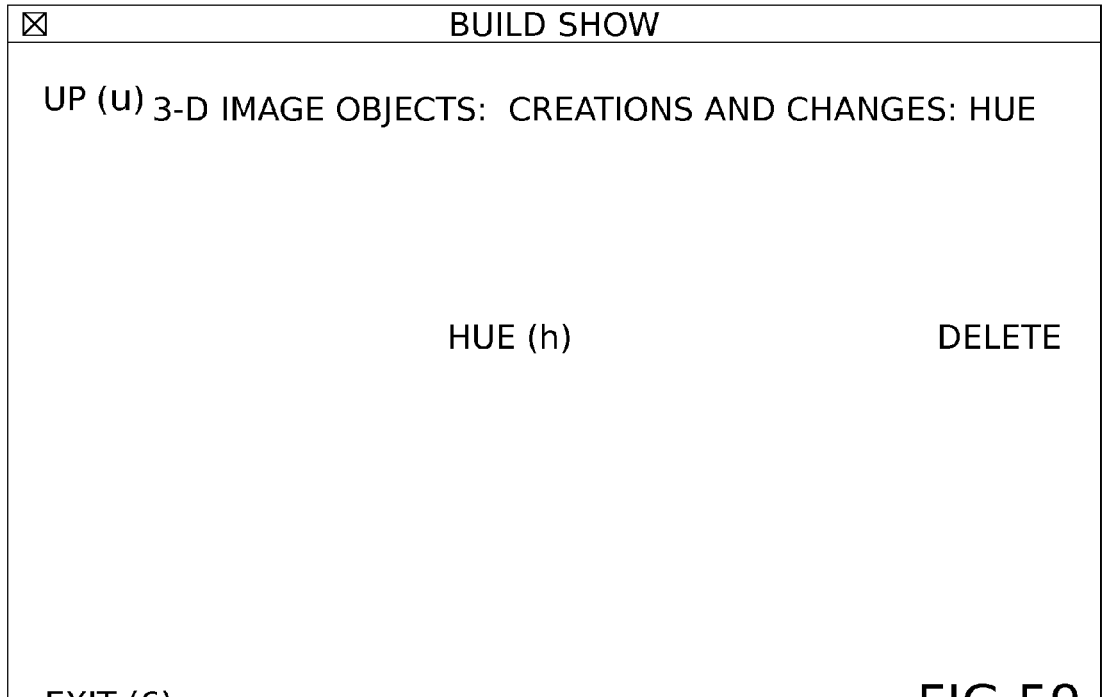

FIG. 59 First page after activating "hue" button of FIG. 47 is depicted, for one embodiment.

Figure 60:
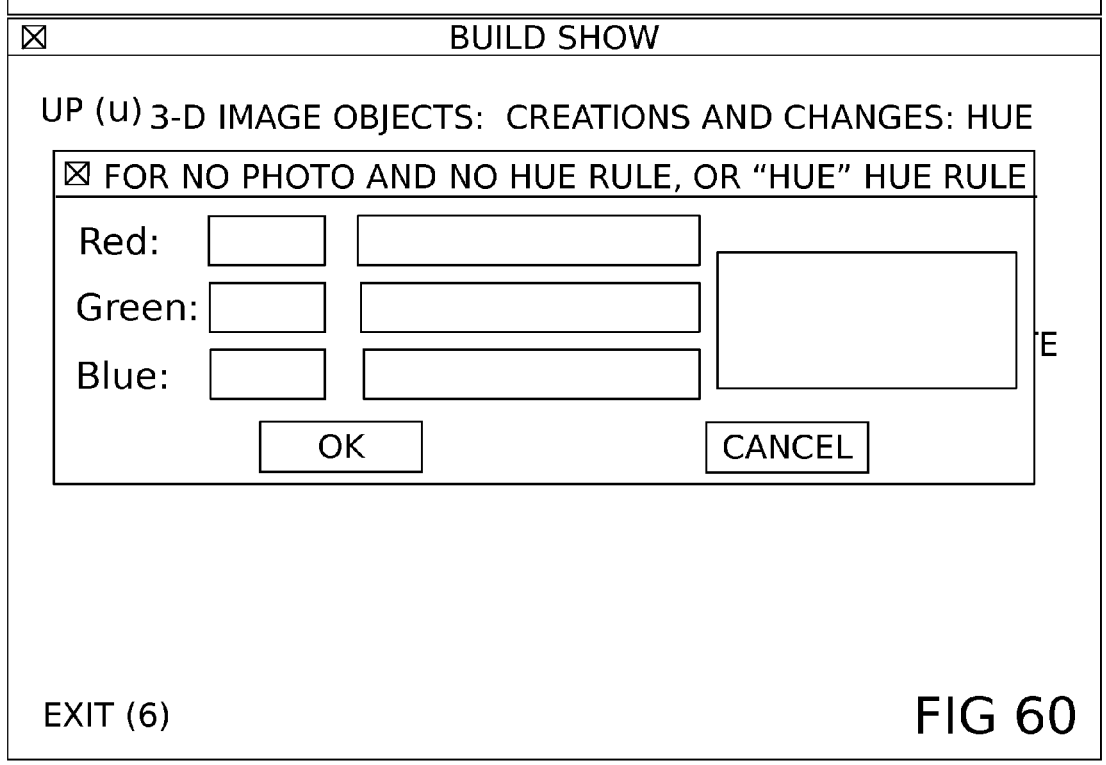

FIG. 60 A dialog box appears after activating "hue" button of FIG. 59, for one embodiment.

Figure 61:
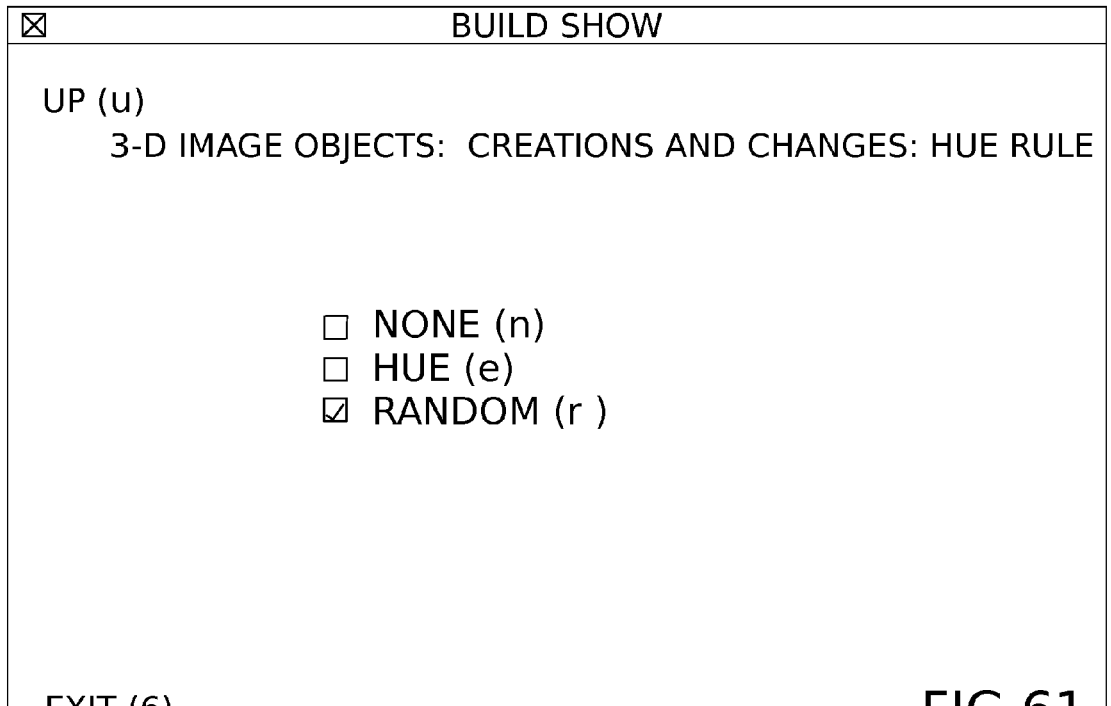

FIG. 61 First page after activating "hue rule" button of FIG. 47 is depicted, for one embodiment.

Figure 62:
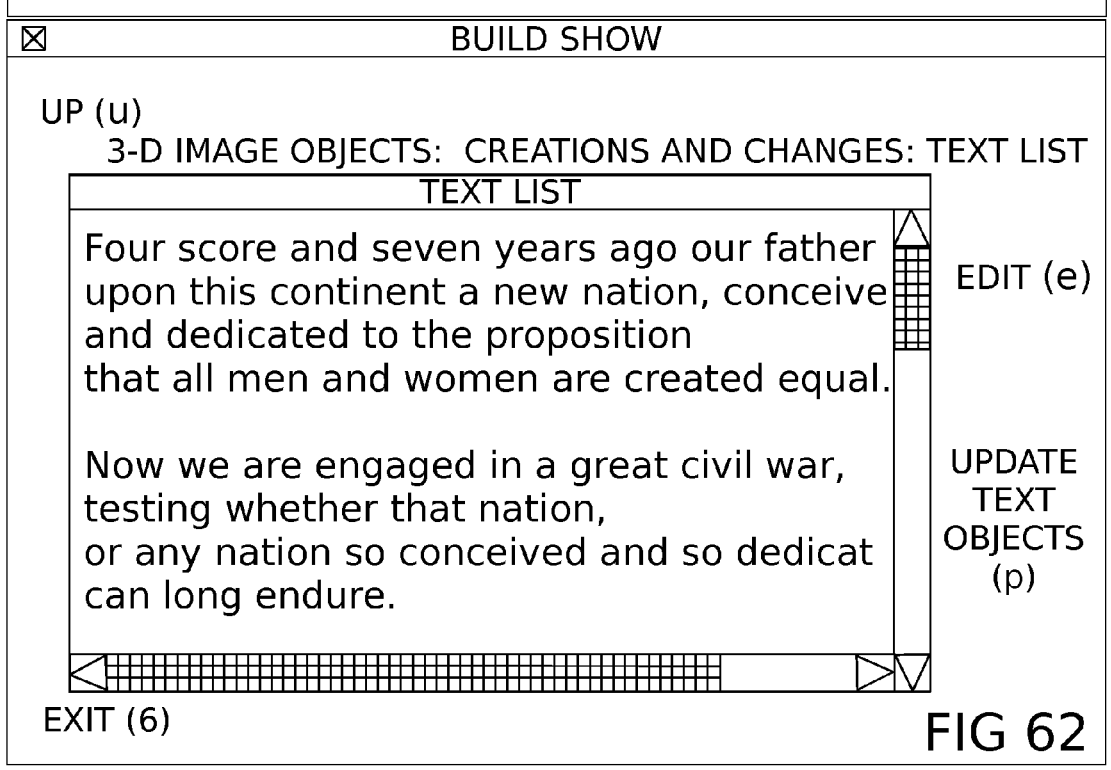

FIG. 62 First page after activating "text list" button of FIG. 47 is depicted, for one embodiment.

Figure 63:
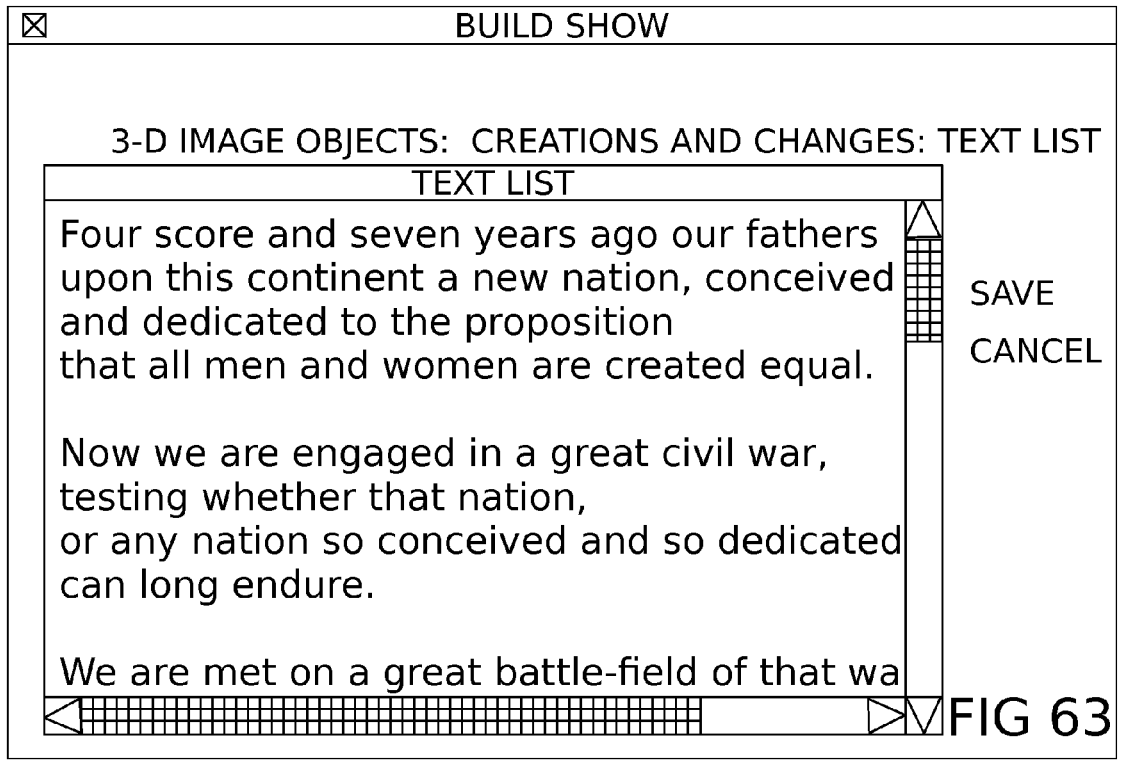

FIG. 63 First page after activating "edit" button is depicted, for one embodiment.

Figure 64:
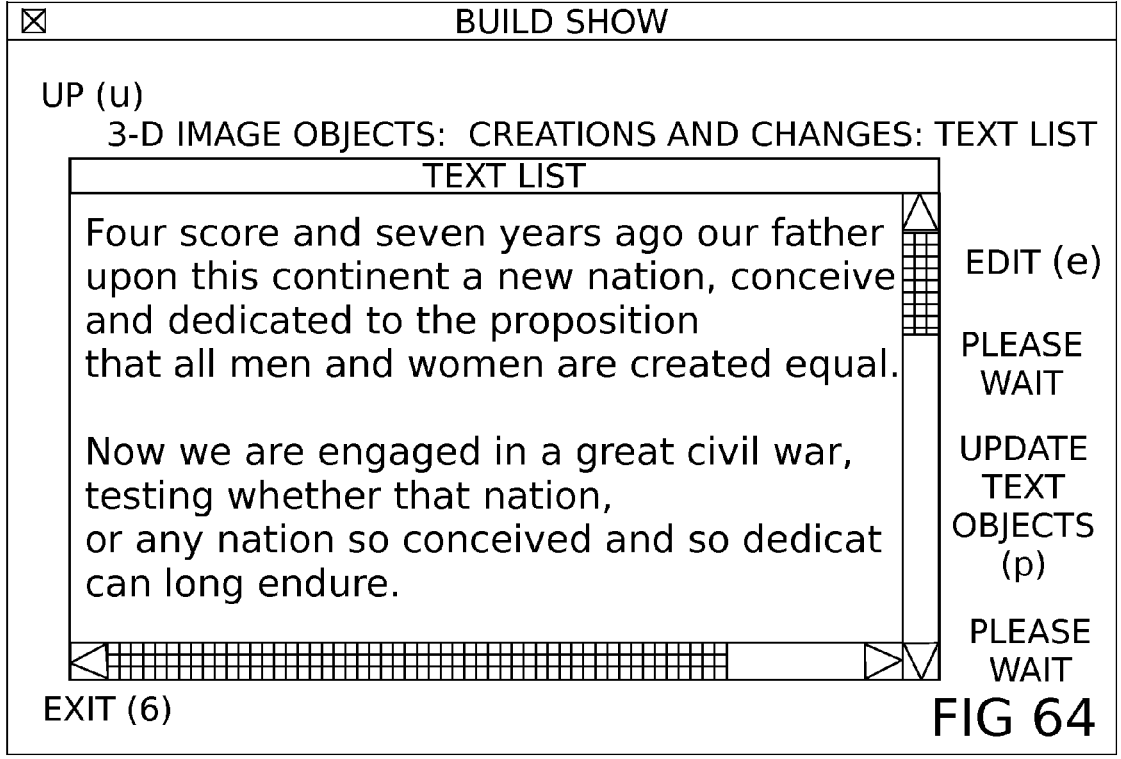

FIG. 64 Labels appear after activating "update text objects" button of FIG. 62, for one embodiment.

FIG. 65 First page after activating "show lineup" button of FIG. 46 is depicted, for one embodiment.

FIG. 66 Objects may be removed from lineup by clicking right listbox, for one embodiment.

FIG. 67 Lineup may be cleared by activating "start fresh" button, for one embodiment.

FIG. 68 First page after activating "begin show" button of FIG. 45 is depicted, for one embodiment.

Figure 69:
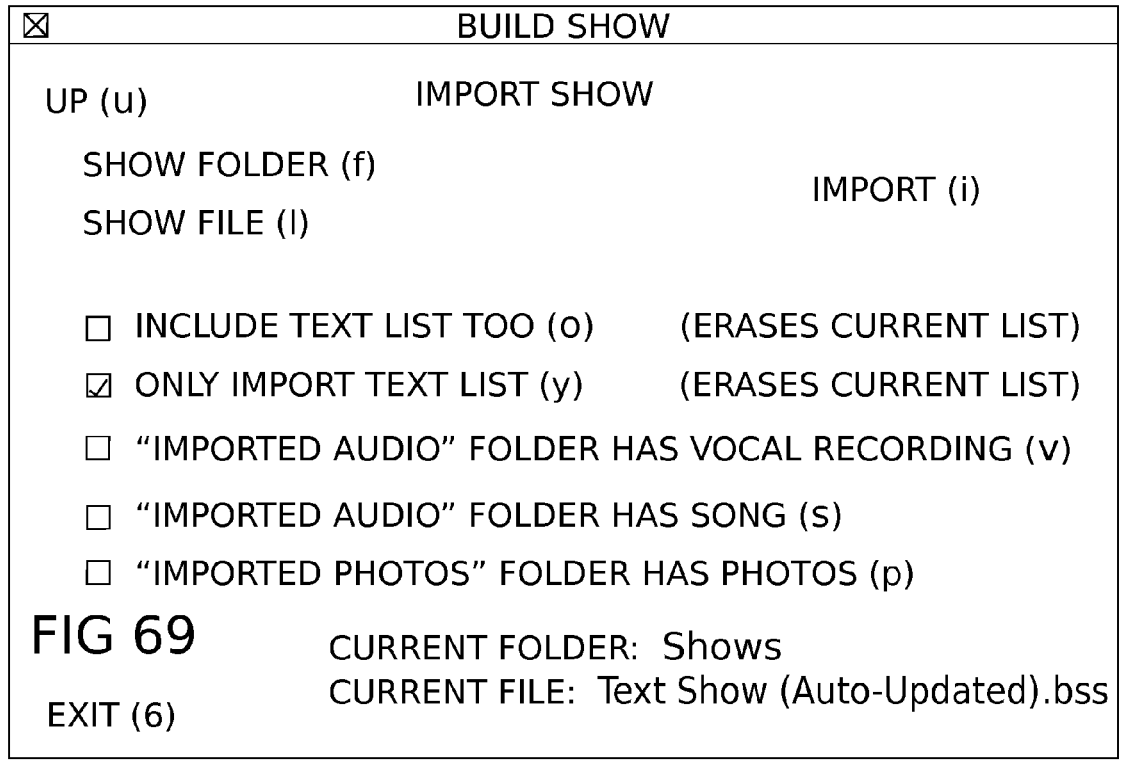

FIG. 69 First page after activating "import" button of FIG. 68 is depicted, for one embodiment.

Figure 70:
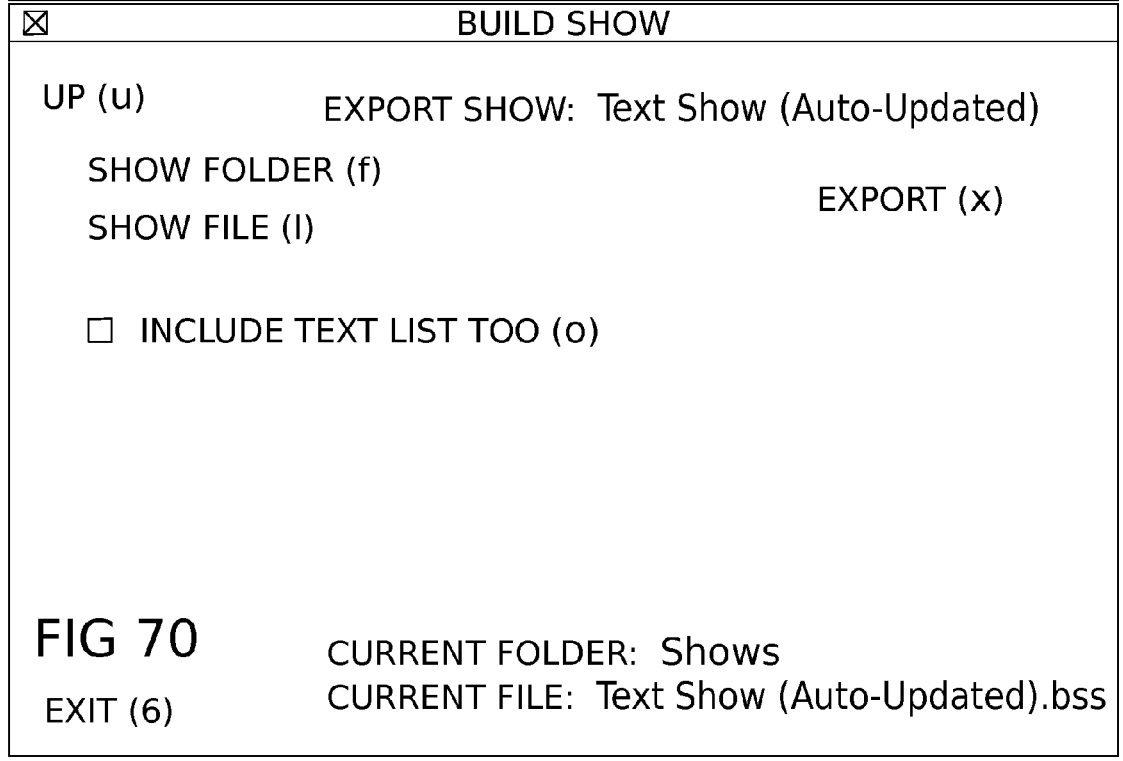

FIG. 70 First page after activating "export" button of FIG. 68 is depicted, for one embodiment.

Figure 71:
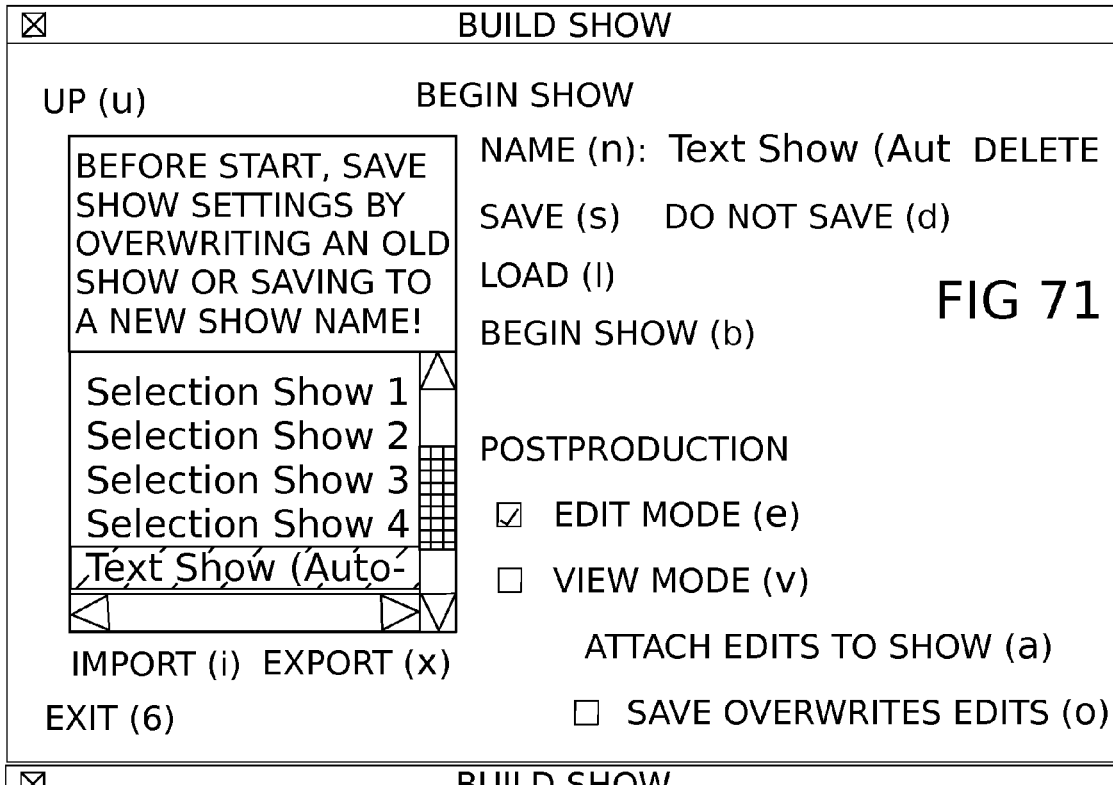

FIG. 71 Activating "edit mode" checkbutton moves checkmark from "view mode" checkbutton, for one embodiment.

Figure 72:
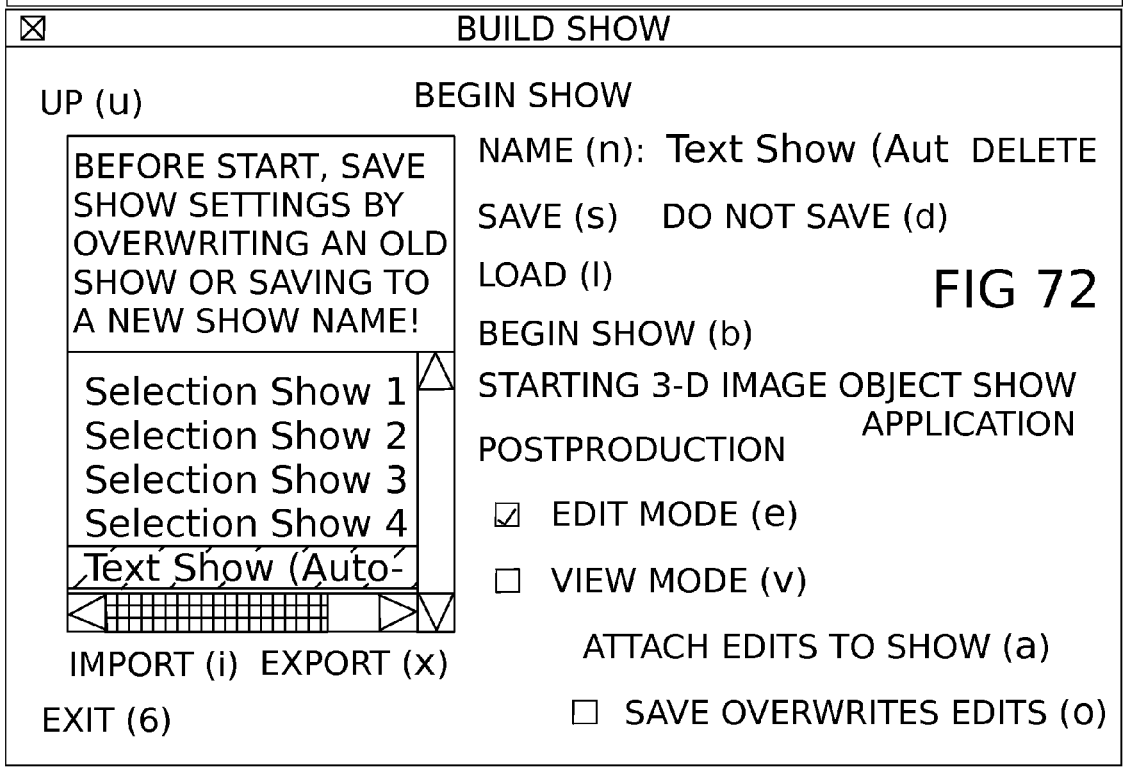

FIG. 72 A label appears after activating "begin show" button of FIG. 68, for one embodiment.

FIG. 73 All objects are seen in Stage View as part of a full screen show performance, for one embodiment.

FIG. 74 All objects are seen in Stage View as part of a full screen show performance, for one embodiment.

FIG. 75 Previous snapshot with invisible track is depicted, for one embodiment.

FIG. 76 Objects appear in reverse order and move in other direction when "reverse draw direction" checkbutton of FIG. 28 is selected, for one embodiment.

FIG. 77 A show Stage View, with background scenery turned on, is depicted, for one embodiment.

FIG. 78 A user-defined virtual perspective of a show, with background scenery turned on, is depicted, for one embodiment.

FIGS. 79 and 80 Front face of an object is seen rotating in Survey View as part of a full screen show performance, for one embodiment.

Figure 81:
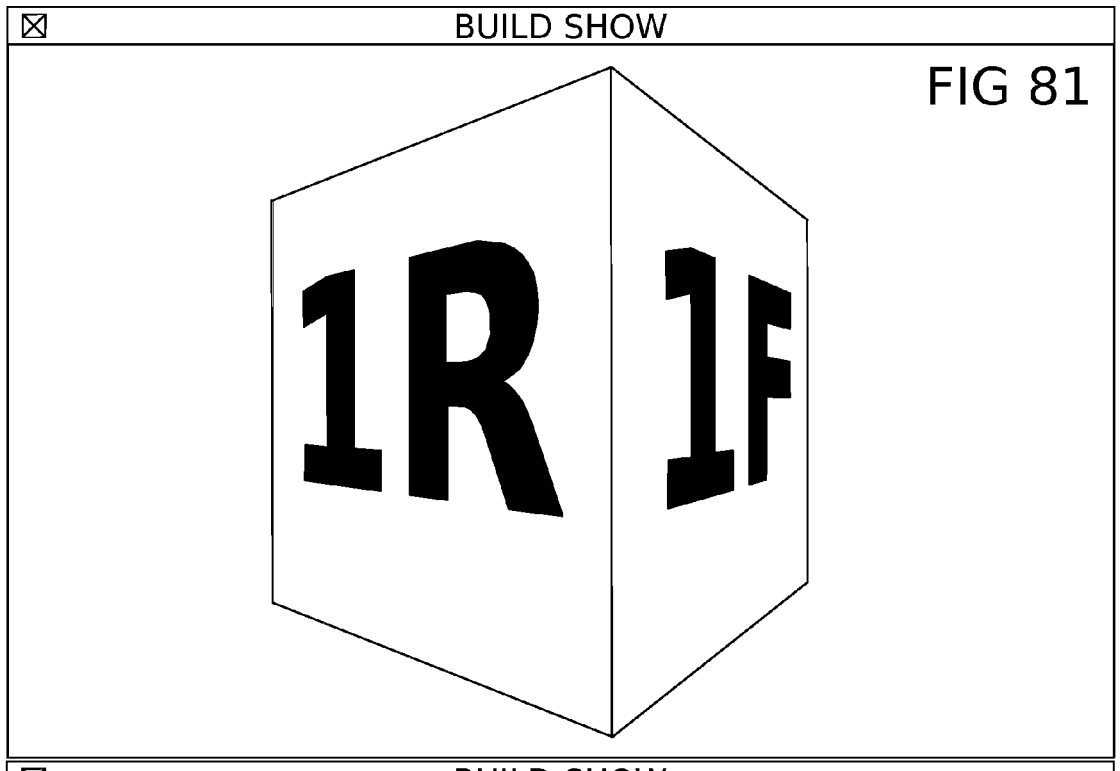
Figure 82:
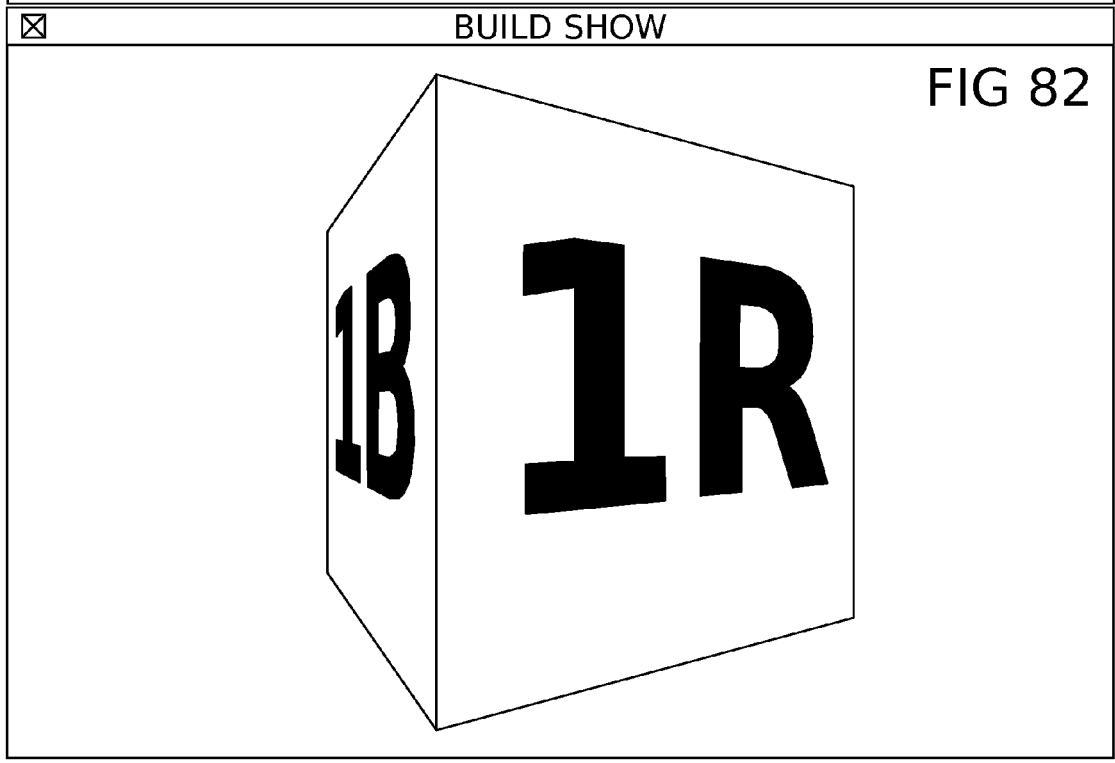

FIGS. 81 and 82 Right face of an object is seen rotating in Survey View as part of a full screen show performance, for one embodiment.

FIGS. 83 and 84 Back face of an object is seen rotating in Survey View as part of a full screen show performance, for one embodiment.

Figure 85:
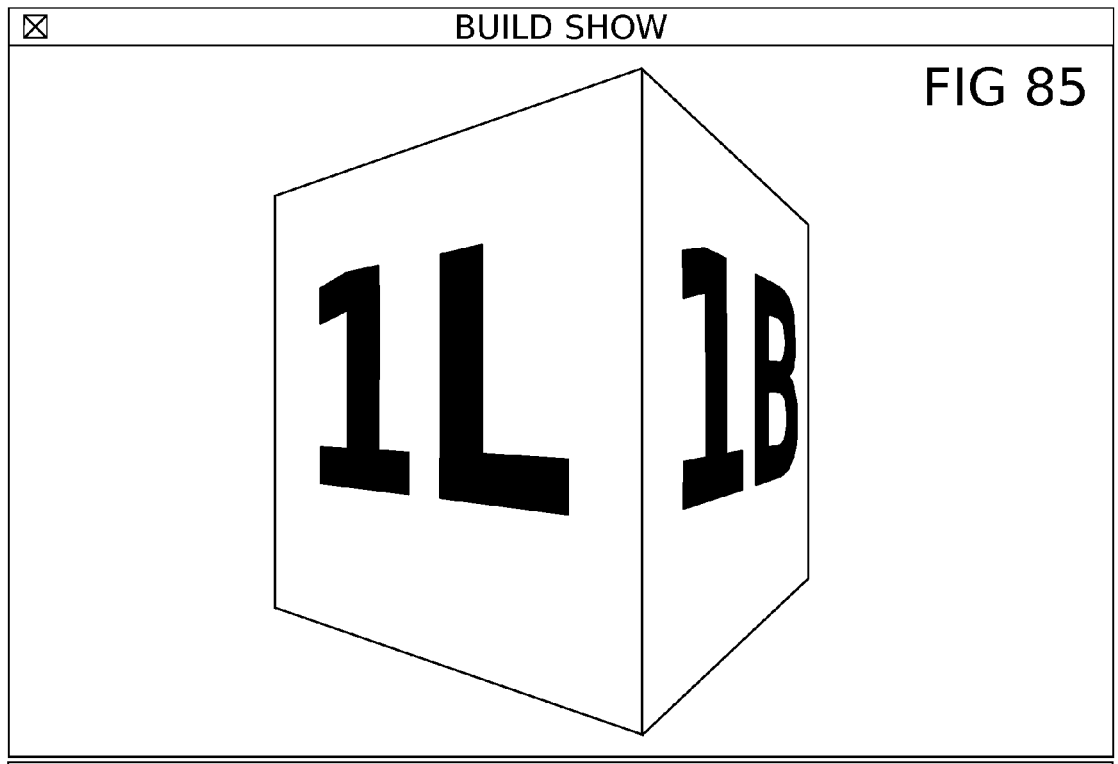
Figure 86:
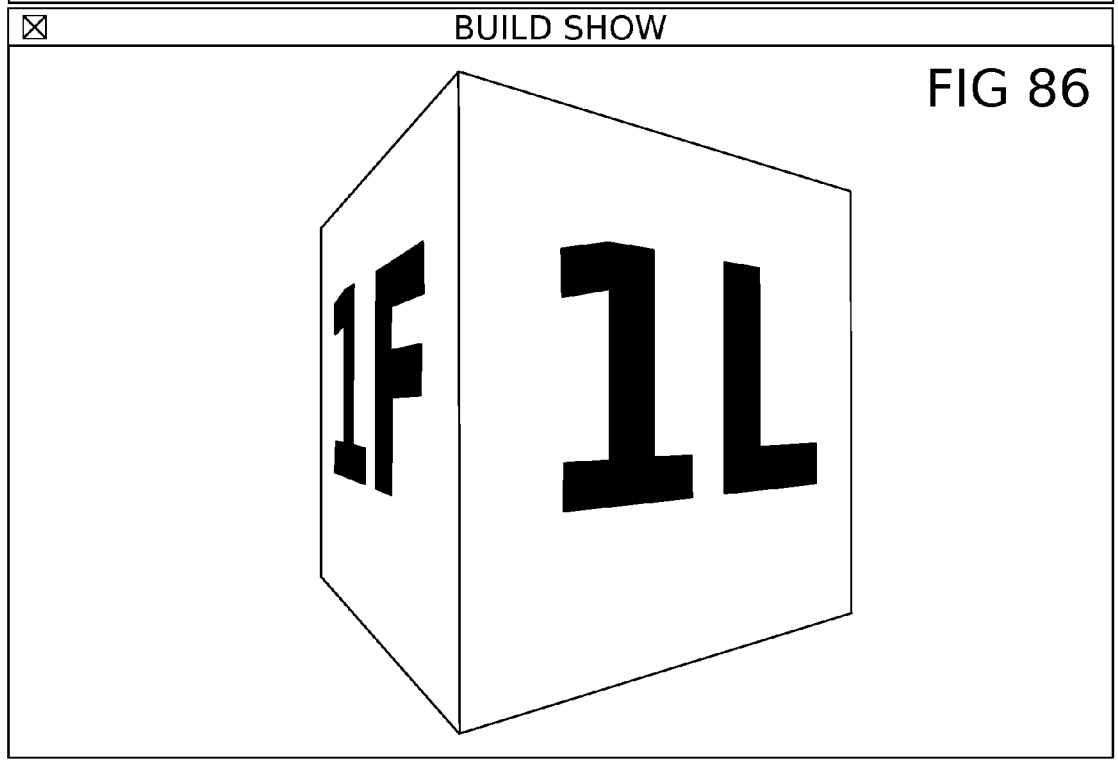

FIGS. 85 and 86 Left face of an object is seen rotating in Survey View as part of a full screen show performance, for one embodiment.

Figure 87:
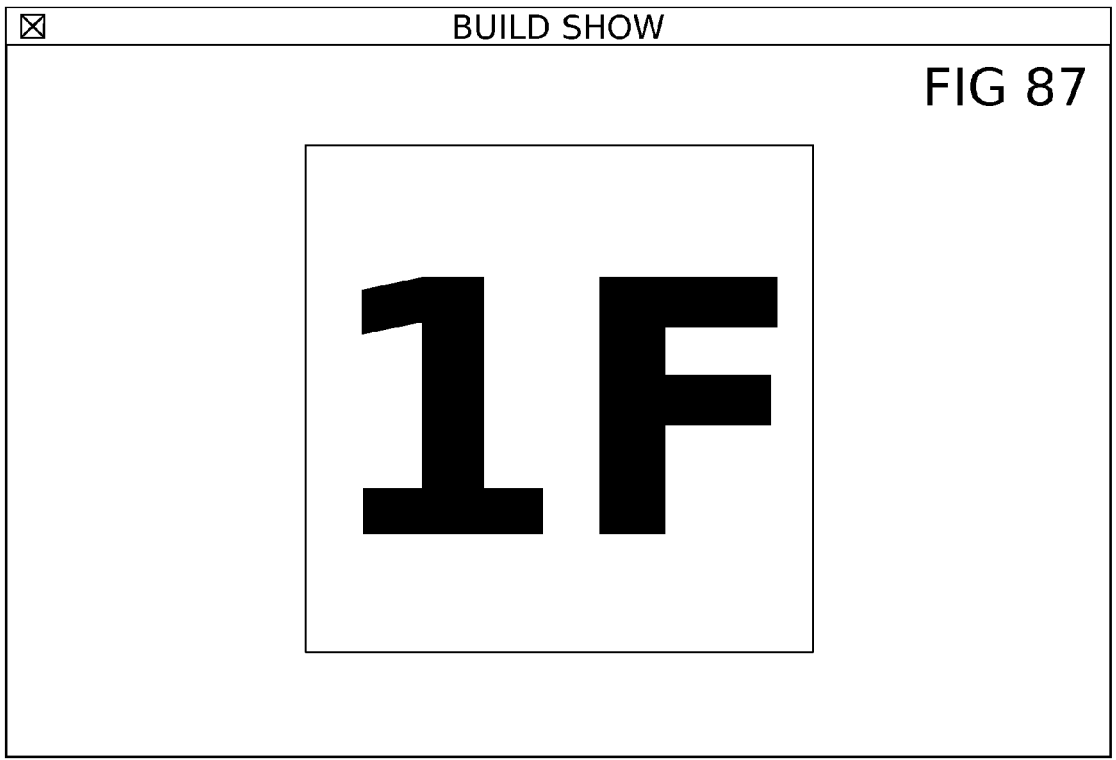

FIG. 87 Front face of an object is seen in Face View as part of a full screen show performance, for one embodiment.

Figure 88:
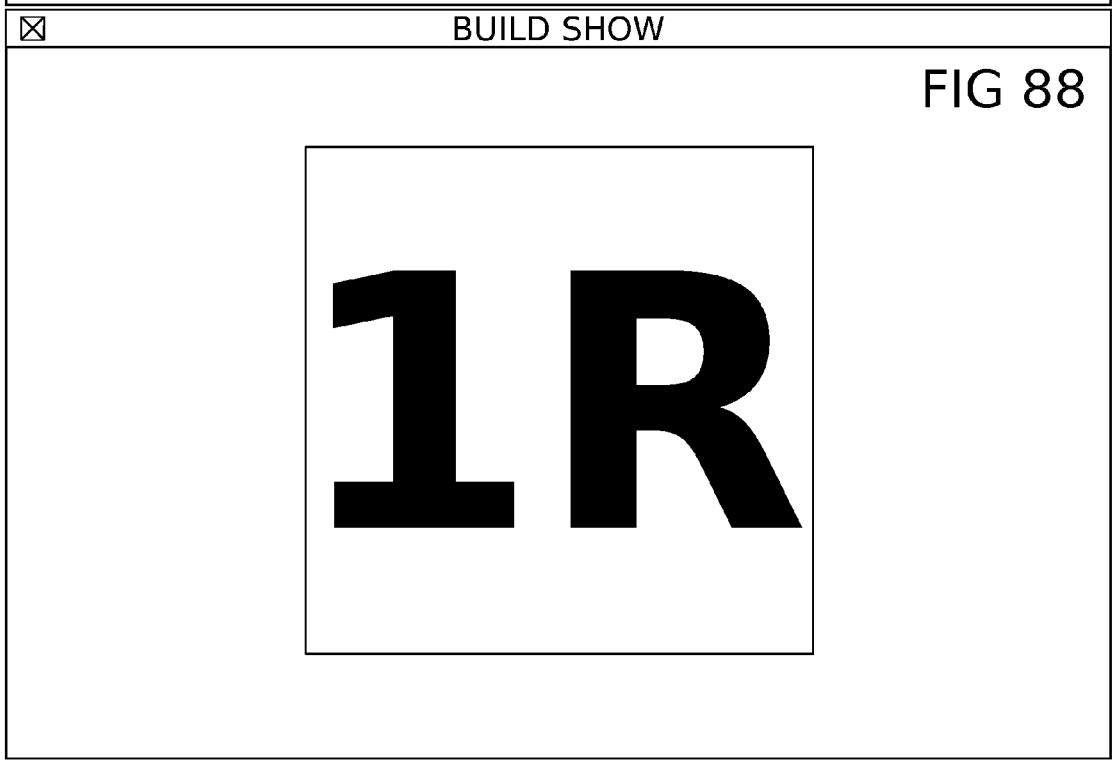

FIG. 88 Right face of an object is seen in Face View as part of a full screen show performance, for one embodiment.

FIG. 89 A message is seen when image filename of FIG. 87 is added to FavoritesList.txt, for one embodiment.

FIG. 90 A message is seen when image filename of FIG. 88 is added to FavoritesList.txt, for one embodiment.

Figure 91:
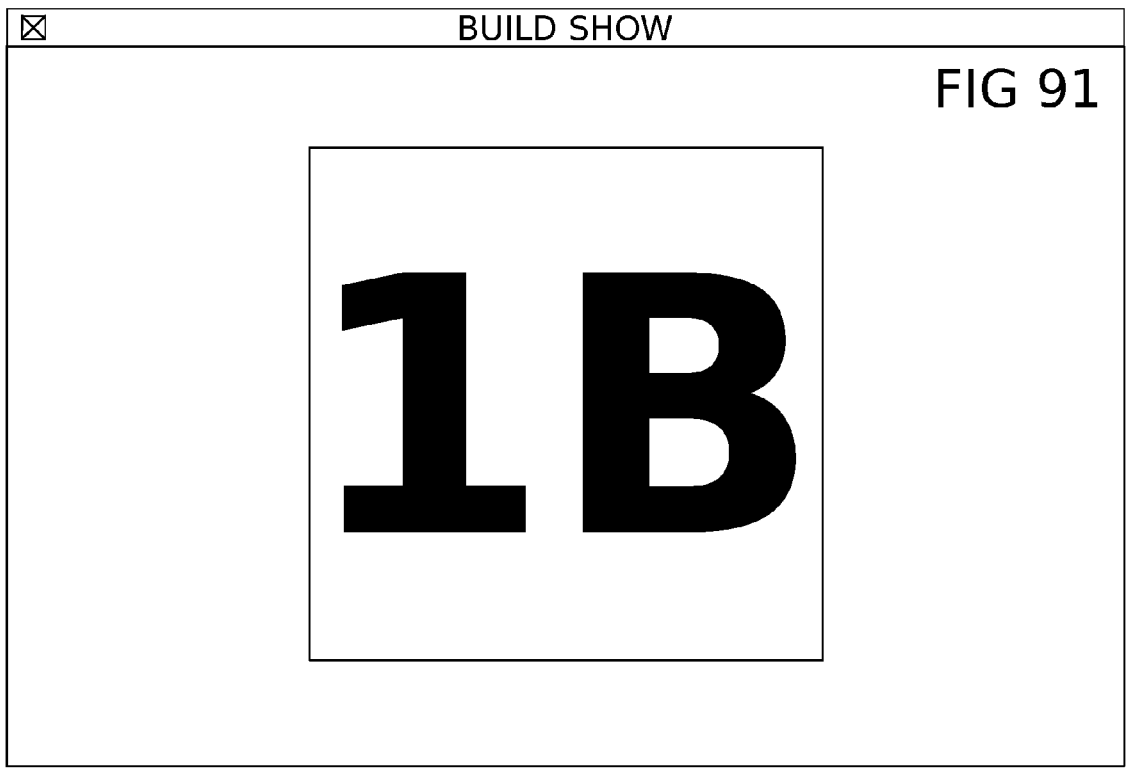

FIG. 91 Back face of an object is seen in Face View as part of a full screen show performance, for one embodiment.

Figure 92:
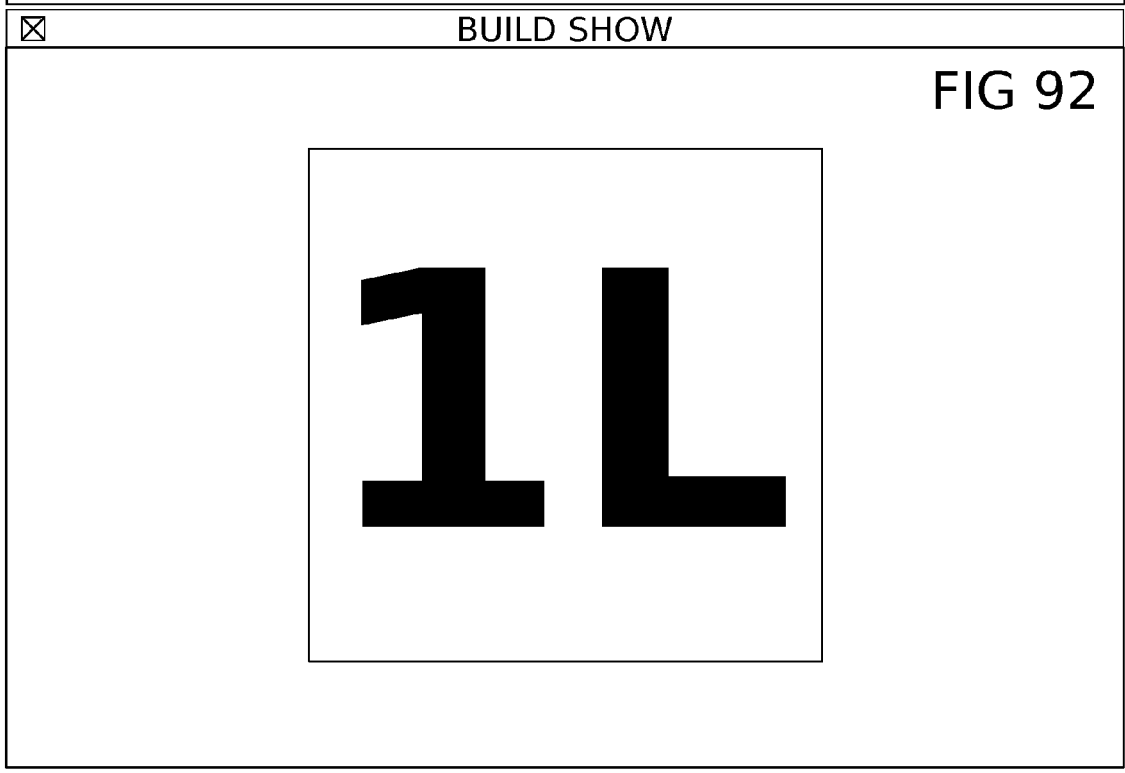

FIG. 92 Left face of an object is seen in Face View as part of a full screen show performance, for one embodiment.

FIG. 93 Top face of an object is seen in Face View as part of a full screen show performance, for one embodiment.

FIG. 94 Bottom face of an object is seen in Face View as part of a full screen show performance, for one embodiment.

FIG. 95 Front face of a "text object" is seen in Face View as part of a full screen show performance, for one embodiment.

FIG. 96 Right face of a text object is seen in Face View as part of a full screen show performance, for one embodiment.

FIG. 97 Back face of a text object is seen in Face View as part of a full screen show performance, for one embodiment.

FIG. 98 Left face of a text object is seen in Face View as part of a full screen show performance, for one embodiment.

FIG. 99 Top face of a text object is seen in Face View as part of a full screen show performance, for one embodiment.

FIG. 100 Bottom face of a text object is seen in Face View as part of a full screen show performance, for one embodiment.

FIG. 101 A first part of a sign-off message appears immediately after activating "exit" button, for one embodiment.

FIG. 102 A second part of a sign-off message appears 0.3 second after activating "exit" button, for one embodiment.

FIG. 103 A third part of a sign-off message appears 1 second after activating "exit" button, for one embodiment.

Figure 104:
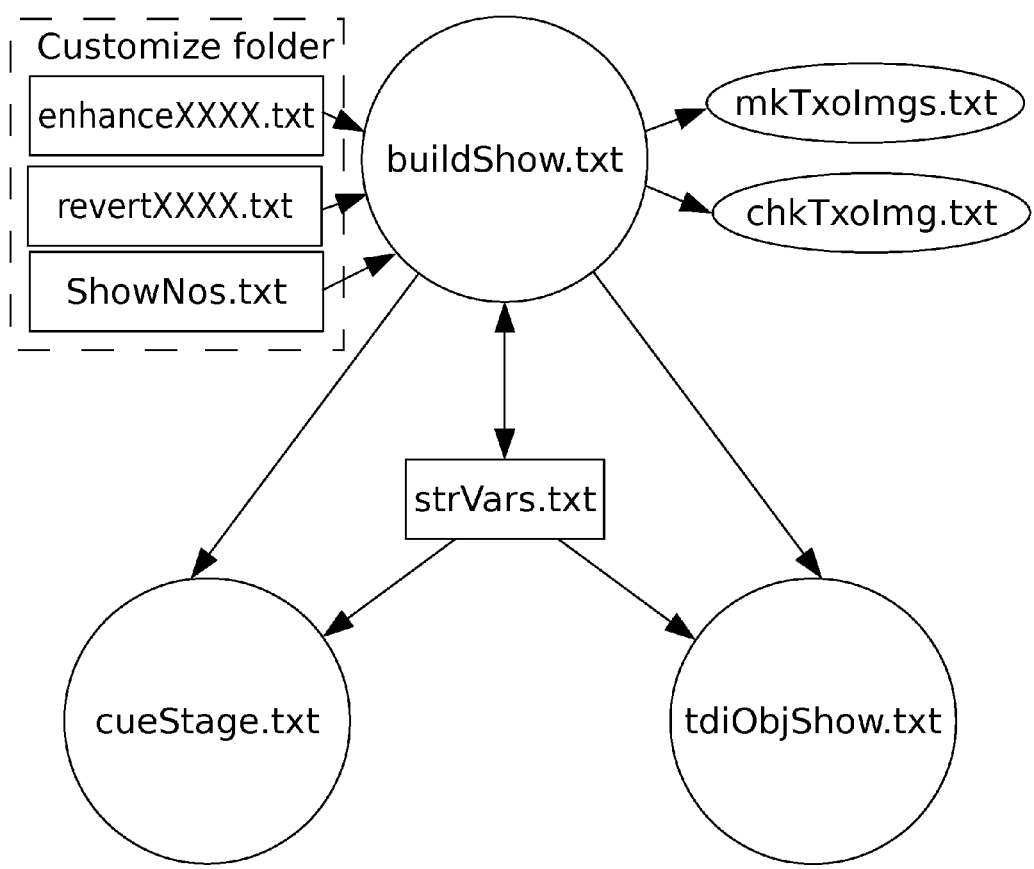

FIG. 104 Files "cueStage.txt" and "tdiObjShow.txt" represent major subunits of a "buildShow.txt" embodiment, (i.e. one embodiment).

Figure 105:
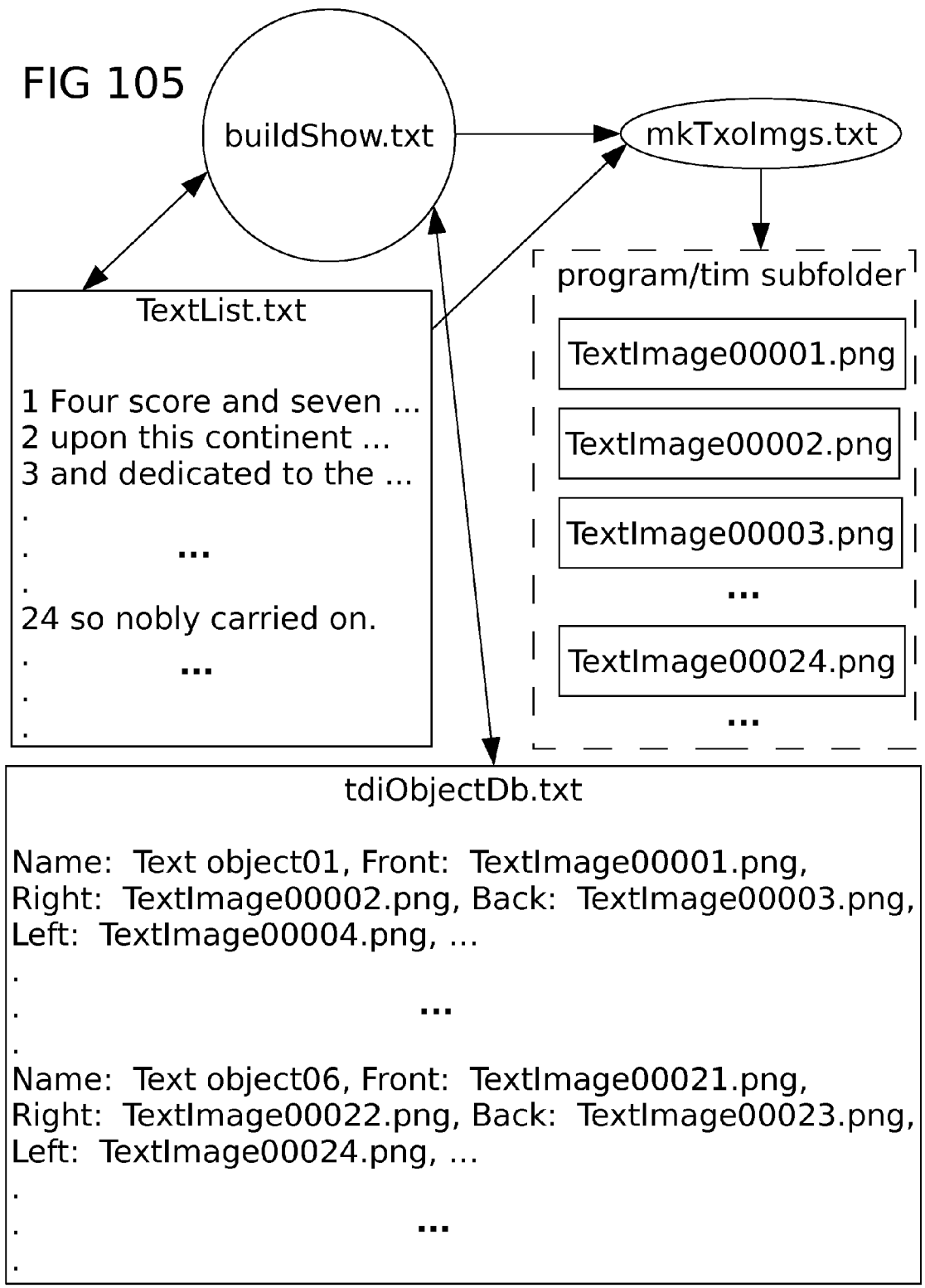

FIG. 105 The buildShow.txt embodiment, (i.e. one embodiment), manages text objects derived from file TextList.txt with help from subunit "mkTxoImgs.txt."

Figure 106:
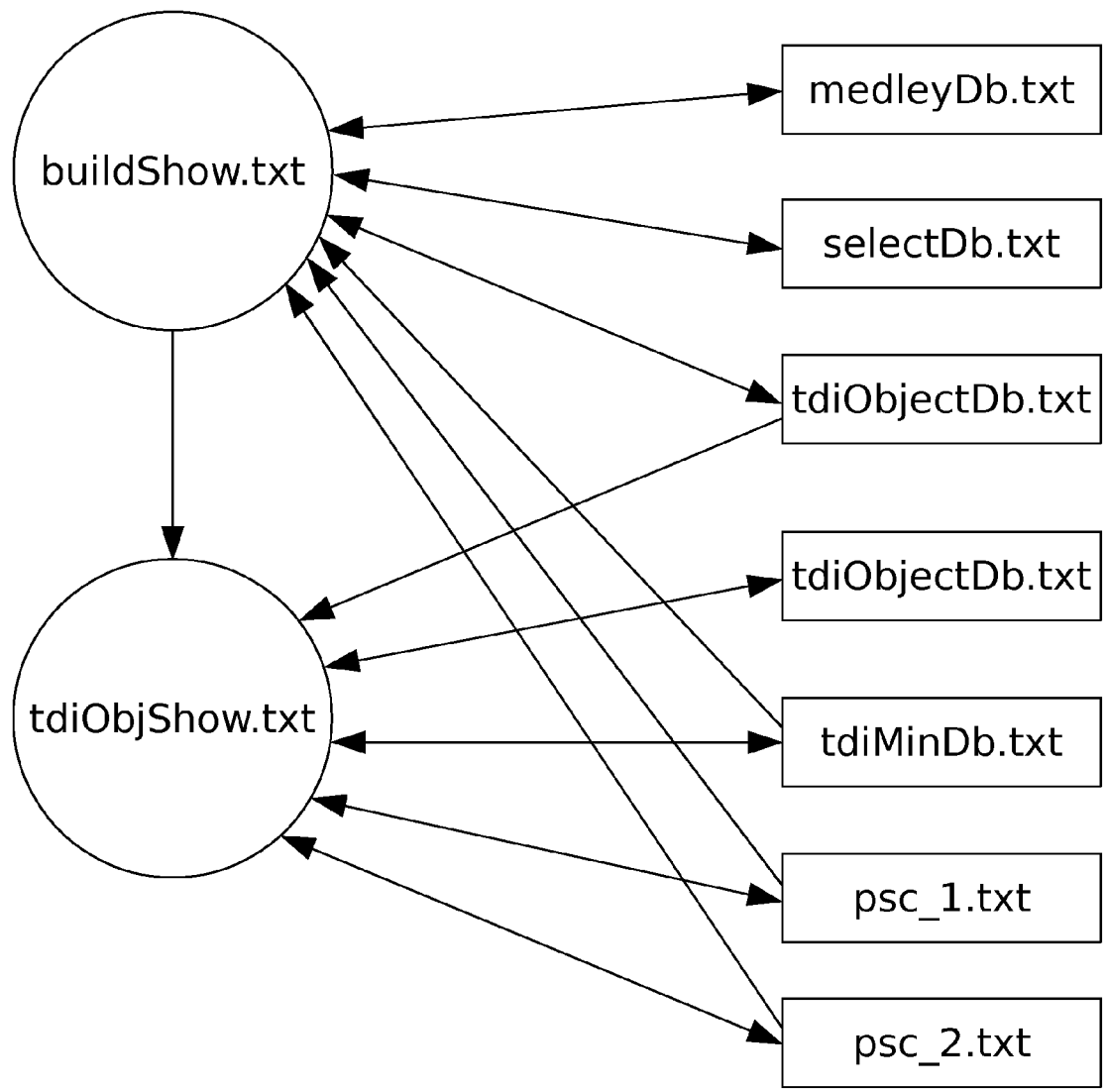

FIG. 106 When the buildShow.txt embodiment, (i.e. one embodiment), communicates with subunit tdiObjShow.txt, it often relies on database and cache files.

Figure 107:
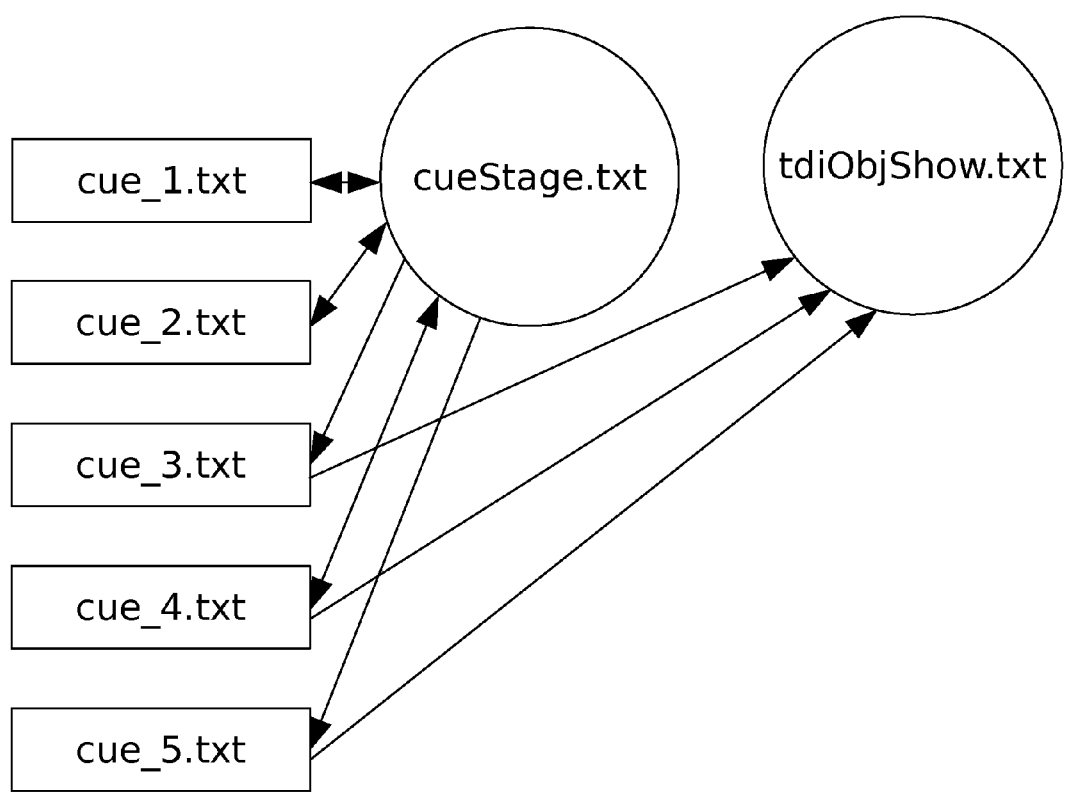

FIG. 107 Subunit cueStage.txt communicates indirectly with subunit tdiObjShow.txt by way of stored cache files, for one embodiment.

Figure 108:
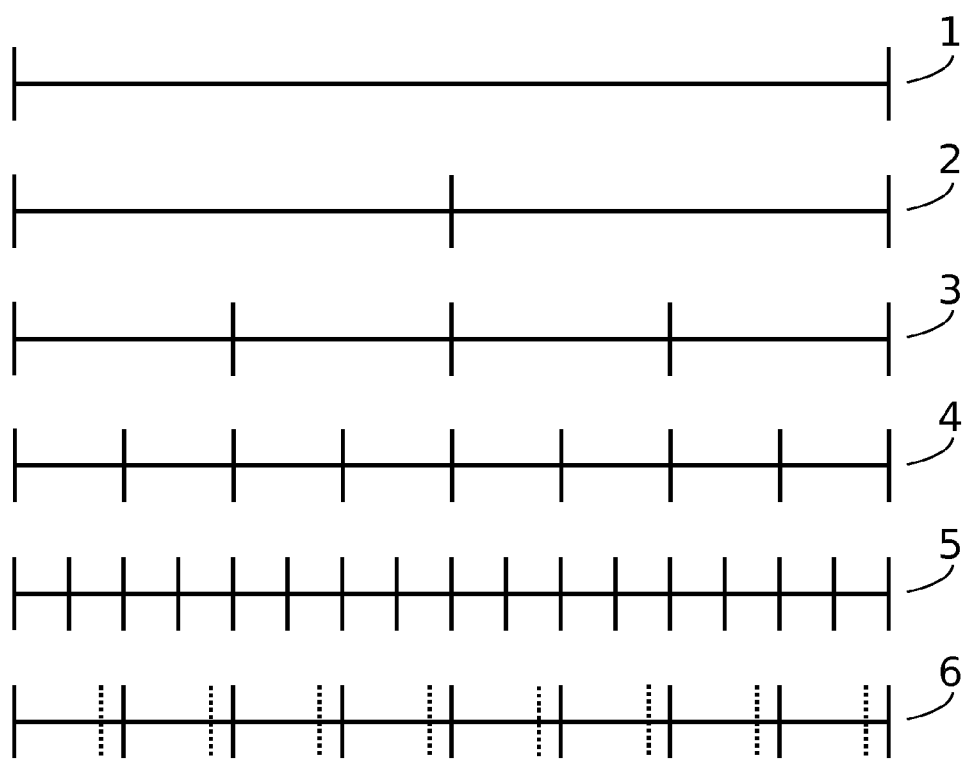

FIG. 108 Segment examples are given for a straight line path, for one embodiment.

FIG. 109 Equations that determine number of indices or "interpositions" to use for fast and slow phases of a legato beat are derived, for one embodiment.

Figure 110:
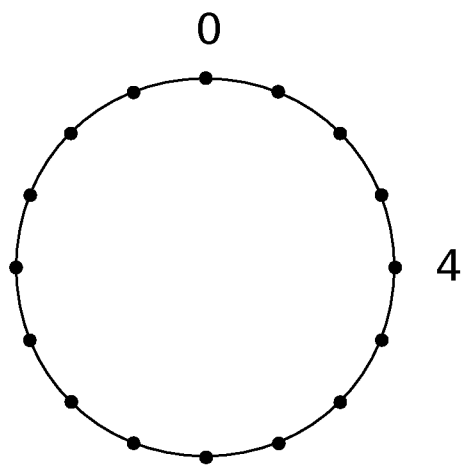
Figure 111:
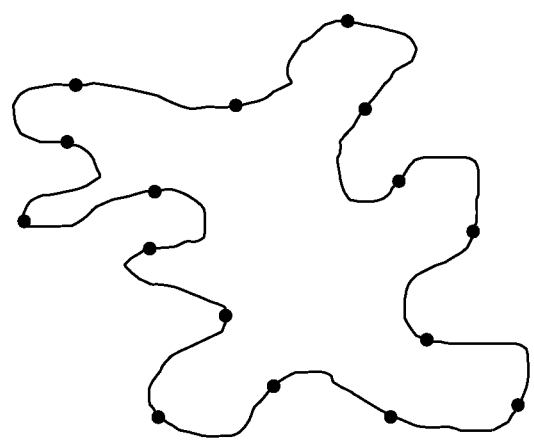

FIGS. 110 and 111 Sixteen positions are indicated along circular and custom paths.

Figure 112:
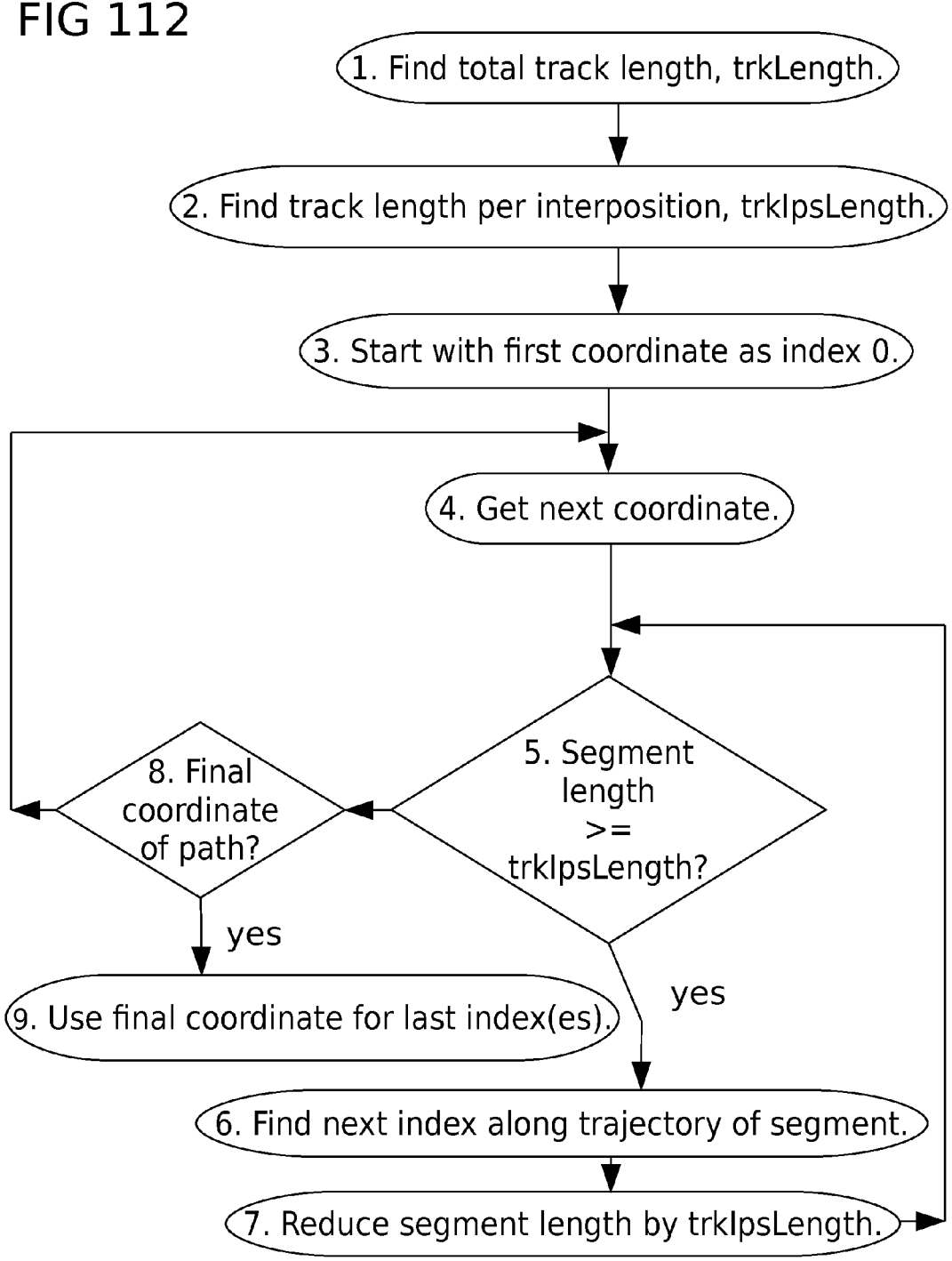

FIG. 112 Flowchart elucidates process for quickly determining interpositions of a custom path, for one embodiment.

FIGS. 113A-113C Simple examples graphically demonstrate two cycles of the flowchart of FIG. 112.

FIGS. 114A-114D Computations put flesh on the examples of FIGS. 113A-113C.

FIG. 115A Sixteen position coordinates of a standard edge track are figured, for one embodiment.

FIG. 115B Sixteen objects occupy a standard edge track, for one embodiment.

FIG. 115C Six objects occupy positions 0, 2, 4, 6, 8, and 10 on a standard edge track, for one embodiment.

FIG. 116A Many syntaxes, used consistently, may distinguish blatant auxiliary activation inputs, for alternative embodiments.

FIG. 116B Many formats, used consistently, may distinguish button widget menu items and other widgets, for alternative embodiments.

FIG. 117A Graphical icons may distinguish motion gesture inputs and other inputs, for alternative embodiments.

FIG. 117B Specified counts of a same motion gesture or other input may distinguish blatant auxiliary activation inputs, for alternative embodiments.

FIG. 117C If a favorite or default input is known, blatant auxiliary activation inputs may be distinguished by specified counts alone, (possibly implied by line number), for alternative embodiments.

FIG. 118 Graphical icons may distinguish pointer device or direct touch gesture inputs, optical face recognition gesture inputs, spoken sound recognition phoneme inputs, and other inputs, for alternative embodiments.

The figures depict one embodiment for purposes of illustration. A person skilled in the art will readily recognize from the following discussion that alternative embodiments of the structures and methods illustrated herein may be employed without departing from the principles described herein.

DRAWINGS

Reference Numerals 1 whole segment
2 half segments
3 quarter segments
4 eighth segments
5 sixteenth segments
6 eighth segments divided into two phases each
7 total interpositions along path, for one embodiment
8 ratio of phase durations, fast and slow
9 ratio of phase interposition speeds, fast and slow
10 time signature, chosen by user
11 interpositions per beat
12 interpositions per beat
13 interpositions per fast phase
14 interpositions per slow phase
15 ratio of interpositions per phase, fast and slow
16 interpositions per fast phase
17 interpositions per slow phase
18 interpositions along path, for example
19 indices along path, for example
20 total track length, FIG. 113A, for example
21 track length per interposition, estimate, for example
22 total track length, FIG. 113B, for example
23 track length per interposition, second estimate, for example

DETAILED DESCRIPTION

First Embodiment—FIGS. 1-103

FIG. 1 portrays a page that appears on a digital screen or display when one embodiment or application, "buildShow.txt," is run. It provides four main choices: to build and/or view "medley shows," to build and/or view "selection shows," review help files, and to exit. "3-D IMAGE OBJECT MEDLEY (m)" is a "button widget menu item" that is activated by clicking a mouse cursor on it or by pressing an "m" keyboard key. Color and cursor distinguish it from non-interactive, informational labels. It is rendered with a "foreground" color. When entering its vicinity, the cursor icon instantly changes from an "arrow" to a "hand." Other button widget menu items share these distinguishing characteristics, including "3-D IMAGE OBJECT SELECTION (s)," "HELP FILES (h)," and "EXIT (6)." Keyboard keys within parentheses indicate "blatant auxiliary activation inputs" or hot or shortcut keys. A button widget menu item style is hewn to on subsequent pages of one embodiment, advantageously providing a cohesive and familiar user experience.

Medley Shows

FIG. 2 is a page that appears when the medley button of FIG. 1 is activated. It covers and hides the page of FIG. 1. It represents one level deeper into the buildShow.txt embodiment. It contains eight button widget menu items: "UP (u)," "PHOTO FOLDER (f)," "OPTIONS (o)," "VOICE (v)," "SONG (s)," "CHOREOGRAPHY (c)," "BEGIN SHOW (b)," and "EXIT (6)." The exit button closes the buildShow.txt embodiment and its pages. The up button closes just the page of FIG. 2, returning a user to the page of FIG. 1. In addition to keyboard key "u," escape key "esc" activates it as a convenience. The other buttons open pages of their own when activated and are discussed in turn below. Of the six central buttons, the first five, "photo folder" through "choreography," help configure elements of a medley show. The "begin show" button allows the user to name, save, export, import, edit, and view the show. When the show is saved, the show attributes determined using the first five central buttons are stored within a medley show database entry.

Medley Shows—Photo Folder

FIG. 3 is a page that appears when the photo folder button of FIG. 2 is activated. It covers and hides the page of FIG. 2. It represents another level deeper into the buildShow.txt embodiment. Standard "UP (p)" and "EXIT (6)" button widget menu items on this and later pages perform similarly as previously discussed. The exit button closes the buildShow.txt embodiment and its pages. The up button closes just the immediate page, effectively boosting the user one level higher to the previously viewed page.

"PHOTO FOLDER (f)" and "DELETE (d)" are button widget menu items. If a folder has been previously chosen by the user, a "CURRENT PHOTO FOLDER NAME:" label indicates its full pathname. If not, or if the delete button is activated, the label and pathname are absent. If a pathname no longer exists, (i.e. from a previously saved show), it is listed along with a bright pink "(MISSING)" label, (not depicted).

FIG. 4 illustrates a dialog box that appears when the "photo folder" button of FIG. 3 is activated. The user may browse or type to specify a folder. A recently chosen folder usually appears highlighted in the dialog box as a convenience. An "OK" button closes the dialog box and updates the current photo label. A "CANCEL" button closes the dialog box without updating the current photo label. The escape key may be used to cancel also, as a convenience. Photo files within the folder are featured as "three-dimensional image objects" during the show. Three-dimensional image objects are virtual polyhedrons with images on one or more sides. One embodiment constructs six-sided rectangular polyhedron type three-dimensional image objects. A three-dimensional image object database is automatically generated when the show starts and deleted upon show close.

"USE PHOTOS IN SUBFOLDERS TOO (s)" and "SHUFFLE PHOTOS (l)" of FIG. 3 are "checkbutton widget selection items." They are distinguished by the same color and cursor as button widget menu items. Likewise, blatant auxiliary activation keys are indicated in parentheses. FIG. 3 illustrates checkmarks in each, indicating they are both selected. The checkbuttons are independent. If one is activated, its checkmark disappears. If it is activated again, its checkmark reappears. If the subfolders checkbutton is selected, subdirectory image files are also included. Otherwise they are not. If the shuffle checkbutton is selected, image files appear in random order. Otherwise they do not.

An entire ordered show may be created by selecting just a single folder! Photographs from a vacation excursion or other event may be downloaded from a digital camera and viewed in chronological order. Likewise, sequentially numbered images of a multi-page document, story or lesson may be easily displayed in correct order. Of course, such shows would leave the shuffle checkbutton of FIG. 3 unselected.

Medley and Selection Shows—Options

FIG. 5 is a page that appears when the options button of FIG. 2 is activated. It allows the user to specify several options for the show. Additional options are available via a customization process or by editing a data file named, "strVars.txt," (for starting variables).

"NORMAL SHOW (n)" and "SLIDE SHOW (s)" are interrelated checkbutton widget selection items. A checkmark appears by the one that is activated, (however many times), and disappears, if present, from the other. Sets of six three-dimensional image objects are displayed between transitions if the "normal show" checkbutton is selected. One three-dimensional image object is displayed between transitions if the "slide show" checkbutton is selected. "VIEW TIME (v)" is a button widget menu item that creates a "text entry widget box," (not depicted), enabling the user to adjust how much time elapses between transitions.

"ON AT START (o)," "NON-PANORAMIC OPTION (p)," "ALTERNATE ORIENTATION (a)," and "CUSTOM (FIRST ON LINEUP) (c)" are independent checkbutton widget selection items affecting background scenery for the show. Usually, a show begins with a default background scene turned off. If the "on at start" checkbutton is selected, it begins instead with background scenery turned on. If the custom checkbutton is selected, images from an initial three-dimensional image object replace the default background scene. If the non-panoramic checkbutton is selected, right and left images of a background scene are swapped. If the "alternate orientation" checkbutton is selected a background scene rotates ninety degrees, moving a top image where a front image normally would be.

"LOW (l)," "MEDIUM (m)," and "HIGH (h)" are interrelated checkbutton widget selection items. If the low checkbutton is selected, regular images are capped at 256×256 pixels. If the medium checkbutton is selected, regular images are capped at 512×512 pixels. Regular images are displayed as-is if the high checkbutton is selected. Lower resolutions entail fewer bits and are therefore relatively faster to upload to graphics hardware. They also suffice for shrunken or moving presentations. In addition, during the show, a "second individual real-time direction" may upgrade an image to high resolution on a one by one basis.

"BOTTOM CORRECTION (b)" is a button widget menu item that creates a text entry widget box, (not depicted), enabling the user to effectively reduce screen length. "RESIZE PHOTOS (NEAREST POWER-OF-2) (r)" is an independent checkbutton widget selection item that, if selected, resizes photos to mollify older, cantankerous hardware.

"CUSTOMIZE (z)" is a button widget menu item that is or is not enabled, depending upon whether or not, respectively, one or more enhancement and/or reversion files are located in a folder of the buildShow.txt embodiment named, "Customize." If disabled, the customize button loses its distinguishing foreground color. Enhancement and reversion files are requested and copies placed in the Customize folder separately by the user. In order to request enhancement and reversion files, the user submits a registration number and unique identification code. Whether the customize button is enabled or not, those numbers appear when the cursor enters the vicinity of the button, as illustrated in FIG. 6.

If the customize button is enabled, it may be activated once for each enhancement and/or reversion file copied to the Customize folder. Each activation may apply changes to one or more starting variables that stay in effect even after exiting. After each enhancement and/or reversion file has been processed, it is deleted from the Customize folder, for one embodiment. Alternative embodiments may move the file to a storage or garbage folder. The customize button is disabled after the last file is deleted. The user may inhibit the registration number and unique identification code from appearing, for security and privacy, by removing a specifically-named file from the Customize folder.

Medley and Selection Shows—Voice

FIG. 7 is a page that appears when the voice button of FIG. 2 is activated. "SILENCE (s)" and "RECORDING (r)" are interrelated checkbutton widget selection items. If the recording checkbutton is selected, then during the show, a chosen vocal recording plays. Otherwise, it does not. If a vocal recording file has been previously chosen by the user, a "CURRENT VOCAL RECORDING NAME:" label indicates its full pathname. If not, the label and pathname are absent. If a pathname no longer exists, (i.e. from a previously saved show), it is listed along with a bright pink "(MISSING)" label, (not depicted). "NEW VOCAL RECORDING NAME (n)" is a button widget menu item that opens a dialog box, portrayed in FIG. 9, that allows the user to choose a vocal recording file, (or other audio or video file). The user may choose to add introductions, narrations, commentaries, instruction, advertisements, disc jockey sound effects, auxiliary instruments, karaoke recordings, vocal backups, vocal leads, etc. to a show. A presenter may choose the silence checkbutton if planning to make a recording while the show is edited or viewed. Later, that recording may be chosen and the recording checkbutton selected.

Medley and Selection Shows—Song

FIG. 8 is a page that appears when the song button of FIG. 2 is activated. "SILENCE (s)" and "MUSIC (m)" are interrelated checkbutton widget selection items. If the music checkbutton is selected, then during the show, a chosen song plays. Otherwise, it does not. If a song file has been previously chosen by the user, a "CURRENT SONG NAME:" label indicates its full pathname. If not, the label and pathname are absent. If a pathname no longer exists, (i.e. from a previously saved show), it is listed along with a bright pink "(MISSING)" label, (not depicted). "NEW SONG NAME (n)" is a button widget menu item that opens a dialog box, portrayed in FIG. 10, that allows the user to choose a song file, (or other audio or video file). The user may choose to add a musical composition as it also plays while recording "initial individual real-time directions" in conjunction with the choreography button of FIG. 2.

Audio files designated as vocal recordings or songs do not have to adhere to their designations. Both audio files may be vocal recordings, songs, both, or neither. Both files start together, but don't have to play for equal durations. They can musically augment each other, or not. One or both can provide information, commentary, and/or promotion. Each can represent one end of a two-way communication. One or both can even be video files. By default, video windows will be hidden by the show window. However, by using the customization process or editing strVars.txt, they may be placed in front of the show window and be of specified sizes and locations. If just an audio portion of a video is pertinent, then hiding it is less distracting, for example. Also, when the show window is active, (i.e. inputs are routed to the show since it is the foreground task), second individual real-time direction inputs may be responsive. If a video pretends to interact with objects from medley or selection shows, placing and sizing the show window on top enables the illusion, for example.

Medley and Selection Shows—Choreography

FIG. 11 is a page that appears when the choreography button of FIG. 2 is activated. "STANDARD (s)" and "DIRECTED (d)" are interrelated checkbutton widget selection items. If the directed checkbutton is selected, then during the show, three-dimensional image objects move according to an initial individual real-time direction recording. The movement playback may be delayed by a specified amount when the show starts. The path or track for the movement may be an edge track or custom. If the standard checkbutton is selected, the objects move in a standard way along the edge track. If a directed dance title has been previously chosen by the user, a "CURRENT DIRECTED DANCE:" label indicates its pathname. If not, the label and pathname are absent. If a pathname no longer exists, (i.e. from a previously saved show), it is listed along with a bright pink "(MISSING)" label, (not depicted).

"NEW DANCE (n)" is a button widget menu item. It creates a bright pink "STARTING CUE STAGE APPLICATION" label, portrayed in FIG. 12, and plays a sound effect audio file. It also runs a subunit of the buildShow.txt embodiment named, "cueStage.txt," depicted in FIGS. 13-36. The user operates cueStage.txt to create, modify, or recall an initial individual real-time direction recording, a start delay, and track. When complete, the "STARTING CUE STAGE APPLICATION" label disappears and the "CURRENT DIRECTED DANCE:" label is updated.

Define and Record Initial Individual Real-Time Directions

FIG. 13 is a page that appears when the "new dance" button of FIG. 11 is activated. Under a bright pink "ON STAGE" label, six circular objects are arranged on a circular path. Each is filled with a solid color. From top and moving clockwise, the colors are red, orange, yellow, green, blue, and violet. These circles may move or rotate as a group along the circular path. Styles and tempos of the rotations are predefined and then selected on a real-time basis by the user. "CUE (f)," "CUE (d)," "CUE (j)," and "CUE (k)," are "text widget touch items" that make these real-time selections. Each is chosen when the cursor enters its vicinity or its blatant auxiliary activation key, within parentheses, is pressed. Blatant auxiliary activation keys may be modified, for typing practice, using the customization process or editing strVars.txt. Circle colors, numbers, and sizes may also be modified, or the circles replaced with other shapes, images or bitmaps, using the customization process or editing strVars.txt.

To the left of each cue touch item, is its summary definition or status. For example, "CUE (f)" is predefined to set the group of circle objects rotating clockwise with a "4/4" time signature at a speed of 10 quarter note beats per minute. "CUE (k)" is predefined to set the group of circle objects rotating counterclockwise with an "8/8" time signature at a speed of 50 quarter note beats per minute. A predefined flow style, (i.e. legato-comport, legato-overlap, or staccato), is not included in the summary, but is usually immediately apparent from the object motion.

None of the objects move unless rotation is enabled. "ROTATE (r)" is a button widget menu item that toggles rotation on and off. If rotation is enabled, the summary that is active exhibits the same bright pink color as the "ON STAGE" label. The inactive summaries, and an "IN THE WINGS" label above, appear normally colored. To the left of each summary, are two button widget menu items, "STYLE /" and "TEMPO," used to set the respective rotation style and tempo. FIGS. 14-18 depict drop-down menus that are opened by the buttons. Also discussed below, "LIGHTS (1)," "RESET/HOLD (2)," "CONCLUDE (3)," "RECALL (4)," and "PLAY (5)" are button widget menu items.

FIG. 14 illustrates a series of submenus that appear when the user clicks on the style button for "CUE (d)" and navigates "TIME SIGNATURE" and "COMPLEX" submenus. They indicate that an "8/8" time signature is selected. A new time signature may be selected by clicking on it. A "SIMPLE" submenu, (not depicted), includes "4/4," "3/4," "2/4," "2/2," "3/8," "4/8," "4/2," and "4/1" time signatures. A "COMPOUND" submenu, (not depicted), includes "6/8," "9/8," "12/8," "6/4," "9/4," and "12/4." Other time signatures may be accommodated.

FIG. 15 portrays a series of submenus that appear when the user clicks on the style button for "CUE (d)" and navigates "FLOW" and "LEGATO" submenus. They indicate that comported legato flow is selected. A new flow may be selected by clicking on it. Staccato flow encompasses just one flavor and may be clicked on directly. A legato motion that comports may temporarily halt, but a legato motion that overlaps will not, for one embodiment.

FIG. 16 depicts a series of submenus that appear when the user clicks on the style button for "CUE (d)" and navigates a "BEARING" submenu. It indicates a counterclockwise bearing is selected. A new bearing may be selected by clicking on it.

FIG. 17 pictures a drop-down menu that appears when the user clicks on the tempo button for "CUE (d)." It indicates a custom tempo option, "MIO METRE . . . ," is selected. A new tempo may be selected by clicking on a tempo name. The tempo names are subjective and correspond to numbers that may be modified using the customization process or editing strVars.txt. When the "MIO METRE . . ." tempo is chosen, a dialog box appears as depicted in FIG. 18. A number, ten, is highlighted in a text entry widget box. It corresponds to the current tempo, (as seen in the summary for "CUE (d)"). A new tempo may be set by typing it and pressing "return" keyboard key. All tempo numbers are in units of quarter note beats per minute, or quarter segment beats per minute, as explained in the operation section below with FIGS. 108-109.

FIG. 19 indicates that the cue touch items may be relocated to arbitrary screen locations by clicking and dragging them with the mouse. A particular layout may improve real-time design efficacy. The cue touch item locations are saved and recalled with the other show settings.

FIG. 20 reproduces the circle objects after they have rotated clockwise by three-eighths of one revolution. All of the objects disappear when the "LIGHTS (1)" button is activated, as depicted in FIG. 21. They reappear when it is activated again.

FIG. 22 represents what happens when the "RESET/HOLD (2)" button is activated. All cached real-time directions are erased, signified by a red background. Also, the "PLAY (5)" button is disabled and loses its distinguishing color. The circle objects take up and hold their starting positions. The "RESET/HOLD (2)" button turns into a "START (2)" button widget menu item.

When activated, the start button removes the red background and turns back into the reset button. Each activation of a cue touch item, lights or rotate button is recorded as an initial individual real-time direction. The first one begins the recording. It also starts playing the audio or video file specified in FIG. 8. The user may activate individual real-time direction inputs with music synchronously and asynchronously, creating audiovisual effects. Using the mouse and/or activating auxiliary activation inputs with music may be appealing, fun, playful, relaxing, and therapeutic.

Define Name, Start Delay, Track, and Save

FIG. 23 is a page that appears when the "CONCLUDE (3)" button is activated. A "listbox widget" lists four existing titles, "test1" through "test4." The test4 title is highlighted. "NAME (n)" is a button widget menu item. Adjacent and below it, is a full pathname label, "Artist Three/Album Five/01 Song One/012111/test4," for the highlighted listbox title. When the name button is activated, as depicted in FIG. 24, the label's bottom line becomes a highlighted text entry widget box. Typing a "test2," for example, and pressing "return," moves the listbox highlight from test4 to test2. Typing a new name and pressing "return," creates a new highlighted title in the listbox. The listbox highlight may also be moved by clicking titles with the mouse or using "up-arrow" or "down-arrow" keys. When the cursor enters the listbox, the cursor icon instantly changes to a "trek" icon.

"DELETE," "COPY (y)," "RENAME (r)" are button widget menu items that perform the relevant functions on the highlighted title. The delete button does not have a blatant auxiliary activation key to help prevent accidents. Also, it moves the title to a "garbage" subdirectory, where the most recent hundred versions are stored. "GO LOWER (l)," "GO HIGHER (h)," "START DELAY (d)," "TRACK (t)," "SAVE (s)," and "IMPORT (i)" are also button widget menu items. The "go lower" button, as depicted in FIG. 25, creates a lower level text entry widget box with a highlighted duplicate name. Typing a name and pressing "return" creates a lower level of that name. The button is not needed for simple navigation. Dropping to an existing lower level is automatic by simply pressing "return" when the parent level is highlighted in the listbox. The "go higher" button, as depicted in FIG. 26, navigates back to the parent level. The "start delay" button creates a text entry widget box, as illustrated in FIG. 27. It allows the user to set a delay for playback of the initial individual real-time directions relative to the start of the show.

FIG. 28 is a page that appears when the track button of FIG. 23 is activated. "EDGE (e)" and "CUSTOM (c)" are interrelated checkbutton widget selection items. If the edge checkbutton is selected, then during the show, three-dimensional image objects move along a rectangular track just inside the show window's edges. Otherwise, the custom checkbutton is selected, and the objects move along a custom track. Adjacent to each checkbutton is a preview of its respective track.

The custom track is drawn by the user after activating "NEW DESIGN (n)," a button widget menu item that opens a full screen page depicted in FIG. 29. A light gray label reads, "USE MOUSE TO DRAW, ESC KEY TO FINISH." Moving the mouse with its left button depressed draws curves. Clicking the mouse draws a straight line from where the last click occurred. Arbitrary paths are acceptable. They can even form piquant drawings and writings. When finished, the escape key removes the page and updates the custom track preview of FIG. 28.

A clockwise bearing, as may be chosen by drop-down menu such as in FIG. 16, corresponds to the direction the custom track was actually drawn by the user. That is, unless "REVERSE DRAW DIRECTION (r)" independent checkbutton widget selection item of FIG. 28 is selected. If it is, then clockwise bearing corresponds to the reverse direction.

The save button of FIG. 23 saves the cached initial individual real-time direction recording from FIG. 13. It saves it under the title highlighted in the listbox. In addition, it saves the start delay and track settings, as well as the position coordinates for the four cue touch items of FIG. 13. Finally, it closes the page and enables the play button of FIG. 13.

FIG. 30 is a page that appears when the import button of FIG. 23 is activated. "IMPORT (i)" is a button widget menu item that opens a dialog box as depicted in FIG. 31. A selected folder and its subfolders are inserted into the listbox as a hierarchy of levels when the "OK" button is pressed.

Load Initial Individual Real-Time Direction Recording

FIG. 32 is a page that appears when the recall button of FIG. 13 is activated. The listbox and name, delete, copy, rename, and "go higher" buttons operate the same way as those of FIG. 23. "START DELAY" and "TRACK" are labels that update for each highlighted title. "RECALL (r)" is a button widget menu item that selects the highlighted title for the show. It also loads the stored initial individual real-time direction recording, start delay, and track into a cache to enable previewing with the play button of FIG. 13. It also relocates the cue touch items of FIG. 13 to their saved coordinates. Finally, it closes the page and enables the play button of FIG. 13.

Play Initial Individual Real-Time Direction Recording

FIG. 33 is a full screen page that appears after the play button of FIG. 13 is activated. It illustrates a snapshot of an initial individual real-time direction recording replay, with objects moving on a large, centered circular path. The play button of FIG. 13 uses this circular path for its preview if the edge checkbutton of FIG. 28 had been selected. Otherwise the play button uses the custom path for its preview as depicted in FIGS. 34-36.

FIG. 34 portrays the objects on a visible custom path. The path may be made visible, with defined color and width, using the customization process or editing strVars.txt. The objects are laid out clockwise, similarly to FIG. 33. The path was drawn by the user in a clockwise fashion and the reverse checkbutton of FIG. 28 was not selected. FIG. 35 depicts FIG. 34 with an invisible path. FIG. 36 reproduces the layout of FIG. 35, but with the reverse checkbutton of FIG. 28 selected. The objects are laid out in the opposite direction and also move oppositely from FIG. 35. Hence, if the red object (horizontal lines) leads the group in a counterclockwise direction in FIGS. 34 and 35, it still leads the group in FIG. 36, but in a clockwise direction.

An initial individual real-time direction recording which has been named and saved, or recalled, may be modified and/or appended. It automatically continues from where it stopped if one of the cue touch items, lights, or rotate button of FIG. 13 is activated. The audio or video recording, specified with the page of FIG. 8, plays from where it stopped. If, after saving or recalling, no individual real-time direction inputs are yet activated, then the style, tempo, and conclude buttons of FIG. 13 may be used to change and save style and tempo definitions for the existing recording. A new title name, start delay, and/or track may also be chosen. A new audio or video recording may be chosen to play with the initial individual real-time direction recording, using the song button of FIG. 8. Many experiments may be performed to find interesting and/or aesthetic results!

Medley Shows—Begin Show

FIG. 37 is a page that appears after the "begin show" button of FIG. 2 is activated. A listbox widget lists names of medley shows, "Medley Show 1" through "Medley Show 5." "Medley Show 5" is highlighted. Adjacent to a "NAME (n)" button widget menu item is a label indicating the highlighted show. The name button and listbox work similarly to those of FIG. 23. However, the listbox navigates a single level of names. When the name button is activated, as depicted in FIG. 38, the show label becomes a highlighted text entry widget box. If a new name is typed in and "return" pressed, it is added at the bottom of the list and highlighted. After a "SAVE (s)" button widget menu item is activated, the new name is listed alphabetically.

"DELETE," "DO NOT SAVE (d)," "LOAD (l)," "BEGIN SHOW (b)," "ATTACH EDITS TO SHOW (a)," "IMPORT (i)," and "EXPORT (x)" are also button widget menu items. "EDIT MODE (e)" and "VIEW MODE (v)" are interrelated checkbutton widget selection items. "SAVE OVERWRITES EDITS (o)" is an independent checkbutton widget selection item. The delete button deletes the highlighted show. The delete button does not have a blatant auxiliary activation key to help prevent accidents. Also, it appends the show to a "garbage" database. The save button creates or overwrites an entry in a medley show database, storing the show's settings. The load button caches the highlighted show's settings allowing the user to modify them for the same or a derivative show.

If "photo folder," (e.g. from FIG. 3), is not specified, then the save and "do not save" buttons are disabled because a complete show has not been determined. If "photo folder" is specified prior to FIG. 37 appearing, then the user is reminded to pick a name, (new or existing), and save the show settings as follows: 1) the save, "do not save," load, and "begin show" buttons are disabled. 2) After the user confirms or changes the highlighted name, the save and "do not save" buttons are enabled, (but load and "begin show" buttons stay disabled). 3) After either save or "do not save" is activated, both buttons become disabled and the load and "begin show" buttons become enabled.

The "begin show" button starts the highlighted show when activated. Similar to a selection show counterpart, discussed further below, it posts a bright pink "STARTING 3-D IMAGE OBJECT SHOW APPLICATION" label, depicted in FIG. 72, plays a sound effect audio file, and runs a subunit of the buildShow.txt embodiment named, "tdiObjShow.txt," (for three-dimensional image object show), portrayed in FIGS. 73-100.

If the "edit mode" checkbutton of FIG. 37 is selected when the "begin show" button is activated, then, as discussed in more detail below, second individual real-time directions may be recorded as the show plays. When the show finishes, the cached recording may be stored with the highlighted show by activating the "attach edits" button. If the "view mode" checkbutton is selected when the highlighted show starts, the second individual real-time direction recording is played back as part of the show, and most second individual real-time direction inputs are ignored. If a recording is not available, (neither stored nor cached), the "edit mode" checkbutton is automatically selected just before the highlighted show begins. Starting an edit mode show caches a new recording. Starting a "view mode" show caches a previously stored recording, if it exists. If the "save overwrites edits" checkbutton is selected, then the save button also stores the latest cached recording, possibly overwriting a previously stored one.

Medley Shows—Import

FIG. 39 is a page that appears after the "import" button of FIG. 37 is activated. "SHOW FOLDER (f)," "SHOW FILE (l)" and "IMPORT (i)" are button widget menu items. The "show folder" button opens a dialog box, portrayed in FIG. 41, that allows the user to choose a folder where one or more medley show "export text files" reside. The "show file" button opens a dialog box, portrayed in FIG. 43, that allows the user to choose a medley show export text file. The files have a ".bsm" file extension, (i.e. for buildShow.txt medley). The "show folder" button is included as an instructional aide, since the "show file" button allows for browsing folders as well. The import button adds the contents of the chosen show export text file to the medley show database and closes the page.

If a medley show export text file has a name matching the highlighted show, then it is preselected when FIG. 39 appears. For example, consider that a folder named, "Shows," was recently used, and it contains a show export text file named, "Medley Show 5.bsm." Then a "CURRENT FOLDER:" label lists "Shows" in FIG. 39 and a "CURRENT FILE:" label lists "Medley Show 5.bsm" because the corresponding show is highlighted in FIG. 37. The import button of FIG. 39 adds new entries to the medley show database. It does not overwrite existing entries. If a show export text file contains a medley show with a name that already exists, a suffix is added to the name, (or modified), before it is added to the database. The suffix has the form of "(i)," where "i" is an integer.

"INCLUDE TEXT LIST TOO (o)," "ONLY IMPORT TEXT LIST (y)," "'IMPORTED AUDIO' FOLDER HAS VOCAL RECORDING (v)," "'IMPORTED AUDIO' FOLDER HAS SONG (s)," and "'IMPORTED PHOTOS' FOLDER HAS PHOTOS (p)" of FIG. 39 are independent checkbutton widget selection items. As further discussed with selection shows below, a text file named, "TextList.txt," may reside within a folder of the buildShow.txt embodiment named, "Text Folder." It also may be wrapped within a show export text file. If so, and if the "include text list too" checkbutton is selected, then the wrapped text file replaces TextList.txt when the import button is activated. If the "only import text list" checkbutton is selected, then that's what happens. The show database is left unmodified.

Each medley show database entry may refer to, among other things, a vocal recording audio or video file, a song audio or video file, and a photo folder. Although audio and/or video file and photo folder names are included, the files themselves are not. Music and other media may be promoted without infringing copyrights. The bottom three central checkbuttons of FIG. 39 solve a problem of where to store audio, video and image files transferred from a device with different directories, and referred to by a transferred show export text file. For example, the user may store the show export text file in a folder of the buildShow.txt embodiment named, "Shows." Supporting audio, video, and image files may be stored in folders of the buildShow.txt embodiment named, "Imported Audio" and "Imported Photos," respectively. If the "'Imported Audio' folder has song" checkbutton is selected, then activating the import button will add a modified entry to the show database. Specifically, the directory component of the song audio or video filename is replaced with the "Imported Audio" folder. Likewise for the other "'Imported Audio' folder" checkbutton. If the "'Imported Photos' folder" checkbutton is selected, the entry is modified by listing the "Imported Photos" directory as the photo folder. If a checkbutton is not selected, then the corresponding full, perhaps missing, pathname is entered into the show database as-is.

Each medley show database entry includes a message authentication code generated by the buildShow.txt embodiment. Message authentication codes may advantageously assimilate plain-text user-defined data. If a show export text file is modified, (specifically, its show database entry), without using the buildShow.txt embodiment, then the message authentication code may not verify. If so, the import operation is cancelled, advantageously reducing unexpected device behavior due to transmission or other errors.

Medley Shows—Export

FIG. 40 is a page that appears when the export button of FIG. 37 is activated. "EXPORT SHOW:" is a label that lists the highlighted show of FIG. 37, "Medley Show 5." It is the database entry of this show that will be included in the show export text file when the button widget menu item, "EXPORT (x)," is activated. "SHOW FOLDER (f)" and "SHOW FILE (l)" are also button widget menu items that choose the folder and file names for the show export text file, similarly to their FIG. 39 counterparts, (see FIGS. 42 and 44). "INCLUDE TEXT LIST TOO (o)" is an independent checkbutton widget selection item that wraps TextList.txt into the show export text file, if selected. A "CURRENT FOLDER:" label uses a recently used folder as its default. A "CURRENT FILE:" label uses the highlighted show of FIG. 37 to generate its default ".bsm" filename. Show export text files are not overwritten. Instead they are moved to a folder of the buildShow.txt embodiment named, "garbage." If a filename is already being used within the garbage folder, a suffix is added or modified. Up to the last 100 copies are kept.

Show export text files are a good way to backup and share shows. Containing no media content other than, potentially, TextList.txt, they are compact and likely free of copyright restrictions. As text, they may be easily distributed electronically.

Selection Shows

FIG. 45 is a page that appears when the selection button of FIG. 1 is activated. "3-D IMAGE OBJECTS (i)," "OPTIONS (o)," "VOICE (v)," "SONG (s)," "CHOREOGRAPHY (c)," and "BEGIN SHOW (b)" are button widget menu items. The options, voice, song, and choreography buttons have already been discussed above. They behave identically for medley and selection shows. The "begin show" button is similar, but not exactly the same as its medley show counterpart. It is detailed below after the objects button, described next. Analogously to the page of FIG. 2, the first five central buttons help configure elements of a selection show. The "begin show" button allows the user to name, save, export, import, edit, and view the show. When the show is saved, the show attributes determined using the first five central buttons are stored within a selection show database entry.

Selection Shows—Three-Dimensional Image Objects

FIG. 46 is a page that appears when the objects button of FIG. 45 is activated. "CREATIONS AND CHANGES (c)" and "SHOW LINEUP (1)" are button widget menu items that open pages of their own when activated, and are discussed in turn below.

Selection Shows—Creations and Changes

FIG. 47 is a page that appears when the "creations and changes" button of FIG. 46 is activated. A listbox widget lists names of three-dimensional image objects, "3-D Image Object 7" and "Text object01," among others. "Text object01" is highlighted. More objects become visible to the user as the highlight is moved with "up arrow," "down arrow," "page up," or "page down" keys. The user may also scroll by clicking and dragging the scroll button on the right side of the listbox or using the mouse's scroll wheel or mouse pad's scroll gesture. Adjacent to a "NAME (n)" button widget menu item is a label indicating the highlighted object. The name button and listbox work similarly to those of FIG. 37. Again, the listbox navigates a single level of names. When the name button is activated, as depicted in FIG. 48, the object label becomes a highlighted text entry widget box. If a new name is typed in and "return" pressed, it is added to the list alphabetically and highlighted. Additionally, labels below the name label, default to "(none)."

The labels are adjacent to button widget menu items, "FRONT (f)," "RIGHT (r)," "BACK (b)," "LEFT (l)," "TOP (t)," "BOTTOM (m)," "HUE (h)," and "HUE RULE (e)." Other button widget menu items are "DELETE," "COPY (c)," "RENAME (a)," and "TEXT LIST (x)." The delete, copy, and rename buttons perform the relevant functions on the highlighted object. The delete button does not have a blatant auxiliary activation key to help prevent accidents. Also, it appends the object to a "garbage" database. The buttons alongside the listbox and under the name button specify aspects of the highlighted three-dimensional image object. The front, right, back, left, top, and bottom buttons open nearly identical pages, depicted in FIGS. 49-58, to choose images for their respective faces. The "hue" button opens a page, portrayed in FIGS. 59-60, for choosing a default tint. The "hue rule" button opens a page, illustrated in FIG. 61, for choosing a rule that determines when to use the default or a random tint. The "text list" button opens a page, pictured in FIG. 62, to view and edit TextList.txt, (see FIG. 39 discussion), and to generate images based on each of its lines.

Many types of three-dimensional image objects may be designed. If side images of a subject are used, then during the show, the subject may give the impression of being frozen inside the object. A panoramic image may be divided and shared among the six sides of an object. Objects may also be made of disparate images that tell a story, instruct, document, inform, entertain, advertise, depict art, etc. Images may be raw or re-touched photographs, artistically rendered artworks, computer generated animations, etc. Any object may be selected to project background scenery for the show.

FIG. 49 is a page that appears when the "front" button of FIG. 47 is activated. On the top half of the page, "FRONT (f)," "PREVIEW (w)," "CLEAR (r)," and "DELETE" are button widget menu items associated with the front face of the object highlighted in FIG. 47. FIG. 50 depicts the dialog box that appears when the front button is activated. After an image file is chosen, a "CURRENT CHOICE:" label is updated, with the full pathname. If a pathname no longer exists, (i.e. from a previously chosen image), it is listed along with a bright pink "(MISSING)" label, (not depicted). FIG. 51 portrays a preview of the chosen image, "TextImage00001.png." It appears when the top preview button is activated, and disappears when the top clear button is activated, (or escape key or up button activated). The delete button removes the "CURRENT CHOICE:" label and leaves the front face without an assigned image.

On the bottom half of FIG. 49, a listbox widget lists lines from a text file named, "FavoritesList.txt," residing in a folder of the buildShow.txt embodiment named, "Favorites Folder." An image file named, "KJDC0201.JPG," is highlighted. As explained below, full pathnames of images are added to FavoritesList.txt during a show using second individual real-time directions. FIG. 52 portrays a preview of the image found using the highlighted filename. It appears when a "PREVIEW (p)" button widget menu item is activated, (or "return" key pressed), and disappears when "CLEAR (c)" button widget menu item is activated, (or escape key or up button activated). A bottom "DELETE" button widget menu item removes the highlighted line from FavoritesList.txt and the listbox. Clicking or moving the highlighted line, or previewing its image, before activating the front button, makes it the default highlighted image name in the dialog box of FIG. 50. Double-clicking also opens the dialog box. FavoritesList.txt images may be rapidly previewed, one-after-the-other, by pressing "down arrow" or "up arrow" key then "p" or "return" key, on an ongoing basis.

If the front face has no assigned image, then on the top half of FIG. 49, the preview, clear, and delete buttons are disabled. Both top and bottom clear buttons are disabled unless a respective preview image is displayed. If the top clear button is enabled, then except for up and exit buttons, the other buttons are disabled. When the bottom clear button is enabled, the up, exit, and bottom preview buttons are also exclusively enabled.

FIG. 53 is a page that appears when the "right" button of FIG. 47 is activated. It works the same as FIG. 49, but is associated with the right face, instead of the front face, of the object highlighted in FIG. 47. A "RIGHT (f)" button widget menu item opens a dialog box similar to that of FIG. 50, targeting the right face. FIG. 54 portrays a preview of the chosen image, "TextImage00002.png." FIGS. 55-58 are pages that appear when the "back," "left," "top," and "bottom" buttons are activated in FIG. 47, respectively. They too behave similarly as FIG. 49, assigning or removing images associated with the other faces of the object highlighted in FIG. 47.

FIG. 59 is a page that appears when the hue button of FIG. 47 is activated. "HUE (h)" is a button widget menu item that opens a dialog box depicted in FIG. 60, allowing the user to specify a default color for the object highlighted in FIG. 47. A "CURRENT CHOICE:" label indicates the chosen color in terms of a set of red, green, and blue values, each within the range of 0 to 255. For example, if pure green were chosen, the "current choice" label would list, "(0, 255, 0)." A "DELETE" button widget menu item removes the "current choice" label and leaves the object without an assigned default color.

FIG. 61 is a page that appears when the "hue rule" button of FIG. 47 is activated. "NONE (n)," "HUE (e)," and "RANDOM (r)" are interrelated checkbutton widget selection items, that determine what kind of tints to convey to the object highlighted in FIG. 47. If the none checkbutton is selected, then no tint is added to the image of any face. However, the face will get a solid color if it doesn't have an assigned image: a default color or a random color depending upon whether a default color is specified. Random colors are chosen from a pool of six colors that may be altered using the customization process or editing strVars.txt. If the hue checkbutton is selected, each face of the object is affected. Faces with images get tinged and faces without images get a solid color. Again, the color is a default, if it's specified, or a random color. If the random checkbutton is selected, each face of the object is affected. Images are tinged with a random color. Faces without assigned images get solid random colors.

Selection Shows—Text Objects

FIG. 62 is a page that appears when the "text list" button of FIG. 47 is activated. A large text widget window, entitled "TEXT LIST," occupies most of the page. Contents of TextList.txt are displayed within the window. "EDIT (e)" and "UPDATE TEXT OBJECTS (p)" are button widget menu items. The edit button opens a page, depicted in FIG. 63, with a slightly larger text widget window. It allows the user to directly edit TextList.txt with keyboard and mouse. Changes are saved or cancelled by activating button widget menu items "SAVE" or "CANCEL," respectively. Either button closes the page as well.

The "update text objects" button converts each line of TextList.txt into an image. The filename for the image of the first line is "TextImage00001.png" and resides in a subfolder of the buildShow.txt embodiment named, "program/tim," (for TextList.txt images). Filenames for the other lines are similar. Line numbers are used as suffixes. Three-dimensional image objects that have a name beginning with, "Text object," followed by at least one integer, are "text objects." They assign one or more of their faces an image made from TextList.txt. For example, as depicted in FIG. 47, the object named, "Text object01," assigns images of the first four lines of TextList.txt to the front, right, back, and left faces, respectively. Of course, three-dimensional image objects that include such images may have different names as well.

FIGS. 51 and 54 preview the images for the front and right faces, respectively. The images are tinged a random color, and the top and bottom faces are given a random solid color, during a show, because the "random" hue rule is chosen. The font size and other text characteristics of the TextList.txt images may be modified using the customization process or editing strVars.txt. In contrast to FIG. 52, the images really do contain white letters on a black background. When the images are tinged, their white letters fully transmit the color, whereas the black background stays black. FIG. 52 is an overly simplified representation of a generic image, possibly containing many colors.

FIG. 64 shows two bright pink "PLEASE WAIT" labels that appear when the "update text objects" button is activated. All other buttons on the page, (including up and exit), are disabled and a sound effect audio file is played. Images are constructed by a subunit of the buildShow.txt embodiment named, "mkTxoImgs.txt," (for make text object images). When it has finished, the wait labels are removed and the buttons re-enabled. To keep a TextList.txt image permanently, the user may copy it to a different folder. The images may be incorporated into a show for general text annotation purposes.

As discussed with FIGS. 39 and 40, a TextList.txt file may be wrapped in a show export text file. When importing a show, just the TextList.txt file may be unwrapped. And text object images may then be updated to reflect it. Since it's wise to export shows for use as a backup anyway, many shows based on different TextList.txt files are easily managed. Shows can be used to post or send reminders, greetings, agendas, schedules, announcements, invitations, information, advertisements, affirmations, quotations, messages, to do items, commercials, instructions, lessons, translations, addenda, jokes, etc. When not the main focus, a show can stay resident as a background task.

Selection Shows—Lineup

FIG. 65 is a page that appears when the "show lineup" button of FIG. 46 is activated. Two listbox widgets list names of three-dimensional image objects. The left listbox contains the same library of objects as the listbox of FIG. 46. "Text object01" through "Text object07" are visible until the list scrolls up or down. "Text object07" is highlighted. The right listbox contains names of three-dimensional image objects selected for the selection show being built. Because a scroll button is not present on the right side, "Text object01" through "Text object07" are the objects added so far. If the user presses the "return" key, with the highlight as depicted, or clicks "Text object07" on the left listbox, another line of "Text object07" is added to the right listbox. If, however, the user clicks on "Text object07" on the right listbox, it disappears from the list, as illustrated in FIG. 66. And the highlight moves to the right listbox. Hence if the user now presses the "return" key, with the highlight as portrayed in FIG. 66, or clicks "Text object06" on the right listbox, "Text list06" also disappears from the right listbox. "START FRESH (f)" is a button widget menu item that removes the names from the right listbox, as pictured in FIG. 67. And the highlight moves back to the left listbox.

Selection Shows—Begin Show

FIG. 68 is a page that appears when the "begin show" button of FIG. 45 is activated. It is very similar to FIG. 37 for medley shows. The main difference is that the listbox lists selection shows, instead of medley shows. Whereas an entry in a medley show database records the photo folder name and settings, an entry in a selection show database stores, among other things, names of three-dimensional image objects on a lineup. If no objects are listed in the "show lineup" listbox, (e.g. from FIG. 65), then the save and "do not save" buttons are disabled because a complete show has not been determined. If objects are listed prior to FIG. 68 appearing, then the user is reminded to pick a name, (new or existing), and save the show settings as explained with FIG. 37.

Selection Shows—Import, Export

Similar pages to those of FIGS. 39 and 40 are depicted in FIGS. 69 and 70. They appear when button widget menu items of FIG. 68, "IMPORT (i)" and "EXPORT (x)," are activated. Because of the difference in database entries, the export text files for selection shows have a ".bss" extension, (i.e. for buildShow.txt selection). The files also contain three-dimensional image object database entries for the objects in the lineup. Object database entries contain object names, image filenames, hues, and hue rules among other things.

As with ".bsm" export text files and medley show database entries, selection show database entries are not overwritten when importing ".bss" files. A suffix, in the form of "(i)," where i is an integer, is added to a show name from a .bss file, (or modified), if a name collision is imminent.

Three-dimensional image object database entries are also protected. Before importing, if an object database entry from a .bss file has a name that already exists in the object database of the buildShow.txt embodiment, the two are compared. If the objects are identical, there's no need to do any more. If they differ, a suffix is added to the name in the .bss file, (or modified), and the entry is added to the object database. Also, the selection show database entry from the .bss file is updated before being added to the selection show database of the buildShow.txt embodiment. The suffix needs to be added to the object name in the show lineup too, (or modified)!

TextList.txt images, such as those of FIG. 47, are automatically detected. Specifically, image names that begin with "TextImage" and an integer, end with ".png," and are located in a "tim" subdirectory, are targeted. Object database entries from the .bss file, with TextList.txt images, are modified before being compared to the object database of the buildShow.txt embodiment. The directory components of the TextList.txt image filenames are replaced with the "program/tim" subfolder of the buildShow.txt embodiment. To keep a TextList.txt image permanently, the user may copy it to a different folder. The images may be incorporated into a show for general text annotation purposes.

If the "'Imported Photos' folder" checkbutton of FIG. 69 is selected, then, object database entries from the .bss file are modified before being compared to the object database of the buildShow.txt embodiment. Directory components of image filenames are replaced with the "Imported Photos" folder of the buildShow.txt embodiment.

Each selection show database entry includes a message authentication code generated by the buildShow.txt embodiment. If a show export text file is modified, (specifically, its show database entry), without using the buildShow.txt embodiment, then the message authentication code may not verify. If so, the import operation is cancelled, advantageously reducing unexpected device behavior due to transmission or other errors.

Each three-dimensional image object database entry also includes a message authentication code generated by the buildShow.txt embodiment. The code authenticates the database entry itself, and moreover, the contents of the referenced images. If a relatively small export text file is delivered securely from a trusted source, the images may be transferred in a less secure fashion, yet still be authenticated. Object database entries are not checked when a show imports, but rather, when it starts. If an object does not authenticate, it is pulled from the lineup, but the show goes on! If authentication fails due to a missing or substitute image, a new message authentication code may be easily generated using the page of FIG. 47. Just highlighting the name and reselecting the hue rule, is enough to fix the message authentication code for the object!

Selection Shows—Text Show (Auto-Updated)

The other difference between FIGS. 37 and 68 is the presence of a show in the listbox named, "Text Show (Auto-Updated)." It is highlighted in FIG. 68. Its default lineup, partially depicted in FIG. 65, consists of a long series of text objects. There are no restrictions on the lineup, however. It is the show name that has significance. When the "begin show" button is pressed with this show highlighted, the timestamp of TextList.txt is compared with that of TextImage00001.png. If the text file is newer than the image, then instead of the selection show actually beginning, the text objects are updated just as if the update button of FIG. 62 were pressed. Although not described earlier, besides new TextList.txt images, fresh text object message authentication codes are also generated. To affirm that revived codes are for text objects, (or at least, objects limited to two colors), a subunit of the buildShow.txt embodiment named, "chkTxoImg.txt," (for check text object image), may be employed. A feature-reduced version of the buildShow.txt embodiment might not allow creation of new selection show three-dimensional image objects, even though text objects and the default "Text Show (Auto-Updated)" are fully implemented. Two bright pink labels, "AUTO-UPDATING TEXT OBJECTS," and "PLEASE WAIT," (not depicted), appear, and a sound effect audio file is played. When the update is complete, the labels disappear. And the second time the "begin show" button is pressed, the show actually begins.

This feature facilitates a quick method for viewing multiple selection shows that use different text objects. Each show is exported with its TextList.txt. To watch the show, 1) import it after selecting the "only import text list" checkbutton. 2) Highlight and run "Text Show (Auto-Updated)" to update text objects. 3) Highlight and run the show. Complete text-based selection shows can be shared, using this process, without transferring images! Device storage space is conserved, as text files use fewer bits than corresponding image files.

Tab-Completion Feature

The text entry widget boxes associated with listbox name buttons, including the one for FIG. 68, which would look like the one of FIG. 38, help speed the above process by providing a tab-completion feature. Consider, for example, the listbox contains one name that begins with "Tex." Then just typing, "Tex," and pressing the "tab" key, will cause characters "t Show (Auto-Updated)" to be automatically typed into the box, completing the show name. Most dialog boxes have a similar feature.

Record Second Individual Real-Time Directions with "Edit Mode"

Selecting the "edit mode" checkbutton of FIG. 68, as depicted in FIG. 71, switches on second individual real-time direction inputs during the show. As described below, they may be used synchronously or asynchronously with music, voice, and/or video to create commercial, educational, entertaining, informative, investigative, and/or inspiring audiovisual effects.

FIG. 72 illustrates a bright pink "STARTING 3-D IMAGE OBJECT SHOW APPLICATION" label that appears when the "begin show" button of FIG. 71 is activated. A sound effect audio file plays as the subunit of the buildShow.txt embodiment, tdiObjShow.txt, is run. The subunit manages show windows and controls playback of audio and/or video files, such as those chosen with the pages of FIGS. 7-10.

Medley and Selection Shows Illustrated

FIGS. 73-94 illustrate full screen snapshots of medley or selection shows. If the "standard" checkbutton of FIG. 11 had been specified, then as seen in FIG. 73, three-dimensional image objects would follow an edge track. If, in FIG. 11, the "directed" checkbutton had been selected instead, the edge track would still apply if the "edge" checkbutton of FIG. 28 had been selected. If so, FIG. 73 corresponds to the replay instance of FIG. 33, although FIG. 33 uses a circular path, (for consistency with how initial individual real-time directions are recorded). The solid colored circles of FIG. 33 are replaced with three-dimensional image objects in FIG. 73. (Note: the snapshots represent different times of a respective performance, since the rotation orientations are different.) The red circle (horizontal lines) corresponds to a "1" three-dimensional image object with generic images represented as "1F," "1R," "1B," "1L," "1T," and "1M," for its front, right, back, left, top, and bottom faces, respectively. Similarly, the orange, yellow, green, blue, and violet circles correspond to the "2," "3," "4," "5," and "6" three-dimensional image objects, respectively. Likewise, if the "custom" checkbutton had been selected in FIG. 28, then replay instances of FIGS. 34-36 correspond to shows of FIGS. 74-76. As depicted in FIGS. 73-76, perspectives displaying a complete path and object set straight on, are "Stage Views."

Second Individual Real-Time Directions

Objects move as directed by initial individual real-time directions, if the "directed" checkbutton of FIG. 11 had been specified. When the directions finish, or if, in FIG. 11, the "standard" checkbutton had been selected instead, the objects move at a specific speed determined by second individual real-time directions. The speed may be increased or decreased by second individual real-time directions. The default speed and adjustment factors may be modified using the customization process or editing strVars.txt.

Whether moving as directed by initial individual real-time directions or not, each object also spins around its own axis or axes, or rotates in-place. By default, each object rotates about its vertical axis. Number of axes, which axes, default in-place rotation speed and adjustment factors may be modified using the customization process or editing strVars.txt. Rate of in-place rotation may be increased or decreased by second individual real-time directions. In-place rotation may be paused and resumed while initial individual real-time directions are underway, (with second individual real-time directions).

In addition to increasing or decreasing object speeds, second individual real-time directions may also change object dimensions. One direction enlarges three-dimensional image objects, and another reduces them. Default object sizes may be modified using the customization process or editing strVars.txt.

Three-dimensional image objects come in sets of six or one, depending upon whether the "normal show" or "slide show" checkbutton of FIG. 5 is selected, respectively. And the set size for the "normal show" checkbutton may be changed from six using the customization process or editing strVars.txt. A small number of simultaneously displayed objects advantageously uses fewer graphics processing cycles, screen pixels, and consequent energy for portable devices. A large number of visible objects advantageously presents more information in a compelling, interactive experience.

A show is not limited to just one set of objects. Rather, many sets of objects are permissible. A medley show may be working from a photo folder with hundreds or thousands of images. A selection show may have a similarly long list of object names in its lineup. By default, each set appears for the number of "view time" seconds specified in FIG. 5. However, the user may use second individual real-time directions to transition objects on demand, in forward or reverse, in steps of one to six sets at once. The initial object set may be recalled anytime. During transitions, one embodiment gradually displaces a current object set with another object set before removal.

Full screen edge track has an aesthetic advantage in that three-dimensional image objects may be apparent just beyond the extent of a smaller foreground window, (i.e. from an independent, concurrent application). Text objects, study note images, weekend excursion photographs, and/or commercial marketing material, for example, may decorate the display while poised to provide productivity boosting reference, inspiration, and/or distraction. Other object sizes and locations are attainable.

Other show window sizes and locations are possible. Second individual real-time directions allow switching between the full screen show window to a resizable show window. A skinny vertical or squat horizontal show window may fit alongside a window of an independent, concurrent application, for example. If three-dimensional image object sets of just one are displayed in "Face View," such as when the "slide show" checkbutton of FIG. 5 is selected, images are often distinguishable, even within a small window. Default show window size may be modified using the customization process or editing strVars.txt.

If the user wants to avoid background object movement distractions, and/or free-up processing cycles, a "freeze" second individual real-time direction is available. Another direction freezes and hides a show window at once. During any "view mode" show the "pause" second individual real-time direction input issues a freeze direction instead, for one embodiment. A speaker may effectively pause a presentation, (including audio and/or video playback), for an audience question, then continue.

Using the customization process or editing strVars.txt to mandate slower refresh rates also reduces CPU cycles. Medley and selection shows progress, but in a stilted fashion. Lower refresh rates allow for operation on slower hardware and a wider variety of devices.

Background Scenery

FIG. 77 illustrates FIG. 73 with background scenery turned on. Actually, "background scenery" is somewhat of a misnomer because its really full surround scenery. This fact becomes evident as soon as the user begins using second individual real-time directions to fly amongst three-dimensional image objects in their virtual space. For example, FIG. 78 provides a different virtual perspective of the same scene as FIG. 77, from below looking up and to the right. The scenery is made with a "0" three-dimensional image object. Its front face is the background scene of FIG. 77. Portions of its top and right faces, (and just a corner of its back face), are seen in FIG. 78.

Default scenery is stored in a subfolder of the buildShow.txt embodiment named, "program/img," and is normally absent from a medley show photo folder or a selection show lineup. However, if the custom checkbutton is selected in FIG. 5, images from an initial three-dimensional image object replace the default background scene. FIG. 78 also demonstrates use of a second individual real-time direction to pause object movement, but not virtual perspective changes, (or audio playback). That is, the objects neither translated nor rotated in-place from FIG. 77, while the user activated second individual real-time directions to change virtual perspectives.

Second individual real-time directions provide flight controls to pivot left, right, up, down, clockwise, or counterclockwise and to move forward or backward. Speeds may also be increased or decreased. Default speeds may be modified with the customization process or editing strVars.txt. The user can make a game of flying alongside or through objects. Flying to spots where objects pass very close by provides interesting virtual perspectives.

By default, background scenery turns on automatically after a virtual perspective change beyond a pre-defined distance. This feature may be turned off or adjusted using the customization process or editing strVars.txt. If the "on at start" checkbutton of FIG. 5 is selected, scenery appears at show startup. Scenery may be toggled on and off via second individual real-time directions.

A second individual real-time direction saves a virtual perspective to a cached list of views. Each view in the list may be recalled, in forward or reverse sequence, by other directions. The first six views may be accessed in random order. Views may be deleted as well.

Another second individual real-time direction speeds refresh rates on a temporary basis. A background medley or selection show may run at slow refresh rates and reduced processing cycles. Yet, by holding down the right-hand "shift" key while piloting, a full-speed virtual space trip is possible immediately! Throughout 360 degrees of yaw and pitch maneuvering, background scenery may provide a cohesive rendition of a specific location, real or imaginary. Such a break!

Survey View

FIGS. 79-86 demonstrate "Survey View" for the "1" three-dimensional image object. Even though the object is moving and spinning, the virtual perspective automatically matches the moves, making the object appear to be just spinning! Second individual real-time directions summon Stage View, Survey View, or Face View (discussed below). In Survey View or Face View, other directions switch between successive objects, in forward or reverse order. Directions that pause or slow object rotation still work. Additional directions pull the object closer or push it farther away. Medley show three-dimensional image objects are automatically constructed with images assigned to front, right, back, and left faces, for one embodiment. Top and bottom faces get solid random colors, for one embodiment. Hence, photo folder images may easily be reviewed in Survey View without piloting skill!

Face View

FIGS. 87-94 demonstrate Face View for the "1" three-dimensional image object. Even though the object is moving and spinning, the virtual perspective automatically matches the moves and spins, making the object appear stationary! As depicted in FIGS. 87-88 and 91-94, successive activations of second individual real-time directions switch virtual perspectives between faces of a single object, in forward or reverse order. In addition to the previously mentioned directions that switch between objects, there are other "jump" directions, that shift through faces and objects both. By default, they switch, in forward or reverse order, between front, right, back, and left faces of one object, before jumping to the front face of the next object! Hence, images from a medley show photo folder may easily be reviewed in Face View without piloting skill! The jump directions even autorepeat when held active. A sequence of images can appear as a "mini-movie." The number of faces to view before jumping to the next object, and the autorepeat interval, may be modified using the customization process or editing strVars.txt. Faces may be viewed in any random order using other second individual real-time directions.

Available in Face View, another second individual real-time direction records the name of the image being viewed to FavoritesList.txt. FIGS. 89-90 depict temporary informational messages that appear when the direction is activated for FIGS. 87-88, respectively. FIG. 52 illustrates a preview of FIG. 87 via FavoritesList.txt. The user can use the list, among other things, to remember individual images or to help organize sequences of images.

When a medley or selection show starts, three-dimensional image objects have cube shapes. That is, each image is potentially distorted into a square, with a width:height aspect ratio of 1:1. Another second individual real-time direction alternately corrects the aspect ratio for the image being viewed and reverts it back to 1:1. For effect, other directions intentionally distort the image by increasing or decreasing the aspect ratio. Yet another direction upgrades a low or medium resolution image (as determined by the resolution checkboxes in FIG. 5) to high resolution.

The previously mentioned second individual real-time directions that pull an object closer or push it farther away still work. Other directions pan up, down, left, and right, which help inspect zoomed in images. Other directions increase or decrease the panning rate. Default panning speed may be modified using the customization process or editing strVars.txt.

A presenter can zoom and pan an image to indicate relevant portions while recording or playing an audio file. Zoom and pan offsets remain constant while viewing different face images. A presenter may display a pristine image, then switch to a marked-up copy and back. The mark-up seems to magically appear and disappear! Close-up differences between original images and filtered and/or touched-up versions are easy to illustrate. The user may change to Stage View, Survey View, or other virtual perspectives, yet still achieve the prior zoom and pan offsets upon returning to Face View.

The user may display a Face View image, or zoom and pan to display just a portion of it. Zoom and pan effectively crop the image! On a fullscreen window, activating the "freeze" second individual real-time direction, effectively creates a background, "wallpaper" image. After working on a foreground task, the user can switch back to the buildShow.txt embodiment to view the wallpaper image, free from operating system icons!

Fit Mode, Quick Option

Communication costs may be reduced if images use fewer bits to store their information. For example, many ideas may be conveyed with drawings and text using just two colors. Pixels of such images may correspond to single bits and can use a format named, "TIFF," (for tag image file format). To be clearly discernible, the high resolution checkbutton of FIG. 5 should be selected. Even then, graphics hardware limitations may cause the buildShow.txt embodiment to discard pixels if an image is too large. The buildShow.txt embodiment therefore automatically detects TIFF images that might be large, black and white documents and implements "Fit Mode" for medley shows that had the "slide show" checkbutton of FIG. 5 selected. Normally, Fit Mode breaks a document into top and bottom halves with trimmed margins. It is also available for selection shows. However, in addition to using one bit per pixel tiff images, a redundant image should be assigned to a second face of a three-dimensional image object. When Fit Mode and Face View are both active, a second individual real-time direction turns on "Quick Option." It instructs the buildShow.txt embodiment to use the front face image for right, back, and left faces too, without halving or margin trimming. Another direction turns Quick Option off. For one embodiment, if Fit Mode and Face View are both active, "q" key turns Quick Option on, while "shift"-then-"q" keys (together) turn Quick Option off.

To make presentations easier to read and more interesting, black and white images may be tinted with a color using the hue and "hue rule" checkbuttons of FIG. 47. One bit per pixel TIFF images, that are not assigned a color, but do use white text on a black background, are automatically tinted the distinguishing color of button widget menu items.

Additional Audio and/or Video Recordings

If a medley or selection show consists of many images, then it may include more than one set of three-dimensional image objects. Transitioning to a new set of objects may add a variable delay, as images are processed and uploaded to graphics hardware. The delay could cause a presentation to become desynchronized with audio recordings chosen in FIGS. 7 and/or 8. Two or more transitions increase the chances for desynchronization. Fortunately, each image assigned to a three-dimensional image object has, potentially, its own audio or video recording file which may be played using second individual real-time directions. Each audio or video file may be played as its corresponding image is viewed in Face View, or other times, even in Stage View or Survey View. By using second individual real-time directions that occur after the variable transition delay, the delay is bypassed and the show stays synchronized! If video files are included, video window size and location may be specified, using the customization process or editing strVars.txt.

One embodiment finds image specific audio or video files by matching their names. For example, an audio file named, "sunset5.mp3," matches an image named, "sunset5.jpg." Digital cameras that also record videos often provide an alternative use for their microphones. After a photograph is taken in "camera mode," the user may view the image in "playback mode" and record audio! Names of audio files match their respective images. The buildShow.txt embodiment automatically finds such audio files when the second individual real-time direction is given! Documentary capabilities of digital cameras may be fully realized! Persons who do not wish to have their photographs taken may still grant a request for audio commentary!

After viewing the official presentation with the "view mode" checkbutton of FIG. 37 or 68 selected, an audience member may play it again with the "edit mode" checkbutton selected instead. Images of interest may be studied in depth and corresponding audio or video even replayed! New material that was skipped in the official presentation may even be discovered! For example, top and bottom faces may include information, but do not get visited in Face View during the "view mode" show because the jump second individual real-time direction automatically bypasses them. Entire sets of three-dimensional image objects may be passed over, or placed at the end of a show lineup, but not viewed. Promise of hidden extra material generates audience interest and demand for medley and selection shows, whether commercial, educational, or neither! Even audience members without sufficient bandwidth for online videos may enjoy such medley and selection shows!

An advantage of one or more aspects is that the user can skip through material, to get an advanced look. Also, subject matter can be reviewed at different angles, using virtual perspective changes. Persons with attention deficit/hyperactivity disorder, (ADHD), and/or other behavioral and/or emotional conditions may be engaged, intrigued, and/or feel empowered to learn more efficiently.

Text Objects

FIGS. 95-100 demonstrate Face View for "Text object01." As depicted in FIGS. 47, 62, and 95-98, it displays the first four lines of TextList.txt on its front, right, back, and left faces, respectively. FIGS. 95-96 are previewed in FIGS. 51 and 54 as black and white images. However, because the "hue rule" in FIG. 47 had been set to "random," FIGS. 95-98 are each tinted with a random color. FIGS. 99-100 represent solid random colors for top and bottom faces, respectively.

Second Individual Real-Time Direction Inputs

Second individual real-time direction inputs are also known as "postproduction command keys." A subunit of the buildShow.txt embodiment, a help file named, "cmdKeys.txt," lists the keys, and is reproduced below. It leaves out Quick Option keys for clarity, (because they apply during Fit Mode and Face View and are less general).

General EDIT MODE (e) Operations:

minus sign, "−": Stage View: 3-D IMAGE OBJECTS (i) on EDGE (e) or CUSTOM (c) TRACK (t) are all visible equal sign, "=" or "shift"-then-"=" (together): Survey View: close-up of individual 3-D IMAGE OBJECT (i) rotating in place; switch to next or previous with another press of "=" or "shift"-then-"=" (together), respectively "f" or "shift"-then-"f" (together): Face View: close-up of individual 3-D IMAGE OBJECT'S (i) face; switch to next or previous face with another press of "f" or "shift"-then-"f" (together), respectively; Face View is a refined version of Survey View (see "=" above); get back to normal version of Survey View through Stage View, (by hitting minus sign, "−", then equal sign, "=")

"j" or "shift"-then-"j" (together): Face View: jump to next or previous image, respectively, among all displayed 3-D IMAGE OBJECTS (i); like "f" key, although skip top and bottom faces, and jump to next object when appropriate; autorepeats when held down "1" to "6"-then-"1" to "6" (consecutively): Face View: punch in <object number>-then-<face number> to view specific image immediately "1" to "6"-then-"p"-then-"1" to "6" (consecutively): punch in <object number>-then-"p"-then-<face number> to play video or audio track associated with specific image WITHOUT switching to Face View (video or audio file is located in same folder and has same base name as image; e.g. /Users/joe/Pictures/image3.mp3 for /Users/joe/Pictures/image3.jpg) (also see "p" in Face View section below)

"1" to "6"-then-"v" (consecutively): punch in <view number>-then-"v" to immediately access the first six user-defined virtual perspectives saved with "s". (See "s", "v", and "d", below.)

"/" or "shift"-then-"/" (together): enlarge or reduce dimensions of all 3-D IMAGE OBJECTS (i), respectively trick for EDGE (e) TRACK (t): make objects translate BEYOND edges: reduce size of objects (hit "shift"-then-"/" (together) twice), press minus sign, "−", (placing shrunken objects on edges proper), then restore original size (push "/" twice)

period, "." or "shift"-then-"." (together): increase or decrease in place rotational speed of all 3-D IMAGE OBJECTS (i), respectively comma, "," or "shift"-then-"," (together): increase or decrease translational speed of all 3-D IMAGE OBJECTS (i), respectively, unless they're following DIRECTED (d) CHOREOGRAPHY (c), in which case comma, ",", will toggle in place rotation on or off (see period, ".", above)

"k": view or hide background scenery zero, "0": start with beginning set of 3-D IMAGE OBJECTS (i)

"n": next set of 3-D IMAGE OBJECTS (i)

"1" to "6"-then-"n" (consecutively): skip 1 to 6 sets ahead

"r": reverse set of 3-D IMAGE OBJECTS (i)

"1" to "6"-then-"r" (consecutively): skip 1 to 6 sets behind

"space bar": pause and resume: pause stops the 3-D IMAGE OBJECTS (i), but NOT user-defined virtual perspective changes or audio play (for an EDIT MODE (e) show)! ("space bar" freezes a VIEW MODE (v) show, see below)

"shift"-then-"space bar" (together): freeze: halts virtual perspective changes and audio play as well, drastically reducing device resource usage; hit the "space bar" to unfreeze "w": toggle between full screen and resizable windows; resize window by dragging right-bottom corner of screen: place mouse cursor at corner, then press and hold mouse button while moving cursor to obtain specified window size; also works for VIEW MODE (v)

right-hand "shift": hold down for Fast Mode and improved video refresh rates, (if curtailed by customization to reduce device resource usage); also works for VIEW MODE (v)

"h": hide screen and freeze; hit "h" again to recover (alternatively, hit "space bar" to unfreeze and then "w"); also works for VIEW MODE (v)

"esc": close the 3-D IMAGE OBJECT SHOW; also works for VIEW MODE (v)

User-Defined Virtual Perspective Changes for EDIT MODE (e):

"q": move forwards
"a": move backwards
"left-arrow": pivot left
"right-arrow": pivot right
"down-arrow": pivot up
"up-arrow": pivot down
"z": pivot clockwise
"x": pivot counterclockwise
"t" or "shift"-then-"t" (together): increase or decrease move speed, respectively "y" or "shift"-then-"y" (together): increase or decrease pivot speed, respectively "s": save the "virtual perspective"

"v" or "shift"-then-"v" (together): rotate through saved virtual perspectives in forward or reverse order, respectively "d": delete the virtual perspective if it has been just displayed ("v" or "shift"-then-"v" (together) was pushed, but no other POSTPRODUCTION COMMAND KEY (p) has been pressed)

Survey View and Face View operations for EDIT MODE (e):

"e" and "shift"-then-"e" (together): extend away from or enlarge, respectively, 3-D IMAGE OBJECT (i); one may zoom-in all the way to opposite side of 3-D IMAGE OBJECT (i), for an unobstructed view!

Face View Operations for EDIT MODE (e):

(Lima), "l": append current face's photo to Favorites List; press "c"-then-"c" (consecutively) to remove advisory message arrow keys: pan image in given direction (India), "i" or "shift"-then-"i" (together): increase or decrease panning rate, respectively "c": toggle between a perfect cube and correct aspect ratio for current face's photo; also reset extension distance (if "e" key has been pressed) and off-center offset (if an arrow key has been pressed)

"g" and "shift"-then-"g": do and undo goof effect

"m": improve resolution, and correct aspect ratio; also reset extension distance (if "e" key has been pressed) and off-center offset (if an arrow key has been pressed)

"p": play image's associated video or audio, (i.e. .mp4, .mpg, .mov, .mp3, .wma, .wav or .aif video or audio file with same folder and base name as image; e.g. /Users/joe/Pictures/image3.mp3 for /Users/joe/Pictures/image3.jpg)

Splash Message when Embodiment Closes

FIGS. 101-103 demonstrate a sign-off message that appears when the exit button is activated, just before the buildShow.txt embodiment closes. A temporary, multi-part, timed greeting and/or closing message, advantageously provides uniqueness and character to a product or show. A message label, depicted in FIG. 101, appears first. A second message label, illustrated in FIG. 102, appears next after about 0.3 second. A third message label, portrayed in FIG. 103, appears after another 0.7 second. After all message labels have appeared, the buildShow.txt embodiment closes after another 0.25 second.

Operation

First Embodiment—FIGS. 104-115

Major Subunits

FIG. 104 depicts a first embodiment named, "buildShow.txt," its major subunits, "cueStage.txt," and "tdiObjShow.txt," (for three-dimensional image object show), and its minor subunits, "mkTxoImgs.txt," (for make text object images), and "chkTxoImg.txt," (for check text object image). A centrally located data file named, "strVars.txt," contains default initialization values. Not illustrated is a configuration file, "config.txt," and an open source program, Mplayer, that each of the major components call when opening multimedia files. The cueStage.txt component elicits, records, and replays initial individual real-time directions. The tdiObjShow.txt, (for three-dimensional image object show), constituent presents shows, including replaying initial individual real-time directions, when indicated, and, eliciting and recording or replaying second individual real-time directions, as instructed.

Arrows radiate outwards from the buildShow.txt circle of FIG. 104 to the other circles and ovals, indicating that the buildShow.txt component calls each of the other subunits. One-way arrows from the strVars.txt box to the two lower circles indicate that cueStage.txt and tdiObjShow.txt read the file. They do not modify it. There is no direct arrow from strVars.txt to mkTxoImgs.txt, because buildShow.txt reads strVars.txt and passes the relevant information in its call.

The buildShow.txt component updates strVars.txt. And it does so using the customization process, which entails reading enhancement and/or reversion files in a folder named, "Customize." A box in FIG. 104 entitled "enhanceXXXX.txt" represents an enhancement file. Each "X" stands for a digit. The enhancement file contains new values for one or more starting variables. The reversion file, "revertXXXX.txt," contains the original default values, in case the user wants to restore them. Both files also contain a unique identification code that should match a calculation by buildShow.txt for a particular installation. If not, the customization process fails. If the file is valid, then the values supplied by each enhancement or reversion file are written to strVars.txt. The files are plaintext for demonstration purposes. An actual deployment would use coded files. A file named, "ShowNos.txt," when present in the Customize folder, enables the user to display a registration number and the unique identification code, (see FIG. 6). These numbers should be included when requesting enhancement and reversion files.

Text Objects

FIG. 105 outlines how selection show text objects work pictorially. As explained with FIGS. 62 and 64, buildShow.txt calls mkTxoImgs.txt to regenerate images located in a subfolder named, "program/tim," (for TextList.txt images). Each image file is named after a line number and portrays the corresponding text from a file named, "TextList.txt." As mentioned with FIG. 68, chkTxoImg.txt verifies an image is black and white, and could help restrict message authentication code updates to text objects. That is, it could help detect normal color images surreptitiously copied to the "program/tim" subfolder, in order to obtain illicit message authentication codes for objects using them. For example, a feature-reduced version of the buildShow.txt embodiment might not allow creation of new selection show three-dimensional image objects, even though text objects are fully implemented.

Arrows indicate that when mkTxoImgs.txt is called by buildShow.txt, it reads TextList.txt and creates the images in the "program/tim" subfolder. Bidirectional arrows indicate that buildShow.txt both reads and writes TextList.txt, (see FIGS. 62 and 63), and a file named, "tdiObjectDb.txt," (for three-dimensional image object database), (see FIGS. 47-61). The latter file, as discussed with FIGS. 69 and 70, stores the database for three-dimensional image objects used in selection shows. Portions of two object database entries are shown. The object names are, "Todo object01," and "Todo object06." Image filenames for front, right, back, and left faces of the first object match those in FIG. 47. For simplicity, just filenames are shown. Actual database entries contain full pathnames, such as depicted by the "CURRENT CHOICE:" label in FIG. 49, "/Users/kjacobi/buildShow/program/tim/TextImage00001.png." Each time an image filename, a hue, or a hue rule is changed using the page of FIG. 47, the corresponding object database entry inside tdiObjectDb.txt is automatically updated.

Databases, Tdiobjshow.Txt Caches

FIG. 106 depicts how buildShow.txt and tdiObjShow.txt communicate through databases and caches. Files named, "medleyDb.txt," and "selectDb.txt," are medley and selection show databases, respectively. Similarly, upper and lower files named, "tdiObjectDb.txt," are three-dimensional image object databases for selection and medley shows, respectively. They are separate files, located in different directories. A file named, "tdiMinDb.txt," (for mini tdiObjectDb.txt), is a temporary, optimized version of an object database created for a particular show. Files named, "psc_1.txt," and "psc_2.txt," (for postproduction command files 1 and 2), are caches for second individual real-time directions.

In addition to tdiObjectDb.txt, bidirectional arrows in FIG. 106 indicate that buildShow.txt also reads and writes medleyDb.txt and selectDb.txt. Each time a save button on a "begin show" page is activated, a show database entry is added or updated within the corresponding database file, (see FIGS. 37 and 68).

A bidirectional arrow indicates the lower tdiObjectDb.txt is generated by tdiObjShow.txt. For a medley show, when the "begin show" button of FIG. 37 is activated, buildShow.txt passes a single entry from the medleyDb.txt file. The medley show database entry contains a photo folder, and tdiObjShow.txt figures out how to make three-dimensional image objects by itself. As mentioned with FIG. 4, medley shows use temporary object databases; tdiObjShow.txt deletes the lower tdiObjectDb.txt upon show close.

In contrast, when the "begin show" button of FIG. 68 is activated, and buildShow.txt passes a single entry from selectDb.txt, it contains a lineup of objects that are specified by the upper tdiObjectDb.txt. Hence, as a unidirectional arrow indicates, tdiObjShow.txt reads the object database to present a selection show. It creates tdiMinDb.txt, picking out object entries named on the lineup. If the user has created many objects for selection shows, then tdiMinDb.txt may contain significantly fewer object database entries than tdiObjectDb.txt. As such it may be faster to read when transitioning between object sets during a show. The tdiObjShow.txt subunit deletes tdiMinDb.txt upon show close.

There are other uses for tdiMinDb.txt. For example, tdiObjShow.txt contains within itself, a single three-dimensional image object database entry for the default scenery. That object database entry is the first one listed in tdiMinDb.txt, if the custom scenery option, as discussed with FIG. 5, is not selected. For this reason, and for consistency with selection shows, tdiMinDb.txt is created for medley shows as well. Additionally, buildShow.txt may request tdiObjShow.txt make a tdiMinDb.txt for wrapping into a selection show export text file. Such tdiMinDb.txt files also do not include the default scenery.

Another difference between the two tdiObjectDb.txt files is that they use incompatible message authentication codes. Hence, if a temporary three-dimensional image object database entry from a medley show is subverted and manually copied from one tdiObjectDb.txt file to the other, it will not verify. And tdiObjShow.txt will automatically pull it from a selection show lineup. This mechanism would help sustain a feature-reduced version of the buildShow.txt embodiment, which might not allow creation of new selection show three-dimensional image objects, even though medley shows are fully implemented.

When a medley or selection show is started with the "edit mode" checkbutton in FIG. 37 or 68 selected, second individual real-time directions are recorded as the show progresses. Upon show close, they are written to psc_1.txt. As discussed just after introducing FIG. 78, virtual perspectives may be saved using a second individual real-time direction. The list of views is stored within psc_2.txt. When the "attach edits to show" button is activated on pages 37 or 68, buildShow.txt copies these cache files to separate medley or selection show subfolders. The "psc" is changed to the show name, but the "_1.txt" and "_2.txt" are kept. The cache files are similarly copied if the save button is pressed when the "save overwrites edits" checkbutton is selected. When a medley or selection show is started with the "view mode" checkbutton in FIG. 37 or 68 selected, second individual real-time directions are replayed. The stored subfolder files, if they exist, are copied back to psc_1.txt and psc_2.txt, potentially overwriting a previous set. The second individual real-time directions from the psc_1.txt file are replayed during the show.

Cuestage.Txt Caches

FIG. 107 shows how cueStage.txt uses its cache files named, "cue_1.txt," through, "cue_5.txt," to store and communicate initial individual real-time directions. The user begins recording initial individual real-time directions by activating one of the cue touch items, the rotate button, or the lights button in FIG. 13. The recording ends when the conclude button is activated. If the track button in FIG. 23 is activated, the "new design" button in FIG. 28 is activated, a custom track is drawn in FIG. 29, and the escape key is pressed, then the custom track is written to cue_4.txt. When the save button in FIG. 23 is pressed the rest of the cache files are created and are also stored within a subfolder of cueStage.txt. The "cue" is changed to the name highlighted in the listbox of FIG. 23, but the "_1.txt" through "_5.txt" are kept.

The initial individual real-time directions are written in native format to cue_1.txt, and, in tdiObjShow.txt formats, to cue_3.txt and cue_5.txt. The coordinates for the cue touch widgets in FIGS. 13 and 19 are stored in cue_2.txt. When the recall button in FIG. 32 is activated, the stored subfolder files, if they exist, are copied back to the cue_1.txt through cue_5.txt files.

The initial individual real-time directions from cue_1.txt are replayed by cueStage.txt when the play button on FIG. 13 is activated. For simplicity, the arrows in FIG. 107 point from cue_3.txt through cue_5.txt to tdiObjShow.txt. In fact, tdiObjShow.txt reads the corresponding stored subfolder files directly to replay initial individual real-time directions during a show.

Musical Paths

Music is written in measures or bars of notes. Notes lasting one quarter of a bar are referred to as quarter notes. Eighth notes and sixteenth notes are sometimes referred to as "quavers" and "semiquavers." In general, many compositions rely on sixteenth and longer notes to establish an overall melody, giving rise to musical meters or time signatures defined in terms of quarter or eighth notes. For example, 4/4 time, 3/4 time, 2/4, 3/8 and 12/8 times are usual time signatures.

Just as a bar of music is broken into eighth, quarter, half, etc. notes, a finite length path is, for one embodiment, separated into eighth, quarter, half, etc. segments. Just as a musical tempo specifies a number of quarter notes per minute, a motion tempo of an object along a finite path is, for one embodiment, specified by a number of quarter segments per minute. Similarly, just as notes are played with staccato or legato styles, objects, for one embodiment, jump instantaneously or flow smoothly from segment to segment. Furthermore, just as legato style notes may contain accents, object motions, for one embodiment, contain smooth flowing, yet contrasting, phase one and phase two speeds along each segment. Several advantages of one or more aspects are methods that accomplish these mappings.

Segment examples 1-5 in FIG. 108, illustrate whole, half, quarter, eighth, and sixteenth segments, respectively, of a straight line path. A given object may traverse each path from start to finish in identical amounts of time for a given tempo, although with different styles. For staccato flow, a time interval between jumps is inversely proportional to total segments. For legato flow, each segment may have a fast and a slow phase, which distinguishes each segment example. For one embodiment, legato flow assigns a faster phase first and a slower phase second, and each phase lasts a same duration. Motion speed of the faster phase is quadruple that of the slower phase, leading to four-fifths of a segment length for phase one, and a remaining one-fifth for phase two. FIG. 108, example 6, illustrates eighth segments, each broken into phases one and two, from left to right, for one embodiment.

Segment length, as a fraction of path length, is indicated, for one embodiment, by a denominator in a musical time signature. For example, as in FIG. 14, 5/4 and 7/4 time signatures establish quarter segments, whereas 5/8 and 7/8 time signatures portend eighth segments. A total number of segments to be traversed for each path is indicated by a numerator in a musical time signature, for one embodiment. For example, as in FIG. 13, 4/4 time indicates an object will traverse four quarter segments, while 3/4 time signifies an object will traverse three quarter segments before returning to a starting point.

Equations 7-17 in FIG. 109 demonstrate how cueStage.txt deals with some of these concepts quantitatively. Variables "xi" 8 and "kappa" 9 are read from the strVars.txt file (see cueStage.txt, lines 195, 196). They represent choices for exactly how each beat is divided into fast and slow phases. The xi variable 8 designates how long the faster phase persists versus the duration of the slower. The kappa variable 9 controls the speed of the faster phase relative to that of the slower. A beat, incorporating both phases in either order, is set by a time signature 10. That is, each cycle or total length of a path is divided into a number of equal counts determined by the denominator of the time signature. Variable "iposArcPerBeat" 11 stores how many "interpositions" or indices the beat covers. It represents arcs of a circle or segments of an arbitrary path, (see cueStage.txt, line 596, where, for one embodiment, 256 total interpositions are used). Given xi 8, kappa 9, and iposArcPerBeat 11, one embodiment determines how many interpositions are allocated to each phase. Variable "iposArcPerPhsFast" 16 gives interpositions for the fast phase. Variable "iposArcPerPhsSlow" 17 yields interposition count for the slow phase (see cueStage.txt, lines 597, 598). One embodiment uses the faster phase for phase 1 and the slower phase for phase 2. However, a different embodiment could use the slower phase first.

Positions, Interpositions, and Indices

As implied by equations 7-17 in FIG. 109, interpositions form a skeletal basis for a path. Objects on the path are located with respect to such interpositions. For a given path, possible object quantities and spacings are numerous. One embodiment defines a sixteenth interposition as a "position," indicating it may be used as a reference point to locate an object, (i.e. in the reset state, before any movement). As one embodiment employs 256 interpositions, a total of sixteen objects may be accommodated per path. For example, FIGS. 110 and 111 depict sixteen positions along circular and custom paths, respectively. Position 0 is on top of the circle in FIG. 110, while position 4 is on the right.

"Interpositions" are formally indices between positions, although they are often referred to interchangeably with "indices." For one embodiment, positions range from 0 to 15, interpositions from 0 to 15, and indices from 0 to 255. For a given position and interposition combination, a corresponding index equates to sixteen times the position plus the interposition, (i.e. index=16*position+interposition). The converse conversion is also straightforward. For a given index, the position is the truncated integer result after dividing by 16, (i.e. position=int(index/16)). The interposition is the remainder after subtracting the nearest multiple of 16 from the index, (i.e. interposition=(index modulo 16)=index % 16=mod(index, 16)).

Coordinates for interpositions on a circular path are determined, for one embodiment, using sine and cosine functions. A one-to-one correspondence exists between each interposition coordinate and an angle that is some multiple of twice pi divided by 256. Coordinates from the sine and cosine functions may be uniformly scaled by a radius and offset, to size and locate the circular path, respectively, for one embodiment. That is, one embodiment uses cosine and sine functions to create a set of parametric equations. Other embodiments can use other functions to form parametric equations for other paths. Other embodiments may scale and offset coordinates nonuniformly. Other embodiments may include a z-coordinate to define three-dimensional paths.

Index Coordinates for Custom Paths

An advantage of one or more aspects is a process for quickly determining interpositions of a custom path. A flowchart in FIG. 112 elucidates such a procedure, for one embodiment. A simple example demonstrating two cycles of the flowchart is depicted graphically in FIGS. 113A-113C, and quantitatively in FIGS. 114A-114D. As discussed below, one embodiment obtains a more uniform interposition distribution using two rounds. That is, the fifth segment of FIG. 113C is closer in length to segments one through four than the final segment of FIG. 113B is to its counterparts.

FIG. 113A depicts an example custom path drawn by the user and specified with three points. FIG. 113B depicts a first round, six interposition estimate of the path. FIGS. 114A-114B reveal the math behind the coordinates. FIG. 113C depicts a second round result, again using coordinates from the first FIG. 113A path, but using the shorter track length from the second FIG. 113B path. FIGS. 114C-114D provide mathematical details.

Final segment lengths in FIGS. 113B and 113C are shorter than their counterparts. This discrepancy is due to decision step 5 of the flowchart in FIG. 112. If a point defining a path represents too fine a detail, it is ignored. That is, if the additional distance added by the point does not bring the total span up to or over the threshold for adding a new index, then it is ignored and the next point on the path is examined by looping back to step 4. Likewise, any remaining gap, after including one or more segments, is also disregarded. Hence, "too fine a detail" equates to an extent less than the interposition segment length, "trkIpsLength."

This effect is often negligible, merely smoothing out jittered curves. However, a path could have many intricate details such as small curlicues. They might be replaced with straight line segments during the FIG. 112 indexing process, leading to a much smaller track length than originally calculated. Such a case might read all coordinates via step 4 before indices have been fully placed. All unplaced indices would then be assigned to the endpoint, by way of step 9.

It is instructive to consider how such an index distribution might affect object motion. Consider that a particular style, tempo, and phase determine how fast objects move from index to index. Where indices are uniformly spaced, objects move as calculated, but are stuck in place when "moving" between indices assigned to the same spot on the track. That is, objects move normally along the beginning of the path, halt at the end, then continue normally again from the start point. Likewise, when indices are closer than the average interposition segment length, objects move slower between them; when farther apart, they move faster.

One embodiment uses the track length of a first estimate to quickly make a second estimate with a more uniform index distribution. Other embodiments may use additional rounds. Other embodiments may use a different procedure to create a nonuniform index distribution. That is, a same number of indices may be used, but spaced closer together, to portray detail, and farther apart, along straighter lengths. Objects would then move slower through detailed areas of the path, and faster along straight sections. Other embodiments could allow the user to choose between such processes. Additional interrelated checkbutton options could be affixed to the track page of FIG. 28, for example. To maintain accuracy through multiple trials, the original track would be stored in addition to the indexed track.

Another embodiment could impose equal interposition segment lengths, and place index coordinates on the original track. The difference, in the FIG. 113B example, would appear after the third index point, (x2, y2). Instead of following a trajectory directly to the endpoint, the third interposition segment could be swiveled up until (x3, y3) intersected the original path, (portrayed separately in FIG. 113A). Successive interposition segments would then use the trajectory of the original path to the endpoint. The third segment would still approximate some detail. That is, instead of two legs of a triangle connecting (x2, y2) and (x3, y3), reflecting the original path, the third segment would represent the base of the triangle. The third segment would therefore represent a reduction in track length. A second round through the procedure, using the track length from the first round, would decrease interposition segment length discrepancies near the endpoint. Other embodiments could use additional rounds. Other embodiments could allow the user to choose a process. Additional interrelated checkbutton options could be affixed to the track page of FIG. 28, for example. To maintain accuracy through multiple trials, the original track would be stored in addition to the indexed track.

At least two procedures could be used to find the point where (x3, y3) would intersect the original track. The first involves writing equations for a circle, representing the swiveling third segment, and a line, for the FIG. 113A segment. Solving the two equations for the two unknowns, x and y, leads to the intersection coordinates. Since a line may intersect a circle twice, the lower intersection coordinate should be selected, for the example. A second process would assign an initial slope, such as zero, to the third segment. After finding the intersection point and evaluating the resultant length for the third segment, a new slope would be calculated and the steps iterated until the intersection point that gives the specified segment length is found.

Another embodiment may use more interpositions to reduce the relative interposition segment length, automatically improving tracing accuracy and allowing more detail. That is, equations 21 and 23 in FIGS. 114A and 114C indicate that a larger number of interpositions reduces the interposition segment length, trkIpsLength. For example, if eleven indices were used instead of six, then equation 21 result would be 1.0 instead of 2.0. Instead of just two interposition segments fitting between the start and mid points of the FIG. 113A path, as in FIG. 113B, five would fit. Five would also fit between the mid and end points. And the first round path would exactly match the FIG. 113A path! Even if the match were not exact, it would still be closer than what was achieved with six interpositions.

Other embodiments could allow the user to directly set an index quantity for delineating a path used for replay. For example, a button option, similar to the start delay button on the conclude page of FIGS. 23 and 27, could be provided on the track page of FIG. 28. Because the total replay path length would still correspond to a single cycle of the circular path of FIG. 13, used to record initial individual real-time directions, object speed would not be affected by the chosen number of interpositions. For a given tempo, objects would still speed-up to cover more distance for a longer track. To maintain accuracy through multiple trials, the original track would be stored in addition to the indexed track.

Other embodiments could allow the user to decide how many cycles of the circular recording path of FIG. 13 correspond to a replay path, simultaneously increasing the number of indices with each cycle. A button on the track page of FIG. 28 could be employed. For example, one embodiment uses 256 indices for all paths. However, just as a song is written or performed, note by note, bar by bar, so too are initial individual real-time directions recorded. That is, the circular track, visually depicting the flow of each beat through one bar, provides a good recording gauge. Once a recording is complete, an embodiment could map multiple cycles of the circular track onto a replay track, just as a song consists of numerous bars of notes.

Each section of replay track corresponding to a cycle could add another 256 indices. A greater number of cycles would increase the number of indices. And a larger count of indices would lead to a smaller interposition segment length and a correspondingly lower speed. Hence, such an option could be used to adjust both replay track resolution and object speed. To maintain accuracy through multiple trials, the original track would be stored in addition to the indexed track.

As noted before discussing FIG. 77, slower refresh rates reduce device resource usage. Another approach is to neglect performing interpolation calculations. That is, objects move from index to index on a given schedule. If a display updates faster than the schedule, or is refreshed asynchronously to it, objects may be placed between indices, by interpolation. Device resource usage may be reduced by not interpolating between indices. A larger number of indices, leading to finer-grained indexed paths, could improve flow appearance for such cases, depending on style, tempo, and track distance.

Standard Edge Track

As discussed after introducing FIGS. 73-76, the user may change both three-dimensional image object and show window sizes using second individual real-time directions. FIG. 115A illustrates how one embodiment determines position coordinates for the standard edge track. One embodiment places five positions along each edge of the show window. Thirty percent spacing is included in cube width and height, cw and ch, respectively, for one embodiment. FIG. 115B depicts sixteen possible three-dimensional image objects occupying the standard edge track, for one embodiment. FIG. 115C portrays the same track, filled by objects in positions 0, 2, 4, 6, 8, and 10, as implemented when the "normal show" checkbutton is selected in FIG. 5, for one embodiment. Note that horizontal and vertical interposition segment lengths may not be identical. When the width of a show window is greater than its height, and objects are actual cubes, with equal widths and heights, objects travel faster along the top and bottom than the vertical sides, due to relatively longer interposition segments. Other embodiments could employ different schemes to figure distances between positions.

Buildshow.Txt

Programming languages Tcl, (for tool command language), with its Tk, (for tool kit), extension and Wish, (for windowing shell) application, and Python, with its Tkinter and Pygame modules, (among others), are concise languages for illustrating concepts associated with the buildShow.txt embodiment.

When opening buildShow.txt, a Python interpreter loads a class, named "ShwBuild," and its methods, until line 9058. Then it analyzes its invocatory line, (i.e. "command line"), to determine its program directory, "proDir." From there, it initializes other variables for files and directories expected to exist relative to proDir. After determining which operating system is running, from lines 9099 to 9106, it reads and analyzes a configuration file named, "config.txt," from lines 9107 to 9145. Variables containing full pathnames of Python, Wish, and Mplayer applications are set.

Lines 9172 to 9195 create "bldKey," (for buildShow.txt key), used to generate message authentication codes for medley show, selection show, and three-dimensional image object database entries. Lines 9196 to 9211 define "uidKey," which helps determine a unique identification code, "self.uidCode," for the local installation of the buildShow.txt embodiment. A constant, named "UIDLINE," on line 9212, indicates which line of strVars.txt self.uidCode should be placed during the customization process. Default strVars.txt files yield, "FACTORY DEFAULT," on UIDLINE until it is customized.

Line 9213 instantiates a Tkinter toplevel widget. Line 9215 instantiates a ShwBuild object, including running method, "_init_( )," specified on lines 14 to 401. Line 9217 starts an event loop, allowing widgets to respond as programmed.

Reading Default Values from Strvars.Txt

Lines 18 to 116 of the _init_( ) method establish variables. Lines 117 to 180 read strVars.txt, as depicted in FIG. 104, and create more variables. Lines 181 to 204 implement default values if strVars.txt yields fewer lines than expected. Lines 205 to 252 set up window sizes and fonts. Lines 253 to 262 read a registration number from a file named, "regNum.txt," and place it in a variable named, "self.regNum." Lines 263 to 285 generate self.uidCode. Lines 286 to 325 verify registration number and strVars.txt. Line 293 adds self.uidCode to self.regNum on a second line. Lines 327 to 401 generate the page of FIG. 1.

Blatant Auxiliary Activation Inputs

Lines 403 to 445 define a method called, "exitCmd( )," which is called to establish the exit button found on most pages of the buildShow.txt embodiment. It also displays a copyright notice, (not depicted), on each page. Line 417 indicates that a method named, "finishExit( )," is called when the exit button is activated. Similarly, a method named, "_finishExit( )," is called when the blatant auxiliary activation key, "6," (as in deep-six), is pressed, according to line 420. Lines 434 to 445 store the binding in a variable named, "boundX," where X is a number representing the current level, self.level. The page of FIG. 1 establishes level 0. Each new page created increments self.level. Each page removed with the up button decrements self.level, (see line 3450).

Lines 447 and 448 establish that _finishExit( ) in turn calls finishExit( ). Separate method _finishExit( ), since it is called when the blatant auxiliary activation key is pressed, acknowledges an argument named, "event." When finishExit( ) is called by the exit button itself, no event argument is included. Hence, the _finishExit( ) relay satisfies the Python interpreter.

Lines 450 to 472 define the finishExit( ) method. On line 451, a variable named, "self.disable," disables the method if it is set. The exit button does nothing unless self.disable is reset. Lines 452 to 458 terminate Mplayer application, if active. Lines 459 to 463 remove second individual real-time direction cache files, psc_1.txt and psc_2.txt, depicted in FIG. 106. Line 464 calls "splash1cmd( )" method which implements the first part of a sign-off message such as in FIG. 101. Line 465 causes a 0.3 second delay. Line 466 calls "splash2cmd( )", which displays a second part of the sign-off message, as illustrated in FIG. 102. After the final part of the sign-off message has been displayed for 0.25 second, lines 470 to 472 close buildShow.txt embodiment.

Lines 477 to 516 define initMedley( ) method which creates the page of FIG. 2. Line 479 calls a method named, "unbindAll( )," which removes all auxiliary activation key bindings from the previous page, (i.e. that of FIG. 1). Line 480 increments self.level to 1.

A method named, "optionsCmd( )," called on lines 510 and 5190, is specified on lines 518 to 532. It adds the options button to the pages of FIGS. 2 and 45. A method named, "chooseOptions( )," called when the options button is activated, and defined on lines 537 to 999, creates the page of FIG. 5. It also creates a fake options page, (not depicted), used in conjunction with the "help files" button of FIG. 1. Line 539 calls method unbindAll( ), and line 540 increments self.level to 2.

Customize Button of FIGS. 5, 6

Lines 963 to 993 create the customize button of FIG. 5. Line 976 causes a method named, "_shwRegNum( )," to be called when the mouse cursor enters the vicinity of the customize button. The _shwRegNum( ) method displays self.regNum, such as depicted in FIG. 6. Line 977 causes a method named, "_rmRegNum( )," to be called when the cursor leaves the vicinity of the button, removing the numbers. Lines 980 to 989 place a list of enhancement and reversion files in a variable named, "enhFiles." If it is nonempty, as tested on line 990, the customize button is enabled. Lines 1001 to 1020 define methods _shwRegNum( ) and _rmRegNum( ). Line 1004 disables _shwRegNum( ) if a file named, "ShowNos.txt," is missing from the Customize folder, "enhDir."

Line 973 indicates a method named, "strVarsUpd( )," is called when the customize button is activated. It is defined on lines 1025 to 1272. The strVars.txt file is read from lines 1043 to 1054. The enhFiles variable is reconstituted by lines 1055 to 1064. The enhFiles list is sorted on line 1066 and rearranged to put reversion files before enhancement files on line 1075. One file is processed per customize button activation. Line 1076 picks the first one on the list. Its lines are read into a variable named, "enhLines." They are processed on lines 1106 to 1153, and then the reversion or enhancement file is deleted on line 1154. An alternative embodiment could move the reversion or enhancement file out of the Customize folder instead of deleting it. Again the enhFiles variable is re-created from scratch on lines 1155 to 1165. If the enhFiles list is empty, the customize button is disabled by lines 1166 to 1168.

If a unique identification code, embedded in the reversion or enhancement file, matches self.uidCode, a variable named, "uidMatch," is set on line 1110. Lines 1131 and 1132 assure that the updated strVars.txt file stores self.uidCode on the appropriate line, identified by UIDLINE constant. Lines 1134 to 1151 create a new strVars.txt file that includes the customizations specified by the reversion or enhancement file, as depicted in FIG. 104. Line 1143 determines if a strVars.txt line should be replaced. Line 1144 replaces it. After the strVars.txt file is updated, it is re-read, as originally done by _init_( ) method, to refresh corresponding variables.

Method regNumVerify( ), defined on lines 1274 to 1287, is a simple, contrived example. It serves as a placeholder for an actual registration number verification routine.

One of the pages, (not depicted), that may be viewed after activating the "help files" button of FIG. 1, is "option details." It resembles the options page of FIG. 5, except each checkbutton is replaced with a regular button. When activated, the "normal show" button, for example, creates a scrollable window loaded with a help file named, "normalShow.txt," on the right side of the page. The article explains what features the "normal show" checkbutton of FIG. 5 provides. Similar articles may be viewed for other option buttons.

Each button calls a method, which in turn calls "optView( )" method, which displays the appropriate help article in the scrollable window. Line 597 assigns "opvNormalShow( )" method to the "normal show" button of the help page. Line 1293 is a call to optView( ) from opvNormalShow( ). An argument, "normalShow," distinguishes the call from those of other buttons. Lines 1361 to 1444 define optView( ). The argument from the opvNormalShow( ) call is assigned to a variable named, "optName." Line 1432 prepends a subdirectory of the buildShow.txt embodiment named, "hlp," to optName. It also appends a ".txt" suffix and opens the resultant file for reading. Line 1433 reads the file. Line 1435 inserts it into the scrollable window.

Lines 1449 to 1500 define method, "chooseBeta( )." As per line 906, it is called when the "bottom correction" button of FIG. 5 is activated. As previously explained with FIG. 5, the button creates a text entry widget box. The box is removed if the button is activated again without first finishing the entry update. Lines 1454 and 1455 test whether the box is still present. Lines 1456 to 1471 remove the box. Line 1472 ignores the button activation if self.disable is set. For example, when the "view time" button of FIG. 5 is activated, a different text entry widget box is created. To prevent a second text entry widget box from appearing, self.disable is set. It is also set to prevent the up or exit buttons from interrupting an entry update. Lines 1473 to 1500 create the text entry widget box.

Line 1479 calls unbindAll( ) to redirect all keyboard keys towards the text entry widget box. Line 1480 sets self.disable to prevent a second text entry widget box from appearing, and the up or exit buttons from interrupting. Line 1481 removes the label of FIG. 5 that displays the current bottom correction factor, "0.975." Line 1495 causes method "_finishBeta( )" to be called when the "return" key is pressed. Because the entry expects numerical values, it is possible to reassign the alphabetical blatant auxiliary activation key for the "bottom correction" button on line 1497. In addition, since a second activation removes the box and cancels the update, assigning the escape, "esc," key too, on line 1499, for convenience, is appropriate. Method _finishBeta( ) is defined on lines 1502 to 1526.

Lines 1531 to 1605 define methods "chooseTime( )" and "_finishTime( )," which similarly handle updates for the "view time" button of FIG. 5.

Lines 1607 to 1635 define methods "bkVoiceCmd( )" and "bkSongCmd( )," which place the voice and song buttons, respectively, on the pages of FIGS. 2 and 45. Method initMedley( ) calls them on lines 511 and 512. A method named, "initSelect( )," calls them on lines 5191 and 5192.

Method "dirDelete( )," defined on lines 1640 to 1652, clears the variable named, "self.phoDir," and removes the "CURRENT PHOTO FOLDER NAME" label of FIG. 3. In order to make sure the label updates, lines 1651 and 1652 effectively hit the up button followed by the "photo folder" button of FIG. 2. That is, the page of FIG. 3 is removed and recreated from scratch.

Methods "hueDelete( )" and "tdfDelete( )," defined on lines 1654 to 1700, likewise perform the operations for delete buttons of FIGS. 59 and 49, (upper delete button).

Method "shwUpdDb( )," updates a show database file, medleyDb.txt or selectDb.txt, as depicted in FIG. 106, depending on which is relevant. It is called when the save button of FIG. 37 or 68 is activated, and a previous version of the show already exists. It is described on lines 1702 to 1735. A variable named, "mdlFlag," is set if a medley show is applicable on line 1703. A variable named, "self.unkShow," contains the latest medley or selection show database entry. It stands for "unknown show," because if the user starts with the top button widget menu item of either FIG. 2 or 45, and works down, then it may have no name, until just before saving!

When the none, hue, or random checkbuttons of FIG. 61 are activated, method "rulUpdDb( )" is called. It is specified on lines 1737 to 1768. As depicted in FIG. 106, it updates tdiObjectDb.txt for a three dimensional image object. The full pathname of the database file is given by a variable named, "tdiDb," defined earlier on line 9080. It is referenced on lines 1742 and 1768. Lines 1747 to 1750 assign a chosen hue rule, or no hue rule, to a database entry of an object. A message authentication code, as discussed with regard to FIGS. 69 and 70, is refreshed by a method named, "tdiBldCode( )," on line 1751. The method is defined within tdiObjShow.txt, lines 3809 to 3827.

When a hue is changed by pressing the ok button of FIG. 60, or the delete button of FIG. 59, method "hueUpdDb( )" is called. It is specified on lines 1770 to 1801, and updates tdiObjectDb.txt, as depicted in FIG. 106. Lines 1780 to 1783 assign a chosen hue, or no hue, to a database entry of an object.

When an image is changed by pressing the ok button of FIG. 50, or the upper delete button of FIG. 49, method "phoUpdDb( )" is called. It is specified on lines 1803 to 1831. Line 1813 assigns a filename of a chosen image, or an empty string, to a face of an object.

After mkTxoImgs.txt finishes making text objects, method, "txoUpdDb( )," on lines 1833 to 1883, updates their message authentication codes. First, it checks them with method, "chkTxoImages( )," defined on lines 1885 to 1944. The latter method calls chkTxoImg.txt, as depicted in FIG. 104.

Method, "chooseFace( )," on lines 1949 to 2032, creates the dialog box of FIG. 50, for choosing an image file for a face of an object.

Lines 2037 to 2309 define method "initImport( )," which creates the pages of FIGS. 39 and 69. Method "updShow-Lineup( )," on lines 2311 to 2320, replaces a specific name on a lineup list with a new name. It is used by method "import-Show( )," which is called when the import button of FIG. 39 or 69 is activated, and defined on lines 2325 to 2693.

Similarly, lines 2698 to 2886 define method "init-Export( )," which creates the pages of FIGS. 40 and 70. Method "mkShwMinDb( )," on lines 2888 to 2931, pulls a show database entry from either medleyDb.txt or selectDb.txt and readies it for export. Method "deleteExpShow( )," on lines 2933 to 2995, moves an export text file into a garbage subdirectory, avoiding name collisions by adding or modifying a suffix. Both methods are used by method "export-Show( )," which is called when the export button of FIG. 40 or 70 is activated, and defined on lines 3000 to 3085.

Method "attachEdits( )," on lines 3090 to 3111, stores second individual real-time direction cache files when the "attach edits" button of FIG. 37 or 68 is activated.

Method "designChoreo( )," on lines 3116 to 3204, is called when the "new dance" button of FIG. 11 is activated. It creates the "STARTING CUE STAGE APPLICATION" label of FIG. 12, plays a sound effect audio file, and calls cueStage.txt, as depicted in FIG. 104.

Lines 3209 to 3377 define method "chooseFile( )," which creates the dialog boxes of FIGS. 9, 10, 43, and 44.

Lines 3379 to 3394 define method "choreoCmd( )," which creates the choreography buttons of FIGS. 2 and 45.

Method "beginCmd( )," on lines 3396 to 3409, creates the "begin show" buttons of FIGS. 2 and 45.

Method "upCmd( )," on lines 3411 to 3440, creates the up buttons for buildShow.txt pages. Method "goBack( )," on lines 3445 to 3455, is called when the up button is activated, among other times. It removes a current page and its associated auxiliary activation key bindings. Method "removeBindings( )," on lines 3457 to 3529, removes bindings from a current page, and restores bindings from a previous page.

Method unbindAll( ), on lines 3531 to 3567, removes all auxiliary activation key bindings.

Method "initBegin( )," on line 3572 to 3909, creates the pages of FIGS. 37 and 68.

Lines 3911 to 3952 specify method "updShwLstBox( )," which loads the listbox of FIG. 37 or 68 with alphabetized names of shows from medleyDb.txt or selectDb.txt, respectively. A show is highlighted as well.

Lines 3957 to 3963 define method "lstShwName( )," which re-highlights a listbox show name and calls method "shwName( )," Lines 3968 to 4009 specify method shwName( ), which updates the name label of FIG. 37 or 68 to match whichever show is highlighted in the listbox. It also enables the save and "do not save" buttons if appropriate.

Method "chooseShow( )," on lines 4014 to 4067, creates the text entry widget box of FIG. 38, for selecting or adding listbox shows. Lines 4069 to 4136 define method "_finishShow( )," which moves the listbox highlight to an old or new show and calls shwName( ) when the "return" key is pressed.

Method "deleteShow( )," on lines 4138 to 4239, deletes a show when the delete button of FIG. 37 or 68 is activated.

Method "cancelShowSave( )," on lines 4244 to 4274, cancels saving a show when the "do not save" button of FIG. 37 or 68 is activated.

Method "saveShow( )," on lines 4279 to 4341, saves a show when the save button of FIG. 37 or 68 is activated.

Method "loadShow( )," on lines 4346 to 4400, loads a show when the load button of FIG. 37 or 68 is activated.

Lines 4405 to 4585 define method "beginShow( )," which is called when the "begin show" button of FIG. 37 or 68 is activated. It creates the "STARTING 3-D IMAGE OBJECT SHOW APPLICATION" label of FIG. 72, plays a sound effect audio file, and calls tdiObjShow.txt, as depicted in FIG. 104.

Method "cpFiles( )," on lines 4587 to 4606, copies files. Method "_tabComplete( )," on lines 4608 to 4653, provides a tab completion feature.

Lines 4655 to 4684, "mkUnkShwDict( )," creates an unnamed show database entry based on currently available settings.

Methods "_nonSelect( )," "_hueSelect( )," and "_rdmSelect( )," on lines 4686 to 4717, bind to blatant auxiliary activation keys for the checkbuttons of FIG. 61. Similarly, methods on lines 4719 to 4767 activate checkbuttons of FIG. 5. Lines 4769 to 4777 define methods that activate the checkbuttons of FIG. 3. Lines 4779 to 4782 activate the checkbutton of FIGS. 40 and 70. Lines 4784 to 4807 invoke the checkbuttons of FIGS. 39 and 69. Lines 4809 to 4825 are for checkbuttons of FIGS. 37 and 68. Lines 4827 to 4835 implement blatant auxiliary activation keys for checkbuttons of FIG. 11. Lines 4837 to 4855 assist checkbuttons of FIGS. 7 and 8.

Method "chooseFolder( )," on lines 4860 to 4974, creates the dialog boxes of FIGS. 4, 41, and 42.

Lines 4979 to 5150 describe method "initFolder( )," which creates the page of FIG. 3. The page of FIG. 45 is created by method "initSelect( )," on lines 5155 to 5196. Method "initTdis( )," on lines 5201 to 5250, creates the page of FIG. 46.

Lines 5252 to 5267 define method "mkTdiDbMap( )," which creates an index of tdiObjectDb.txt in a variable called, "self.tdiDbMap." It also returns names of shows within the three-dimensional image object database file.

Method "mkTdi( )," on lines 5272 to 5532, creates the page of FIG. 47.

Method "fvrListCmd( )," on lines 5537 to 5542, re-highlights a file in the favorites listbox of FIG. 49 and calls method "fvrCmd( )." Lines 5702 to 5713 specify fvrCmd( ), which updates a favorites listbox index, "self.fvrLbi," and sets a "self.useFvr" variable. Double-clicking a file in the listbox, via line 7342, calls method "_fvrCmd2( )," defined on lines 5698 to 5700. It calls fvrCmd( ) and then opens the dialog box of FIG. 50 by calling method chooseFace( ).

Method "_listCmd( )," on lines 5544 to 5564, works on listboxes of FIGS. 47 and 65, which display names of three-dimensional image objects. It re-highlights a name and updates either a label or a listbox index.

Method "tdfPreview( )," on lines 5569 to 5605, presents previews of images assigned to three-dimensional image object faces, such as in FIGS. 51 and 54. It runs when the upper preview button is activated. Method "fvrPreview( )," on lines 5610 to 5652, presents previews of images from the favorites list, such as in FIG. 52. It operates when the lower preview button is activated. Both preview methods call method "shwPvwImg( )," defined on lines 5654 to 5693, which resizes an image, saves it to "gif" format, and creates "self.image" on line 5693. The self.image is displayed using a label widget, (see lines 5579 to 5587 or lines 5629 to 5637).

Lines 5715 to 5783 cover methods splash1cmd( ), splash2cmd( ), "splash3cmd( )," and "rmSplash( )," which create and remove the sign-off messages of FIGS. 101-103 as discussed earlier in connection with the finishExit( ) method.

Methods "shwImpVoxRename( )" and "shwImpSngRename( )," on lines 5785 to 5799, implement modifications provided by the "'Imported Audio' folder has vocal recording" and "'Imported Audio' folder has song" checkbuttons, respectively, of FIGS. 39 and 69. Similarly, lines 5801 to 5818 define method "tdiImpPhoRename( )," which makes modifications for the "'Imported Photos' folder has photos" checkbutton of FIGS. 39 and 69.

Method "getTdiObject( )," on lines 5820 to 5826, uses self.tdiDbMap index to return an object database entry from tdiObjectDb.txt.

Method "labelsCmd( )," on lines 5831 to 6012, update the three-dimensional image object labels of FIG. 47.

Lines 6017 to 6068 define method "chooseHue( )," which creates the dialog box of FIG. 60.

Lines 6073 to 6185 specify method "editTxt( )," which creates the page of FIG. 63. Methods "cancelTxt( )" and "saveTxt( )," on lines 6187 to 6228, implement functions of the cancel and save buttons of FIG. 63, respectively.

Method "initTxt( )," on lines 6233 to 6389, creates the page of FIG. 62.

Text Objects

Method "mkTxos( )," on lines 6396 to 6464, makes text objects when the update button of FIG. 62 is activated. It plays a sound effect audio file and displays the "PLEASE WAIT" labels of FIG. 64. It calls mkTxoImgs.txt as depicted in FIG. 104, and then method txoUpdDb( ).

Similarly, method "autUpdTlos( )," on lines 6466 to 6549, displays "AUTO-UPDATING TEXT OBJECTS" and "PLEASE WAIT" labels, (not depicted, but discussed with FIG. 68). If TextList.txt is newer than TextImage00001.png, it calls mkTxoImgs.txt and then method txoUpdDb( ).

Method "initRule( )," on lines 6554 to 6626, creates the page of FIG. 61.

Method "initChoreo( )," on lines 6631 to 6845, creates the page of FIG. 11.

Method "initVoice( )," on lines 6850 to 7019, creates the page of FIG. 7.

Method "initSong( )," on lines 7024 to 7193, creates the page of FIG. 8.

Method "initHue( )," on lines 7198 to 7284, creates the page of FIG. 59.

Method "initFace( )," on lines 7424 to 7611, creates the pages of FIGS. 49, 53, and 55-58. It calls method "fvrView( )," specified on lines 7286 to 7422, to create the favorites list listbox and associated preview, clear, and delete buttons. Methods "initFront( )," "initRight( )," "initBack( )," "initLeft( )," "initTop( )," and "initBottom( )," on lines 7616 to 7653, interface to method initFace( ) for three-dimensional image object face buttons of FIG. 47.

Methods "tdfClear( )," and "fvrClear( )," on lines 7658 to 7686, remove image previews for three-dimensional image object faces and favorites list line items, respectively. They run when the upper and lower clear buttons, respectively, of FIG. 49 are activated. As a convenience, when a preview image is displayed, they also run when the escape, "esc," button is pressed, (lines 5594 and 5642).

Method "fvrDelete( )," on lines 7688 to 7732, deletes a line item from the favorites list listbox and from FavoritesList.txt when the lower delete button of FIG. 49 is activated.

Lines 7737 to 7806 define method "copyName( )," which executes when the copy button of FIG. 47 is activated. Likewise, lines 7811 to 7862 define methods "renameName( )" and "deleteName( )," which implement rename and delete button functions, respectively, of FIG. 47.

Lines 7867 to 7869 define method "chooseName( )," which creates the text entry widget box of FIG. 48, when the name button is activated. Methods chooseName( ) and renameName( ) create text entry widget boxes using a common method named, "nameEntry( )," defined on lines 7871 to 7922.

Lines 7924 to 7941 specify method "lbxHighlight( )," which highlights a listbox line for listboxes of FIG. 37, 47, or 68.

Method "addShwObject( )," defined on lines 7943 to 7952 adds a show database entry to medleyDb.txt or selectDb.txt.

Method "addTdiObject( )," defined on lines 7954 to 7960 adds a three-dimensional image object database entry to tdiObjectDb.txt.

Method "_finishName( )," on lines 7962 to 8047, closes the text entry widget box of FIG. 48, and processes its three-dimensional image object name.

Method "mkPicks( )," on lines 8052 to 8224, creates the page of FIG. 65.

Lines 8229 to 8240 define method "strFresh( )," which removes all three-dimensional image object names from the right listbox of FIG. 65 when the "start fresh" button is activated.

Lines 8245 to 8270 specify method "subCmd( )," which removes a single name from the right listbox of FIG. 65 when it is clicked on, or when it is highlighted and the "return" key pressed.

Lines 8275 to 8294 define method "addCmd( )," which adds a single name to the right listbox of FIG. 65 when it is clicked on in the left listbox, or, in the left listbox, it is highlighted and the "return" key pressed.

Lines 8299 to 8709 define methods "dirTutorial( )," "dirTopFloor( )," "dirExeSui1( )," "dirExeSui2( )," and "dirExeSui3( )," which display a "directory tree structure" tutorial, (not depicted). It represents one of the menu choices on a subsequent page, (not depicted), that appears when the "help files" button of FIG. 1 is activated.

Methods "_magnify( )" and "_demagnify( )," on lines 8711 to 8793, substitute larger or smaller font sizes within text widget windows, such as of FIGS. 62 and 63. Font size grows when keys "control"-then-"=" (together) or "control"-then-"shift"-then-"+" (together) are pressed. Font size shrinks when keys "control"-then-"−" keys (together) are pressed.

Lines 8798 to 9057 define methods "qAndA( )," "cmd-Keys( )," and "initHelp( )," Method initHelp( ) creates the menu choice page, (not depicted), when the "help files" button of FIG. 1 is activated. A button on that page calls method qAndA( ) to display help file, "qAndA.txt," (also not depicted). Another button on that page calls method cmdKeys( ) to display help file, "cmdKeys.txt," incorporated into DETAILED DESCRIPTION section, under "SECOND INDIVIDUAL REAL-TIME DIRECTION INPUTS" heading.

Cuestage.Txt

Line 7, a usage statement, indicates a Tcl/Tk Wish application, "wish8.5," is called to provide a widget environment. Subunit cueStage.txt may be called with or without a pathname. A full pathname sets variable, "proDir," (for program directory) unequivocally, (see lines 34 to 61). Brackets signify optional parameters. However, there is an expected order. If a first parameter is missing, a second and third should be absent as well. An audio or video file may be included as first command line parameter, otherwise default "missing.mp3" is substituted, (see lines 64 to 66). A second parameter reveals a cueStage.txt subdirectory where cache files from a previous initial individual real-time direction session are stored, (see FIG. 107). Variable "newDir" saves the subdirectory, (see line 24). A third parameter, stored as variable, "loadOnlyFlag," (see line 31), is expected to be either 1 or 0. If set to 1, cueStage.txt regenerates cache files cue_3.txt and cue_5.txt, (and their stored copies), and closes. It is used to import export text files, (i.e. .bsm and .bss files). The two cache files are left out of export text files to reduce file size. Smaller files are easier and cheaper to share, using less bandwidth to transport electronically.

Line 9 is a window manager command that sets a window title.

Line 11 clears variable "debug." If it is set instead, (see line 10), extra commentary is reported for some errors.

Line 17 effectively escapes all spaces within the name of the song file with a double-backslash to prevent errors when using it later.

Upon startup, "finishLoad( )" procedure is called, (see line 5489), which defines cue touch items from cache files in proDir or stored in newDir. Line 25 sets "iniCstFlag," (for initialize custom), which tells finishLoad( ) to use newDir (lines 4212 to 4214).

Line 31 sets the loadOnlyFlag if a "1" is found on the command line for the third parameter. Lines 5492 to 5496 close cueStage.txt after procedure finishLoad( ) has finished.

Lines 34 to 61 determine proDir. Line 46 sets proDir to "present working directory," (pwd), since variable "argv0" starts with "./". If cueStage.txt is called from a parent directory, then by line 48, proDir contains an appended subdirectory path, (i.e. argv0 starts with "./<subdirectory path>/"). Line 53 is the same as line 46 because a Tcl interpreter sets the directory name to ".". Line 55 is similar to line 48 because argv0 starts with "<subdirectory path>/". Line 60 doesn't use the pwd command because argv0 contains a full pathname.

Line 65 sets variable "song" to missing.mp3 if a first parameter is either not specified or not found, (though named).

Reading Default Values from Strvars.Txt

Lines 68 to 248 retrieve default values for many variables from strVars.txt, as depicted in FIG. 104. Keeping these values in a separate file allows a company to release a binary version of the buildShow.txt embodiment, yet still allow changes of strVars.txt. A business may use standard encryption techniques to protect its ability to exclusively modify strVars.txt. A customization service may then be offered. The first token of each line corresponds to an initial value for a variable. If the file is missing, then a "catch" command on line 68 returns a nonzero value, causing an early exit on either lines 244 or 246. If a line is missing within the file, (or is blank), then variable "svrProb," (for strVars.txt problem), is set, leading to an early conclusion on either lines 234 or 236. For an actual debug session, lines 234 and 244 may be easily commented-out, to continue a flawed run regardless.

Line 261 sets number of pixels per point from variable "sclFactor".

Line 262 sets window size and location to a value stored in variable "gemSpec," for one embodiment. A typical character string, "770×490+80+80," indicates a window size of 770× 490 pixels, 80 pixels from left edge of display and 80 pixels from top edge. Lines 263 and 264 store width and height information from gemSpec into separate variables, "gemW" and "gemH".

Lines 265 to 363 initialize variables. A "pack" command on line 269 yields a colored background or "canvas," with a Tk pathname, ".c." The color is given by variable "bkground." A "." in Tk pathnames refers to the root or roof of a full path. The canvas is equivalent to a top floor, or level 0. Variable "active" starts as a list with its first entry a period, ".", on line 272. Variable "disable" prevents confusion when the user opens a text entry widget box. Other buttons and keyboard bindings are temporarily disabled while the text entry widget box is active. Dictionary variables "bound0," "bound," "bound2," and "bound3," remember keyboard bindings for levels 0 through 3, respectively. They allow the user to go to a deeper level, creating a new set of keyboard bindings. Upon returning, previous bindings are restored automatically. Variable "trkList" holds raw user-specified coordinates for a custom track while procedure "drawTrack( )" is active. Variable "trkListP" is a standardized (i.e. "prime") version of trkList. It is created by procedure "limitTrack( )" and stored in cue_4.txt. It is used internally by procedure "mkTrack( )," (for make track), and externally by tdiObjShow.txt, as depicted in FIG. 107. Variable "trkDrwFlag" allows drawTrack( ) to tell a more primitive "startDraw( )" procedure to initialize a new trkList, (i.e. if it's 0). Variable "oc" enables use of procedure "goLoop( )" for both the level 0 page of FIGS. 13-22 and the full screen playback page of FIGS. 33-36.

Calling Mplayer Application

Variable "cmd," (line 528), contains a string of characters that is normally entered on a shell command line to activate open source program Mplayer. Variable "mplApp," read from "config.txt" file on line 324, contains a full pathname for "mplayer." An "open" command, (line 536), effectively executes the shell command. Variable "mplayer" stores a handle to the mplayer session. Variable "ffwTime," (lines 357, 528), represents a number of seconds to fast-forward into an audio or video file, in case initial individual real-time directions are being tacked-on to a previously saved recording. An "fconfigure" command, (line 537), sets the mplayer pipe to be nonblocking and line buffered. Such settings allow mplayer communication using Tcl command "puts," (for put string). A "fileevent" command, (line 538), makes sure nothing is done in case the mplayer application sends data through the pipe.

Averaging Real-Time Performance

Lines 365 to 444 define procedure "kiloAvg( )," which initializes variable "divisor" on line 455. Timestamps from Tcl command "clock" help record initial individual real-time directions. For playback, Tcl command "after" pauses cueStage.txt for a specified number of milliseconds. The divisor variable converts from timestamp units to millisecond units. Because a CPU may be heavily loaded, causing real-time behavior to be slower than expected, kiloAvg( ) averages up to 1,000 real-time tests for what divisor should be, which is a reasonable attempt to achieve some error correction for those machines that are regularly stressed. That is, many tests are taken as a group to avoid over-correcting if the processor happens to be overly tasked on just one or two occasions. Each new session of cueStage.txt runs another test, (i.e. an "Nth" test), leading to test result "divisorN," (line 454), which is used as a parameter to kiloAvg( ). Test results are stored and updated in the file named "divSmp.txt" (line 374). An average of available samples (up to 1,000) is returned by kiloAvg( ) (lines 384, 386, 438, 440, or 442).

Index Coordinates for Circular Path of FIG. 13

As discussed after introducing FIG. 110, sine and cosine functions may be used to pre-calculate 256 evenly spaced positions around a circle. From lines 457 to 477 a "posCoords" list is created which contains a double-set of 256 positions—the (x1, y1) set and the (x2, y2) set. It defines the circular path of FIG. 13 and the size of its circle objects. Line 473 indicates each x2 is "ovlSize" pixels to the right of each x1; line 474 indicates each y2 is ovlSize pixels below each y1. With Tk, (i.e. Wish), an abscissa increases from left to right; an ordinate increases from top to bottom. Each entry of posCoords list is perfect for Tk commands "create oval" and "coords." They use two sets of coordinates to delimit an oval, (or circle). Line 465 defines variable "ovlPos" to be a set of integers from 0 to 15 which represent 16 evenly spaced positions around a circular track. As depicted in FIG. 110, an ovlPos of 0 is on top; ovlPos of 15 is to the left. Interposition distance between each ovlPos is kept track of by variable "ovlIPos," defined on line 466 to be a set of integers from 0 to 15 as well. As ovlIPos and ovlPos increment, they choose indices around the track in a clockwise fashion; as they decrement the choices rotate counterclockwise. Equations for x1 and y1 on lines 470 and 472 represent a circle with a radius of 110 pixels and a center at (555, 180).

Lines 478 to 482 are more variable initializations. Variables ovlPos and ovlIPos are set to choose the top position of the circular track. Variable "mtrPos" counts full beats, (i.e. both phase 1 and phase 2). Variable "ovlPosStart" remembers a position that is current when an initial individual real-time direction is given. Variable "index" converts a pair of ovlPos and ovlIPos numbers into a single integer from 0 to 255, (by multiplying ovlPos by 16 and adding ovlIPos, see line 468). They are initialized to zero.

Line 484 initializes variable "rtuPhase," (for rotate update phase). It stores a current phase. Variables "rtuPhs1Thresh" and "rtuPhs2Thresh" hold timestamps that indicate when a beat should transition to phases 1 and 2, respectively. Since, rotation (i.e. object motion) is initially off, neither phase 1 nor phase 2 are relevant. The two threshold variables are initialized to non-timestamp values, (i.e. negative real numbers, "−60e30"), for clarity.

As explained with FIG. 109, variables xi 8 and kappa 9 are read from strVars.txt. Variables "xiKappa" and "invXiKappa" are calculated on lines 488 and 489. As mentioned with example 6 of FIG. 108, for one embodiment, kappa is 4.0, signifying a faster phase is four times quicker than a slower phase. For one embodiment, xi is 1.0, indicating the faster phase endures for as long as the slower phase. Hence, the faster phase takes up 4/5 of a beat segment, while the slower phase uses 1/5 of it. See lines 597 and 598 and note that, for the example, (1+xiKappa)=5 and (1+invXiKappa)= (1+1/4)=5/4. One embodiment uses the faster phase for phase 1 and the slower phase for phase 2. However, a different embodiment could use the slower phase first.

Variable "newPhs1," line 491, indicates that a new beat is about to commence when set to 1. Interestingly, if an initial individual real-time direction interrupts a beat, a reset variable, "rstPhs1," is set, which in turn activates newPhs1 upon a next iteration of goLoop( ). When rtuPhs2Thresh is given a negative real number on line 4763, thanks to rstPhs1 being 1, then line 4766 will be bypassed in favor of line 4779. Similarly, because rtuPhs1Thresh is given a negative real number on line 4764, line 4781 is accepted, and goLoop( ) uses code it would normally use if a previous beat were timing-out normally and a next beat were being set up, including setting newPhs1 to 1 on line 4791.

For one embodiment, definitions for each cue touch item are numbered 1 through 4. Variable "dowNum," (for window number), stores this number when procedure "setRot( )," (for set rotation) is called. Another embodiment may have more or fewer cue touch items.

When a summary window is colored bright pink, it tells the user which cue touch item is active, and moreover, it also informs cueStage.txt itself! Specifically, when a cue touch item is activated, it calls procedure "cueRot( )," (for cue rotation), which in turn calls setRot( ). It checks to see if the cue touch item is already active by inspecting the foreground color of its summary. Variable "lastX" provides a secondary mechanism that is more reliable in case all cue touch items are momentarily deactivated by the rotate button of FIG. 13. When rotation is turned back on, lastX may help distinguish between two otherwise identical definitions, (see relevant parts of procedure "toggleRot( )," (for toggle rotation), lines 4714, 4718, 4722, and 4726). On line 492, lastX is initialized to 0 to indicate that no cue has yet been active.

If cue touch items are inactive because rotation is off, rotation location variable "rtLoc" is assigned a character string, "wings." If a cue touch item is active because rotation is on, rtLoc is assigned, "stage." On line 495, rtLoc is initialized to "wings," because rotation is off.

Three procedures, cueRot( ), setRot( ), and "dowCmd( )," (for summary window command), are defined before main screen widgets, because some widget definitions reference them. Lines 497 to 509 define cueRot( ). It is called when the mouse cursor enters the vicinity of a cue text widget touch item, (see lines 1244, 1246, 1248, and 1250), a blatant auxiliary activation key is pressed, (see lines 1215, 1217, 1219, and 1221) or potentially when an even entry of variable "plaList," (for play list), is evaluated, (see lines 4385, 4397, 5071, and 5239). Variable "rotCurrent," (for current rotation), represents a stage for a cue touch item. "Going on stage," to a cue touch item basically refers to copying its definition to rotCurrent. Variables "rotDow1" through "rotDow4," (and therefore rotCurrent), are all structured lists that contain individual specifications for each cue touch item. After updating rotCurrent, cueRot( ) then calls setRot( ), defined on lines 511 to 690.

Refresh Time

Variable "refTime," (for refresh time), is initialized by strVars.txt, (see line 154). It contains how many milliseconds cueStage.txt waits between goLoop( ) calls, (see lines 5108 to

5114). Procedure setRot( ) scans rotCurrent and sets various control variables. Procedure goLoop( ) continuously interprets these variables and updates the display. Procedure setRot( ), if appropriate, also saves a record of each cue touch item activation, (i.e. initial individual real-time direction), and its timestamp within variable "cueList," (see lines 569 to 571). Furthermore, it colors cue touch item summaries, (see lines 683 to 688).

Procedure "rebuildLists( )" is called during a start, load, or save, (see lines 5489, 4283, 4053). Procedure "rstHold( )" is called during a restart. Variable "newLoad" is set by rebuildLists( ), (line 4497), and rstHold( ), (line 1641). It is cleared by setRot( ), (line 564), toggleRot( ), (line 4699), and "toggleLts( )," (for toggle lights), (line 1442).

Procedures setRot( ), toggleRot( ), and toggleLts( ) help record initial individual real-time directions by updating variable cueList with an appropriate input mnemonic and timestamp. However, if variable "cueLock" is set, then cueList is "locked," indicating modifications are forbidden. The procedures can perform their other tasks without affecting a recording.

When cueStage.txt is replaying initial individual real-time directions, variable "plt2Threshold" contains a timestamp indicating when a next plaList command is to be interpreted (see lines 5069 and 5071). Play mode is disabled when plt2Threshold is set to 60e30, a real number representing a timestamp for the year, 1.9e18 or 1.9 billion, (i.e. 60e30 microseconds from the year 1970).

Line 525 of setRot( ) evaluates true, if cueStage.txt is set to record initial individual real-time directions, but has not begun. Recording is enabled when cueLock is 0 and plt2Thresh is 60e30. Activating an initial individual real-time direction input calls setRot( ), toggleRot( ), or toggleLts( ), eventually clearing newLoad, as discussed above.

Hence, lines 526 to 567 enable changes just before a first initial individual real-time direction is recorded. Lines 526 through 542 load and pause an audio or video file. If a cueStage.txt subdirectory is not specified as a second command line parameter, then iniCstFlag is zero and cueList has one starting entry, (see lines 4285 through 4287). The timestamp of that starting entry is replaced by line 545. Lines 546, 547 start the audio or video file playing from its beginning. Initial individual real-time directions are already stored in cueList if a cueStage.txt subdirectory is specified on startup, or a save or a load has successfully completed. Therefore, because procedure "finishSave( )" needs to resynchronize old timestamps with newly appended ones, a "skip" mnemonic and timestamp are appended on line 559. Lines 560, 561 start the audio or video file playing from where it left off, thanks to nonzero ffwTime, (see lines 528, 532, and 4495).

As rebuildList( ) rebuilds plaList after a save or load, it tracks whether rotation is on or off with variable "lastRot," (lines 4403 to 4414). It tracks lights with variable "lastLts," (lines 4415 to 4426). Line 553 turn lights on or off and line 556 turns rotation back on if plaList and cueList mandate it. (Procedure goLoop( ) automatically turns rotation off after a performance by calling haltMotion( ), (line 5086)).

Line 566 colors the play button of FIG. 13 light gray, or whatever color is stored in variable "wngColor," (for "in the wings" color). It also changes its cursor to a pointer. The play button is disabled while initial individual real-time directions are being recorded.

Cue Touch Item Summary Definitions

For one embodiment, as discussed with FIG. 13, each cue touch item summary displays a time signature, rotation direction, and tempo. Lines 730 to 732 of dowCmd( ) bring up a bitmap image for a time signature. Lines 735 to 737 generate the rest. Both commands specify widget tags. For example, line 736 includes variable "dow," (first parameter of dowCmd( )), as a first of three tags. Variable dow could be any of four strings, "rtd1" through "rtd4" depending on which cue touch item is pertinent. Line 574 references one of these tags in its "itemcget" command, (i.e. "rtd$dowNum" represents a concatenation of two strings, "rtd", and variable dowNum, to check color of an appropriate summary.

A bright pink color, "stgColor," (for stage color), and a lastX match, denote a consecutive setRot( ) call for a same cue touch item. For one embodiment, object positions are reset by calling procedure "rstPosition( )," (line 575), and finishing early, (line 577), since other control variables are in place already.

Line 579 updates lastX.

Lines 580 to 581 scan rotCurrent, converting its contents into individual control variables. A numerator of a time signature is assigned to "mtrX," a denominator to "mtrY." Legato flow implies "rotSmooth" is 1. Staccato flow signifies rotSmooth is 0. If legato flow comports, then "rotCmprt" is 1. If it overlaps, then rotCmprt is 0. If a clockwise bearing is chosen, "bearing" is "cw." Variable bearing is "ccw" if counterclockwise rotation is selected. If the tempo is 100 quarter beats per minute, then variable "qbpm" is 100.

Line 582 sets "mtrPosTotal" to mtrX, because a numerator of a time signature gives total number of beats per bar. Line 583 resets mtrPos, a current beat count, to 0.

Staccato, Legato Flow

Lines 584 to 592 set up staccato style rotation, (i.e. object motion around a circle). Lines 594 to 678 prepare for legato flow. Staccato is simple—there is one phase, ("rtuTime2" and "rtuPeriod2" are zero), and one update per beat. Each "rtuTime1," (rotate update time for phase 1), ovllPos is incremented by "ovllPosDelta1" and ovlPos is incremented by "ovlPosDelta1." Since there is one update per beat, "rtuPeriod1" equals rtuTime1. Variable rtuTime1 represents the number of milliseconds per beat. Its equation on line 589 is derived, for one embodiment, by rearranging the following: (60,000 milliseconds/minute*4 quarter beats/whole note)/ (tempo*mtrY). Variable qbpm stores tempo in units of quarter beats per minute. Variable mtrY is a number of beats per whole note (from a time signature denominator). The numerator of the above equation has units (ms/min*qb/wn) and its denominator has units of (qb/min*b/wn), leaving ms/b, or milliseconds/beat, after cancellation.

An equation on line 585 for ovllPosDelta1 indicates, for one embodiment, 256 interpositions represent a whole note or complete trek along a circle, or any path representing a bar of music. A modulo function is used to throw away that part of the path that is taken care of by ovlPosDelta1, where each increment represents 16 interpositions. Lines 586 and 588 negate corresponding deltas to effect a counterclockwise bearing.

As discussed with FIG. 109 and lines 488, 489, equations on line 596 to 598 help specify legato rotation, (compare to equations 11, 16, and 17, FIG. 109). Equations on lines 589 and 599 are identical. However, line 599 does not truncate the result to an integer and assign it to rtuTime1. Instead, it saves it as a real number to "msPerBeat." Recall that xi=TF/TS, a ratio of a faster phase time period over a slower phase time period. Hence, TF=xi*TS. For one embodiment, each beat is made up of a slow and fast phase, or msPerBeat=TF+TS. Variable "msPerPhsSlow," (i.e. TS), on line 600 takes advantage of these relations. For one embodiment the slower phase corresponds to the second phase, leading to line 601. On line 602, msPerPhsFast is initially assigned whatever is leftover after the the slow phase takes its share from the beat time.

However, before committing, a test is performed to see if it makes sense to split the beat into two phases. That is, is the beat time long enough to resolve two phases effectively? For one embodiment, "minUpdate," a delay before an index updates, is stored as 50 milliseconds within strVars.txt. If the time period for the fast phase isn't at least twice minUpdate, then line 603 is accepted and lines 604 to 607 enforce one phase per beat.

Because a millisecond is a practical resolution limit for scheduling a multi-tasking central processing unit, (as suggested by Tcl command "after"), and because motion pictures (i.e. movies) use 24 frames per second, or one each 41.7 milliseconds, it's appropriate to digitize object movement in terms of integral numbers of milliseconds and interposition indices. Interpolation may further smooth object travel. For one embodiment implementing a "comport" option, digitization rounding error is handled by defining a limit position and stopping a motion if it is reached before beat's end. For one embodiment, since the slower phase is second, any slight halting blends right in. For one embodiment, a tremolo or "fuzzy stop" option makes objects hop among a range of positions around a limit position, if it's reached. Another embodiment could add the effect to staccato flow or even no movement.

In general, a smooth flow is achieved with a large number of small updates. However, there is a practical limit to the short update time, minUpdate. Also, there is a digitization constraint that an interposition increment, or delta, be at least one index. For very slow moving beats, (i.e. objects transit a small number of indices over a long time period), an update each minUpdate, as calculated on lines 618 and 623, could lead to interposition deltas less than one index. Interposition deltas are calculated on lines 627 and 628 and tested on lines 633 and 637. If a test fails, then the delta is set to one interposition index, (lines 634 and 638). Also, the update time is increased by reducing the number of updates to just the integer number of interposition indices within the phase, (lines 635 and 639). Hence lines 643 and 644 calculate update times greater than or equal to minUpdate (or zero for line 644 if phase 2 is cancelled).

After update times, rtuTime1 and rtuTime2, are finalized on lines 643 and 644, the deltas are converted from their theoretical real values to their best integer approximations. Cumulative rounding errors are taken into account. That is, phase 1 delta is rounded down. Otherwise, if it's rounded up, there may be no interpositions left in a beat for phase 2 travel! Phase 2 then, because path length for phase 1 may be slightly less than the theoretical value, inherits any unused interpositions from phase 1, called an "accumulated deficit," or "accDef," on line 649. Phase 2 is rounded up, and for one embodiment, any excess interpositions are, (if the comport option is enabled), thrown out, the motion briefly halted at the theoretical end-of-beat boundary. An extra amount is called an "accumulated surplus," or "accSrp," on lines 654 and 655. The phase 2 delta is tested, in brute-force fashion, from lines 658 to 663. The code checks whether phase 2 delta can be decreased and still maintain a positive surplus. That is, it attempts to decrease the surplus in order to increase normal phase 2 motion, for one embodiment. Another embodiment may seek to increase the surplus to allow more time to accentuate the fuzzy stop effect, for example.

Lines 665 and 666 negate interposition deltas if counterclockwise movement is specified. Lines 667 and 669 set position deltas (i.e. to zero for slow beats). Lines 668 and 670 negate them for counterclockwise motion. Lines 673 and 674 calculate phase periods as exact integer multiples of their update times. If the comport option is selected, "incPos" is set to an integer number of positions per beat. As previously explained, one embodiment uses 16 positions per whole note. Variable incPos is used at the beginning of a beat to determine "lmtPos," a theoretical end-of-beat boundary (see lines 1503, 4860, 4862, 5324, and 5326). It is negative for counterclockwise movement.

Line 680 effectively resets ovlPosStart to a current ovlPos, as calculated on an ongoing basis by goLoop( ). Variable ovlPosDelta1 is subtracted to compensate for goLoop( ) adding it on a next upcoming run, before refreshing the display, (on line 4879). On the next iteration of goLoop( ), ovlPos is set to "itself-minus-ovlPosDelta1", (i.e. ovlPosStart), on line 4853. Variable mtrPos is reset to 0 on line 583. Variable rstPhs1 is set to 1 on line 682. Therefore, rtuPhase is set to 1 on line 4782, newPhs1 is set to 1 on line 4791, and mtrPos is updated to 1 on line 4851. (Variable mtrPosTotal is generally greater than 1). Line 4854 sets "startZeroIPos," ensuring that a new beat starts off at interposition zero via line 4877. Procedure toggleRot( ) initializes mtrPos to 1 (i.e. instead of 0 like setRot( )). By doing so, when rtLoc is reset to "stage," objects don't suddenly jerk, ensuring a smooth off-on transition. That is, because mtrPos is updated to 2 or 0 on line 4851.

Setting "rtt2Threshold" to a negative real number on line 681, ensures that it is less than any actual timestamp. It thus activates lines 4751 to 4965 of goLoop( ). Line 682 resets a beat to the beginning of phase 1 by setting variable rstPhs1, as explained earlier with reference to line 491 and newPhs1.

Initial Individual Real-Time Directions

In a nutshell, setRot( ) scans cue touch item definitions and updates control variables that goLoop( ) uses to implement initial individual real-time directions. Procedures toggleRot( ) and toggleLts( ) operate similarly. Other embodiments can reduce processing overhead by storing and recalling more calculations, instead of computing them each time an initial individual real-time direction is given or played back.

Procedure dowCmd( ) is defined from lines 692 to 748. Generally, when a style item or tempo is chosen from a menu of FIGS. 14-18, a global variable is set. Then dowCmd( ) is called, to update a cue touch item summary definition.

As depicted in FIG. 13, lines 750 to 786 create two text widgets, "IN THE WINGS" and "ON STAGE," and two button widget menu items, "PLAY (5)" and "ROTATE (r)." Foreground color for the play button is light gray, wngColor. The button is disabled because no initial individual real-time direction session is yet loaded. Foreground color for the rotate button is green, from variable "frground." The button is enabled on startup.

Lines 787 to 994 setup menus for the style and tempo buttons of FIG. 13. A first menu of either button executes a "postcommand" before it appears. By calling procedure "escCmd0( )," any open menus are first closed, (see lines 806 and 935). Line 936 "posts" the menu of FIG. 17, (for the tempo button), away from cue touch item default locations, (i.e. to upper-left coordinates (80, 187)). The menu is posted if the mouse button is released while still over the tempo button, (i.e. without making a selection).

Line 793 creates a "for" loop which iterates four times, establishing the style and tempo buttons of FIG. 13 and their corresponding menus. A different embodiment that uses fewer cue touch items, reduces the "5" on line 793. An embodiment establishing more cue touch items, increases the "5."

Lines 995 to 1011 create the corresponding cue text widget touch items of FIG. 13. Each cue text widget tag that begins with "rtc," binds it to a different cueRot( ) call when the cursor enters its vicinity, (see lines 1244, 1246, 1248, and 1250). Tag "tgc" binds each cue touch item to identical "startTug( )" and "tugWidget( )" calls when the mouse clicks on and moves it, respectively, (see lines 1240 and 1242). Procedures start Tug( ) and tugWidget( ), (lines 1384 to 1403), allow the user to move cue touch items anywhere within the cueStage.txt window for best timing effect.

Lines 1015 to 1138 create the rest of the widget buttons and text on the main page of FIG. 13.

Circle Objects

Lines 1139 to 1189 create 16 invisible circles, using the posCoords list described above. The circles are invisible because they are filled with a background color, from variable bkground. For one embodiment, the first six circles described by even positions are later filled with rainbow colors red, orange, yellow, green, blue, and violet. They constitute a group or pattern of objects. Another embodiment may use a different set of positions and colors. Another embodiment may incorporate additional selection menus and cue touch items, similar to those for rotation, to choose multiple patterns and colors and to switch between them. An embodiment might associate color choices with a particular pattern or have it apply to all patterns as an independent choice of its own or a combination. Another embodiment may provide sets of dynamic patterns and color palettes that automatically switch at specified tempos. The tempos for the dynamic pattern and palette sets could run independently or synchronize to the rotation tempos. If synchronized, an embodiment could allow the user to set delays for when to switch groups and palettes relative to the beat. If synchronized, rotation cue touch items could switch the tempos of the dynamic sets, even if rotation (i.e. movement) were off. Another embodiment may provide different shapes other than circles. It could use diamonds, squares, ovals, trapezoids, other geometric shapes, custom bitmaps, or a combination. It could use standard or custom images.

Lines 1190 to 1202 update coordinates of the cue touch items with most recently used values from crdLatest.txt. The values in crdLatest.txt are refreshed when an initial individual real-time direction session is saved, (see lines 4100 to 4127). If a cueStage.txt subdirectory is specified as a second command line parameter upon startup, the crdList.txt values are overwritten with those from the stored cue_2.txt cache file, (see FIG. 107, lines 4198, 4216 to 4226).

Blatant Auxiliary Activation Inputs

For a mouse, a widget is inaccessible as soon as its page is closed, or concealed beneath another page. The same is not true, however, for auxiliary activation keys, (blatant or otherwise). If a "bind" Tk command remains intact, a key can still call a procedure even though its button, (and an entire page), have been deleted. An auxiliary activation key could, if allowed, still activate a button, even if it's obscured from view. To avoid confusion, keyboard bindings are erased when a new page is created. New bindings are asserted. When the user returns, bindings are again deleted. The bindings for the previous page are then recalled and reinstated. Lines 1213 to 1251 take care of bindings for the level 0 page of FIG. 13. For each binding, dictionary variable bound0 gets a new entry. Each entry is identified by a dictionary "key" revealing an "event sequence" string. The entry itself equates to one or more commands and/or procedures being "bound." Lines 1253 to 1335 define procedure "removeBindings( )." It removes bindings for a most recent level, (1 through 3), and restores bindings for a previous level, (0 through 2). Procedure "unbindAll( )," on lines 1337 to 1378, just removes all bindings, regardless of level. Procedure "unk( )," (for unknown), (lines 1380 to 1382), is a do-nothing placeholder routine for erasing certain specific bindings.

Procedures startDraw( ) and "drawLine( )," (lines 1405 to 1434), pressed into service by drawTrack( ), (lines 2794 to 2831), allow the user to specify an arbitrary path for object movement.

Procedure toggleLts( ), (lines 1436 to 1496), toggles visibility of objects, as if switching stage lights on and off. Lines 1441 to 1483 are identical to lines 525 to 567 of setRot( ), discussed earlier.

Procedure rstPosition( ), (lines 1498 to 1506), sets ovllPos and ovlPos to their negative deltas, persuading goLoop( ) to reset object positions on a next cycle.

Reset/Hold, Start Buttons of FIGS. 13, 22

Procedure rstHold( ), (lines 1508 to 1643), resets cueList, plaList, and object positions. It halts movement and audio, (or video), if applicable. It toggles variable "holdStatus" and the reset and start buttons of FIGS. 13 and 22. An initial individual real-time direction session is interrupted and thrown out, if the reset and start buttons are activated. A new session begins following activation of a cue touch item, the rotate button or the lights button. For striking effect, as depicted in FIG. 22, when the reset button is activated, background color is set to red via lines 1530, 1621 to 1635. Tk command "itemconfigure," on lines 1631 and 1632, targets the circle objects by referring to their tags, (see lines 1187, 1752). Procedure rstHold( ) turns all 16 circles invisible. Procedure goLoop( ) restores the visible ones. When the start button is pressed, the "plaInit" list is re-initialized to ensure a correct start upon replay. To confirm that cueList and plaList are erased (and to toggle holdStatus back to 0 and normalize background color), rstHold( ) is called if the conclude or load buttons are pressed after reset button, but before start button. That is, list entries, potentially added during reset, are ignored.

A playback of initial individual real-time directions is interrupted with the blatant auxiliary activation key, "2," of the reset button, or the escape key, "esc," (see lines 1759 to 1764). A replay creates a new page and increments variable "level" to 1 (see lines 1728 to 1734). That page is removed and the level brought back to 0 by procedure "goBack( )," called within rstHold( ) on line 1596. Procedure "stdRestore( )," called on line 1598 and defined on lines 1645 to 1662, reestablishes the original posCoords list, allowing objects to form the standard circle of FIG. 13, (see discussion above for lines 457 to 477).

Variable disable, on line 1673, prevents procedure "playCmd( )," (lines 1664 to 1851), from running if a text entry widget box is present. Thus, for example, the user should close a "mio meter . . . " tempo dialog box, containing a text entry widget box, as depicted in FIG. 18, before replaying an initial individual real-time direction session. Procedure "chooseMm( )," on line 4543, sets disable. Either procedure "finishMm( )," on line 4634 or procedure "escCmd0( )," on line 5168, clears it. Line 1674 ensures that when playCmd( ) runs, the play button of FIG. 13 is enabled, as per its foreground color.

Lines 1686 to 1689 interrogate line one of cue_4.txt to find variables "trkStyle," "trkDirection," "ww," and "wh." For one embodiment, when trkStyle is "standard," cueStage.txt uses a circular path, and tdiObjShow.txt deploys a rectangular edge path. A different embodiment could use different curves and/or additional options. Variable trkListP defines a track when trkStyle is "custom." As explained above, with reference to lines 265 to 363, limitTrack( ) creates trkListP from raw user data, trkList, collected by drawTrack( ). As depicted by the flowchart of FIG. 112, limitTrack( ) creates trkListP by reinterpreting trkList's curve with 256 equally-spaced coordinates, for one embodiment. These coordinates correspond to the 256 indices around the circle of FIG. 13, for one embodiment. A different embodiment may use a greater or lesser number of coordinates. Because tdiObjShow.txt relies on open source software packages, Python and Pygame, it uses a coordinate system whose origin is at the center of the window and whose ordinate increases in the up direction. However, cueStage.txt, invokes open source software packages Tcl and Tk, and their Wish application. Its coordinate system has an upper left corner origin with an ordinate that increases in the down direction. Since coordinates within cue_4.txt are native to tdiObjShow.txt, line 1699 converts them for cueStage.txt. Variables ww and wh represent full screen width and height, for one embodiment. They are read from "shwScreen.txt," generated by buildShow.txt, (see lines 249 to 259, 2517, 2518). Lines 1720 to 1727 expand the window size to full screen, for one embodiment.

When a new page or level is created, input bindings are erased, variable level is incremented, and variable active appends a new frame name. The frame is created. It is populated by a background canvas widget, (see lines 1728 to 1734). Because the new canvas hides the old one, lines 1735 to 1754 duplicate lines 1170 to 1189 to form new objects. Line 1755 sets variable oc to the name of the new canvas, allowing goLoop( ) to update the right (i.e. visible) set of objects. Lines 1771 to 1804, similar to lines 463 to 477, redefine the posCoords list for a larger screen size. Variable "plaIndex" is set to index 0 on line 1805, to point to the first entry of plaList. An audio or video recording is started via lines 1830 to 1847. Line 1849 turns on play mode via line 5069 of goLoop( ). When goLoop( ) has finished activating each plaList cue, line 5089 calls goBack( ) to reinstate the level 0 page and its bindings, as depicted in FIG. 13. Line 5091 calls stdRestore( ) to re-initialize posCoords, (compare lines 463 to 477). goBack( ) calls removeBindings( ) to erase level 1 bindings and re-establish level 0 bindings, (see line 3680). Line 3683 recalls the level 1 frame name from the end of the active list and destroys the corresponding page. Line 3684 pops the level 1 entry off the end of the list. Lines 3688 to 3704 restore the default screen size and location, while line 3705 points goLoop( ) back to the original set of objects on the level 0 canvas. Line 3778 decrements variable level back to 0.

When the up button of FIG. 13 is activated, or the escape key, "esc," is pressed, and no menus or text entry widget boxes are present, then procedure "finishExit( )," lines 1853 to 1868, is called. Because variable "upFlag" is set to 1, cueStage.txt exits with a status of 0, (see line 1865). If the exit button of FIG. 13 is activated, upFlag is cleared to 0 and cueStage.txt exits with a status of 1, (see line 1863). As cueStage.txt closes, control is returned to buildShow.txt, which checks the returned status and itself exits if it is 1.

Procedures "initLoad( )," (lines 1870 to 2071 and FIG. 32), "initSave( )," (lines 2073 to 2322 and FIG. 23), "impFolders( )," (lines 3035 to 3094 and FIG. 30), mkTrack( ), (lines 2494 to 2678 and FIG. 28) and drawTrack( ), (lines 2794 to 2831 and FIG. 29), create new levels, hiding prior pages. In each case, input bindings of the prior page are removed by calling unbindAll( ). Variable level is incremented by 1. Variable active appends a new frame name. The frame is created and filled with a canvas. Newly defined input bindings are added to the appropriate "bound" variable for the level. If no legitimate input bindings are called for, a fake one is added to the "bound" variable so that removeBindings( ) works as expected when the page is eventually closed. That is, removeBindings( ) deletes the fake binding and restores the bindings of the prior page. For the above routines, except drawTrack( ), the up and exit buttons are added to the page by calling procedures "upCmd( )" and "exitCmd( )," respectively.

Interestingly, upCmd( ), (lines 1018 to 1042), inspects level, (see lines 1037 and 1039), to determine which "bound" variable to use, since upCmd( ) may be called by overlapping pages. Likewise for exitCmd( ), (lines 1047 to 1080), (see lines 1075 and 1077). When an up button activates, goBack( ), (lines 3673 to 3781), generally calls removeBindings( ), destroys a current page, and takes care of bookkeeping for variables active and level. If a replay is ending, then window size is restored. If a save or load is finishing, object motion is halted and object positions are reset. A level of 2 implies that impFolders( ) or mkTrack( ) has finished and a return to FIG. 23 is in progress. Procedure goBack( ) re-highlights the listbox for convenience. A level of 3 implies drawTrack( ) is relinquishing control back to mkTrack( ) and FIG. 28. Procedure goBack( ) resizes the window from the full screen dimensions, for one embodiment.

Procedures "chooseMm( )," (for mio meter, lines 4532 to 4614), "chooseName( )," (lines 3269 to 3329), and "chooseSd( )," (for start delay, lines 3534 to 3575), introduce text entry widget boxes to their pages. The latter two first check whether their text entry widget box is already open, and if so, cancel it by calling removeBindings( ), destroying the widget, and clearing disable. That way, one activation opens, and a second activation closes. If a text entry widget box isn't posted, then each routine first checks variable disable and refuses any action if its set. Another text entry widget box is already open, awaiting a response. If disable is clear, then all input bindings are removed to prevent errors when the user types miscellaneous data into the text entry widget box. Of course, variable disable is set, to lock attention on the soon-to-appear text entry widget box. As previously discussed, for proper use of removeBindings( ) later, new input bindings are recorded in a "bound" variable that normally corresponds to a next higher level. For example, chooseMm( ) runs on the main page of FIG. 13, level 0, but lines 4599 and 4600 store information in variable bound, (i.e. normally associated with level 1). Both chooseName( ) and chooseSd( ) run on level 1, but lines 3323, 3325, 3327, 3569, 3571, and 3573 remember input bindings in variable bound2. Note that line 3570, which rebinds the "d" key to the "start delay" button of FIG. 23, is possible because the text entry widget box is for numerical data. However, allowing the user to press "d" key a second time to close the text entry widget box is consistent with the mouse clicking scheme. If the entry isn't cancelled, then cleanup is left to procedures "finishMm( )," (lines 4616 to 4637), "finishName( )," (lines 3331 to 3387), or "finishSd( )," (lines 3577 to 3594). After each routine processes data from the text entry widget box, it calls removeBindings( ), destroys the text entry widget box, and clears variable disable.

Although not a text entry widget box, the dialog box of procedure "chooseFolder( )," (lines 3096 to 3142 and FIG. 31), created by calling "tk_chooseDirectory( )" on lines 3131 to 3133, does accept miscellaneous user data. Hence, input bindings are erased and disable is set. If the dialog box is cancelled, variable "musDir" will be an empty string and a previous condition is restored by clearing disable, calling goBack( ), and then impFolders( ). Procedure goBack( ) returns to the level 1 conclude page of FIG. 23, made by initSave( ). Procedure impFolders( ) recreates the level 2 import page of FIG. 30. Thus, input bindings are restored without using removeBindings( ). A valid musDir result is processed by procedure "finishImp( )," (lines 3144 to 3187).

The five cache files that cueStage.txt manages, cue_1.txt through cue_5.txt, depicted in FIG. 107, are hidden from the user, who just needs to create or select a title in conjunction with listboxes of FIGS. 23 and 32. To accelerate browsing, a tab completion routine, "tabComplete( )," (lines 3221 to 3267), binds to the name text entry widget box, depicted in FIG. 24, (see line 3322). The user may type a first few unique characters of a title before pressing "tab" key to fill in a match found in the listbox.

Initial individual real-time direction recordings are stored under a subdirectory named, "titles." The listbox lists directories, not filenames. A new name added by using the name button of FIG. 23, creates a peer directory. To create a title hierarchically below a current one, the user activates the "go lower" button. To navigate up in a title hierarchy, use the "go higher" button. To navigate down, simply highlight a title and press the "return" key. If one or more subfolders exist, they will be displayed. If none are present, the listbox remains unchanged. The import button of FIG. 23 expedites organizing titles by replicating a chosen directory structure that catalogs sound tracks of interest.

To speed editing, an initial individual real-time direction session is overwritten without flashing an "Are you sure?" dialog box, when the save button is pressed. However, up to 100 of the most recent versions of a given name are stored in a "garbage" subdirectory. Suffixes "(2)" to "(100)" are appended transparently to the user. To reduce data storage space, three fundamental files are junk collected. Two others may be regenerated and are deleted. In fact when a show is exported by buildShow.txt, it excludes the redundant two too, to shrink the show export text file size. When importing, buildShow.txt calls cueStage.txt with a loadOnlyFlag to restore the missing files.

Those secondary files are revived by procedures "speedd( )," (for speed daemon, lines 5205 to 5409), and "lightsd( )," (for lights daemon, lines 5172 to 5203). They convert calculations performed by goLoop( ) to an understandable format for external programs, such as tdiObjShow.txt. Procedure speedd( ) works by duplicating the structure of goLoop( ) but instead of waiting in real-time for a "t2" timer to increment, it is updated immediately, artificially. Instead of changing object locations on the display each refTime milliseconds, position index, interposition index, speed, and duration are recorded each update time, (see lines 5393 to 5397). If the t2 threshold set by the plaList, plt2Threshold, interrupts the latest position-speed interval to activate the next recorded cue touch item, then the most recent duration is amended to the appropriately reduced time, "rdcTime," (see lines 5233 to 5236). The job for lightsd( ) is considerably simpler, measuring delays between plaList invocations of toggleLts( ) and keeping track of off or on status.

Microprocessors continuously field many operating system and network requests which limit the precision of their schedules. Therefore, goLoop( ), (lines 4737 to 5115), which updates a display in real-time, keeps its own clock with variable t2 instead of presuming that each cycle is refTime milliseconds apart.

When a beat cycle starts, phase 1 is active first. Therefore, rtuPhs2Thresh indicates a timestamp that marks a transition to phase 2 and rtuPhs1Thresh indicates a timestamp that marks a transition to a next cycle's phase 1. Upon initiation of the next cycle, both thresholds are updated. Hence, the beat is within phase 1 if t1 is less than rtuPhs2Thresh and rtuPhs1Thresh. It is within phase 2 if t1 is greater than rtuPhs2Thresh and less than rtuPhs1Thresh. Procedure goLoop( ) initiates phase 1 of the next cycle if t1 is greater than rtuPhs2Thresh and rtuPhs1Thresh. Note that a new phase 1 may be instigated by setting both rtuPhs2Thresh and rtuPhs1Thresh to a negative number such as −60e30 because any t1 timestamp will be positive and therefore greater.

Each phase may update object position indices numerous times, (i.e. using the same delta), before switching phases. Variable rtt2Threshold keeps track of exactly when these intraphase updates occur for both phase 1 and phase 2. Because the phase periods, (timed by rtuPhs2Thresh and rtuPhs1Thresh), are integer multiples of the phase update times, (timed by rtt2Threshold), the interphase transitions occur at the end of intraphase updates.

When a cue touch item is activated or rotation is toggled on, setRot( ), rstPosition( ), or toggleRot( ) sets rstPhs1, (see lines 682, 1505, and 4732). Hence, goLoop( ) imposes negative values on the thresholds, (see lines 4763, 4764). Thereafter, goLoop( ) computes threshold values using a starting timestamp of t1, (see lines 4770, 4787, 4788, and 4802). However, to avoid accumulating micro-errors due to imprecision of the schedule of a processor, the thresholds update themselves by theoretically perfect values thereafter, (i.e. even if a cycle starts a little late).

Procedure goLoop( ) is called each refTime milliseconds, which for one embodiment is half of minUpdate, a delay before a position index changes. In this case, each alternate goLoop( ) cycle has a position index that is the same as for the last cycle, because the test on line 4751 fails. However, it still interpolates new object coordinates based on speed and direction of the last cycle and what portion of the update time has passed, (see lines 4966 to 5036). Tests on lines 4968 to 4972 prevent coordinate interpolation, if a limit position is active for comported legato flow. Objects temporarily hesitate in place. For one embodiment, a variable named, "fuzzFlag," may be set within strVars.txt, causing objects to jump amongst a set of four coordinates in the neighborhood of a limit position. They are defined by variables fuzzIncr1a, fuzzIncr1b, (see lines 4940 and 4942), fuzzIncr2a and fuzzIncr2b, (see lines 5012 and 5014), also specified within strVars.txt. Another embodiment, may add this "fuzzy stop" option to staccato flow or even no movement.

Variable refTime controls display refresh time for both cueStage.txt and tdiObjShow.txt. Larger refTime values may be used, for example, to reduce CPU usage, ease reading of text-based three-dimensional image objects, or add a slow motion effect to a choreographic work. For large refTime values, it makes sense to match minUpdate to refTime. Procedure goLoop( ) can update position indices without losing intermediate changes due to infrequent cycles.

Tdiobjshow.Txt

When tdiObjShow.txt is called from buildShow.txt, line 4168 holds true. Lines 4169 to 4499 set some global variables. Line 4500 calls function "cmdParse( )," (lines 3968 to 4166) to parse a command line from buildShow.txt. Lines 3975 to 3995 initialize variables to take care of any option not mentioned by buildShow.txt. A "for" loop from lines 3998 to 4060 inspects and interprets command line arguments. Some arguments, like "−s", are self-contained, whereas other options, like "−t<seconds>", expect a data word to follow. Logic on Line 3999 is true whether "−s" is by itself or combined with another self-contained option such as "−n", (e.g. "−sn"). Lines 4052 to 4058, however, mandate that arguments like "−t<seconds>" not be merged with others. Any non-option argument is presumed to be a list of three-dimensional image object names, a selection show lineup. A medley show is specified with a "−d<photo directory>" option.

Show Lineup

A lineup is appended to a "tdiNames" list variable on lines 4059 to 4060 for a selection show. A medley show invokes function "mkTdiDb( )," (lines 329 to 490), to make three-dimensional image objects on the fly from photos found in a directory. Names of those dynamically created objects are then added to tdiNames (see line 4050). If line 4051 discovers that mkTdiDb( ) did not set variable "phoDbDir," (because no photos were found in the directory, for example), the show is cancelled. If line 4061 ascertains that tdiNames doesn't hold any names, the show ends, (after a usage statement is printed). Hence, if line 4085 doesn't see phoDbDir, it simply implies a selection show is pertinent, instead of a medley show. Line 4086 sets variable "tdiDbActive" to a global variable, "tdiDb." Variable tdiDb is defined on line 4190 and depicted in FIG. 106 as the upper tdiObjectDb.txt database file. It stores object specifications generated with the page of FIG. 47. Otherwise line 4089 sets tdiDbActive to the lower tdiObjectDb.txt file portrayed in FIG. 106. It represents a temporary, auto-generated database for a medley show.

Line 4090 calls function "mkTdiMinDb( )," (lines 3865 to 3966), which produces a file named, "tdiMinDb.txt," (see lines 3893, 3902, and 3961), depicted in FIG. 106. The file is a lean copy of tdiDbActive. It contains database entries referred to by variable tdiNames. Thus, intrashow lookups, (i.e. for object set transitions), are generally faster for selection shows, since there are likely fewer entries to contend with. A medley show database is already trim.

Function mkTdiMinDb( ) also adds a default background scenery database entry, (see lines 3867 to 3876 and 3913 to 3919), and returns variables "tdiMinDbMap" and "foundCount." Variable tdiMinDbMap maps where each three-dimensional image object database entry is within tdiMinDb.txt. Give tdiMinDbMap a name and it returns a line number, replacing multiple search string compare computations and reducing lookup time. Variable foundCount tells how many unique names in tdiNames were actually present within the tdiDbActive database, plus one for default background scenery, (if the custom scenery option of FIG. 5 is off). Lines 4094 to 4110 compile "notFound" and "bldFail" lists and pare down tdiNames correspondingly. If names are found within tdiMinDb.txt, but their message authentication codes aren't valid, they are added to the bldFail list and variable foundCount is decremented. If foundCount is zero, an error is printed before show cancellation (see lines 4133 to 4145). Otherwise a warning is printed for names not found and/or not validated, but the show goes on, (see lines 4112 to 4132)! If tdiObjShow.txt is run without any command line arguments, a show is cancelled after printing a usage statement, (see lines 4146 to 4166).

Refresh Time

A show is a go when function "run( )," (see lines 1604 to 3754), is called on lines 4129 to 4132. Broadly speaking, setup occurs from lines 1608 to 2129, and an event loop entered on line 2130. As with goLoop( ) in cueStage.txt, variable refTime, specifies a cycle time. It is read from strVars.txt as depicted in FIG. 104. On line 2131, variable "timePassed" gets a number of milliseconds since a last iteration from function "clock.tick( )." Line 2137 lets tdiObjShow.txt sleep awhile longer if refTime milliseconds have not yet passed. Line 2138 includes actual slept time, (per CPU scheduling precision), in timePassed. As units for timePassed are milliseconds, line 2139 divides by one thousand to yield variable "timePassedSeconds," with units of seconds.

Second Individual Real-Time Direction Inputs

Variable "eventList" stores second individual real-time direction inputs, gathered by function "pygame.event.get( )," on line 2141. For one embodiment, events are included for window resizing and closing, keyboard key pushing and releasing, mouse movement, and mouse button pushing and releasing. For a different embodiment, an eventList may include internal or separately linked motion sensor readings, touch screen gestures, optical pattern recognition data, joy stick particulars, game pad specifics, etc.

If the "begin show" button of FIG. 37 or 68 is activated with the "view mode" checkbutton selected, function cmdParse( ) finds "-y" on a command line and sets variable "pscPlay" to 1. Line 2143 is true. Lines 2147 to 2162 check eventList for interrupts or window resizings. If none are found, live events are ignored. Instead, previously recorded second individual real-time direction inputs are substituted, (see lines 2163 to 2204).

Multiple input activations may be grouped together, for a given event loop iteration, whether live or recorded. Variable "dlyList" matches each eventList item with a time duration. If several live events are selected at once, the last one is associated with timePassedSeconds on line 2156. The other events get zero on line 2158 to account for their simultaneity. Live events are removed when eventList is initialized to an empty list on line 2164. Recorded inputs are appended on lines 2171, 2181, 2188.

Second Individual Real-Time Direction Recordings

A recorded eventList derives from variable "evtSched," (for event schedule) and psc_1.txt, the cache file depicted in FIG. 106, which is written upon conclusion of an "edit mode" show. Lines 2037 to 2045 build variable "pscSched," (for postproduction command schedule). Function "formatEvents( )," (lines 1303 to 1437), produces evtSched on line 2048. Function formatEvents( ) filters eventList-specific press codes and converts from short, byte-conserving psc_1.txt format to pygame.event.get( ) format.

If the "begin show" button of FIG. 37 or 68 is activated with the "edit mode" checkbutton selected, variable pscPlay is 0, and "not pscPlay" is true. Function pygame.event.get( ) gathers many events, including superfluous ones. Therefore, lines 2211 to 3268 check each event to see if it matches a pertinent second individual real-time direction. Upon finding a match, it is acted upon. Also, a short identifier code, for the second individual real-time direction input, is appended to variable "poCmds2," (for postproduction commands). The codes are eventually written to cache file psc_1.txt. Although it would be straightforward to store each pygame.event.get( ) list within psc_1.txt, an advantage of one or more aspects is a comparatively smaller file size. The psc_1.txt file represents second individual real-time direction recordings that are included as part of an export text file. Hence, decreasing file size for psc_1.txt, lowers file size for a subsequent export text file.

Each line of psc_1.txt consists of a list of second individual real-time direction input codes, and a time delay to wait before moving on, (see lines 3361 to 3363, 3366 to 3372, 3791 to 3806, 2032). When a code is stored in variable poCmds2, variable timePassed informs how much time passed since a previous iteration. Variable "poDly," (for postproduction delay), sums each iteration to find total delay from poCmds2 receiving a previous code to a current one. This delay fits psc_1.txt format for the previous code!

Line 2209 sets variable "dlyIdx," (for delay index), to −1. Line 2212 increments it for each pass through an event "for" loop declared on line 2211. Variable dlyIdx is therefore zero, (and "not dlyIdx" is true), on a first iteration. Hence, lines 3363 and 3367 to 3372 are likewise invoked on the first iteration, (for an "edit mode" show). Variable "poCmds" is initialized as an empty list on line 2023 and represents a previous set of input codes. That is, when an input code is received by poCmds2 during an "edit mode" show, line 3367 is true. Variable "pscSched" creates a list containing poCmds and poDly on line 3368. It is appended to variable "pscSchedList" on line 3369. Variable pscSchedList is written out to file psc_1.txt upon show close, (lines 3801 to 3806). After poCmds is recorded by pscSchedList, it is time to set up the next iteration. Hence, the current input code gets transferred from poCmds2 to poCmds, to become the previous input code for the next iteration, (line 3370). Also, poCmds2 and poDly are cleared, (lines 3371, 3372).

As a result, psc_1.txt usually starts off with a first line containing an empty set of input codes. Delays on each line total to the running time of a "view mode" show. A last line usually consists of an escape, "es," input code and a 0 delay as per lines 3759, 3796 to 3800.

Initially, variable "evtTimer" is 0 (line 2028) and on a first loop becomes negative timePassedSeconds (line 2166), (i.e. negative refTime, or thereabouts). A negative amount tells how much evtSched time may be processed. Variable evtTimer becomes more negative for each new event loop. A "while" loop on line 2173 processes evtSched entries until evtTimer climbs out of negative territory, (line 2177), or evtSched entries run out, (line 2204). Each entry of evtSched may contain multiple simultaneous events. Each one runs through the event "for" loop declared on line 2211, (and extending to line 3372).

Variable refTime is not a fixed constant. It is determined by strVars.txt and may be changed using the customization process or editing strVars.txt. For a "view mode" show, refTime may be larger than when its second individual real-time directions were recorded by a corresponding "edit mode" show. For example, different devices may have varying graphics capabilities. Variable refTime may be increased to ease device resource usage. Perhaps refTime is greater to conserve battery power, reduce background processing cycles, improve visibility and/or readability of three-dimensional image objects, or even to achieve an artistic slow motion effect. Hence, multiple evtSched entries may be read and compiled into the substitute eventList. Because eventList may therefore consist of consecutive events, dlyList keeps track of duration for each item. It allows a playback to catch-up, during each refTime loop, without skipping any intermediate computations. To further enhance accuracy, each batch of dlyList entries totals to timePassedSeconds. A last event duration may be shortened, thereby preventing a playback from jumping ahead of a recording, (lines 2184 and 2192). Any time left over is handled with an artificial "wait" event at the start of a next loop. The previous loop is thereby allowed to finish and stay synchronized to the recording, (lines 2170 to 2172).

Line 2180 checks for empty evtSched entries. They occur for a first entry, (see poCmds comments above), and "time filler" entries precipitated by formatEvents( ), when it prunes away pressList items from pscSched, (see below). Artificial "wait" events get their corresponding dlyList values recognized. Line 2187 bypasses empty event lists. Lines 2187 to 2197 add individual events from an evtSched event list to eventList. Since each evtSched event list represents simultaneously recorded events, a last event dlyList value is the full duration (lines 2189 to 2194). The rest are naught, (lines 2195 to 2197).

Lines 2198 to 2204 close a show when evtSched is depleted, as long as an "es" code finishes psc_1.txt. Line 2202 invokes "edit mode" functionality by resetting pscPlay to zero. Regardless of the mode switch, the "escape" event closes a show without user input, (see lines 1419, 1420, 3184 to 3187). Variable timePassed is set to zero on line 2203, preventing psc_1.txt from being overwritten by line 3791. A different embodiment could append new second individual real-time directions at the end of a "view mode" show, by jumping to "edit mode!" Such operation is enabled by removing the final "es" code line from a psc_1.txt file before a "view mode" show begins. As a show progresses in "view mode," a recorded substitute eventList is treated the same as a live one, updating pscSchedList regularly (line 3369). When evtSched is depleted, line 2202 resets pscPlay, invoking "edit mode" functionality. With an "es" code missing, timePassed is updated upon a next loop, (lines 2131, 2138), and an eventual user-initiated show close will write out all, (original plus appended), second individual real-time directions normally.

Lines 2206 to 2208 add an artificial "none" event to eventList. It ensures the event "for" loop declared on line 2211 is cycled at least once, and timePassed gets recognized. The lines are invoked during an "edit mode" show when no second individual real-time directions are given. A "view mode" show uses them when a duration for a current evtSched entry is equivalent to multiple refTime event loop cycles.

Second Individual Real-Time Directions

A first "for" loop "if" clause, (lines 2213 to 3268), takes care of recording second individual real-time directions within poCmds2 and implementing features that may be provided immediately, (i.e. within a same refTime loop). For example, although a press or release of an "a" key may be recorded, (lines 2241, 3218, 3219, 3227, 3254, and 3255), motion calculations are not enacted, (i.e. to move a virtual perspective backwards), which generally occur over multiple refTime loops.

Initial Individual Real-Time Direction Recordings

Variables "edGldOffset," (for edge glide offset), and "ipRotOffset," (for in-place rotation offset) determine position and rotation of three-dimensional image objects and are set on lines 3300 to 3313. Variable "cueSpeed" indicates whether objects, and edGldOffset, follow initial individual real-time directions. Line 3300 holds objects still during a pause, by preventing any changes to edGldOffset or ipRotOffset. If cueSpeed is 1, line 3302 sets edGldOffset to variable "edGldOffsetCalc," derived from cueStage.txt cache file, cue_3.txt, depicted in FIG. 107, and "spdSched," (see lines 1976 to 1996). Variables edGldOffset and ipRotOffset are in units of indices. For one embodiment, 256 indices are used, and therefore each update is modulo 256. Both edGldOffset and ipRotOffset are real numbers, to allow for interpolation between indices, if specified.

Lines 3273 to 3298 prepare edGldOffsetCalc by way of spdSched. Lines 3273 to 3277 update "spdTimer." During an "edit mode" show, whether one or multiple or no (i.e. "none" artificial event) events are detected, spdTimer is updated once, (i.e. when dlyIdx is 0), with a full timePassedSeconds. For a "view mode" show, (i.e. pscPlay is 1), an artificial "none" event indicates that evtTimer is positive. An event loop is run once on an obligatory basis, and spdTimer gets a whole timePassedSeconds. Otherwise, eventList is updated with a current evtSched entry or entries and spdTimer is updated on a per event basis via dlyList.

As with evtTimer, a negative spdTimer allows reading one or more entries from spdSched. For legato flow, spdSched contains phase 1 and phase 2 starting positions, speeds, and durations for each beat. For staccato flow, spdSched contains phase 1 starting position, speed (equal to 0), and duration for each beat. Lines 3289 and 3290 give edGldOffsetCalc based on the current spdSched entry. Lines 3297, 3298 calculate a current offset with a same spdSched entry used in a previous loop, but with a new, smaller spdTimer value.

If a pause command ensues, audio and/or video recordings continue playing, (three-dimensional image objects stop), and spdTimer continues counting. That way, after the pause, objects catch-up and continue from where they would have been had there not been a pause.

Once a spdSched is exhausted, lines 3291 to 3295 turn speed control back over to second individual real-time direction inputs, for one embodiment. In particular, resetting cueSpeed on line 3292, prevents spdTimer from being updated again, by way of line 3272.

Lines 3317 to 3343 formulate variable "lightsOn," which turns on and off "stage lights," based on cueStage.txt cache file, cue_5.txt, and variable "ltsSched," (see FIG. 107, lines 2003 to 2019). Three-dimensional image objects are either rendered on a display or not. Time tracking is analogous to that for spdSched.

Object Set Transitions

Lines 3346 to 3351 update variable "sdxTimer," which tracks display time for each set of three-dimensional image objects. A "slide show" presents one object on a screen at once. A "normal show" exhibits up to six, for one embodiment. A new set of objects, (if available from a lineup or photo folder, for a selection show or medley show, respectively), takes over when sdxTimer reaches a "viewTime" limit, (see lines 3982, 4008 to 4012, 4017 to 4019, 4072, 4155, and 1923 to 1933). For one embodiment, objects are spaced at positions 0, 2, 4, 6, 8 and 10, or indices 0, 32, 64, 96, 128, and 160, (for up to six objects). A "preloadTime" is at 72% of viewTime (line 1923). Preparations for a transition begin by uploading a next set of "cubes" and "textures," (i.e. images), to graphics hardware, (see lines 3644 to 3682).

An upload may take more time than a refTime loop period. Variable timePassed does not reflect the excess time, and edGldOffset and ipRotOffset do not grow abnormally large, because a clock is reset on line 3680 (on the previous loop). Objects appear to halt momentarily, but then continue from where they left off. Of course, initial individual real-time directions may get out-of-synch with an audio recording if a preload pause was not planned for. Preload times may vary depending on such factors as amount of data uploaded, software efficiency, and hardware performance specifications. Another embodiment may remove, or provide an option to remove, a clock reset, to keep post preload pause movements synchronized. Another embodiment could use multiple "preloadTimeX" values to better spread-out upload background processes, reducing and perhaps preventing preload pauses.

By line 3682, after an upload, sdxTimer is set to a second before "transTime." Variable transTime marks the introduction of a new set of objects at interstitial pattern positions 15, 1, 3, 5, 7, and 9, or indices 240, 16, 48, 80, 112, and 144. Variable sdxTimer is artificially set to ensure that it starts a transition at the beginning. For example, an upload could take excessive time and a clock, (for another embodiment), may not reset. For one embodiment and a "normal show," transTime allows 10 seconds for a transition. New cubes gradually move from their interstitial positions to primary positions. Old cubes likewise move to interstitial positions before disappearing. A "slide show" transition, for one embodiment, endures for 2 seconds. However, if transTime numbers represent more than 14% of viewTime, then a transition period is limited to the smaller 14%, (see lines 1924 to 1933). Lines 3631 to 3635 generate new cube index coordinates, "ncxCoords." Variable "sdxOffset" is a slide index that gradually moves old and new cubes an additional amount during a transition. When sdxTimer is equal to transTime, sdxOffset is zero. As sdxTimer approaches viewTime, sdxOffset approaches 15. After sdxTimer reaches viewTime, old cubes are deleted and sdxTimer and sdxOffset are reset to zero (lines 3636 to 3637 and 3683 to 3722).

Lines 3354 to 3358 update "rptTimer" to implement autorepeat for certain second individual real-time direction inputs. For one embodiment, keyboard key "j" implements a "jump" direction discussed with FIGS. 87-94. The user jumps from one image to another among all displayed three-dimensional image objects. For one embodiment, the top and bottom faces of each object are skipped. Variable "jmpNum" determines the number of faces to skip, if any, and may be modified using the customization process or editing strVars.txt. If the user continuously holds down the "j" key, a next image appears each 150 milliseconds, for one embodiment. Variable "rptInterval" determines the 150 millisecond repeat interval and may be modified using the customization process or editing strVars.txt.

Lines 3361 to 3372 update poDly and pscSchedList. Each event is appended to poCmds2 as it happens. Variable poCmds contains events occurring in a previous loop. For a new event, line 3367 is true and poCmds and poDly are combined in a list and appended to pscSchedList. Variable poDly represents a duration for poCmds, before another event happens. To set up a next loop, poCmds gets poCmds2, which is then cleared, as is poDly.

Events are polled each refTime milliseconds. Hence, accuracy is about +/−refTime milliseconds. Consider that second individual real-time direction recordings may invoke a pause and subsequent virtual perspective changes, for example. Another embodiment, therefore, may provide an option to adjust a start time, to improve playback pause precision. Another embodiment may use an interrupt technique, (instead of polling), to improve timing precision.

Freeze

Lines 3375 to 3376 mandate each refTime loop be extended to at least one second if a "freeze" second individual real-time direction is given. Freeze signifies a show window is unresponsive except for unfreezing, unhiding, or quitting. Hence, an event loop continues checking for unfreeze, unhide, and quit events. However, all code related to object positions and rotations and virtual perspective changes is bypassed. Although halted three-dimensional image objects are still displayed, device resource usage is dramatically reduced. A freeze effectively stops simulation time. It therefore remains an unrecorded second individual real-time direction.

Line 3380, for an "edit mode" show, makes a one entry list from a large tuple returned by method "pygame.key.get_pressed( )." If a particular keyboard key is pressed, a 1 is given for its entry within the tuple, otherwise 0. For a "view mode" show, variable "pressList" is created from "prsSched" entries. Variable prsSched is derived from the same data as evtSched, (i.e. psc_1.txt and pscSched). It pays attention to a different set of keys. It tracks their ongoing status instead of just individual press and release events. A pressed dictionary is initialized on lines 2050 to 2052, indicating keys are released. A prsSched is created on line 2049 by calling function "formatPressed( )." It returns a list of pressed dictionaries and their respective durations throughout a show.

Virtual Perspective Change, Pan, Jump

Similar to the "for" loop for eventList, lines 3425 to 3523 form a "for" loop for pressList. It helps update virtual perspective changes from Stage View, pan an image in Face View, and jump to a new image using autorepeat in Face View. Lines 3427 to 3446 reset virtual perspective vectors, "rotationDirection" and "movementDirection," based on a current pressed dictionary. Lines 3448 to 3466 increment or decrement "fmrOffset," (for face view (mode) right offset), and "fmuOffset," (for face view (mode) up offset), for panning in Face View. Lines 3468 to 3501 jump to a next image if variable rptTimer has reached the rptInterval limit. Lines 3503 to 3523 calculate virtual perspective changes from Stage View.

Survey View, Face View

Instead of an independent virtual perspective, Survey View locks a perspective view, or camera, over a current object. Object position changes are matched to cancel object motion. A steady close-up watch over a rotating, apparently stationary object is achieved, (lines 3527 to 3530). Likewise, Face View keeps a constant gaze above a single face of a current three-dimensional image object. Shifts and twirls of the object are cancelled by automatically shifting and twirling the virtual perspective view, (lines 3531 to 3583).

Stage View

Each position within "ipRot" and "iniZeroAngle" lists, for one embodiment, is "on", (lines 1745 to 1759, 4347 to 4352, 4446 to 4448). However, these lists may be modified using the customization process or editing strVars.txt. If an ipRot entry is "off", then an object in that corresponding position doesn't rotate in-place. If an iniZeroAngle entry is "off", then an object in that corresponding position has a skewed in-place rotation angle offset.

Background Scenery

A background scene, background enclosure, or "sky cube," is easily rendered when depth analysis and GL_CULL_FACE are disabled, (see lines 3589 to 3590 and 3617 to 3618). For one embodiment, background scenery is normally off. Variable "skyOn" is 0. However, if a virtual perspective moves a significant distance from a starting coordinate, (0.0, 0.0, vz+czp/2.0), background scenery appears. Variable skyOn is set to 1, (see lines 1887 to 1898 and 3592 to 3610). Variable skyOn may also be set by way of a second individual real-time direction input, (keyboard key "k," for one embodiment). After skyOn is set, additional directions are enacted by toggling variable "skyMask." Selecting the "on at start" checkbutton of FIG. 5 is another way that skyOn is set. Function cmdParse( ) finds a "–s" command line option in that case, (see line 2879 to 2884, 3977, 3999 to 4000, and 4129).

Index 0 of a "cubes" list refers to the sky cube, which when rendered, for one embodiment, has a choice between two standard orientations, determined by the "alternate orientation" checkbutton of FIG. 5 and a "–a" command line option, (see lines 3979, 4006 to 4007, 4129, and 1856 to 1863).

If variable "skyFlag" is set, functions cubes[0].render( ), (lines 95 to 316), and reorient( ), (lines 736 to 904), distinguish a sky cube from standard three-dimensional image objects. For example, images of the sky cube may be mirrored from left-to-right to account for an inside, rather than outside, view, (see lines 124, 166, 207, 239, 273, and 307). Left and right images may be swapped if they constitute left and right sides of an object, instead of a panoramic scene, (see lines 145 to 153 and 186 to 194). Other transpositions may accompany an object, to make left, right, top, and bottom faces resemble mirrors, (see lines 163 to 164, 204 to 205, 270 to 271, and 304 to 305). Although function reorient( ) scales regular three-dimensional image objects to keep them onscreen, (lines 740 to 750), it does not scale the sky cube, for one embodiment. A perspective view provides its own location coordinate to establish a center of the sky cube. Therefore, although the perspective view twists and translates, faces of the sky cube remain at a constant, inside distance.

After current changes of a refTime loop are added to variable "cameraMatrix," line 3621 uploads it to graphics hardware via an "OpenGL API," (for open graphics language application programming interface). It informs graphics hardware which virtual perspective to portray, (see McGugan, Will "Beginning Game Development with Python and Pygame," Berkeley, Calif.: Apress, 2007, p. 204).

The rest of the refTime loop determines a current location and rotation angle for each three-dimensional image object, (lines 3638 to 3641). They are rendered if variable lightsOn is set, (3723 to 3749). Object sets of a show lineup are tracked and transitions, if any, are handled. Variable sdxTimer grows from 0 to preloadTime, (lines 3644 to 3682), then beyond tranTime, (lines 3631 to 3635, 3728 to 3730, 3734 to 3736, 3741 to 3743, and 3747 to 3749), and finally to viewTime, (lines 3683 to 3722). Line 3751 switches graphics hardware buffers, displaying what is current!

For a given "normal show" or "slide show," the user decides on a quantity of three-dimensional image objects. How many objects are displayed together, including the sky cube, (before a transition), is "numTexs," (for number of textured objects, lines 1779 to 1790). A total number of objects in a lineup, minus the sky cube, is "numCubes," for one embodiment, (line 1843).

Three-Dimensional Image Objects

File tdiMinDb.txt, depicted in FIG. 106, lists a name for each three-dimensional image object in a show. For each object, it also lists hue, hue command, polygon identifiers, (i.e. "front," "right," "back," "left," "top," and "bottom", for one embodiment), and image file names to be applied as textures to those polygons, (i.e. rectangles, for one embodiment). The file is indexed by variable tdiMinDbMap. Both the file and the index are created by function cmdParse( ), described earlier. For each three-dimensional image object whose portrayal is imminent, function "texLoad( )," (for texture load, lines 1027 to 1301), pulls a relevant dictionary line out of tdiMinDb.txt. It uses the information to create an instance of a "Tdi" class. It appends the instance to a "tdis," (for three-dimensional image objects), list, (lines 1030 to 1046). Anticipating a need to read and convert image file data for use by graphics hardware, it also appends an instance of a "TdiTexture" class to a "texs," (for textures), list, (lines 1047 to 1053). Loading data from disk files to program memory structures speeds up subsequent accesses, improving show performance. To further reduce slow disk file reads and memory resource usage, texLoad( ) builds variable "tdiRdnMap," (for tdi redundant map). It is an index for three-dimensional image objects already loaded into memory. They don't have to be loaded again, if a show lineup contains duplicates, (lines 1061 to 1065).

Variable "clrMap," (for color map, lines 4331 to 4332, 4438), is a numbered dictionary of six (red, green, blue) color tuples, representing red, orange, yellow, green, blue, and violet. Each object has a "colors" list, mapping each face with a random color, (lines 1054 to 1059), for one embodiment. Before readying a new set of objects for display, a single random index is chosen. From that single random number, the face colors for the new objects are determined. The random index is incremented between texLoad( ) calls. This method prevents a single object from being assigned a same color twice (i.e. to different polygons), for one embodiment. It also assures variation among similar sides, when using object set sizes of six or less, (lines 1793, 1795 to 1820, 3165 to 3178, 3645 to 3679), for one embodiment. Variable clrMap may be modified using the customization process or editing strVars.txt.

If variable tdiRdnMap already contains a name, then variable "preI," (for previous index), on line 1061, receives an index greater than or equal to zero. Line 1066 evaluates true. Data previously loaded is assigned to a TdiTexture instance, (lines 1068 to 1091). Otherwise, each face, when an image file is matched to it, loads the image file onto a pygame surface. Image width and height are recorded, (line 1262). Function "chkPhoto( )" is run, (line 1263). The function, (lines 556 to 692), reduces dimensions if they exceed variable "maxSize," determined by which "resolution" checkbutton of FIG. 5 is selected, (see lines 1710 to 1715, 3986, 4025 to 4028). It adjusts dimensions to a power-of-two if variable "powerOf2" is set, because the "resize photos" checkbutton of FIG. 5 is selected. A potentially modified surface is then converted into a string by function "pygame.image.to-string( )." It is stored in a "dataF," "dataR," "dataB," "dataL," "dataT," or "dataM" variable appropriate for the front, right, back, left, top or bottom face, respectively, (lines 1264 to 1298). It is ready for upload to graphics hardware. If no photo is assigned to a face, zeros are assigned to the relevant variables, (lines 1047 to 1053).

After texture data is loaded into internal memory, function "texUpload( )," (lines 945 to 1025), uploads it to graphics hardware.

Three-dimensional image object faces without an assigned photo, may substitute a solid color, for one embodiment. The colors are brightest if they tinge a plain white background image, such as global variable "unkFile," (for unknown file, line 4189). A string conversion for an unkFile pygame surface, along with width and height information, are organized within variable "unk." It is an instance of class "Unk," (lines 1718 to 1722, 49 to 49). Function "unkUpload( )," (lines 932 to 943), sends it to graphics hardware, (lines 1794, 2237, 2244, 2282, 2300, and 2362).

After graphics hardware has been primed with textures, a list of instances of class "Cube," (lines 55 to 316), cubes, defines each grouping of "GL QUADS" that make up geometrical objects, for one embodiment, (1844 to 1846, 1946, 3166 to 3178, 3646 to 3679, and 3699 to 3702).

Function "reorient( )," (lines 736 to 904), scales three dimensional image objects and their track. It calculates an amount of z-axis depth for Survey View or Face View, "vzSlideP," (lines 738 to 770) It prepares "posCoords," a list of coordinates mapping object locations to indices, (lines 774 to 832). It puts together "rotVertsList," a list of vertex sets mapping object rotation angles to indices, (lines 833 to 902). The latter two lists replace real-time calculations with simple, fast lookups. One embodiment uses 256 indices that are divided into 16 object positions, each with 16 interpositions.

Standard Edge Track

FIGS. 115A-115B depict one position in each corner of a rectangular screen. Remaining positions are spread evenly among edges. Equal dispersal dictates 16/4+1=5 positions per side. Another embodiment, with X indices, divided into Y positions, (evenly divisible by 4), distributes Y/4+1 positions per side. A Z-sided display, (Z>2, and Y evenly divisible by Z), realizes Y/Z+1 positions per side.

Variable "acs," (for adjacent cube space), is 1.3, for one embodiment, (lines 1732, 4340, 4442). It adds 30% to a width or height dimension to provide object spacings. Variables "cw" and "ch," (for cube width and height), specify object dimensions. Total height for five objects stacked above each other is 5.0*ch*acs. If this height is greater than variable "scrHeight," (for screen or window height), then some objects won't fit. To prevent this situation, object dimensions are lowered by applying a scaling factor, "sclFactor," less than one. However, if 5.0*cw*acs is even larger with respect to "scrWidth," than 5.0*ch*acs is with respect to scrHeight, then objects have even less room horizontally. They are scaled accordingly, (lines 742 to 750).

If screen width is "vw," (for view width), then distance between center coordinates of two horizontal corner cubes is (vw−cw), as depicted in FIG. 115A. For one embodiment, each side has an equivalent number of indices. There are, therefore, 256/4=64 interposition spaces between two horizontal corner cubes. Each one represents a distance of (vw−cw)/64. Likewise, distance between center coordinates of vertical corner cubes is (vh−ch). A vertical interposition space represents a distance of (vh−ch)/64, (lines 817 to 832). Other embodiments could use other methods for defining edge tracks. For example, another embodiment could equalize horizontal and vertical interposition spaces.

Function reorient( ), for one embodiment, supports object in-place rotation around either one or two object axes. Each run through the indices, implies a rotation of 360 degrees around an axis. A smooth continuous rotation is achieved, even as a last index loops back to a first index. For two axes, one embodiment divides its 256 indices into quarters. Each 64 indices, rotation switches to an alternate single axis. Therefore, when two axes are involved, each axis has effectively half as many indices in which to rotate 360 degrees. Each set of 64 indices should complete 180 degrees around one of the two axes. Therefore, an increment, update, or delta angle is twice as much for two axes, than if just one axis were involved, (lines 833 to 886).

One embodiment uses one axis for three-dimensional image objects, (lines 1736, 4344, 4444). One embodiment uses either one or two axes for a sky box. If the "alternate orientation" checkbutton of FIG. 5 is selected, then two axes are employed, (lines 1856 to 1863). Variables "numAxes," "numAxesSky," (lines 1858, 1861, 4380, 4462), "rotTypes," (lines 1739, 4346, 4445), and "rotTypesSky," (lines 1859, 1862, 4382, 4463), control how many and which axes are used. They may be modified using the customization process or editing strVars.txt. Another embodiment could use a total number of indices greater than 256. Another embodiment could provide up to three axes of rotation. Another embodiment could allow simultaneous rotation around more than one axis, providing 256 indices, (or some other total number of indices), for 360 degrees of rotation, no matter how many axes are involved.

Another embodiment could change position locations of objects, relative to their order within a show lineup. For example, one embodiment maps first through sixth three-dimensional image objects on a lineup, to positions 0, 2, 4, 6, 8 and 10, respectively, (with the custom checkbutton of FIG. 5 left unselected). However, another embodiment could map them to positions 10, 8, 6, 4, 2, and 0, respectively, for example. Additionally, for the standard edge track of FIGS. 115A-115C, position 0 could be located somewhere other than top center. Successive positions could follow in a counterclockwise fashion, instead of a clockwise fashion. For custom tracks, the "reverse draw direction" checkbutton of FIG. 28 provides this latter feature. However, as previously explained, opposite movement directions also occur.

Another embodiment may not specify corner positions, per se, for the standard edge track of FIGS. 115A-115C. It could divide the rectangular edge track into a total number of equal or unequal interposition lengths.

Functions texLoad( ), texUpload( ), and reorient( ), for one embodiment, set up a sky box once before an event loop starts, (lines 1797 to 1805, 1820, 1855 to 1885). Another embodiment could allow new custom scenery continuously throughout a show. For example, each three-dimensional image object set transition could also swap to a different sky box.

Function reorient( ) is called when a show window is resized. It is called when three-dimensional image objects are resized. It determines, as depicted in FIG. 115A, object center coordinates for the standard edge track. It takes into account object sizes, screen dimensions, and field of view! Field of view angle, "theta," is 60.0 degrees, for one embodiment, (line 1698). Another embodiment could make theta modifiable using the customization process or editing strVars.txt.

An aspect ratio is defined as (width/height). It may be approximately 1.6 for a full screen window. It could be 8.0 for a horizontal "status bar" type window. It could also be 0.125 for a vertically oriented window. An aspect ratio for a portable device may be greater than or less than 1.0 depending on which 90 degree orientation the user holds it! Variable "fit-FlagSky," if set, fits a background image onto a screen. It constrains aspect ratios for a sky box to match that of a device screen, (lines 1868 to 1884, 4384, 4464). One embodiment does not set fitFlagSky. However, it may be set using the customization process or editing strVars.txt.

Build Notes, Unpacking Buildshow Embodiment

Unpack and set up the buildShow embodiment. On Mac OS X or Linux, open a "Terminal" window. On Windows, open a "Command Prompt" window. Change directories, (using "cd" command), to a suitable local directory such as, "/Users/kjacobi/" on Mac OS X or "c:\Users\kjacobi\" on Windows, or "/home/kjacobi/" on Linux. For help with "cd" command, type "man bash" (for on-line manual page for Bourne-again shell), on Mac OS X or Linux, or "help cd" on Windows.

Copy "bldShwSkel.txt", (for buildShow skeleton), to the directory using "cp" command for Mac OS X or Linux, or "copy" command for Windows. For help with "cp" command, type "man cp". For help with "copy" command, type "help copy". Make new subdirectory, "bin/", (using "mkdir" command), and copy "uuDec.txt", (for uudecode) "tgzExt.txt", (for tar gzip extract), and "txtDebut.txt" to it.

Rename bldShwSkel.txt to "buildShow.tgz.uue" using "my" command on Mac OS X or Linux, or "move" command on Windows, (type "man my" or "help move" for help). Within bin/subdirectory rename uuDec.txt to "uuDec.py", tgzExt.txt to "tgzExt.py", and txtDebut.txt to "txtDebut.py".

If "python" command is not already available, download and install a binary version of it from python.org or activeState.com. A standard build of Python with "os", "sys", "uu", and "tarfile" modules is good enough for unpacking the buildShow embodiment. However, a fresh python build, containing additional modules, will be compiled and linked, (see below), for running the buildShow embodiment. Alternatively, "uudecode" and "tar" commands, (if already available), along with a text editor can be used to unpack the buildShow embodiment. A third alternative is to unpack after completing the fresh python build. Unpacking is presented first because it is more straightforward and germane.

On Mac OS X or Linux, type "python bin/uuDec.py buildShow.tgz.uue" or "uudecode buildShow.tgz.uue". On Windows, type "python bin\uuDec.py buildShow.tgz.uue" or "uudecode buildShow.tgz.uue". A resultant binary file, "buildShow.tgz", appears in the directory.

Type "python bin/tgzExt.py buildShow.tgz", (or "python bin\tgzExt.py buildShow.tgz" on Windows), or "tar xzfp buildShow.tgz". A resultant subdirectory, "buildShow/", appears in the directory. It establishes a skeleton directory structure with miscellaneous supporting files for the build-Show embodiment. For example, files, "config.txt" and "strVars.txt" are located in "buildShow/cueDir/program/" subdirectory.

Change to buildShow/cueDir/program/directory, (or buildShow\cueDir\program on Windows). Copy "cueStage.txt" to it. Rename cueStage.txt to "cueStage.tcl".

Change to "buildShow/program/" directory. Copy "tdiObjShow.txt", "buildShow.txt", "mkTxoImgs.txt", and "chkTxoImg.txt" to it. Rename tdiObjShow.txt to "tdiObjShow.py". Rename buildShow.txt to "buildShow.py". Rename mkTxoImgs.txt to "mkTxoImgs.py". Rename chkTxoImg.txt to "chkTxoImg.py".

Change to "buildShow/program/hlp/" directory. Copy "hlpFiles.txt" to it. Type "python ../../../bin/txtDebut.py hlpFiles.txt" or use a text editor to manually break hlpFiles.txt into its constituent text files. Twenty text-based files associated with the help button of FIG. 1 appear in the directory. Four of them have a ".xbm," (for X Window System bitmap), file extension.

Build Notes, Running Buildshow Embodiment

After the fresh python build is complete, (see below), the buildShow embodiment may be run by changing directories to "buildShow/program/" and typing "python buildShow.py". On Mac OS X, first typing "export DISPLAY=:0.0" and "open /Applications/Utilities/X11.app", may help, (see script file, "buildShow/program/bldShwStartOSX"). The config.txt file may first have to be adjusted for specific local installation paths of Python, Wish, and Mplayer applications, as well as whether current graphics acceleration hardware is compatible with the operating system.

After the buildShow embodiment starts, in order to get the "Text Show (Auto-Updated)" selection show of FIG. 68 running, it may be helpful to first delete the show and import it from "buildShow/Shows/" directory. Select the "include text list too" checkbutton of FIG. 69 when importing. After importing, make sure the show is highlighted in the listbox of FIG. 68.

To get a "Town" medley show running, it may be helpful to first load it using the load button of FIG. 37, then select "buildShow/program/img/" as a replacement photo folder using the "photo folder" buttons of FIGS. 2 and 3, and save the show using the save button of FIG. 37.

If font size of the buildShow embodiment is too large or small, edit "buildShow/Downloads/enhance0002.txt". First, go to the options page of FIGS. 5 and 6 to get a unique identification code similar to that of FIG. 6. Update enhance0002.txt to reflect the unique identification code and a proper font size. For example, a smaller font size of "12" may look better if default "16" looks too big. Copy enhance0002.txt to "buildShow/Customize", and activate the Customize button of FIGS. 5 and 6. For full effect, restart the buildShow embodiment.

Build Notes, Fresh Python Build (and tcl and tk)

One embodiment uses a 2.26 GHz Intel Core 2 Duo central processor with an Nvidia GeForce 9400M graphics processor on Mac OS X, Linux, or Windows operating systems. An earlier version of the embodiment ran on a 2 GHz Intel Core Duo with an Intel GMA 950 graphics processor. Applying "patch" fixes to some source code files may help avoid errors during compilation and installation. Make a directory such as "/Users/kjacobi/patchFiles", and copy "pchFiles.txt" to it. Change to the directory and type "python ../bin/txtDebut.py pchFiles.txt". Twenty eight ".pch", six ".pch.uue", two ".def", and three ".tcl" text-based files, are added to the directory. A source code file is "patched" using a "patch" command. For example, type, "patch <source file> <patch file>". Type "man patch" for more information.

Mac OS X

For Mac OS X, (version 10.7.1), with Xcode, (version 4.1 (4B110)), download, unpack, compile, and install the following open source software package files, (in order): tcl8.5.10-src.tar.gz, bzip2-1.0.6.tar.gz, db-4.6.21.tar.gz, gdbm-1.9.1.tar.gz, expat-2.0.1.tar.gz, gperf-3.0.4.tar.gz, libiconv-1.14.tar.gz, ncurses-5.9.tar.gz, gettext-0.18.1.1.tar.gz, zlib-1.2.5.tar.bz2, openssl-1.0.0e.tar.gz, readline-6.2.tar.gz, sqlite-autoconf-3070701.tar.gz, Python-2.7.2.tar.bz2, freetype-2.4.6.tar.bz2, freetype-doc-2.4.6.tar.bz2, fontconfig-2.8.0.tar.gz, perl-5.12.3.tar.bz2, gettext-1.05.tar.gz, help2man-1.40.4.tar.gz, m4-1.4.16.tar.bz2, autoconf- 2.68.tar.bz2, automake-1.11.1.tar.bz2, libtool-2.4.tar.gz, glib-2.28.8.tar.bz2, pkg-config-0.26.tar.gz, bigreqsproto-1.1.1.tar.bz2, inputproto-2.0.2.tar.bz2, kbproto-1.0.5.tar.bz2, xproto-7.0.22.tar.bz2, libXau-1.0.6.tar.bz2, libXdmcp-1.1.0.tar.bz2, libpthread-stubs-0.3.tar.bz2, libxml2-2.7.8.tar.gz, xcb-proto-1.6.tar.bz2, libxcb-1.7.tar.bz2, util-macros-1.15.0.tar.bz2, xcmiscproto-1.2.1.tar.bz2, xextproto-7.2.0.tar.bz2, xf86bigfontproto-1.2.0.tar.bz2, xtrans-1.2.6.tar.bz2, libX11-1.4.4.tar.bz2, renderproto-0.11.1.tar.bz2, libXrender-0.9.6.tar.bz2, libXft-2.2.0.tar.bz2, libXext-1.3.0.tar.bz2, scrnsaverproto-1.2.1.tar.bz2, libXScrnSaver-1.2.1.tar.bz2, tk8.5.10-src.tar.gz, distribute-0.6.21.tar.gz, bdist_mpkg-0.4.4.tar.gz, altgraph-0.9.tar.gz, modulegraph-0.9.1.tar.gz, macholib-1.4.2.tar.gz, py2app-0.6.3.tar.gz, pyobjc-core-2.3.tar.gz, jpegsrc.v8c.tar.gz, libpng-1.4.8.tar.bz2, libICE-1.0.7.tar.bz2, libSM-1.2.0.tar.bz2, libXt-1.1.1.tar.bz2, libXpm-3.5.9.tar.bz, gd-2.0.35.tar.bz2, libidn-1.22.tar.gz, libpaper_1.1.24.tar.gz, tiff-3.9.5.tar.gz, ghostscript-9.04.tar.gz, ghostscript-fonts-other-6.0.tar.gz, mappingresources4pdf_2unicode_20091116.tar.Z, mappingresources4pdf_other 20091116.tar.Z, jasper-1.900.1.zip, jbigkit-2.0.tar.gz, netpbm-10.47.29_0.darwin_11.x86_64.tbz2, gts-0.7.6.tar.gz, cmake-2.8.5.tar.gz, pixman-0.22.2.tar.bz2, xcb-util-0.3.8.tar.bz2, cairo-1.10.2.tar.gz, pango-1.28.4.tar.bz2, libLASi-1.1.0.tar.gz, urw-fonts-1.0.7pre44.tar.bz2, psutils-p17.tar.gz, groff-1.21.tar.gz, libXmu-1.1.0.tar.bz2, libXaw-1.0.9.tar.bz2, graphviz-2.28.0.tar.gz, tcllib-1.13.tar.bz, pycrypto-2.3.tar.gz, randrproto-1.3.2.tar.gz, libXrandr-1.3.2.tar.gz, SDL-1.2.14.tar.gz, SDL_image-1.2.10.tar.gz, libogg-1.3.0.tar.gz, flac-1.2.1.tar.gz, libmikmod-3.2.0-beta2.tar.bz2, libvorbis-1.3.2.tar.gz, smpeg-0.4.4.tar.gz, SDL_mixer-1.2.11.tar.gz, SDL_ttf-2.0.10.tar.gz, fftw-3.3.tar.gz, nose-1.1.2.tar.gz, numpy-1.6.1.tar.gz, pygame-1.9.1release.tar.gz, lcms-1.19.tar.gz, Imaging-1.1.7.tar.gz, PyOpenGL-accelerate-3.0.1.tar.gz, PyOpenGL-3.0.1.tar.gz, xvidcore-1.3.2.tar.bz2, a52dec-0.7.4.tar.gz, aalib-1.4rc5.tar.gz, cppunit-1.12.1.tar.gz, dirac-1.0.2.tar.gz, audiofile-0.2.7.tar.gz, esound-0.2.41.tar.bz2, faac-1.28.tar.gz, lame-3.98.4.tar.gz, popt-1.16.tar.gz, libdv-1.0.0.tar.gz, libmad-0.15.1b.tar.gz, libmng-1.0.10.tar.gz, liboil-0.3.17.tar.gz, libtheora-1.1.1.tar.bz2, lzo-2.05.tar.gz, lcms2-2.2.tar.gz, openjpeg_v1_4_sources r697.tgz, orc-0.4.14.tar.gz, schroedinger-1.0.10.tar.gz, speex-1.2rc1.tar.gz, libsndfile-1.0.25.tar.gz, twolame-0.3.13.tar.gz, x264-snapshot-20110628-2245.tar.bz2, xineramaproto-1.2.1.tar.bz2, libXinerama-1.1.1.tar.bz2, videoproto-2.3.1.tar.bz2, libXv-1.0.6.tar.bz2, xf86vidmodeproto-2.3.1.tar.bz2, libXxf86vm-1.1.1.tar.bz2, yasm-1.1.0.tar.gz, mplayer-33766.tar.gz, dejavu-fonts-ttf-2.33.tar.bz2, gameobjects-0.0.3.zip, pytiff-0.1.6.tar.gz.

An open source automation tool for completing the above steps is a "port" command from The MacPorts Project at macports.org. Download and install MacPorts, (version 2.02, (selfupdate on 09/18/2011)), and issue the following port commands: "port install tcl+threads+universal", "port install python27+universal", "port install tk+universal", "port install py27-tkinter+universal", "port install py27-pyobjc+universal", "port install tcllib", "port install py27-crypto+universal", "port install py27-game+universal", "port install py27-pil+universal", "port install py27-opengl", "port install mplayer-devel+osd+x11+noappleremote+mencoder extras+dirac+speex+a52+aa+esd+mng+sdl", "port install dejavu-fonts".

Unpack, compile, and install macports source code file, MacPorts-2.0.2.tar.bz2. Specify a "frameworks" directory. For example, make directories "/opt", "/opt/local", "/opt/local/applications", "/opt/local/frameworks", "/opt/local/tclpackage", and "/opt/local/tclpackage/macports2.0". Make sure PATH environment variable does NOT include any of the above directories, (yet). For example, type "export PATH=/usr/local/bin:/usr/bin:/bin:/usr/sbin:/sbin:/usr/X11/bin:/Developer/usr /bin:/Developer/usr/sbin". After unpacking MacPorts-2.0.2.tar.bz2, change directories to resultant "MacPorts-2.0.2/" subdirectory and type, "make clean", "./configure --prefix=/opt/local --with-install-user=kjacobi --with-install-group=staff --with-applications-dir=/opt/local/applications --with-frameworks-dir=/opt/local/frameworks --with-tclpackage=/opt/local/tclpackage/macports2.0 --with-included-tclthread", (consider changing "kjacobi" username), "make", "make install", "export PATH=/opt/local/bin:${PATH}", and "rehash". (Restart computer for good measure.) Typing "which port" should return "/opt/local/bin/port". Otherwise, fix PATH environment variable to start with /opt/local/bin.

To install gameobjects, type, "unzip gameobjects-0.0.3.zip", "cd gameobjects-0.0.3", and "python2.7 setup.py install".

To install pytiff, type, "tar xzfp pytiff-0.1.6.tar.gz", "cd pytiff-0.1.6", "export CFLAGS=-I/opt/local/include", "patch pytiff.c /Users/kjacobi/patchFiles/patch-osx-pytiff-0.1.6.pch", "python2.7 setup.py build", and "python2.7 setup.py install".

Linux

For Ubuntu Linux, (version 11.04), type "sudo apt-get install tk8.5" and "sudo apt-get install mplayer". Use Ubuntu Software Center to install apt-build, python-apt-dev, libeptdev, IDLE, (using Python-2.7, (installs Tkinter)), python-pygame, python-opengl, (including libgle3 add-on), tcllib, libtiff4-dev, (libtiff4 already installed), libtiff-doc, libtiff-tools, libtiff-opengl, pngtools, libjpeg62, libjpeg62-dev, libpng12-dev, and libsmpeg-dev.

To install pytiff, type, "tar xfp pytiff-0.1.6.tar.gz", "cd pytiff-0.1.6/", "python2.7 setup.py build", and "sudo python2.7 setup.py install".

To install gameobjects, type, "unzip gameobjects-0.0.3.zip", "cd gameobjects-0.0.3/", and "sudo python2.7 setup.py install".

To install yasm, type, "tar xfp yasm-1.1.0.tar.gz", "cd yasm-1.1.0/", "./configure", "make", and "sudo make install".

To install mpg123, type "tar xfp mpg123-1.13.4.tar.bz2", "cd mpg123-1.13.4/", "./configure", "make", and "sudo make install".

To install mplayer, type, "tar xfp mplayer-33766.tar.gz", "cd mplayer-33766/", "./configure", "make", and "sudo make install". Before running this version of mplayer, (i.e. /usr/local/bin/mplayer), type "export LD_LIBRARY_PATH=/usr/local/lib". Alternatively, run /usr/bin/mplayer, (which was installed with apt-get command above).

Windows

To use Unix command line tools on Windows, (Microsoft Windows 7 Professional, Service Pack 1, 32-bit), download and install MinGW, (for minimalist Gnu for Windows), from www.mingw.org and sourceforge.net/projects/mingw/. For example, type "mkdir c:\MinGW" and "cd c:\MinGW". Download up to about 166 different package files, such as binutils-2.21.53-1-mingw32-bin.tar.lzma and gcc-core-4.6.1-2-mingw32-bin.tar.lzma, to the c:\MinGW directory and unpack them. One unpacking method is to use "tar xfp" command on Mac OS X or Linux for ".tar.gz", ".tar.bz2", and ".tar.lzma" package files and then copy an entire directory, with the unpacked files, to Windows. Add "c:\MinGW\bin" to PATH environment variable, (open Start menu, right-click on Computer, left-click on Properties, click on "Advanced system settings" link, click on "Environment Variables . . . " button, highlight "Path" in "System variables" listbox, and press "Edit . . . " button). Type "mkdir c:\MinGW\MSYS\", "mkdir c:\MinGW\MSYS\1.0\" and "cd c:\MinGW\MSYS\1.0\". Download up to about 327 different package files, such as binutils-2.19.51-3-msys-1.0.13-bin.tar.lzma and coreutils-5.97-3-msys-1.0.13-bin.tar.lzma, to the c:\MinGW\MSYS\1.0\ directory and unpack them. From within the directory, type "msys.bat", and a new MSYS terminal window appears which emulates a bash Unix shell! In the new window, type "/postinstall/pi.sh". Add "c:\MinGW\MSYS\1.0\bin\" to PATH environment variable.

To use native Windows tools, buy Microsoft Visual Studio 2010 Professional on amazon.com, (i.e. current for 11/8/2010).

Download and install Windows SDK7.1, (for Software Development Kit) from microsoft.com, (i.e. download.microsoft.com/download/F/1/0/F10113F5-B750-4969-A255-274341AC6BCE/GRMSDK_EN_DVD.iso). Burn GRMSDK_EN_DVD.iso to CD-R. Run Setup.exe. Select all components except Microsoft Help stuff.

Download and install Service Pack 1 for Microsoft Visual Studio 2010 from microsoft.com, (i.e. http://go.microsoft.com/fwlink/? LinkId=210710). Burn VS2010S P1dvd1.iso to a DVD-R disk. Run Setup.exe.

Download and install Microsoft Exchange 2003 SDK, June2007, from microsoft.com. Run E2k3SDK.exe.

Download and install Microsoft HTML Help Workshop, from microsoft.com, (i.e. http://go.microsoft.com/fwlink/?LinkId=14188). Run htmlhelp.exe.

Search for "cabarc.exe" on go.microsoft.com. Download WindowsXP-KB838079-SupportTools-ENU.exe, install it on a Windows XP machine. Back on Windows 7 machine, using Command Prompt window, type, "mkdir c:\Users\kjacobi\bin\", (if haven't already done so). Place cabarc.exe in it. Add c:\Users\kjacobi\bin\ to PATH environment variable.

Download and install Microsoft DirectX SDK, from microsoft.com. Run DXSDK_Jun10.exe.

Make directories such as "c:\Users\kjacobi\openSourceSw\" and "c:\Users\kjacobi\openSourceSw\build\", and change to the latter directory. Copy tcl8.5.10-src.tar.gz to it and unwrap it, (i.e. open MSYS window and type "cd /c/Users/kjacobi/openSourceSw/build", and "tar xfp tcl8.5.10-src.tar.gz"). A resultant subdirectory, "tcl8.5.10/", appears. Make a sibling subdirectory called, "tcltk/", which will be used later when compiling Python-2.7.2 and its "tkinter" module. Open a Command Prompt window and type "'c:\Program Files\Microsoft Visual Studio 10.0\VC\bin\vcvars32.bat'", (for Visual C variables, 32-bit), "c dc:\Users\kjacobi\openSourceSw\build\tcl8.5.10\win\", "nmake -f makefile.vc OPTS=threads COMPILERFLAGS=-DWINVER=0x0500 DEBUG=0 INSTALLDIR=..\..\tcltk clean", "nmake -f makefile.vc OPTS=threads COMPILERFLAGS=-DWINVER=0x0500 DEBUG=0 INSTALLDIR=..\..\tcltk all", and "nmake -f makefile.vc OPTS=threads COMPILERFLAGS=-DWINVER=0x0500 DEBUG=0 INSTALLDIR=..\..\tcltk install". For general use, (i.e. in addition to supporting Python-2.7.2 installation), make directory, "c:\Tcl85", and type, "nmake -f makefile.vc OPTS=threads COMPILERFLAGS=-DWINVER=0x0500 DEBUG=0 INSTALLDIR=c:\Tcl85 clean", "nmake -f makefile.vc OPTS=threads COMPILERFLAGS=-DWINVER=0x0500 DEBUG=0 INSTALLDIR=c:\Tcl85 all", and "nmake -f makefile.vc OPTS=threads COMPILERFLAGS=-DWINVER=0x0500 DEBUG=0 INSTALLDIR=c:\Tcl85 install". Add "c:\Tcl85\bin" to PATH environment variable. Because "threads" option is used in above commands, a "t" is added to various resultant names for distinction. To provide expected reference names, manually copy to them. That is, change directories to "..\..\tcltk\bin" and type "copy tcl85t.dll tcl85.dll", "copy tclsh85t.exe tclsh85.exe", "cd ..\lib", and "copy tcl85t.lib tcl85.lib". Likewise for files under "c:\Tcl85\" and "openSourceSw\build\tcl8.5.10\win\Release_VC10\".

To install tk8.5.10-src.tar.gz, unpack it in "openSourceSw/build/", (with MSYS window). In previous Command Prompt window, (i.e. vcvars32.bat already run), cd to "openSourceSw\build\tk8.5.10\win\", and type "nmake -f makefile.vc OPTS=threads,noxp COMPILERFLAGS=-DWINVER=0x0500 DEBUG=0 INSTALLDIR=..\..\tcltk TCLDIR=..\..\tcl8.5.10 clean", "nmake -f makefile.vc OPTS=threads,noxp COMPILERFLAGS=-DWINVER=0x0500 DEBUG=0 INSTALLDIR=..\..\tcltk TCLDIR=..\..\tcl8.5.10 all", and "nmake -f makefile.vc OPTS=threads,noxp COMPILERFLAGS=-DWINVER=0x0500 DEBUG=0 INSTALLDIR=..\..\tcltk TCLDIR=..\..\tcl8.5.10 install". For general installation, type "nmake -f makefile.vc OPTS=threads,noxp COMPILERFLAGS=-DWINVER=0x0500 DEBUG=0 INSTALLDIR=c:\Tcl85 TCLDIR=..\..\tcl8.5.10 clean", "nmake -f makefile.vc OPTS=threads,noxp COMPILERFLAGS=-DWINVER=0x0500 DEBUG=0 INSTALLDIR=c:\Tcl85 TCLDIR=..\..\tcl8.5.10 all", and "nmake -f makefile.vc OPTS=threads,noxp COMPILERFLAGS=-DWINVER=0x0500 DEBUG=0 INSTALLDIR=c:\Tcl85 TCLDIR=..\..\tcl8.5.10 install". Copy to expected reference names. That is, type "cd ..\..\tcltk\bin", "copy wish85t.exe wish85.exe", "copy tk85t.dll tk85.dll", "cd ..\lib", and "copy tk85t.lib tk85.lib". Likewise for files under "c:\Tcl85\" and "openSourceSw\build\tk.5.10\win\Release_VC10\".

In addition to tcl8.5.10 and tk8.5.10, several other packages support an upcoming Python-2.7.2 build. For example, download Tix8.4.3-src.tar.gz and copy it to openSourceSw/build/. Unpack it. Change directories to "openSourceSw/build/Tix8.4.3/win" in MSYS window and type "patch makefile.vc/c/Users/kjacobi/patchFiles/patch-Tix8.4.3.pch" and "tclsh85 /c/Users/kjacobi/patchFiles/convert.tcl". Switch to Command Prompt window, run vcvars32.bat, (see above), change to directory openSourceSw\build\Tix8.4.3\win, and type "nmake /f makefile.vc INSTALLDIR=..\..\tcltk clean", "nmake /f makefile.vc INSTALLDIR=..\..\tcltk all", and "nmake /f makefile.vc INSTALLDIR=..\..\tcltk install".

Open an MSYS window, copy Python-2.7.2.tar.bz2 to openSourceSw/build/ and unwrap it. A resultant subdirectory, "Python-2.7.2/", appears. Change directories to "Python-2.7.2/Tools/msi/", (for Microsoft installer), and type, "patch msi.py /c/Users/kjacobi/patchFiles/patch1-Python-2.7.2.pch". Change directories to "Python-2.7.2/Lib/distutils/", and type, "patch cygwinccompiler.py /c/Users/kjacobi/patchFiles/patch2-Python-2.7.2.pch" and "patch msvc9compiler.py/c/Users/kjacobi/patchFiles/patch3-Python-2.7.2.pch". From directory "Python-2.7.2/Lib/distutils/command/", type, "patch build_ext.py/c/Users/kjacobi/patchFiles/patch4-Python-2.7.2.pch".

Download and install a binary version of "svn", (for subversion), command for Windows, or use a Mac OSX or Linux machine that already has it, and download specific versions of some packages by typing "svn export http://svn.python.org/projects/external/bzip2-1.0.5", "svn export http://svn.python.org/projects/external/openssl-0.9.8l", "svn export http://svn.python.org/projects/external/db-4.7.25.0", "svn export http://svn.python.org/projects/external/sqlite-3.6.21", "svn co http://svn.python.org/projects/external/Sphinx-0.6.7/sphinx tools/sphinx", "svn co http://svn.python.org/projects/external/docutils-0.6/docutils tools/docutils", "svn co http://svn.python.org/projects/external/Jinja-2.3.1/jinja2 tools/jinja2", and "svn co http://svn.python.org/projects/external/Pygments-1.3.1/pygments tools/pygments", ("co" is short for checkout). Copy resultant subdirectories, "bzip2-1.0.5/", "openssl-0.9.8l/", "db-4.7.25.0/", and "sqlite-3.6.21/" to Windows directory "c:\Users\kjacobi\openSourceSw\build\". Copy resultant subdirectories in "tools/" subdirectory to Windows directory "c:\Users\kjacobi\openSourceSw\build\Python-2.7.2\Doc\tools\". In MSYS window, change directories to /c/Users/kjacobi/openSourceSw/build/openssl-0.9.8l/ and type, "patch e_os.h/c/Users/kjacobi/patchFiles/patch-openssl-0.9.8l".

Download nasm-2.09.10-win32.zip from nasm.sf.net. Using MSYS window type, "cd /c/Users/kjacobi/bin/". Copy nasm-2.09.10-win32.zip to it, and type, "unzip nasm-2.09.10-win32.zip", "rm -f nasm-2.09.10-win32.zip", "cd nasm-2.09.10", and "cp -p nasm.exe nasmw.exe". Add c:\Users\kjacobi\bin\nasm-2.09.10 to the PATH environment variable.

Open "openSourceSw\build\Python-2.7.2\PCbuild\pcbuild.sln" with Microsoft Visual Studio 2010 Professional. Solution Explorer indicates that Berkeley DB 4.7.25 Source Files are located within and below PCbuild/subdirectory. For that reason, consider typing, "cd openSourceSw/build/Python-2.7.2/PCbuild" and "my../../db-4.7.25.0/* .", (and unpacking a fresh version of db-4.7.25.0 within openSourceSw/build/).

Select "Configuration Manager . . . " from "Build" drop-down menu and choose "Release" and "Win32" for "Active solution configuration" and "Active solution platform," respectively, (and for each project), in pop-up window.

Select "Property Manager" from "View" drop-down menu. Highlight all projects, (click on top project, hold "Shift" key down and click on bottom project). Click on "Add Existing Property Sheet" button, (i.e. with the green "+" icon). Browse to c:\Program Files\MSBuild\Microsoft.Cpp\v4.0\Platforms\Win32\PlatformToolsets\Windows 7.1 SDK\Microsoft.Cpp.Win32.Windows 7.1 SDK.props and click "Open" button.

Highlight project "_tkinter," in Solutions Explorer and select "Properties" from the "Project" drop-down menu. Within a pop-up "_tkinter Property Pages" window, change Linker→Input→Additional Dependencies to "..\..\tcltk\lib\tcl85.lib;..\..\tcltk\lib\tk85.lib" and click "Apply" button. Double-check Linker→Command Line shows quotation marks around each .lib file above.

Select "Clean Solution" then "Build Solution" from Build drop-down menu.

Open a Command Prompt window, change directories to "Python-2.7.2\Doc", and type, ".\make.bat html" and ".\make.bat htmlhelp".

Download pywin32-216.zip from https://sourceforge.net/projects/pywin32 to "openSourceSw/build/", unwrap it, and move resultant "pywin32-216/" subdirectory into Python-2.7.2/subdirectory, (i.e. "openSourceSw/build/Python-2.7.2/pywin32-216/"). With MSYS window change directories to Python-2.7.2/pywin32-216/ and type "patch setup.py/c/Users/kjacobi/patchFiles/patch1-pywin32-216.pch", "patch pywin32_postinstall.py/c/Users/kjacobi/patchFiles/patch2-pywin32-216.pch", "tclsh85 /c/Users/kjacobi/patchFiles/convert.tcl setup.py", and "tclsh85 /c/Users/kjacobi/patchFiles/convert.tcl pywin32_postinstall.py". Change directories to "Python-2.7.2/pywin32-216/pythonwin/Scintilla/win32/" and type "patch scintilla_vc6.mak /c/Users/kjacobi/patchFiles/patch3-pywin32-216.pch" and "tclsh85 /c/Users/kjacobi/patchFiles/convert.tcl scintilla_vc6.mak".

Open a Command Prompt window and type "set LIB=c:\Users\kjacobi\openSourceSw\build\Python-2.7.2\PCbuild", "set MSSdk=c:\Program Files\Microsoft SDKs\Windows\v7.1", "'c:\program files\microsoft visual studio 10.0\vc\bin\vcvars32'", "cd c:\Users\kjacobi\openSourceSw\build\Python-2.7.2\pywin32-216\", "..\PCbuild\python.exe setup.py build", and "..\PCbuild\python.exe setup.py install".

Add c:\Users\kjacobi\openSourceSw\build\Python-2.7.2 to PATH environment variable.

Open a Command Prompt window and type "set LIB=c:\Users\kjacobi\openSourceSw\build\Python-2.7.2\PCbuild", "set MSSdk=c:\Program Files\Microsoft SDKs\Windows\v7.1", "'c:\program files\microsoft visual studio 10.0\vc\bin\vcvars32'", "cd c:\Users\kjacobi\openSourceSw\build\Python-2.7.2\Tools\msi", "nmake /f msisupport.mak", "cd ..\..\UPC", "nmake /f icons.mak", and "cd ..\Toos\msi", "..\..\PCbuild\python.exe msi.py". Run resultant "python-2.7.15261.msi" file to install python.exe in directory, "c:\Python27"! Add c:\Python27 to PATH environment variable. Remove c:\Users\kjacobi\openSourceSw\build\Python-2.7.2 from PATH environment variable.

Copy nose-1.1.2.tar.gz to openSourceSw/build/directory and unwrap it. Open a Command Prompt window, change to nose-1.1.2/subdirectory, and type, "set MSSdk=c:\Program Files\Microsoft SDKs\Windows\v7.1", "'c:\program files\microsoft visual studio 10.0\vc\bin\vcvars32'", "python setup.py build", and "python setup.py install".

Copy distribute-0.6.21.tar.gz to openSourceSw/build/directory, unwrap it, change to distribute-0.6.21/ subdirectory, and type, "python setup.py install".

In MSYS window, copy numpy-1.6.1.tar.gz to openSourceSw/build/directory and unwrap it. From directory "numpy-1.6.1/numpy/distutils/" type "patch misc_util.py /c/Users/kjacobi/patchFiles/patch1-numpy-1.6.1.pch", "patch system_info.py/c/Users/kjacobi/patchFiles/patch2-numpy-1.6.1.pch". From directory "numpy-1.6.1/numpy/distutils/command" type "patch build_ext.py/c/Users/kjacobi/patchFiles/patch3-numpy-1.6.1.pch".

Open a Command Prompt window, change to numpy-1.6.1/subdirectory, and type, "set MSSdk=c:\Program Files\Microsoft SDKs\Windows\v7.1", "'c:\program files\microsoft visual studio 10.0\vc\bin\vcvars32'", "python setup.py build", and "python setup.py install".

In MSYS window, copy tiff-3.9.5.tar.gz to openSourceSw/build/directory and unwrap it. From directory "tiff-3.9.5/", type, "patch nmake.opt/c/Users/kjacobi/patchFiles/patch1-tiff-3.9.5.pch", (consider changing patch file's "kjacobi" directory first), "tclsh85 /c/Users/kjacobi/patchFiles/convert.tcl nmake.opt". Change directories to "tiff-3.9.5/tools" and type, "patch tiff2pdf.c /c/Users/kjacobi/patchFiles/patch2-tiff-3.9.5.pch".

Using prepped Command Prompt window, (i.e. set MSSdk, run vcvars32), change to tiff-3.9.5/ directory and type, "nmake -f Makefile.vc", "cd libtiff/", "move libtiff.lib libtiff_s.lib", and "copy libtiff_i.lib libtiff.lib".

In MSYS window, copy jpegsrc.v8c.tar.gz to openSourceSw/build/directory and unwrap it. From resultant "jpeg-8c/" directory, in prepped Command Prompt window, type "nmake -f makefile.vc setup-v10".

In MSYS window, copy "/c/Users/kjacobi/patchfiles/patch1-jpeg-8c.pch.uue" to jpeg-8c/ and type, "python /c/Users/kjacobi/bin/uuDec.py patch1-jpeg-8c.pch.uue" and "patch jpeg.vcxproj.filters patch1-jpeg-8c.pch". Patch five other ".vcxproj.filters" files with patch1-jpeg-8c.pch. Patch "jpeg.vcxproj" file with "patch2-jpeg-8c.pch", (i.e. after applying uuDec.py to "patch2-jpeg-8c.pch.uue"). Similarly, patch five other ".vcxproj" files with "patch3-jpeg-8c.pch". For six ".vcxproj" files, also run convert.tcl. For example, type, "tclsh85 /Users/kjacobi/patchFiles/convert.tcl jpeg.vcxproj". Type, "patch jmorecfg.h /Users/kjacobi/patchFiles/patch4-jpeg-8c.pch".

Using Visual Studio, open "jpeg.sln". Highlight "jpeg" project in Solution Explorer and select "Properties" from "Project" drop-down menu. In Property Pages pop-up window, change Configuration Properties→General→Target Extension to ".dll". Change Configuration Type to Dynamic Library (.dll) and press "Apply" button. Select "Clean Solution" then "Build Solution" from Build drop-down menu. Close jpeg solution. Move resultant "jpeg-8c/jpeg.lib", (i.e. an "import library" used when linking dependent applications to resultant "jpeg-8c/Release/jpeg.dll"), to "jpeg-8c/Release/jpeg.lib".

Type, "patch jmorecfg.h /Users/kjacobi/patchFiles/patch5-jpeg-8c.pch". Using Visual Studio, open "apps.sln". Select "Clean Solution" then "Build Solution" from Build drop-down menu.

In MSYS window, copy zlib-1.2.5.tar.bz2 to openSourceSw/build/directory and unwrap it. From resultant "zlib-1.2.5/" directory, in prepped Command Prompt window, type 'nmake -f win32/Makefile.msc LOC="-DASMV -DASMINF" OBJA="match686.obj inffas32.obj"'.

In MSYS window, copy libpng-1.4.8.tar.bz2 to openSourceSw/build/directory and unwrap it. Change directories to "libpng-1.4.8/projects/vstudio/" and type, "patch zlib.props /c/Users/kjacobi/patchFiles/patch1-libpng-1.4.8.pch", (consider first updating "kjacobi" path within patch file). Copy patch2-libpng-1.4.8.pch.uue through patch4-libpng-1.4.8.pch.uue from /c/Users/kjacobi/patchFiles/ and uudecode them with /c/Users/kjacobi/bin/uuDec.py. Type, "patch zlib/zlib.vcxproj patch2-libpng-1.4.8.pch", "tclsh85 /Users/kjacobi/patchFiles/convert.tcl zlib/zlib.vcxproj", "patch libpng/libpng.vcxproj patch3-libpng-1.4.8.pch", "tclsh85 /Users/kjacobi/patchFiles/convert.tcl libpng/libpng.vcxproj", "patch pngtest/pngtest.vcxproj patch4-libpng-1.4.8.pch", and "tclsh85 /Users/kjacobi/patchFiles/convert.tcl pngtest/pngtest.vcxproj". Change directories back to "libpng-1.4.8/" and type, "patch pngconf.h /Users/kjacobi/patchFiles/patch5-libpng-1.4.8.pch".

Using Visual Studio, open "libpng-1.4.8/projects/vstudio/vstudio.sln". Select "Configuration Manager . . . " from Build drop-down menu and choose "Release" and "Win32" for "Active solution configuration" and "Active solution platform," respectively, (and for each project), in pop-up window. Choose "Clean Solution" then "Build Solution" from Build drop-down menu.

In MSYS window, copy freetype-2.4.6.tar.bz2 to openSourceSw/build/directory and unwrap it. Change directories to "freetype-2.4.6/include/freetyp/config" and type, "patch ftoption.h /c/Users/kjacobi/patchFiles/patch1-freetype-2.4.6.pch". Change directories to "freetype-2.4.6/builds/win32/vc2010/" and type, "patch freetype.vcxproj /c/Users/kjacobi/patchFiles/patch2-freetype-2.4.6.pch" and "tclsh85 /c/Users/kjacobi/patchFiles/convert.tcl freetype.vcxproj".

Using Visual Studio, open "builds/win32/vc2010/freetype.sln". Select "Configuration Manager . . . " from Build drop-down menu and choose "Release" and "Win32" for "Active solution configuration" and "Active solution platform," respectively, (and for project), in pop-up window. Choose "Clean Solution" then "Build Solution" from Build drop-down menu.

Copy SDL-1.2.14.tar.gz to openSourceSw/build/directory, unwrap it, change directories to resultant "SDL-1.2.14/" subdirectory and unzip "VisualC.zip".

Start Visual Studio and open "SDL-1.2.14/VisualC/SDL.sln". Select "Configuration Manager . . . " from Build drop-down menu and choose "Release" and "Win32" for "Active solution configuration" and "Active solution platform," respectively, (and for each project), in pop-up window.

Select "Property Manager" from "View" drop-down menu. Highlight all projects. Click on "Add Existing Property Sheet" button. Browse to c:\Program Files\MSBuild\Microsoft.Cpp\v4.0\Platforms\Win32\PlatformToolsets\Windows 7.1 SDK\Microsoft. Cpp.Win32.Windows 7.1 SDK.props and click "Open" button.

Highlight project "SDL," in Solutions Explorer and select "Properties" from the "Project" drop-down menu. Within a pop-up "SDL Property Pages" window, add "C:\Program Files\Microsoft DirectX SDK (June 2010)\Lib\x86" to VC++ Directories→Library Directories, and click "Apply" button.

Select "Clean Solution" then "Build Solution" from Build drop-down menu.

In MSYS window, copy SDL_image-1.2.10.tar.gz to openSourceSw/build/directory, unwrap it, change directories to resultant "SDL_image-1.2.10/" subdirectory and unzip "VisualC.zip". Copy "SDL-1.2.14/VisualC/SDL/Release/SDL.dll" to "SDL_image-1.2.10/VisualC/" and "SDL_image-1.2.10/VisualC/showimage/Release/" subdirectories. Change directories to "SDL_image-1.2.10/VisualC/graphics/" and type, "rm -rf include", "rm -rf lib", "mkdir include", "mkdir lib", "cd include", "cp -p ../../../../libpng-1.4.8/png.h.", "cp -p ../../../../libpng-1.4.8/pngconf.h.", "cp -p ../../../../tiff-3.9.5/libtiff/tiffvers.h.", "cp -p ../../../../tiff-3.9.5/libtiff/tiffio.h.", "cp -p ../../../../tiff-3.9.5/libtiff/tiffconf.h.", "cp -p ../../../../tiff-3.9.5/libtiff/tiff.h.", "cp -p ../../../../zlib-1.2.5/zlib.h.", "cp -p ../../../../zlib-1.2.5/zconf.h.", "cp -p ../../../../jpeg-8c/jpeglib.h.", "cp -p ../../../../jpeg-8c/jmorecfg.h.", "cp -p ../../../../jpeg-8c/jerror.h.", "cp -p ../../../../jpeg-8c/jconfig.h.", "cd ../lib", "cp -p ../../../../libpng-1.4.8/projects/vstudio/Release/libpng14.lib.", "cp -p ../../../../tiff-3.9.5/libtiff/libtiff.lib.", "cp -p ../../../../zlib-1.2.5/zdll.lib.", and "cp -p ../../../../jpeg-8c/Release/jpeg.lib.".

Start Visual Studio and open "SDL_image-1.2.10/VisualC/SDL_image.sln". As before, choose "Release" and "Win32" configuration. Add Windows SDK 7.1 property sheet to project. Add "c:\Users\kjacobi\openSourceSw\build\SDL-1.2.14\include" to VC++ Directories→Include Directories. Add "c:\Users\kjacobi\openSourceSw\build\SDL-1.2.14\VisualC\SDL\Release" and "c:\Users\kjacobi\openSourceSw\build\SDL-1.2.14\VisualC\SDLmain\Release" to VC++ Directories→Library Directories. Add "SDL.lib;SDLmain.lib" to Linker→Input→Additional Dependencies. Add 'LOAD_JPG_DYNAMIC="jpeg.dll"', 'LOAD_PNG_DYNAMIC="libpng14.dll"', and 'LOAD_TIF_DYNAMIC="libtiff.dll"' to C/C++→Preprocessor→Preprocessor Definitions.

Select "Clean Solution" then "Build Solution" from Build drop-down menu.

In MSYS window, copy SDL_ttf-2.0.10.tar.gz to openSourceSw/build/directory, unwrap it, change directories to resultant "SDL_ttf-2.0.10/" subdirectory and unzip "VisualC.zip". Copy "SDL-1.2.14/VisualC/SDL/Release/SDL.dll" to "SDL_ttf-2.0.10/VisualC/" and "SDL_ttf-2.0.10/VisualC/Release/" subdirectories. Change directories to "SDL_ttf-2.0.10/VisualC/FreeType/include/" and type, "rm -f ft2build.h", "cp -p ../../../freetype-2.4.6/include/ft2build.h.", "rm -rf freetype", "cp -pR ../../../freetype-2.4.6/include/freetype freetype", "cd ../lib", "rm -f libfreetype.lib", and "cp -p ../../../freetype-2.4.6/objs/win32/vc2010/freetype246.lib.".

Start Visual Studio and open "SDL_ttf-2.0.10/VisualC/SDL_ttf.sln". As before, choose "Release" and "Win32" configuration. Add Windows SDK 7.1 property sheet to projects. To all projects, add "c:\Users\kjacobi\openSourceSw\build\SDL-1.2.14\include" to VC++Directories→Include Directories. Add "c:\Users\kjacobi\openSourceSw\build\SDL-1.2.14\VisualC\SDL\Release" and "c:\Users\kjacobi\openSourceSw\build\SDL-1.2.14\VisualC\SDLmain\Release" to VC++ Directories→Library Directories. Add "SDL.lib;SDLmain.lib" to Linker→Input→Additional Dependencies. In Solution Explorer, highlight and remove "libfreetype.lib" of project "SDL_ttf". With same project highlighted, select "Add Existing Item . . . " from Project drop-down menu and choose "SDL_ttf-2.0.10/VisualC/FreeType/lib/freetype246.lib".

Select "Clean Solution" then "Build Solution" from Build drop-down menu.

In MSYS window, copy SDL_mixer-1.2.11.tar.gz to openSourceSw/build/directory, unwrap it, change directories to resultant "SDL_mixer-1.2.11/" subdirectory and unzip "VisualC.zip". Copy "SDL-1.2.14/VisualC/SDL/Release/SDL.dll" to "SDL_mixer-1.2.11/VisualC/" subdirectory.

Start Visual Studio and open "SDL_mixer-1.2.11/VisualC/SDL_mixer.sln". As before, choose "Release" and "Win32" configuration. Add Windows SDK 7.1 property sheet to projects. To all projects, add "c:\Users\kjacobi\openSourceSw\build\SDL-1.2.14\include" to VC++ Directories→Include Directories. Add "c:\Users\kjacobi\openSourceSw\build\SDL-1.2.14WisualC\SDL\Release" and "c:\Users\kjacobi\openSourceSw\build\SDL-1.2.14 WisualC\SDLmain\Release" to VC++ Directories→Library Directories. Add "SDL.lib;SDLmain.lib" to Linker→Input→Additional Dependencies.

Select "Clean Solution" then "Build Solution" from Build drop-down menu.

In MSYS window, copy pygame-1.9.1release.tar.gz to openSourceSw/build/directory, unwrap it, change directories to resultant "pygame-1.9.1release/" subdirectory, type, "python setup.py --help", and press "Return" for prompted questions. A file named "Setup" is generated. Type, "patch Setup /c/Users/kjacobi/patchFiles/patch-pygame-1.9.1release.pch" and "tclsh85 /c/Users/kjacobi/patchFiles/convert.tcl Setup". Type, "cd src", "gcc -c scale_mmx32.c", "mkdir ../obj", "mkdir ../obj/win32", and "my scale_mmx32.o ../obj/win32/scale_mmx.obj".

In a prepped Command Prompt window, change to pygame-1.9.1release/directory and type, "python setup.py build" and "python setup.py install".

In MSYS window, copy glut-3.7.6-src.zip to openSourceSw/build/directory and unwrap it.

Start Visual Studio and open "glut-3.7.6/glut.dsw". As before, choose "Release" and "Win32" configuration. Add Windows SDK 7.1 property sheet to projects. Highlight project "glut32," in Solutions Explorer and select "Properties" from the "Project" drop-down menu. Within a pop-up "glut32 Property Pages" window, delete copy commands under Configuration Properties→Build Events→Post-Build Event→Command Line, and description under Post-Build Event→Description. Click "Apply" button.

Select "Clean Solution" then "Build Solution" from Build drop-down menu.

In MSYS window, copy gle-3.1.0.tar.gz to openSourceSw/build/directory, unwrap it, change to "gle-3.1.0/ms-visual-c/" directory and copy "/c/Users/kjakobi/patchFiles/gle32.def" to it.

Start Visual Studio and open "gle-3.1.0/ms-visual-c/vc.dsw". As before, choose "Release" and "Win32" configuration. Add Windows SDK 7.1 property sheet to projects. Highlight project "gle," in Solutions Explorer and select "Properties" from the "Project" drop-down menu. Within a pop-up "gle Property Pages" window, replace ".lib" with ".dll" under Configuration Properties→General→Target Extension. Select "Dynamic Library (.dll)" under General→Configuration Type. Change General→Target Name to "gle32". Add "opengl32.lib; glu32.lib" to Linker→Input→Additional Dependencies. Add "c:\Users\kjacobi\openSourceSw\build\gle-3.1.0\ms-visual-c\gle32.def" under Linker→Input→Module Definition File. Click "Apply" button.

Select "Clean Solution" then "Build Solution" from Build drop-down menu.

In MSYS window, copy PyOpenGL-3.0.1.tar.gz to openSourceSw/build/directory, unwrap it, change to "PyOpenGL-3.0.1/OpenGL/DLLS/" directory and type, "cp -p ../../../glut-3.7.6/lib/glut/Release/glut32.dll." and "cp -p ../../../gle-3.1.0/ms-visual-c/gle/Release/gle32.dll.". Change back to "openSourceSw/build/" directory, copy PyOpenGL-accelerate-3.0.1.tar.gz to it, and unwrap it.

In a prepped Command Prompt window, change to "PyOpenGL-3.0.1\" directory and type, "python setup.py build" and "python setup.py install". Change to "..\PyOpenGL-accelerate-3.0.1\" directory and type, "python setup.py build" and "python setup.py install".

In MSYS window, copy yasm-1.1.0.tar.gz to openSourceSw/build/directory, unwrap it, change to "yasm-1.1.0/" directory and type, "./configure" and "make".

Start Visual Studio and open "yasm-1.1.0/Mkfiles/vc10/yasm.sln". As before, choose "Release" and "Win32" configuration. Add Windows SDK 7.1 property sheet to projects. Select "Clean Solution" then "Build Solution" from Build drop-down menu. Copy resultant "yasm-1.1.0\Mkfiles\vc10\Win32\Release\yasm.exe" to c:\Users\kjacobi\bin\.

In MSYS window, copy libmad-0.15.1b.tar.gz to openSourceSw/build/directory, unwrap it, change to "libmad-0.15.1b/msvc++/" directory and copy "/c/Users/kjacobi/patchFiles/libmad.def" to it.

Start Visual Studio and open "libmad-0.15.1b/msvc++/libmad.dsp". As before, choose "Release" and "Win32" configuration. Add Windows SDK 7.1 property sheet to projects. Highlight project "libmad," in Solutions Explorer and select "Properties" from the "Project" drop-down menu. Within a pop-up "libmad Property Pages" window, replace ".lib" with ".dll" under Configuration Properties→General→Target Extension. Select "Dynamic Library (.dll)" under General→Configuration Type. Add "c:\Users\kjacobi\openSourceSw\build\libmad-0.15.1b\msvc++\libmad.def" under Linker→Input→Module Definition File. Click "Apply" button. Select "Clean Solution" then "Build Solution" from Build drop-down menu.

In MSYS window, copy mpg123-1.13.4.tar.bz2 to openSourceSw/build/directory and unwrap it.

Start Visual Studio and open "mpg123-1.13.4/ports/MSVC++/2008/mpg123.sln". As before, choose "Release" and "Win32" configuration. Add Windows SDK 7.1 property sheet to projects. Select "Clean Solution" then "Build Solution" from Build drop-down menu.

In MSYS window, change to openSourceSw/build/directory and type, "svn export -r33766 --ignore-externals svn://svn.mplayerhq.hu/mplayer/trunk mplayer-33766", "svn export -r1228 svn://svn.mplayerhq.hu/dvdnav/trunk/libdvdnav/src mplayer-33766/libdvdnav/", "svn export -r1228 svn://svn.mplayerhq.hu/dvdnav/trunk/libdvdread/src mplayer-33766/libdvdread4/", "git clone --depth 1000 git://git.videolan.org/ffmpeg.git mplayer-33766/ffmpeg", "cd mplayer-33766/ffmpeg/", and "git checkout -f 9e17d051ac9b113b70980373b8489ca469505f3f".

Copy library and header files to allow use with MinGW compilers and linkers. Type, "cd /c/Users/kjacobi/openSourceSw/build/jpeg-8c/Release/", "cp -p jpeg.lib /c/MinGW/lib/libjpeg.a", "cp -p jpeg.dll /c/MinGW/bin/", "cd ..1", "cp -p *.h /c/MinGW/include/", "cd ../libpng-1.4.8/projects/vstudio/Release/", "cp -p libpng14.lib /c/mingw/lib/libpng.a", "cp -p libpng14.dll /c/mingw/bin/", "cd ../../..", "cp -p png.h /c/mingw/include/", "cp -p pngconf.h /c/mingw/include/", "cd ../SDL-1.2.14/VisualC/SDL/Release/", "cp -p SDL.lib /c/mingw/lib/libSDL.a", "cp -p SDL.dll /c/mingw/bin/", "cd ../../../include/", "mkdir /c/mingw/include/SDL/", "cp -p *.h /c/mingw/include/SDL/", "cd ../../libmad-0.15.1b/msvc++/Release/", "cp -p libmad.lib /c/mingw/lib/libmad.a", "cp -p libmad.dll /c/mingw/bin/", "cd ../../", "cp -p *.h /c/mingw/include/", "cd ../SDL_mixer-1.2.11/VisualC/Release/", "cp -p SDL_mixer.lib /c/mingw/lib/libSDL_mixer. a", "cp -p SDL_mixer.dll /c/mingw/bin/", "cd ../../", "cp *.h /c/mingw/include/SDL/", "cd ../SDL_image-1.2.10/VisualC/Release/", "cp -p SDL_image.lib /c/mingw/lib/libSDL_image.a", "cp -p SDL_image.dll /c/mingw/bin/", "cd ../../", "cp -p *.h /c/mingw/include/SDL/", "cd ../SDL_ttf-2.0.10/VisualC/Release/", "cp -p SDL_ttf.lib /c/mingw/lib/libSDL_ttf.a", "cp -p SDL_ttf.dll /c/mingw/bin/", "cd ../../", and "cp -p *.h /c/mingw/include/SDL/". "cd ../zlib-1.2.5/", "cp -p zlib1.dll /c/mingw/bin/", "cd ../mpg123-1.13.4/ports/MSVC++/2008/Release/", "cp -p libmpg123.lib /c/mingw/lib/libmpg123.a", "cp -p libmpg123.dll /c/mingw/bin/", "cd ../../../../src/", "cp -p *.h /c/mingw/include/", "cd ../ports/MSVC++/", "cp -p *.h /c/mingw/include/", "cd ../../src/libmpg123/", "cp -pi *.h /c/mingw/include/", (do not overwrite existing files), and "cp -p mpg123.h.in /c/mingw/include/".

Apply patches. Type, "cd ../../../mplayer-33766/libao2/", "patch ao_sdl.c /c/Users/kjacobi/patchFiles/patch1-mplayer-33766.pch", "cd ../libvo/", "patch vo_sdl.c /c/Users/kjacobi/patchFiles/patch2-mplayer-33766.pch", "cd /c/mingw/include/", and "patch mpg123.h /c/Users/kjacobi/patchFiles/patch3-mplayer-33766.pch".

Build mplayer. Change to mplayer-33766/ directory and type, "make clean", "./configure --disable-pthreads", and "make".

In MSYS window, copy Imaging-1.1.7.tar.gz to openSourceSw/build/directory, unwrap it, change to "Imaging-1.1.7/" directory and type, "patch setup.py /c/Users/kjacobi/patchFiles/patch-Imaging-1.1.7.pch", (consider first updating "kjacobi" path within patch file), "cd ../tiff-3.9.5/libtiff/", "cp -p libtiff.lib /c/mingw/lib/libtiff.a", "cp -p libtiff.dll /c/mingw/bin/", "cp -p *.h /c/mingw/include", "cd ../../freetype-2.4.6/objs/win32/vc2010/", "cp -p freetype246.lib freetype.lib", "cp -p freetype.lib /c/mingw/lib/freetype.a", "cp -p freetype246.dll /c/mingw/bin/", "cd ../../../include/freetype/", and "cp -p *.h /c/mingw/include/".

In a prepped Command Prompt window, change to "Imaging-1.1.7\" directory and type, "python setup.py build_ext -i" and "python setup.py install".

In MSYS window, copy pytiff-0.1.6.tar.gz to openSourceSw/build/directory, unwrap it, change to "pytiff-0.1.6/" directory and type, "patch setup.py /c/Users/kjacobi/patchFiles/patch1-win-Imaging-1.1.7.pch", and "patch pytiff.c /c/Users/kjacobi/patchFiles/patch2-win-Imaging-1.1.7.pch".

In a prepped Command Prompt window, change to "pytiff-0.1.6\" directory and type, "python setup.py build" and "python setup.py install".

In MSYS window, copy pycrypto-2.3.tar.gz to openSourceSw/build/directory and unwrap it. In a prepped Command Prompt window, change to "pycrypto-2.3\" directory and type, "python setup.py build" and "python setup.py install".

In MSYS window, copy gameobjects-0.0.3.zip to openSourceSw/build/directory and unwrap it. In a prepped Command Prompt window, change to "gameobjects-0.0.3\" directory and type, "python setup.py install".

In MSYS window, consider copying dejavu-fonts-ttf-2.33.tar.bz2 to openSourceSw/build/directory and unwrapping it. Consider making a "ttf/", (for true type font), subdirectory under /c/Users/kjacobi/buildShow/cueDir/program/ that contains "LICENSE", "DejaVuSans-Bold.ttf", "DejaVuSansMono-Bold.ttf", and "DejaVuSans.ttf" from the dejavu-fonts-ttf-2.33 archive.

DETAILED DESCRIPTION

Alternative Embodiments—FIGS. 116-118 Initial Individual Real-Time Directions

Alternative embodiments could modify the pages of FIGS. 13-22 by substituting, subtracting, and/or adding different objects, colors, patterns, paths, buttons, menus, dialog boxes, cue touch items, and auxiliary activation inputs. More or less than four predefined cue touch items could direct rotation styles and tempos. Their specifications may be subdivided. In addition, specific objects, colors, patterns, paths, in-place rotations, in-place animations, and/or in-place behaviors may be predefined with more buttons, menus, and dialog boxes, and selected with additional cue touch items and auxiliary activation inputs, providing additional initial individual real-time directions. Shows that choose to replay initial individual real-time directions, depicted in FIGS. 73-100, are affected as well.

Different Objects

Instead of, or in addition to, circular objects on the pages of FIGS. 13-20, 22, 33-36, squares, stars, diamonds, ovals, trapezoids, custom bitmaps, photographs, animations, videos, three-dimensional models, animated three-dimensional models, three-dimensional image objects, "three-dimensional video objects," or a combination, may be applied. Three-dimensional video objects are virtual polyhedrons with videos on one or more sides. One embodiment accommodates from 1 to 16 objects, (6 are used as a default). Other embodiments may allow more.

Objects may be modified, for one embodiment, using the customization process or editing strVars.txt. Lines 167 to 169 of cueStage.txt read variables "iconTypeList," "imgList," (for image list), and "btmList," (for bitmap list) from strVars.txt. Variable iconTypeList determines a type of object to be displayed in each of 16 positions. One embodiment uses code "ovl" in each position to indicate circular objects, (created as Tk canvas "oval" items). Additional iconTypeList codes, "img," and "btm," direct one embodiment to find a respective object by referring to an image in imgList or a bitmap in btmList, respectively. Lines 1140 to 1162 of cueStage.txt and lines 94 to 96 of strVars.txt give examples of each list.

Alternative embodiments may provide a wider range of different objects. Similar to the style and tempo buttons of FIGS. 13-22, alternative embodiments may provide "object" buttons that provide menus and dialog boxes for selecting objects for particular positions. Cue touch items and auxiliary activation inputs, similar to those of FIGS. 13-22, could instantly invoke the predefined objects. Such activations would constitute further initial individual real-time directions.

Different Object Patterns

Patterns of objects may be modified, for one embodiment, using the customization process or editing strVars.txt. Line 198 of cueStage.txt reads variable "group," from line 124 of strVars.txt. Variable group determines, for one embodiment, which positions are visible. For example, one embodiment uses decimal 1365 as a value for group. Decimal 1365 equals binary 0000 0101 0101 0101. That is, bits 0, 2, 4, 6, 8, and 10 are set. They make positions 0, 2, 4, 6, 8 and 10 visible.

Alternative embodiments may provide a range of different object patterns. Similar to the style and tempo buttons of FIGS. 13-22, alternative embodiments may provide "pattern" buttons that provide menus for selecting which positions are visible. Cue touch items and auxiliary activation inputs, similar to those of FIGS. 13-22, could instantly invoke the predefined patterns. Such activations would constitute further initial individual real-time directions.

Different Object Colors and Opacity Levels

Colors of objects may be modified, for one embodiment, using the customization process or editing strVars.txt. Line 210 of cueStage.txt reads variable "colors," from line 136 of strVars.txt. Variable colors determines, for one embodiment, a color for each position.

Alternative embodiments may provide a range of different object colors and opacity levels. Similar to the style and tempo buttons of FIGS. 13-22, alternative embodiments may provide "color" and "opacity" buttons that provide menus for selecting colors and opacity levels for each position. Cue touch items and auxiliary activation inputs, similar to those of FIGS. 13-22, could instantly invoke the predefined colors and opacity levels. Such activations would constitute further initial individual real-time directions.

Different Paths

Custom paths of objects may be drawn, for one embodiment, using the "new design" button of FIG. 28 and drawing canvas of FIG. 29. One embodiment uses a circular path, depicted in FIGS. 13-20, 22, 33, as a default when recording or replaying initial individual real-time directions. One embodiment, for both initial and second individual real-time direction environments, allows paths to become visible, with a specific color and thickness, using the customization process or editing strVars.txt.

Alternative embodiments may provide a range of different object paths, including three-dimensional paths. Similar to the style and tempo buttons of FIGS. 13-22, alternative embodiments may provide "path" buttons that provide menus, dialog boxes, polynomial equations, differential equation solutions, and/or drawing canvases for creating or importing unique or standard object paths. Cue touch items and auxiliary activation inputs, similar to those of FIGS. 13-22, could instantly invoke the predefined paths. Additional cue touch items could change their colors and opacity levels. Such activations would constitute further initial individual real-time directions.

Other embodiments may use a different path as a default path. For example, a path in the shape of a logo may augment branding efforts. One embodiment uses a default path instead of an edge path for initial individual real-time direction replays. An alternative embodiment could provide an extra option to choose, or use the edge path as indicated on the page of FIG. 28.

Paths, for one embodiment, depict a graphical motion analog to one bar of music. Paths, for alternative embodiments, may correlate to multiple bars of music. Alternative embodiments could record with single bar paths and replay with multiple bar paths, or vice versa. Alternative embodiments could offer options to set numbers of bars of music to be portrayed by particular paths. For example, one or more button widget menu items, similar to the "start delay" button of FIGS. 23 and 27, could be added to the page of FIG. 28 to indicate how many bars of music correspond to a custom path, edge path, or both.

Object In-Place Rotation, Animation, Behavior

One embodiment employs second individual real-time directions to facilitate object in-place rotation changes. Alternative embodiments may utilize initial individual real-time directions. In-place rotation may be controlled directly, depicted with three-dimensional objects, or interpreted from object movements. Each position on a closed path may be translated into an in-place rotation angle. Likewise for in-place animations and in-place behaviors.

Multiple Initial Individual Real-Time Direction Recordings

One embodiment incorporates a single initial individual real-time direction recording per medley or selection show. Alternative embodiments may record and integrate multiple sessions of initial individual real-time directions. For example, a session may be recorded for object movements. Another session may record changes in color and/or opacity levels. Another session may record in-place rotation directions, etc. All initial individual real-time direction sessions may be brought to bear during medley and selection shows.

In addition to movements along a path, transitions throughout an entire volume may be achieved by alternative embodiments. For example, an alternative embodiment could record one initial individual real-time direction session per coordinate axis. Each cycle along the circular path of FIG. 13 could correspond to movement along a full extent, or a portion of, a coordinate axis, for example. Combining three separate sessions may be then combined to find corresponding three-dimensional volume coordinate changes, for example. Besides rectangular volumes, cylindrical or spherical coordinate systems may specify cylindrical or spherical volumes, respectively. Other arrangements are possible.

Initial individual real-time directions modifying different aspects and given by multiple users may be integrated into a single show by alternative embodiments. Such embodiments may be a basis for interactive social games.

Predefined Series of Activations, Tempos

For any type of initial individual real-time direction, a button may arrange to assemble a series of them. For example, several different patterns may be grouped together. These directions may follow each other automatically in succession, and repeat upon completion. An independent pace for each series may be set using tempo buttons similar to those of FIGS. 13-22. A pace may also be linked to tempos for a separate type of direction. For example, a series of patterns may be linked with rotation tempos. Each pattern in the series may change for each rotation beat. Activating different rotation styles and tempos would automatically change tempos for series that were linked. The tempos for these linked series could be controlled by rotation cue touch items, even if rotation of objects was halted. A "beat delay" variable may be set for each series. It would delay when a change occurs, relative to a new beat.

Additional Audio and/or Video Recordings

One embodiment, using the song button of FIGS. 2 and 45, plays one audio and/or video recording when an initial individual real-time direction session starts or continues.

Alternative embodiments may include additional audio and/or video recordings that play when an initial individual real-time direction starts or continues.

Second Individual Real-Time Directions

Different Objects

Instead of, or in addition to, three-dimensional image objects on the pages of FIGS. 73-100, circles, squares, stars, diamonds, ovals, trapezoids, custom bitmaps, photographs, animations, videos, three-dimensional models, animated three-dimensional models, three-dimensional video objects, or a combination, may be applied. Other embodiments may accept a greater number of image formats and integrate converters, such as for PDF, (portable document format), files. One embodiment uses six-sided, rectangular three-dimensional image objects. Alternative embodiments may use virtual polyhedrons with a different number of sides. One embodiment provides hue and hue rule options affecting entire objects. Alternative embodiments can add finer-grained options that affect individual faces and portions of faces. One embodiment accommodates from 1 to 16 objects, (1 and 6 are used as defaults). Other embodiments may allow more.

One embodiment implements a predefined Fit Mode that breaks certain images, into two and trims margins to improve readability. Other embodiments can expand the Fit Mode concept into a full-featured option, selected and defined by the user on a per-image, per-image-type, or per-show basis. For example, the user may divide an image into a chosen number of images using specified division formats and margin reductions.

Graphical Controls

Alternative embodiments may provide one or more graphical control panels, buttons, and/or other widgets, (and, optionally, blatant auxiliary activation inputs), to activate second individual real-time directions.

Additional Controls and Presets

Different formats and additional second individual real-time directions for controlling object speeds, in-place rotations, animations, and behaviors may be employed by alternative embodiments. Likewise for navigating between saved virtual perspectives, Survey Views, Face Views, and Stage View. For example, an alternative embodiment may dedicate an input to pause and resume object in-place rotations, regardless of whether an initial individual real-time direction recording is playing or not. Alternative embodiments may provide additional rotation controls for objects that rotate in-place on two or more axes. Alternative embodiments may add second individual real-time directions that toggle which way objects move and rotate in-place. Alternative embodiments may add second individual real-time directions that change object in-place animations and/or in-place behaviors. Alternative embodiments may allow seamless transitions from Face View or Survey View to custom virtual perspectives when the pause second individual real-time direction is issued. Alternative embodiments may add second individual real-time directions for muting, unmuting, delaying, and advancing individual audio or video recordings. In addition to a constant press of a right-hand "shift" key to temporarily upgrade refresh rates, (if curtailed by customization), as for one embodiment, an alternative embodiment can implement a preselected time period and a momentary activation, for example. Multiple presets for instantly changing from one set or subset of directions to another may be utilized. Function directions, programmed to automatically switch through a series of presets, may be applied.

Face View Enhancements

Panning and zooming in Face View may be enhanced with directions that smoothly zoom into and pan to preselected areas. Preselected areas may be standard or custom. That is, pan and zoom offsets may be saved similarly to how other virtual perspectives are saved by the user when not in Face View or Survey View. Alternatively, they may be specified using a mouse or similar pointing device. Other directions can smoothly zoom and pan out, and/or center a Face View image. A speaker may thus indicate relevant subject matter on a Face View image.

A cursor object, controlled by a mouse or similar pointing device, may be added to Face view. A speaker may thus point to relevant subject matter on a Face View image.

Cursor movements and preselected, smooth zooming and panning could be recorded as second individual real-time directions during an "edit mode" show. They could be replayed during a "view mode" show. Additionally, they could be separated from other second individual real-time directions into files associated with names of images or videos displayed during Face View. Those files, if present, could be played via a second individual real-time direction during subsequent "edit mode" shows. The second individual real-time direction could be the same one that plays additional audio and/or video recordings corresponding to displayed Face View images, for one embodiment. The user may review audio and cursor movement portions of lectures that correspond to individual images, at random and on demand, for example.

In addition to playing audio, video, zoom, pan, and cursor movement recordings corresponding to displayed Face View images or videos, alternative embodiments may provide second individual real-time directions to launch additional services, applications, and/or content. For example, instead of calling the Mplayer application to play an audio recording, a batch file, shell script, or other specific program call may be arranged. A show may thus become a full-fledged graphical user interface, (GUI), in itself!

Alternative embodiments may use additional object database entry fields that allow the user to specify additional materials directly. For example, one embodiment uses a "left" field to specify an image name that corresponds to the left face of an object. Alternative embodiments may include a "left_aud" field that specifies an additional audio recording name that corresponds to the left face of the object, or a "left_pro" field that specifies an additional program name. Directly specified additional materials advantageously have fewer path and file naming constraints.

Alternative Motion Equations, Direction Paradigms Initial and/or Second Individual Real-Time Directions An initial or second individual real-time direction may or may not continue to apply after its input is released. Influence from the direction may vary with time, growing, decaying, oscillating, or a combination. For example, an initial individual real-time direction for object opacity may make objects gradually turn invisible then reappear.

Objects on a path do not have to move uniformly together. Initial and/or second individual real-time directions may apply to just a subset of objects. A same subset and/or additional subsets of objects may be influenced by direct interactions and/or through attractive and/or repulsive virtual forces from objects and/or paths and/or regions of virtual space. Likewise for virtual perspectives and related second individual real-time directions.

An initial individual real-time direction affecting object translation or rotation, may follow alternative equations than those outlined by FIG. 109, as per one embodiment. For example, a direction may impart a constant or variable virtual force of a given strength instead. The strength may determine acceleration and deceleration speeds, for example.

In addition to forward and reverse movements along a path, initial individual real-time directions may control transverse motions. Hence, an object "wiggle" and similar movements may be effected. On a three-dimensional path, two transverse motions may be directed.

Activating an initial individual real-time direction affecting object translation or rotation, when it is already active, (i.e. pressing its input twice in a row), may not reset object positions, as per one embodiment. For example, a different initial individual real-time direction affecting object translation may be activated each alternate button press. Hence, for example, toggling between two directions may be effected with consecutive presses of a single button. The alternate direction may be an adjacent direction or a most recently used different direction. Alternative embodiments may fast-forward objects at double-time for a quarter-cycle when an active direction is repeated, for example. Alternative embodiments may use repeated activations to switch directions for a number of beats. Alternative embodiments may define multiple menu options to control this aspect of initial individual real-time directions. Alternative embodiments may place objects mid-path for an activation, regardless if it is a repeat activation or not. Other alternatives are possible.

One embodiment can generate back-step movements by activating two initial individual real-time directions, (with opposite bearings), in close succession. Alternative embodiments may define automatic back steps for each beat or each number of beats as part of a single initial individual real-time direction.

Different Display Hardware and/or Lighting Uses

The cue_1.txt to cue_5.txt cache files, depicted in FIG. 107, may be redeployed by different software, hardware, or both. Likewise for cache files of alternative embodiments. Initial individual real-time directions may thus affect flashing lights, including their synchronizations with audio recordings. Light emitting diodes, (LEDs, inorganic and organic), liquid crystal displays, (LCDs), digital light projectors, (DLPs), quantum dots, lasers, strobes, flashlamps, and light sources that can be electrically, optically, or mechanically shuttered, refracted, or reflected may be orchestrated. White light sources may be colored with transmission filters. Lights may appear to move if many lights are used or shone at various locations at a flash rate of around 20 Hz or greater, illuminating positions as per data in the cache files. Of course, lights may also actually move. A flash may highlight a current location. Any repetitive movement maps out an equivalent path that objects may translate upon. The cache files contain information for when flashing is needed to depict objects moving on their path, as per initial individual real-time directions.

Wheels, circular fans, windmills, gears, pulleys, and other rotary components may be visually enhanced with flashing lights controlled by initial individual real-time directions. Similarly arms, legs, heads, and torsos of athletes, dancers, fashion models, and robots often undergo repetitive movements and may be similarly enhanced. Colored, flashing lights influenced by initial individual real-time directions may guide an exerciser through a pre-planned range of tempos. They could be used as a choreography tool to help a dancer practice. They could be used to add pizzazz to an exhibition, musical presentation, or stage show.

Lighting devices following individual real-time directions may provide general entertainment, instruction, decoration, and ambience, with or without background music. For example, devices or displays comprised of LEDs, LCDs, quantum dots, or a combination, could be placed underneath translucent glassware or plasticware, perhaps with frosted surface designs, on a dining room table. The glassware may be illuminated with dancing designs that are synchronized to background audio recordings. The devices attached to wheels, wrists, ankles, etc. may help direct a coached workout, while improving night-time safety. Decorative patches, lines, and patterns of light may illuminate in time with music for Christmas and holiday displays.

One embodiment allows for recording and replaying initial and second individual real-time directions, medley shows, and selection shows. One embodiment works on devices running Windows™, Mac OS X™, or Linux™ operating systems. Example devices include netbooks, ultrabooks, laptops, desktops, handhelds, portable computers. One embodiment provides for lighting uses as well.

Alternative embodiments may similarly provide for recording and replaying initial and second individual real-time directions, medley shows, and selection shows. Alternative embodiments may work on devices running other operating systems other than Windows™, Mac OS X™, or Linux™. Example devices include netbooks, ultrabooks, laptops, desktops, handhelds, smart phones, portable computers, cell phones, tablet devices, readers, music players, televisions, set-top boxes, digital video disc players (all formats), digital video recorders (DVRs), game consoles, mainframes, server and client machines integrating social network services, cloud services, and internet services. External displays and DLPs, may extend a device, for example. Alternative embodiments may provide for lighting uses as well.

Robotic Uses

As discussed above, initial individual real-time directions may replace the equations outlined by FIG. 109 with other paradigms, such as imparting a constant or variable virtual force of a given strength. This virtual force, used for display purposes, may then be translated into an actual force. For example, robotic motor current levels may be amplitude modulated to achieve choreographic motion.

Multiple Simultaneous Paths and Object Sets

One embodiment allows for one path, its lineup of objects, and initial and second individual real-time direction sessions. Alternative embodiments may enable multiple simultaneous paths, their object lineups, and initial and second individual real-time direction sessions. Objects may overlap each other or interact in some way. For example, two objects might bounce away from each other if they touch. They could also deform or cling together for a time. Paths, in such instances, may not be strictly adhered to. Instead, paths may act as virtual forces that attract/repulse objects to/from them over time. The attractive or repulsive virtual forces may vary with virtual distance and/or time and be set by the user. A path may attract all objects, including objects originally from a different path. A path may be attractive to just its original set of objects. A path might be repulsive to objects from a different path. Initial and second individual real-time directions may influence similarly as virtual forces. Such parameters, and others, could be presented as additional options for the user to experiment with.

A single two- or three-dimensional object may be broken into multiple pieces. The pieces may constitute separate objects with independent paths.

Paths may be treated themselves as objects that follow a same or different initial individual real-time direction recording during an "edit mode" or "view mode" show. An "anchor" point for each path could determine its position on a "super-path" or "path for paths." Anchor points could be at central, corner, or side locations, for example. Multiple levels of complexity are possible. That is, super-paths may themselves be treated as objects, and so on.

Different Background Scenery Objects

One embodiment uses six-sided, rectangular three-dimensional image objects to display background scenery. Alternative embodiments may use virtual polyhedrons with a different number of sides and/or use videos instead of still images to portray background scenery.

Multiple Background Scenery Objects

One embodiment displays one background scenery three-dimensional image object per show. Alternative embodiments may use more than one. Backgrounds could change via new second individual real-time directions, a countdown timer, and/or a timetable.

Initial Individual Real-Time Directions for Background Scenery Objects

One embodiment uses the center of a background scenery three-dimensional image object as its anchor point. Alternative embodiments may use a series of anchor points within the object, forming a path. Alternative embodiments may use an initial individual real-time direction recording to determine where on the path to anchor the background scenery object at any given moment.

Multiple Simultaneous Users

One embodiment provides a single path with objects while recording initial individual real-time directions, as depicted by FIG. 13. Two or more users may take turns controlling initial individual real-time direction inputs during a recording session. Alternatively, one user could control the lights button of FIG. 13, a second user could control the rotate button of FIG. 13, and a third user could control the cue touch items of FIG. 13. Likewise for second individual real-time directions. Users may take turns or control different aspects at once. Three-dimensional image objects created by multiple users may form a show lineup.

Alternative embodiments with larger varieties of initial individual real-time directions could allow a greater number of people to participate at once. For example, one user could control object colors, another user could manage object patterns, another could administer object paths, another object rotations, etc.

Alternative embodiments could handle parallel sets of paths, objects, and initial and second individual real-time directions. Multiple users could simultaneously issue initial or second individual real-time directions. Two or more keyboards or joysticks could be attached to a single laptop or desktop computer via universal serial bus (USB), for example.

Networked Data and Users

One embodiment invokes dialog boxes allowing the user to choose image, audio, video, or show files or folders from local or networked storage devices, as depicted in FIGS. 4, 9, 10, 31, 41, 42, 43, 44, and 50. Text files of the buildShow.txt embodiment, TextList.txt and FavoritesList.txt, are local files for one embodiment. Similarly, enhancement and reversion files are placed in a local folder to be processed.

Alternative embodiments may provide interfaces to social networks, cloud-based, and internet services. Alternative embodiments may be provided as remote software services. Users could specify, (and show database entries could link), image, audio, video, and show files and folders directly. Separate downloading and re-linking steps may be skipped in some cases. Media may be streamed in some cases. For copy-protected works, an import mechanism may redirect links through the user's paid accounts. Alternative embodiments may link to and manage multiple cloud-based instances of FavoritesList.txt and TextList.txt. The customization process may be automated and managed with a cloud-based service.

Alternative embodiments may allow multiple, remotely located users to simultaneously record and replay initial and second individual real-time directions, medley shows, and selection shows collaboratively or independently. Social network, cloud, and internet connectivity may be employed. For example, while a same song plays, two or more users may each record, at a same time, initial individual real-time directions. Each user may control directions for one or more aspects of a single set of objects and paths. Alternatively, each user may manage all or a portion of directions for parallel sets of objects and paths. Parallel sets of objects may provide additional interactions based on virtual locations, (i.e. via virtual forces, etc.). Second individual real-time directions, where object translation and rotation controls are concerned, may also be shared. Each user may influence a subset of controls for a single set of objects and paths. Alternatively, each user may administer all or a portion of controls for parallel sets of objects and paths. Parallel sets of objects may provide additional interactions based on virtual locations, (i.e. via virtual forces, etc.). Multiple users may also work independently on separate works simultaneously.

Different Activation Inputs

One embodiment uses keyboard keys as blatant auxiliary activation inputs for initial individual real-time directions and menu navigation. For example, keyboard keys are depicted in parentheses within many figures, including the buttons of FIG. 2 and the cue touch items of FIG. 13. One embodiment activates many second individual real-time directions using keyboard keys as inputs.

Alternative embodiments may use different activation inputs. For example, buttons, screen touches, additional keyboard keys, joystick toggles, remote controls, and specific recognitions by way of mice, styluses, pointing devices, direct touches, optical cameras, audio microphones, motion sensors, and thought detectors may encompass activation inputs. Activation inputs may be derived from electronic musical instruments, electronically-adapted musical instruments, and musical instrument emulation devices, for example.

Different Widget and Activation Input Representations, Syntaxes, Icons

One embodiment uses text-based widgets. One embodiment uses text characters to indicate keyboard key activation inputs. Parentheses enclose text characters representing blatant auxiliary activation inputs, for one embodiment.

Alternative embodiments may use graphical representations, textual portrayals, or both to indicate widgets and/or activation inputs. Alternative embodiments may indicate blatant auxiliary activation inputs using a different separator syntax. Blatant auxiliary activation inputs may involve a repetition count. Line numbers may imply repetition counts.

A consistent syntax may distinguish a blatant auxiliary activation input from its widget. FIG. 116A depicts some example button widget menu items similar to the option buttons of FIGS. 2 and 45. They illustrate instances of syntaxes that indicate keyboard key "o" is a blatant auxiliary activation input.

A consistent combination of upper case, lower case, italic, underlined, bold, and other text styles may designate widgets and their blatant auxiliary activation inputs. FIG. 116B portrays some examples of formats to represent button widget menu items similar to the option buttons of FIGS. 2 and 45.

Alternative embodiments may use graphical icons that inform the user of activation inputs. FIG. 117A depicts example icons for motion gesture inputs. Motion sensors and/or gesture recognizers may be integrated into or otherwise connected to a device. The icons are portrayed as blatant auxiliary activation inputs for button widget menu items similar to the option buttons of FIGS. 2 and 45. A few words to describe each motion gesture appear below each example, in parentheses.

Each primary input may be combined with a second input, such as a button press or screen touch, to distinguish primary inputs from normal ambient conditions. For example, pressing a button while providing motion gestures may separate the inputs from normal motions that a portable device might undergo while in transit.

Alternative embodiments may indicate a number of repetitions that applies to a particular input or input combination, effectively refining or "time demultiplexing" a single input or input combination into several activation inputs. FIG. 117B provides four examples of button widget menu items similar to the options, voice, and song buttons of FIGS. 2 and 45. In each example, buttons are activated with a same motion gesture. They are distinguished by the number of consecutive motion gestures in a row, without a significant pause. The options button activates if a single gesture is given. The voice button corresponds to two consecutive gestures, and the song button three, before a pause.

If an input or input combination is established as a default, alternative embodiments may specify a number of repetitions to activate a widget, or an initial or second individual real-time direction. FIG. 117C provides three more examples like that of FIG. 117B, minus icons for motion gesture inputs. The first example uses Arabic numerals, and the second, Roman numerals. The third example uses a line number to infer a repetition count! Consistent use of such menu activation layouts may improve multitasking performance of the user. Identifying a keyword and line number is enough to make a choice!

FIG. 118 provides further examples of icons representing pointer device or direct touch gesture inputs, optical face recognition gesture inputs, and spoken sound recognition phoneme inputs. The icons are portrayed as blatant auxiliary activation inputs for button widget menu items similar to the option buttons of FIGS. 2 and 45. A few words to describe each recognition input appear below each example, in parentheses. Spoken sound recognition phoneme inputs may succeed in noisier environments where speech recognition inputs would fail. Some icons may improve signal-to-noise ratios for thought detectors. Animated or video icons may be employed as well.

Different Widget Organizations, Navigation Flows, Interfaces, Widgets

In addition to new widget and activation input representations, alternative embodiments may rearrange, reorganize, add, and/or remove widgets, pages, navigation flows, and/or interfaces.

One embodiment provides the copy and rename buttons of FIGS. 23, 32, and 47. Alternative embodiments may add similar buttons to the pages of FIGS. 37 and 68, for example.

Different Menu Selection and Program Navigation Techniques

Alternative embodiments may use menubars containing drop-down menus, panes, tabbed notebook widgets, icon toolbars, ribbons, and other program navigation techniques.

An alternative embodiment may provide a new button on the page of FIG. 47 that establishes a second pop-up window for dragging and dropping image preview icons onto the front, right, back, left, top, and bottom buttons to specify images of a three-dimensional image object, for example. New dialog boxes, replacing those in FIGS. 4, 9, 10, 31, 41-44, 50, and 60, may be designed from scratch to include blatant auxiliary activation inputs and image and video preview icons, where relevant, for example. They may also implement application programming interfaces, (APIs), to social networks and cloud services, for example.

Different Devices, Os's, Software Frameworks, and Languages

Alternative embodiments may employ different devices, operating systems, software frameworks, and languages. For example, operating systems of smart phones, tablet computers, and personal digital assistants, may host alternative embodiments written in native development languages. Other languages, such as HTML5, PHP, XML, Ruby, Perl, Javascript, Java, C, C++, C#, ObjectiveC, Assembly, etc. may be utilized. Alternative embodiments may run from a browser application. Alternative embodiments may use different database models.

One embodiment allows for recording and replaying initial and second individual real-time directions, medley shows, and selection shows. One embodiment works on devices running Windows™, Mac OS X™, or Linux™ operating systems. Example devices include netbooks, ultrabooks, laptops, desktops, handhelds, portable computers. External displays and DLPs, may extend a device, for example.

Alternative embodiments may similarly provide for recording and replaying initial and second individual real-time directions, medley shows, and selection shows. Alternative embodiments may work on devices running other operating systems other than Windows™, Mac OS X™, or Linux™. Example devices include netbooks, ultrabooks, laptops, desktops, handhelds, smart phones, portable computers, cell phones, tablet devices, readers, music players, televisions, set-top boxes, digital video disc players (all formats), digital video recorders (DVRs), game consoles, mainframes, server and client machines integrating social network services, cloud services, and internet services. External displays and DLPs, may extend a device, for example.

Performance Improvements

One embodiment is described in concise terms. Alternative embodiments may improve performance using various techniques, including using lower level computer languages that are more efficient, but less concise. Post-processed images, including widths, heights, and string conversions of tdiObjShow.txt, lines 1264 to 1298, may be cached for subsequent runs of shows, for example.

Different International Languages

Alternative embodiments may integrate different international languages, (i.e. instead of English).

Two- and Three-Dimensional Environment Variations, Alterations

One embodiment uses a two-dimensional environment for recording and playing initial individual real-time directions. One embodiment uses a three-dimensional environment for medley and selection shows that include initial and second individual real-time directions.

Alternative embodiments may use two- or three-dimensional environments for recording and playing initial individual real-time directions. Alternative embodiments may employ two- or three-dimensional environments for medley and selection shows that include initial and second individual real-time directions.

A two-dimensional environment advantageously uses fewer device resources and less consequent energy for portable computing devices. A three-dimensional environment advantageously provides a compelling, interactive experience.

Alternative embodiments may emulate three-dimensional aspects within a two-dimensional environment. For example, instead of a rotating three-dimensional image object, a series of images may share an object position via time multiplexing. That is, a set of images may be displayed, one after the other. Rate of change may coincide with what would otherwise be in-place rotation speed. Each image could represent a face of a three-dimensional image object within Face View.

A three-dimensional environment may be further emulated by substituting the following two-dimensional object effects for three-dimensional perspective view actions: 1) zooming in and out instead of moving forward and backward, respectively, 2) panning left and right instead of yawing right and left, respectively, 3) rotating clockwise and counterclockwise instead of rolling counterclockwise and clockwise, respectively, and 4) panning up and down instead of pitching down and up, respectively.

Direct Sheet Music Translation

Alternative embodiments could use the ideas presented to translate sheet music directly into graphical object flows, replacing initial individual real-time directions for "time signatures." Initial individual real-time directions for flow styles, bearings, and tempos, among others, may still be applicable.

Channel Surfing and Program Selection

Providers of multimedia content may provide predefined show object lineups instead of program listings. The user may switch to programs and channels based on their corresponding objects, using existing and/or new second individual real-time directions.

The user may select initial individual real-time direction recordings, object paths, and background audio or video recordings, as usual. Second individual real-time directions are used to peruse program content and channel content objects. Because the user is more engaged than when simply reading a schedule, unfamiliar content is less likely to be overlooked, and more likely to be reviewed, studied, and/or investigated. Show lineups may include promotional objects that switch to advertisements or web sites.

Content providers may provide complete "edit mode" shows that also specify initial individual real-time direction recordings, object paths, and background audio or video recordings. "View mode" shows, that add second individual real-time direction recordings, may also be distributed by content providers. "Edit mode" and "view mode" shows may introduce and/or conclude programs, and/or advertise, for example. Users who want to read end credits for a movie can do so with an "edit mode" or "view mode" show, while a main channel begins a next scheduled movie without boring viewers who are not interested, for example. Facts, trivia, trailers, memorabilia, contests, news, reviews, commentaries, and cartoons are other examples of information that may be distributed with "edit mode" and "view mode" shows.

Multimedia Recorders and Players

Predefined or automatically generated "edit mode" and/or "view mode" shows may provide the user an interface to recorded or featured programs and movies, scene selections, credits, trailers, behind-the-scenes extras, director and/or actor interviews and commentaries, trivia, etc.

Graphical User Interface, (GUI)

"Edit mode" shows perform as general graphical user interfaces, (GUIs), when, for example, second individual real-time directions search for and run programs, batch files, and/or shell script files that correspond to image filenames displayed in Face View. Such second individual real-time directions could be very similar to the ones that play additional audio and/or video recordings, for one embodiment, for example. Alternative embodiments may use additional object database entry fields that allow the user to specify additional materials directly. For example, one embodiment uses a "left" field to specify an image name that corresponds to the left face of an object. Alternative embodiments may include a "left_aud" field that specifies an additional audio recording name that corresponds to the left face of the object, or a "left_pro" field that specifies an additional program name. Directly specified additional materials advantageously have fewer path and file naming constraints.

Additional Uses

Blatant auxiliary activation inputs may be used to navigate programs, operating systems, services, applications, apps, utilities, web pages, etc. Complete screen utilization improves clarity and readability for vision-impaired or reduced-size display users.

Embodiments may be utilized as teaching and practicing tools for typing, music, math, foreign languages, sign languages, vocabulary, and/or motor skills. Instruction and skills practice for other activation input mechanisms may comprise additional uses. Top-down menu layouts help teach "directory tree structure". Embodiments may organize business, promotion, academic, and personal communications. Artistic expression, storytelling, entertainment, mood intervention, and social engagement are further applications.

Importing Scenes from a Video

Providing synopses of videos and a mechanism for commenting on videos are other uses. Reducing a video to a shortened series of images and an audio track diminishes data storage and bandwidth usage.

Alternative embodiments may automate conversions of videos to medley or selection shows. For example, given a list of time instances, an embodiment may rely on an import script to pull out corresponding images from a video and separate its audio portion. Second individual real-time directions that switch to the images in Face View at related time instances may be simulated by script, as well. Commentary audio tracks may be added. Cursor movement and/or zooming second individual real-time directions may be incorporated.

Additional Audio and/or Video Recordings

One embodiment, using the voice and song buttons of FIGS. 2 and 45, plays two audio and/or video recordings when a show starts, (i.e. specified without second individual real-time directions). One embodiment may play additional audio and/or video recordings using second individual real-time directions.

Alternative embodiments may include additional audio and/or video recordings that play when a show starts.

A start delay or skew may delay or advance, respectively, each recording with respect to a show start. In addition, second individual real-time directions may fine-tune each delay for each recording. Such capabilities enable, for example, replaying a conference call or netcast, with local recordings filling in for transmission loss gaps.

Audio and/or Video Recording, Previewing, and/or Editing Capabilities

Alternative embodiments may include audio and/or video recording, previewing, and/or editing capabilities.

Image Capture and/or Editing Capabilities

Alternative embodiments may include image capture and editing capabilities.

Different Behaviors after Initial Individual Real-Time Directions Finish

As explained with lines 3291 to 3295 of tdiObjShow.txt, speed control of objects switches from initial to second individual real-time directions, after an initial individual real-time direction recording has finished. Alternative embodiments may choose instead to stop a show, repeat a same initial individual real-time direction recording, start a new initial individual real-time direction recording, or implement other behaviors.

Appending Second Individual Real-Time Directions

As explained with lines 2198 to 2204 of tdiObjShow.txt, alternative embodiments could provide an option to append new second individual real-time directions at the end of a "view mode" show.

Automatic Search, Download, and/or Link

The bottom three checkbuttons of the import pages of FIGS. 39 and 69 indicate to one embodiment where separately downloaded files may be found. Corresponding paths in database entries are automatically modified. Alternative embodiments may provide options that automatically search and find referenced titles, download them if pertinent, and update pathnames or universal resource locators, (URLs), within database entries. Searches may be performed on local storage devices, network attached storage devices, or on the internet.

Message Authentication Code Options for Covering Additional Recordings, Services, Applications, and Content One embodiment authenticates images of three-dimensional image objects. Alternative embodiments may include an option to include show audio and/or video file content for authentication purposes. Because these files may be quite long, an import process may experience delays.

One embodiment does not include additional recordings, services, applications, and/or content that correspond to image or video names displayed in Face View as part of a show database. Alternative embodiments, during a save process, may conduct a search for these additional materials and include them as part of a show database. Alternative embodiments may use additional object database entry fields that allow the user to specify additional materials directly. For example, one embodiment uses a "left" field to specify an image name that corresponds to the left face of an object. Alternative embodiments may include a "left_aud" field that specifies an additional audio recording name that corresponds to the left face of the object, or a "left_pro" field that specifies an additional program name. Directly specified additional materials advantageously have fewer path and file naming constraints. An option to include their contents for authentication purposes may be provided.

Message Authentication Codes Covering Entire Export Text Messages

One embodiment includes message authentication codes in show and object database entries. Alternative embodiments may include a message authentication code within an export text file that authenticates the entire file. A change to the show export text file, (not made with the buildShow.txt embodiment), may be detected and a show import operation cancelled. An "AUTHENTICATION CODE:" label and the message authentication code may be displayed near the "CURRENT FILE:" label of FIGS. 39 and 69. The user may optionally send the message authentication code on a trusted channel to confirm origination. A change to the show export text file, even if made by the buildShow.txt embodiment, could then be manually detected before importing.

Show Export Binary Files

One embodiment uses show export text files. Alternative embodiments may use show export binary files.

Export Files Containing Referenced Material as Well

Show export text files for one embodiment contain no media content other than, potentially, TextList.txt. Show export text or binary files for alternative embodiments may contain additional relevant media content, such as referenced images, or audio or video recordings, for example.

Splash Messages for Medley and/or Selection Shows

Similar to the splash message that closes the buildShow.txt embodiment, depicted in FIGS. 101-103, alternative embodiments may allow the user to specify custom splash messages for medley and/or selection shows. Messages may appear after a show opens, at specified times during the show, and/or before it closes, for example.

Different Splash Messages for Embodiments

One embodiment uses a single splash message when closing. Alternative embodiments may use different splash messages when opening and/or closing. A single message helps brand a product. Alternative embodiments could use multiple different messages for closings and/or openings. Multiple different messages help keep a product fresh and new. Alternative embodiments could allow the user to customize closing and/or opening messages. Custom messages provide a creative outlet for users.

Multiple Show Playlists

One embodiment plays initial individual real-time direction recordings and "view mode" shows one at a time. Alternative embodiments may allow the user to play several, successively, one after the other.

Enclosed Virtual Space

One embodiment does not limit virtual perspective changes. Alternative embodiments may enforce limits on virtual space volumes. Alternative embodiments may nix background scenery objects to ensure unencumbered views of such limits.

Computer Controlled Target and/or Obstacle Objects

A background scenery object and objects on a lineup are included in a show, for one embodiment. Alternative embodiments may include additional stationary and/or moving target and/or obstacle objects to intercept or avoid, respectively, by chance or skill. Moving obstacles may be programmed with distinguishable behavior traits or a random set of vectors, for example.

Different Customization Interface, Customizations, Process

One embodiment uses plaintext enhancement and reversion files depicted in FIG. 104 and the customize button of FIG. 5 to illustrate a customization process concept. Alternative embodiments would provide a full-fledged interface to choose, request, turn on or revert, and otherwise manage customizations. Alternative embodiments with greater or fewer startup variable values, potentially eligible for customizations, may have correspondingly different strVars.txt file formats.

Instead of enhancement and reversion files, a complete, new, encrypted strVars.txt file may be delivered in response to a customization request. Public-key cryptography could then be used whereby an embodiment would read strVars.txt using a public key. An embodiment would not have to modify strVars.txt, and therefore the public key would suffice. A remote service would use the secret key to write the encrypted file. If an embodiment were reverse-engineered to discover the public key, a third party could read encrypted strVars.txt files, but could not alter or write them. The remote service would maintain distribution control of unique, new, encrypted strVars.txt files.

Advantages

Advantages of one or more aspects help users enjoy creating personally moving presentations. Users can experiment with initial individual real-time directions, paths, second individual real-time directions, audio recordings, video recordings, additional services, applications, and/or content for various objects, lighting devices, machines, and/or robots.

An advantage of one or more aspects challenges users on how best to evoke an emotional response, and/or avoid obstacle objects, and/or intercept target objects, and/or create artistic, intriguing, unique, and/or funny perspectives. Providing such creative outlets is a hook for becoming familiar with initial and second individual real-time directions. In addition to developing informal presentations that may, for example, convey recent personal events, messages, and/or artistic sensibilities, they may be used for professional, educational, developmental, therapeutical, entertaining, promotional, and other commercial endeavors. User familiarity with second individual real-time directions stimulates curiosity and greater interactivity with third-party exhibits.

An advantage of one of more aspects encourages repetitive use of input mechanisms which boosts skill level and improves productivity. Specific input mechanisms may be targeted for more practice using the customization process or editing strVars.txt.

An advantage of one or more aspects allows users to make distinctive changes that are remembered on subsequent runs. User demand for customizations can be monetized by a supplier.

An advantage of one or more aspects pairs distinct presentation views of specific objects with audio recordings, video recordings, zoom recordings, pan recordings, cursor movement recordings, additional services, additional applications, and/or additional content. Second individual real-time directions exhibit or discover them.

An advantage of one or more aspects visually animates musical concepts, promoting discussion, learning, and appreciation of music, math, arts, and sciences.

An advantage of one or more aspects enables small export text files to share, authenticate, and manage personally moving presentations without infringing copyrighted works. Shows are experienced as intended using personally licensed copies of referenced published songs or music-videos, for example.

An advantage of one or more aspects generates demand for personally licensed copies of published works.

An advantage of one or more aspects automatically recreates unique, colorful text objects from a TextList.txt file, (wrapped within an export text file) when importing a show. Complete shows may thus be shared with export text files. Copies of published works, if referenced, may already be personally licensed and available.

An advantage of one or more aspects allows easy production, exporting, authenticating, importing, and managing of shows incorporating initial and/or second individual real-time directions. Shows may act as graphical user interfaces for images, documents, audio recordings, video recordings, additional services, additional applications, and/or additional content.

An advantage of one or more aspects presents and shares information contained within a video using less bandwidth. High quality images and audio recordings are valued more highly than low quality videos, when bandwidth is a concern.

An advantage of one or more aspects reproduces teleconferences or netcasts or podcasts using high quality, remotely recorded audio and/or video recordings, images and/or documents. Remote recordings are not subject to transmission errors and/or packet losses and resultant distortions and/or drops.

An advantage of one or more aspects parlays one specific set of choices into another, one screenful at a time. Displays are fully utilized with fonts and icons that are easily distinguished.

An advantage of one or more aspects depicts auxiliary activation inputs blatantly, providing a productivity boost without memorization and efficacious use of available device inputs.

An advantage of one or more aspects automatically specifies, authenticates, and produces three-dimensional image and video objects from files contained in a single directory.

An advantage of one or more aspects enables a user to specify, authenticate, and produce distinctive three-dimensional image, document, and video objects.

An advantage of one or more aspects enables a user to organize images, documents, and videos. When specific images, documents, and/or videos are viewed within a show, their filenames may be posted to a FavoritesList.txt file via second individual real-time directions. Entries from the list may be previewed and chosen directly when specifying three-dimensional image, document, and/or video objects.

An advantage of one or more aspects sets virtual background surround scenes using three-dimensional image or video objects. Many uncluttered background wallpaper images are easily deployed.

An advantage of one or more aspects freezes shows while still displaying them, dramatically reducing processor utilization.

An advantage of one or more aspects reduces show refresh rates while still maintaining synchronization with audio and/or video recordings. Processor utilization is dramatically reduced. A show produced on a high-end device may still be watched on a lower-end device. An ongoing, productivity boosting, background show may be displayed with low processor utilization. Another advantage of one or more aspects temporarily upgrades show refresh rates, providing a full-featured experience on demand.

Conclusion, Ramifications, and Scope

Initial individual real-time directions manipulate object movements, in-place rotations, in-place animations, paths, colors, or patterns. Multiple levels of complexity are achieved when paths themselves are treated as objects on super-paths. Additional intricacies are generated with object or path interactions or additional users. Multiple recording sessions of initial individual real-time directions, controlling separate aspects or different sets of objects may be combined into a single show.

Second individual real-time directions manipulate object movements, (absent initial individual real-time directions), in-place rotations, (absent initial individual real-time directions), in-place animations, (absent initial individual real-time directions), or sizes. They control virtual perspectives, (including Stage Views, Survey Views, Face Views, or custom views), background scenery, object set transitions, pausing, freezing, or muting. They interface with additional audio or video recordings, second individual real-time direction recordings corresponding to specific Face View content, services, applications or content. They manage Survey View or Face View zooming, (in or out), or Face View panning or cursor movements. They manage aspect ratios, resolution upgrades, or content identification additions to a favorites list. They resize, hide, restore, or close show windows. They upgrade show refresh rates on demand, if relevant.

Shows containing colorful text messages are easily composed, assembled, shared, authenticated and managed using a TextList.txt file, auto-generated text objects, and export text files.

Shows may be shared, authenticated, and managed using small export text files that do not infringe copyrights. Incorporated works, (other than TextList.txt), are referenced, not included.

Shows themselves, in conjunction with second individual real-time directions, make personally moving, interactive, graphical user interfaces, (GUIs). For example, objects may be perused and examined in Face View. Second individual real-time directions specific to each view of each object may be activated to instigate other services, applications, and content, for example. A three-dimensional virtual environment provides clarity for learning second individual real-time directions that may be emulated elsewhere in two-dimensions, if warranted by device hardware constraints.

Initial and second individual real-time directions may be re-purposed to influence lighting devices and mechanical movements. For example, LED light flashes on a windmill arm may emulate objects on the circular path of FIG. 13. Or initial individual real-time directions could influence motor currents and cause a robotic arm to circle in a similar fashion, for example. Zooming in and out with second individual real-time directions could influence the flash time of the windmill's LEDs or the height of the robot's arm, as further examples. Holiday light displays may be synchronized with music using initial and/or second individual real-time directions, for example.

Those of skill in the art will appreciate that other embodiments may be realized. First, particular naming of components, capitalization of terms, attributes, data structures, or any other programming or structural aspect is not mandatory or significant, and mechanisms that implement features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present a feature in terms of algorithms and symbolic representations of operations on information. These algorithmic descriptions and representations are used to most effectively convey substance. These operations, while described functionally or logically, are understood to be implemented by computer programs, which are stored in computer readable mediums. Furthermore, these arrangements of operations can be equivalently referred to as modules or code devices, without loss of generality.

It should be borne in mind, however, that these and similar terms are to be associated with appropriate physical quantities and are merely convenient labels applied to these quantities. Unless specifically stated otherwise, it is appreciated that throughout the description, discussions utilizing terms such as "calculating" or "determining" or the like, refer to action and processes of a computer system or similar electronic computing device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be loaded to reside on and be operated from different type of computing platforms.

Apparatus employing methods described herein may be constructed for the purposes, or may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and illustrations presented herein are not inherently related to any particular computer or other apparatus. Various general-purpose systems may also be used with programs in accordance with the teachings herein, or it may prove convenient to construct more specific apparatus to perform the method steps. The structure for a variety of these systems will appear from the description above. In addition, the methods not described with reference to any particular programming language. It is appreciated that a variety of programming languages may be used to implement the teachings as described herein, and any references to specific languages are provided for disclosure of enablement.

The methods are well-suited to a wide variety of computer network systems over numerous topologies. Within this field, configuration and management of large networks comprise storage devices and computers that are communicatively coupled to dissimilar computers and storage devices over a network, such as the internet.

Although the description above contains many specificities, these should not be construed as limiting the scope of the embodiments but as merely providing illustrations of some of several embodiments. The scope of the embodiments should be determined by the appended claims and their legal equivalents, rather than by the examples given.

I claim:

1. A method for generating rhythmic motion, color, and group flows (sequences) comprising:

A display, a memory, a central and graphics processor, a human input or pointing means;

wherein a circle is displayed on the screen containing a definite number of icons arranged, evenly spaced, about a locus of a circle and forms a skeletal basis upon which icon motions, colors, and groups are chosen;

wherein definite sets of motions, colors, and groups are cited and linked to specific user inputs for activation;

wherein four sets of motions are cited and linked to four keyboard keys and apply equally to all icons and are either clockwise or counterclockwise around said circle, the motions are defined by a time signature, X/Y, where X represents a number of beats before resetting to an initial orientation, and (1/Y*360) gives a number of degrees of arc movement around said circle for each beat, the motion may be either "staccato," (instantaneous jump to next beat position), or "legato," (smooth flow to next beat position utilizing two speed phases) and motion beat rates are given by a beat tempo;

wherein each set of colors defines a single color for each icon;

wherein each set of groups defines which icons are visible and which are hidden by background color, color sets and group sets may be "static" (consisting of a single set), or "dynamic," (consisting of several sets that cycle automatically), Wherein a tempo may be defined for a dynamic color or group set to control its cycle speed, the tempo is either independent tempo, (i.e. controlling just the cycle speed of the set), or tied to a current motion tempo, (i.e. each cycle corresponds to a current motion beat), which contains a delay indicating what percentage of current motion beat to wait before effecting a next color or group cycle, wherein a recording session records real-time activations of said specific user inputs, initial individual real-time directions, for later play back, and depicts consequent changes in icon motions, colors, and groups, wherein replays of the icon motion, color, and group sequences is portrayed on a circular path or an arbitrary closed-loop path.

* * * * *